(12) United States Patent
Cosic

(10) Patent No.: US 10,223,621 B1
(45) Date of Patent: *Mar. 5, 2019

(54) ARTIFICIALLY INTELLIGENT SYSTEMS, DEVICES, AND METHODS FOR LEARNING AND/OR USING VISUAL SURROUNDING FOR AUTONOMOUS OBJECT OPERATION

(71) Applicant: Jasmin Cosic, Miami, FL (US)

(72) Inventor: Jasmin Cosic, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/829,984

(22) Filed: Dec. 4, 2017

Related U.S. Application Data

(63) Continuation of application No. 15/245,046, filed on Aug. 23, 2016, now Pat. No. 9,864,933.

(51) Int. Cl.
| | | |
|---|---|---|
| *G06K 9/00* | (2006.01) | |
| *G06K 9/66* | (2006.01) | |
| *G06K 9/52* | (2006.01) | |
| *G06K 9/62* | (2006.01) | |
| *G06N 99/00* | (2010.01) | |

(52) U.S. Cl.
CPC ............ *G06K 9/66* (2013.01); *G06K 9/52* (2013.01); *G06K 9/6215* (2013.01); *G06N 99/005* (2013.01)

(58) Field of Classification Search
None
See application file for complete search history.

(56) References Cited

U.S. PATENT DOCUMENTS

| | | |
|---|---|---|
| 4,370,707 A | 1/1983 | Phillips et al. |
| 4,730,315 A | 3/1988 | Saito et al. |
| 4,860,203 A | 8/1989 | Corrigan et al. |
| 5,560,011 A | 9/1996 | Uyama |
| 5,592,661 A | 1/1997 | Eisenberg et al. |
| 5,602,982 A | 2/1997 | Judd et al. |
| 5,758,333 A | 5/1998 | Bauer et al. |
| 5,983,232 A | 11/1999 | Zhang |
| 6,026,234 A | 2/2000 | Hanson et al. |
| 6,088,731 A | 7/2000 | Kiraly et al. |
| 6,106,299 A | 8/2000 | Ackermann et al. |
| 6,126,330 A | 10/2000 | Knight |
| 6,314,558 B1 | 11/2001 | Angel et al. |
| 6,643,842 B2 | 11/2003 | Angel et al. |
| 6,728,689 B1 | 4/2004 | Drissi et al. |
| 6,735,632 B1 | 5/2004 | Kiraly et al. |
| 6,754,631 B1 | 6/2004 | Din |
| 6,801,912 B2 | 10/2004 | Moskowitz et al. |
| 6,842,877 B2 | 1/2005 | Robarts et al. |
| 6,850,942 B2 | 2/2005 | Cotner et al. |
| 6,915,105 B2 | 7/2005 | Masuda |
| 6,973,446 B2 | 12/2005 | Mamitsuka et al. |

(Continued)

OTHER PUBLICATIONS

About | OpenCV, retrieved from <URL: http://opencv.org/about.html> on Dec. 13, 2014, 1 pages.

(Continued)

*Primary Examiner* — Soo Jin Park

(57) ABSTRACT

Aspects of the disclosure generally relate to computing devices and/or systems, and may be generally directed to devices, systems, methods, and/or applications for learning operation of an application or an object of an application in various visual surroundings, storing this knowledge in a knowledgebase (i.e. neural network, graph, sequences, etc.), and enabling autonomous operation of the application or the object of the application.

20 Claims, 38 Drawing Sheets

(56) References Cited

U.S. PATENT DOCUMENTS

| | | |
|---|---|---|
| 7,017,153 B2 | 3/2006 | Gouriou et al. |
| 7,052,277 B2 | 5/2006 | Kellman |
| 7,082,435 B1 | 7/2006 | Guzman et al. |
| 7,113,946 B2 | 9/2006 | Cosic |
| 7,117,225 B2 | 10/2006 | Cosic |
| 7,222,127 B1 | 5/2007 | Bem et al. |
| 7,240,335 B2 | 7/2007 | Angel et al. |
| 7,249,349 B2 | 7/2007 | Hundt et al. |
| 7,395,255 B2 | 7/2008 | Li |
| 7,409,401 B2 | 8/2008 | Hansen et al. |
| 7,424,705 B2 | 9/2008 | Lewis et al. |
| 7,444,338 B1 | 10/2008 | Fisher |
| 7,478,371 B1 | 1/2009 | Gove |
| 7,484,205 B2 | 1/2009 | Venkatapathy |
| 7,533,128 B1 | 5/2009 | Sanchez et al. |
| 7,565,340 B2 | 7/2009 | Herlocker et al. |
| 7,721,218 B2 | 5/2010 | Awe et al. |
| 7,765,537 B2 | 7/2010 | Havin et al. |
| 7,797,259 B2 | 9/2010 | Jiang et al. |
| 7,831,564 B1 | 11/2010 | Wei et al. |
| 7,840,060 B2 | 11/2010 | Podilchuk |
| 7,849,114 B2 | 12/2010 | Boss et al. |
| 7,925,984 B2 | 4/2011 | Awe et al. |
| 7,987,144 B1 | 7/2011 | Drissi et al. |
| 8,005,828 B2 | 8/2011 | Buchner et al. |
| 8,019,699 B2 | 9/2011 | Baxter |
| 8,078,556 B2 | 12/2011 | Adi et al. |
| 8,090,669 B2 | 1/2012 | Shahani et al. |
| 8,137,112 B2 | 3/2012 | Woolf et al. |
| 8,166,463 B2 | 4/2012 | Gill et al. |
| 8,195,674 B1 | 6/2012 | Bem et al. |
| 8,196,119 B2 | 6/2012 | Gill et al. |
| 8,244,730 B2 | 8/2012 | Gupta |
| 8,251,704 B2 | 8/2012 | Woolf et al. |
| 8,261,199 B2 | 9/2012 | Cradick et al. |
| 8,266,608 B2 | 9/2012 | Hecht et al. |
| 8,335,805 B2 | 12/2012 | Cosic |
| 8,364,612 B2 | 1/2013 | Van Gael et al. |
| 8,386,401 B2 | 2/2013 | Virkar et al. |
| 8,397,227 B2 | 3/2013 | Fan et al. |
| 8,417,740 B2 | 4/2013 | Cosic |
| 8,464,225 B2 | 6/2013 | Greifeneder |
| 8,549,359 B2 | 10/2013 | Zheng |
| 8,572,035 B2 | 10/2013 | Cosic |
| 8,589,414 B2 | 11/2013 | Waite et al. |
| 8,655,260 B2 | 2/2014 | Yueh et al. |
| 8,655,900 B2 | 2/2014 | Cosic |
| 8,667,472 B1 | 3/2014 | Molinari |
| 8,762,428 B2 | 6/2014 | Kulack et al. |
| 8,949,186 B1 | 2/2015 | Yueh et al. |
| 8,996,432 B1 | 3/2015 | Fu |
| 9,047,324 B2 | 6/2015 | Cosic |
| 9,268,454 B2 | 2/2016 | Hamilton, II et al. |
| 9,282,309 B1 | 3/2016 | Cosic |
| 9,298,749 B2 | 3/2016 | Cosic |
| 9,305,216 B1 | 4/2016 | Mishra |
| 9,367,806 B1 | 6/2016 | Cosic |
| 2002/0019822 A1 | 2/2002 | Seki et al. |
| 2003/0026588 A1 | 2/2003 | Elder et al. |
| 2003/0065662 A1 | 4/2003 | Cosic |
| 2004/0117771 A1 | 6/2004 | Venkatapathy |
| 2004/0194017 A1 | 9/2004 | Cosic |
| 2004/0249774 A1 | 12/2004 | Caid et al. |
| 2004/0267521 A1 | 12/2004 | Cutler et al. |
| 2005/0149517 A1 | 7/2005 | Cosic |
| 2005/0149542 A1 | 7/2005 | Cosic |
| 2005/0154745 A1 | 7/2005 | Hansen et al. |
| 2005/0240412 A1 | 10/2005 | Fujita |
| 2005/0245303 A1 | 11/2005 | Graepel et al. |
| 2005/0289105 A1 | 12/2005 | Cosic |
| 2006/0047612 A1 | 3/2006 | Stanley et al. |
| 2006/0184410 A1 | 8/2006 | Ramamurthy et al. |
| 2006/0190930 A1 | 8/2006 | Hecht et al. |
| 2006/0259466 A1 | 11/2006 | Bilotti |
| 2006/0265406 A1 | 11/2006 | Chkodrov et al. |
| 2007/0006159 A1 | 1/2007 | Hecht et al. |
| 2007/0050606 A1 | 3/2007 | Ferren et al. |
| 2007/0050719 A1 | 3/2007 | Lui et al. |
| 2007/0058856 A1 | 3/2007 | Boregowda et al. |
| 2007/0061735 A1 | 3/2007 | Hoffberg et al. |
| 2007/0106633 A1 | 5/2007 | Reiner |
| 2008/0071770 A1 | 3/2008 | Schloter et al. |
| 2008/0144893 A1 | 6/2008 | Guo et al. |
| 2008/0215508 A1 | 9/2008 | Hanneman et al. |
| 2008/0254429 A1 | 10/2008 | Woolf et al. |
| 2008/0281764 A1 | 11/2008 | Baxter |
| 2008/0288259 A1 | 11/2008 | Chambers et al. |
| 2009/0067727 A1 | 3/2009 | Hirohata |
| 2009/0070337 A1 | 3/2009 | Romem et al. |
| 2009/0110061 A1 | 4/2009 | Lee et al. |
| 2009/0131152 A1 | 5/2009 | Busse |
| 2009/0136095 A1 | 5/2009 | Marcon et al. |
| 2009/0141969 A1 | 6/2009 | Yu et al. |
| 2009/0222388 A1 | 9/2009 | Hua et al. |
| 2009/0287643 A1 | 11/2009 | Corville et al. |
| 2009/0324010 A1 | 12/2009 | Hou |
| 2010/0023541 A1 | 1/2010 | Cosic |
| 2010/0033780 A1 | 2/2010 | Gitter |
| 2010/0063949 A1 | 3/2010 | Eaton et al. |
| 2010/0082536 A1 | 4/2010 | Cosic |
| 2010/0114746 A1 | 5/2010 | Bobbitt et al. |
| 2010/0138370 A1 | 6/2010 | Wu et al. |
| 2010/0241595 A1 | 9/2010 | Felsher |
| 2010/0278420 A1 | 11/2010 | Shet et al. |
| 2011/0004586 A1 | 1/2011 | Cherryholmes et al. |
| 2011/0007079 A1 | 1/2011 | Perez et al. |
| 2011/0030031 A1 | 2/2011 | Lussier et al. |
| 2011/0085734 A1 | 4/2011 | Berg et al. |
| 2011/0093435 A1 | 4/2011 | Zha et al. |
| 2011/0218672 A1 | 9/2011 | Maisonnier et al. |
| 2011/0270794 A1 | 11/2011 | Drory et al. |
| 2012/0089570 A1 | 4/2012 | Zha et al. |
| 2012/0150773 A1 | 6/2012 | DiCorpo et al. |
| 2012/0167057 A1 | 6/2012 | Schmich et al. |
| 2012/0284026 A1 | 11/2012 | Cardillo et al. |
| 2012/0290347 A1 | 11/2012 | Elazouni et al. |
| 2013/0007532 A1 | 1/2013 | Miller et al. |
| 2013/0156345 A1 | 6/2013 | Shmunk |
| 2013/0159021 A1 | 6/2013 | Felsher et al. |
| 2013/0204907 A1 | 8/2013 | Alonso Alarcon et al. |
| 2013/0218932 A1 | 8/2013 | Cosic |
| 2013/0226974 A1 | 8/2013 | Cosic |
| 2013/0238533 A1 | 9/2013 | Virkar et al. |
| 2013/0278631 A1 | 10/2013 | Border et al. |
| 2014/0052717 A1 | 2/2014 | Franks et al. |
| 2014/0075249 A1 | 3/2014 | Sato et al. |
| 2014/0143276 A1 | 5/2014 | Rogers et al. |
| 2014/0161250 A1 | 6/2014 | Leeds et al. |
| 2014/0164430 A1 | 6/2014 | Hadjieleftheriou et al. |
| 2014/0177946 A1 | 6/2014 | Lim et al. |
| 2014/0207580 A1 | 7/2014 | Minnis et al. |
| 2014/0211988 A1 | 7/2014 | Fan et al. |
| 2015/0006171 A1 | 1/2015 | Westby et al. |
| 2015/0039304 A1 | 2/2015 | Wein |
| 2015/0055821 A1 | 2/2015 | Fotland |
| 2015/0264306 A1 | 9/2015 | Marilly et al. |
| 2015/0269415 A1 | 9/2015 | Gelbman |
| 2015/0310041 A1 | 10/2015 | Kier et al. |
| 2015/0324685 A1 | 11/2015 | Bohn et al. |
| 2015/0339213 A1 | 11/2015 | Lee et al. |
| 2016/0140999 A1 | 5/2016 | Cosic |
| 2016/0142650 A1 | 5/2016 | Cosic |
| 2016/0167226 A1 | 6/2016 | Schnittman |
| 2016/0274187 A1 | 9/2016 | Menon et al. |
| 2016/0328480 A1 | 11/2016 | Owens et al. |

OTHER PUBLICATIONS

Animetrics, Inc. | 3D Facial Recognition, retrieved from <URL: http://animetrics.com/> on Dec. 13, 2014, 2 pages.

Bag-of-words model, retrieved from <URL: http://wikipedia.com> on Nov. 19, 2015, 2 pages.

(56) References Cited

OTHER PUBLICATIONS

Beier-Neely morphing algorithm, retrieved from <URL: http://wikipedia.com> on Nov. 19, 2015, 1 pages.
Computer vision, retrieved from <URL: http://wikipedia.com> on Nov. 19, 2015, 7 pages.
Convolutional neural network, retrieved from <URL: http://wikipedia.com> on Nov. 11, 2015, 5 pages.
Decimation (signal processing), retrieved from <URL: http://wikipedia.com> on Nov. 19, 2015, 3 pages.
Digital image processing, retrieved from <URL: http://wikipedia.com> on Nov. 19, 2015, 3 pages.
Dissolve (filmmaking), retrieved from <URL: http://wikipedia.com> on Nov. 11, 2015, 2 pages.
Facial recognition system, retrieved from <URL: http://wikipedia.com> on Nov. 11, 2015, 6 pages.
Feature detection (computer vision), retrieved from <URL: http://wikipedia.com> on Nov. 19, 2015, 3 pages.
Feature extraction, retrieved from <URL: http://wikipedia.com> on Nov. 19, 2015, 2 pages.
Gesture recognition, retrieved from <URL: http://wikipedia.com> on Nov. 19, 2015, 5 pages.
GrabCut, retrieved from <URL: http://wikipedia.com> on Nov. 1, 2015, 1 pages.
Image processing, retrieved from <URL: http://wikipedia.com> on Nov. 19, 2015, 2 pages.
Image segmentation, retrieved from <URL: http://wikipedia.com> on Nov. 19, 2015, 12 pages.
Image warping, retrieved from <URL: http://wikipedia.com> on Nov. 1, 2015, 2 pages.
Inbetweening, retrieved from <URL: http://wikipedia.com> on Nov. 11, 2015, 2 pages.
Interpolation, retrieved from <URL: http://wikipedia.com> on Nov. 1, 2015, 5 pages.
Language model, retrieved from <URL: http://wikipedia.com> on Nov. 19, 2015, 4 pages.
List of speech recognition software, retrieved from <URL: http://wikipedia.com> on Nov. 19, 2015, 4 pages.
Livewire Segmentation Technique, retrieved from <URL: http://wikipedia.com> on Nov. 1, 2015, 2 pages.
Morphing, retrieved from <URL: http://wikipedia.com> on Nov. 11, 2015, 2 pages.
Motion estimation, retrieved from <URL: http://wikipedia.com> on Nov. 19, 2015, 2 pages.
Muse: Face Morph || Mesh Warping, retrieved from <URL: http://alexwolfe.blogspot.com/2011/10/face-morph-mesh-warping.html> on Nov. 19, 2015, 2 pages.
N-gram, retrieved from <URL: http://wikipedia.com> on Nov. 1, 2015, 5 pages.
Optical flow, retrieved from <URL: http://wikipedia.com> on Nov. 1, 2015, 4 pages.
Outline of object recognition, retrieved from <URL: http://wikipedia.com> on Nov. 19, 2015, 7 pages.
Phonotactics, retrieved from <URL: http://wikipedia.com> on Nov. 19, 2015, 3 pages.
Recurrent neural network, retrieved from <URL: http://wikipedia.com> on Nov. 11, 2015, 5 pages.
Sample rate conversion, retrieved from <URL: http://wikipedia.com> on Nov. 1, 2015, 2 pages.
Simple interactive object extraction, retrieved from <URL: http://wikipedia.com> on Nov. 19, 2015, 2 pages.
Speech recognition, retrieved from <URL: http://wikipedia.com> on Nov. 11, 2015, 12 pages.
Speech segmentation, retrieved from <URL: http://wikipedia.com> on Nov. 1, 2015, 4 pages.
Welcome to recognize-speech.com, retrieved from <URL: http://recognize-speech.com/> on Oct. 18, 2015, 1 pages.
Introduction Speech, retrieved from <URL: http://recognize-speech.com/speech> on Oct. 18, 2015, 1 pages.
Preprocessing, retrieved from <URL: http://recognize-speech.com/preprocessing> on Oct. 18, 2015, 4 pages.
Feature Extraction, retrieved from <URL: http://recognize-speech.com/feature-extractions> on Oct. 18, 2015, 3 pages.
Acoustic model, retrieved from <URL: http://recognize-speech.com/acoustic-model> on Oct. 18, 2015, 2 pages.
Video content analysis, retrieved from <URL: http://wikipedia.com> on Nov. 19, 2015, 2 pages.
Video tracking, retrieved from <URL: http://wikipedia.com> on Nov. 1, 2015, 2 pages.
Andrej Karpathy, Thomas Leung, George Toderici, Rahul Sukthankar, Sanketh Shetty, Li Fei-Fei, Large-scale Video Classification with Convolutional Neural Networks, Apr. 14, 2014, 8 pages, Stanford University.
Karen Simonyan, Andrew Zisserman, Two-Stream Convolutional Networks for Action Recognition in Videos, Nov. 13, 2014, 11 pages, University of Oxford.
2D computer graphics, retrieved from <URL: http://wikipedia.com> on Nov. 9, 2014, 7 pages.
3D computer graphics, retrieved from <URL: http://wikipedia.com> on Nov. 9, 2014, 3 pages.
3D modeling, retrieved from <URL: http://wikipedia.com> on Nov. 9, 2014, 5 pages.
8: Mouse Handling, retrieved from <URL: http://ericsink.com/wpf3d/8_Mouse.html> on Nov. 13, 2014, 2 pages.
AutoCAD, retrieved from <URL: http://wikipedia.com> on Nov. 9, 2014, 7 pages.
Collision detection, retrieved from <URL: http://wikipedia.com> on Nov. 23, 2014, 5 pages.
Comparison of OpenGL and Direct3D, retrieved from <URL: http://wikipedia.com> on Nov. 22, 2014, 7 pages.
Data dictionary, retrieved from <URL: http://wikipedia.com> on Nov. 6, 2014, 3 pages.
DBA_TABLES, retrieved from <URL: http://wikipedia.com> on Nov. 6, 2014, 1 pages.
Digital sculpting, retrieved from <URL: http://wikipedia.com> on Nov. 12, 2014, 3 pages.
Facial recognition system, retrieved from <URL: http://wikipedia.com> on Dec. 13, 2014, 7 pages.
Game engine, retrieved from <URL: http://wikipedia.com> on Nov. 23, 2014, 4 pages.
JavaFX, retrieved from <URL: http://wikipedia.com> on Nov. 22, 2014, 7 pages.
Jreality, retrieved from <URL: http://wikipedia.com> on Nov. 22, 2014, 3 pages.
List of 14+ Image Recognition APIs, retrieved from <URL: http://blog.mashape.com/list-of-14-image-recognition-apis/> on Dec. 13, 2014, 2 pages.
List of 50+ Face Detection / Recognition APIs, libraries, and software, retrieved from <URL: http://blog.mashape.com/list-of-50-face-detection-recognition-apis/> on Dec. 13, 2014, 4 pages.
List of file formats, retrieved from <URL: http://wikipedia.com> on Nov. 9, 2014, 33 pages.
List of game engines, retrieved from <URL: http://wikipedia.com> on Nov. 22, 2014, 17 pages.
Lua (programming language), retrieved from <URL: http://wikipedia.com> on Nov. 25, 2014, 10 pages.
Mantle (API), retrieved from <URL: http://wikipedia.com> on Nov. 22, 2014, 5 pages.
Microsoft XNA, retrieved from <URL: http://wikipedia.com> on Nov. 22, 2014, 7 pages.
3.4 Getting Information About Databases and Tables, retrieved from <URL: http://dev.mysql.com/doc/refman/5.7/en/getting-information.html> on Nov. 6, 2014, 2 pages.
MySQL show users—how to show the users in a MySQL database, retrieved from <URL: http://alvinalexander.com/blog/post/mysql/show-users-i-ve-created-in-mysql-database> on Nov. 6, 2014, 4 pages.
OpenCV, retrieved from <URL: http://wikipedia.com> on Dec. 13, 2014, 3 pages.
Optical character recognition, retrieved from <URL: http://wikipedia.com> on Dec. 13, 2014, 6 pages.
Outline of object recognition, retrieved from <URL: http://wikipedia.com> on Dec. 13, 2014, 8 pages.

(56) References Cited

OTHER PUBLICATIONS

Particle system, retrieved from <URL: http://wikipedia.com> on Nov. 12, 2014, 3 pages.
Physics engine, retrieved from <URL: http://wikipedia.com> on Nov. 23, 2014, 5 pages.
Polygonal modeling, retrieved from <URL: http://wikipedia.com> on Nov. 12, 2014, 4 pages.
POV-Ray, retrieved from <URL: http://wikipedia.com> on Nov. 10, 2014, 5 pages.
Raster graphics, retrieved from <URL: http://wikipedia.com> on Nov. 9, 2014, 3 pages.
Scene graph, retrieved from <URL: http://wikipedia.com> on Nov. 22, 2014, 4 pages.
STL (file format), retrieved from <URL: http://wikipedia.com> on Nov. 11, 2014, 4 pages.
Subdivision surface, retrieved from <URL: http://wikipedia.com> on Nov. 12, 2014, 3 pages.
Sysobjects, retrieved from <URL: http://technet.microsoft.com/en-us/library/aa260447(d=default,I=en-us,v=sql.80).aspx> on Nov. 6, 2014, 2 pages.
Vector graphics, retrieved from <URL: http://wikipedia.com> on Nov. 9, 2014, 5 pages.
Vertex (computer graphics), retrieved from <URL: http://wikipedia.com> on Nov. 9, 2014, 2 pages.
Voxel, retrieved from <URL: http://wikipedia.com> on Nov. 11, 2014, 5 pages.
Wavefront .obj file, retrieved from <URL: http://wikipedia.com> on Nov. 9, 2014, 6 pages.
Acrobat 3D tutorials—basic interaction, retrieved from <URL: https://acrobatusers.com/assets/collections/tutorials/legacy/tech_corners/3d/3d_tutorials/basic_interaction.pdf> on Nov. 23, 2014, 2 pages.
Nowostawski, Mariusz et al., "Dynamic Demes Parallel Genetic Algorithm", May 13, 1999, 6 pages.
Stack Overflow, How can I quantify difference between two images?, accessed Aug. 2, 2017 at https://stackoverflow.com/questions/189943/how-can-i-quantify-difference-between-two-images, 8 pages.
Skolicki, Zbigniew et al., "The Influence of Migration Sizes and Intervals on Island Models", Jun. 29, 2005, 8 pages.
Vahid Lari, et al., "Decentralized dynamic resource management support for massively parallel processor arrays", Sep. 11, 2011, 8 pages.
Vahid Lari, et al., "Distributed resource reservation in massively parallel processor arrays", May 16, 2011, 4 pages.
Mohsen Hayati and Yazdan Shirvany, "Artificial Neural Network Approach for Short Term Load Forecasting for Illam Region", Jan. 2007, 5 pages.
Hasim Sak, Andrew Senior, and Francoise Beaufays, "Long Short-Term Memory Recurrent Neural Network Architectures for Large Scale Acoustic Modeling", Jan. 2014, 5 pages.
Jorg Walter and Klaus Schulten, "Implementation of self-organizing neural networks for visuo-motor control of an industrial robot", Jan. 1993, 10 pages.
Heikki Hyotyniemi and Aarno Lehtola, "A Universal Relation Database Interface for Knowledge Based Systems", Apr. 1991, 5 pages.
Mrissa, Michael, et al. "An avatar architecture for the web of things." IEEE Internet Computing 19.2 (2015): 30-38., 9 pages.
Luck, Michael, and Ruth Aylett. "Applying artificial intelligence to virtual reality: Intelligent virtual environments." Applied Artificial Intelligence 14.1 (2000): 3-32., 30 pages.
Terdjimi, Mehdi, et al. "An avatar-based adaptation workflow for the web of things." Enabling Technologies: Infrastructure for Collaborative Enterprises (WETICE), 2016 IEEE 25th International Conference on. IEEE, 2016., 6 pages.
Bogdanovych, Anton, et al. "Authentic interactive reenactment of cultural heritage with 3D virtual worlds and artificial intelligence." Applied Artificial Intelligence 24.6 (2010): 617-647., 32 pages.
Hernandez, Marco E. Perez, and Stephan Reiff-Marganiec. "Autonomous and self controlling smart objects for the future internet." Future internet of things and cloud (FiCloud), 2015 3rd international conference on. IEEE, 2015., 8 pages.
Medini et al., "Building a Web of Things with Avatars", Managing the Web of Things (2017), 30 pages.
About Event Tracing, retrieved from <URL: http://msdn.microsoft.com/en-us/library/aa363668(d=default,I=en-us,v=vs.85).aspx> on Jan. 12, 2014, 2 pages.
Add dynamic Java code to your application, retrieved from <URL: http://www.javaworld.com/article/2071777/design-patterns/add-dynamic-java-code-to-your-application.html> on May 13, 2014, 6 pages.
BCEL, retrieved from <URL: http://commons.apache.org> on May 13, 2014, 2 pages.
Artificial intelligence, retrieved from <URL: http://wikipedia.com> on May 21, 2014, 28 pages.
Artificial neural network, retrieved from <URL: http://wikipedia.com> on May 21, 2014, 12 pages.
Branch (computer science), retrieved from <URL: http://wikipedia.com> on May 6, 2014, 2 pages.
Branch trace, retrieved from <URL: http://wikipedia.com> on May 28, 2014, 2 pages.
C Function Call Conventions and the Stack, retrieved from <URL: http://www.csee.umbc.edu/~chang/cs313.s02/stack.shtml> on Jan. 11, 2014, 4 pages.
Call stack, retrieved from <URL: http://wikipedia.com> on Jan. 11, 2014, 5 pages.
Program compilation and execution flow, retrieved from <URL: http://cs.stackexchange.com/questions/6187/program-compilation-and-execution-flow> on Jan. 9, 2014, 2 pages.
Control unit, retrieved from <URL: http://wikipedia.com> on May 25, 2014, 2 pages.
Create dynamic applications with javax.tools, retrieved from <URL: http://www.ibm.com/developerworks/library/j-jcomp/> on May 13, 2014, 11 pages.
Creating a Debugging and Profiling Agent with JVMTI, retrieved from <URL: http://www.oracle.com/technetwork/articles/java/jvmti-136367.html> on Jan. 11, 2014, 18 pages.
Decision tree learning, retrieved from <URL: http://wikipedia.com> on Jun. 24, 2014, 5 pages.
Dynamic Bytecode Instrumentation, retrieved from <URL: http://www.drdobbs.com/tools/dynamic-bytecode-instrumentation/184406433> on Apr. 26, 2014, 6 pages.
Dynamic programming language, retrieved from <URL: http://wikipedia.com> on May 7, 2014, 4 pages.
Dynamic recompilation, retrieved from <URL: http://wikipedia.com> on May 19, 2014, 4 pages.
Eval( ), retrieved from <URL: https://developer.mozilla.org/en-US/docs/Web/JavaScript/Reference/Global_Objects/eval> on May 7, 2014, 13 pages.
Function, retrieved from <URL: https://developer.mozilla.org/en-US/docs/Web/JavaScript/Reference/Global_Objects/Function> on May 7, 2014, 11 pages.
FunctionEnter2 Function, retrieved from <URL: https://msdn.microsoft.com/en-us/library/aa964981(d=default,I=en-us,v=vs.110).aspx> on Mar. 19, 2014, 2 pages.
FunctionLeave2 Function, retrieved from <URL: https://msdn.microsoft.com/en-us/library/aa964942(d=default,I=en-us,v=vs.110).aspx> on Mar. 19, 2014, 1 pages.
Heuristic, retrieved from <URL: http://wikipedia.com> on May 22, 2014, 5 pages.
How to: Configure Trace Switches, retrieved from <URL: https://msdn.microsoft.com/en-us/library/vstudio/t06xyy08(d=default,I=en-us,v=vs.100).aspx> on Mar. 19, 2014, 3 pages.
Indirect branch, retrieved from <URL: http://wikipedia.com> on May 5, 2014, 1 pages.
Instruction cycle, retrieved from <URL: http://wikipedia.com> on Apr. 30, 2014, 2 pages.
Instruction set, retrieved from <URL: http://wikipedia.com> on Apr. 29, 2014, 6 pages.
Interrupt, retrieved from <URL: http://wikipedia.com> on May 15, 2014, 5 pages.

(56) References Cited

OTHER PUBLICATIONS

Introduction to Instrumentation and Tracing, retrieved from <URL: http://msdn.microsoft.com/en-us/library/aa983649(d=default,I=en-us,v=vs.71).aspx> on Jan. 10, 2014, 2 pages.
Java bytecode, retrieved from <URL: http://wikipedia.com> on May 27, 2014, 4 pages.
Package java.util.logging, retrieved from <URL: http://docs.oracle.com/javase/1.5.0/docs/api/java/util/logging/package-summary.html> on Mar. 19, 2014, 2 pages.
Javac—Java programming language compiler, retrieved from <URL: http://docs.oracle.com/javase/7/docs/technotes/tools/windows/javac.html> on May 13, 2014, 12 pages.
Interface JavaCompiler, retrieved from <URL: http://wikipedia.com> on May 13, 2014, 4 pages.
Javassist, retrieved from <URL: http://wikipedia.com> on May 13, 2014, 2 pages.
Just-in-time compilation, retrieved from <URL: http://wikipedia.com> on May 19, 2014, 5 pages.
JVM Tool Interface, retrieved from <URL: http://docs.oracle.com/javase/7/docs/platform/jvmti/jvmti.html> on Apr. 26, 2014, 127 pages.
Machine code, retrieved from <URL: http://wikipedia.com> on Apr. 30, 2014, 3 pages.
Metaprogramming, retrieved from <URL: http://wikipedia.com> on May 8, 2014, 3 pages.
Microsoft.VisualBasic.Logging Namespace, retrieved from <URL: http://msdn.microsoft.com/en-us/library/ms128122(d=default,I=en-us,v=vs.110).aspx> on Jan. 13, 2014, 1 pages.
Pin (computer program), retrieved from <URL: http://wikipedia.com> on May 6, 2014, 3 pages.
Processor register, retrieved from <URL: http://wikipedia.com> on Apr. 29, 2014, 4 pages.
Profiling (computer programming), retrieved from <URL: http://wikipedia.com> on Jan. 10, 2014, 4 pages.
Profiling Overview, retrieved from <URL: http://msdn.microsoft.com/en-us/library/bb384493(d=default,I=en-us,v=vs.110).aspx> on Jan. 12, 2014, 6 pages.
Program counter, retrieved from <URL: http://wikipedia.com> on Apr. 24, 2014, 2 pages.
Ptrace, retrieved from <URL: http://wikipedia.com> on Apr. 24, 2014, 2 pages.
Reflection (computer programming), retrieved from <URL: http://wikipedia.com> on May 7, 2014, 5 pages.
Class Runtime, retrieved from <URL: http://docs.oracle.com/javase/7/docs/api/java/lang/Runtime.html> on Jan. 10, 2014, 10 pages.
Self-modifying code, retrieved from <URL: http://wikipedia.com> on Jan. 12, 2014, 6 pages.
Subjective logic, retrieved from <URL: http://wikipedia.com> on May 22, 2014, 5 pages.
System.CodeDom.Compiler Namespace, retrieved from <URL: http://msdn.microsoft.com/en-us/library/z6b99ydt(d=default,I=en-us,v=vs.110).aspx> on May 13, 2014, 2 pages.
System.Reflection.Emit Namespace, retrieved from <URL: http://msdn.microsoft.com/en-us/library/xd5fw18y(d=default,=en-us,v=vs.110).aspx> on May 13, 2014, 2 pages.
Chen et al. Case-Based Reasoning System and Artificial Neural Networks: A Review Neural Comput & Applic (2001) 10: pp. 264-276, 13 pages.
John J. Grefenstette, Connie Loggia Ramsey, Alan C. Schultz, Learning Sequential Decision Rules Using Simulation Models and Competition, 1990, Navy Center for Applied Research in Artificial Intelligence, Naval Research Laboratory, Washington, DC, 27 pages.
Alan C. Schultz, John J. Grefenstette, Using a Genetic Algorithm to Learn Behaviors for Autonomous Vehicles, 1992, Navy Center for Applied Research in Artificial Intelligence, Naval Research Laboratory, Washington, DC, 12 pages.
Koppula et al., "Anticipating human activities using object affordances for reactive robotic response", IEEE TRAMI 2016, published May 5, 2015, 16 pages.
Tracing (software), retrieved from <URL: http://wikipedia.com> on Jan. 10, 2014, 3 pages.
Tree (data structure), retrieved from <URL: http://wikipedia.com> on Jun. 24, 2014, 6 pages.
PTRACE(2), retrieved from <URL: http://unixhelp.ed.ac.uk/CGI/man-cgi?ptrace> on Mar. 19, 2014, 5 pages.
Wevtutil, retrieved from <URL: http://technet.microsoft.com/en-us/library/cc732848(d=default,I=en-us,v=ws.11).aspx> on Apr. 28, 2014, 5 pages.
Intel Processor Trace, retrieved from <URL: https://software.intel.com/en-us/blogs/2013/09/18/processor-tracing> on Apr. 28, 2014, 3 pages.
Younghoon Jung, Java Dynamics Reflection and a lot more, Oct. 10, 2012, 55 pages, Columbia University.
Amitabh Srivastava, Alan Eustace, Atom A System for Building Customized Program Analysis Tools, May 3, 2004, 12 pages.
Mathew Smithson, Kapil Anand, Aparna Kotha, Khaled Elwazeer, Nathan Giles, Rajeev Barua, Binary Rewriting without Relocation Information, Nov. 10, 2010, 11 pages, University of Maryland.
Marek Olszewski, Keir Mierte, Adam Czajkowski, Angela Demle Brown, JIT Instrumentation—A Novel Approach to Dynamically Instrument Operating Systems, Feb. 12, 2007, 14 pages, University of Toronto.
Orme, "System design tips for entry level smartphones—part 3", found online at "https://community.arm.com/processors/b/blog/posts/system-design-tips-for-entry-level-smartphones---part-3", Oct. 21, 2013, 12 pages.

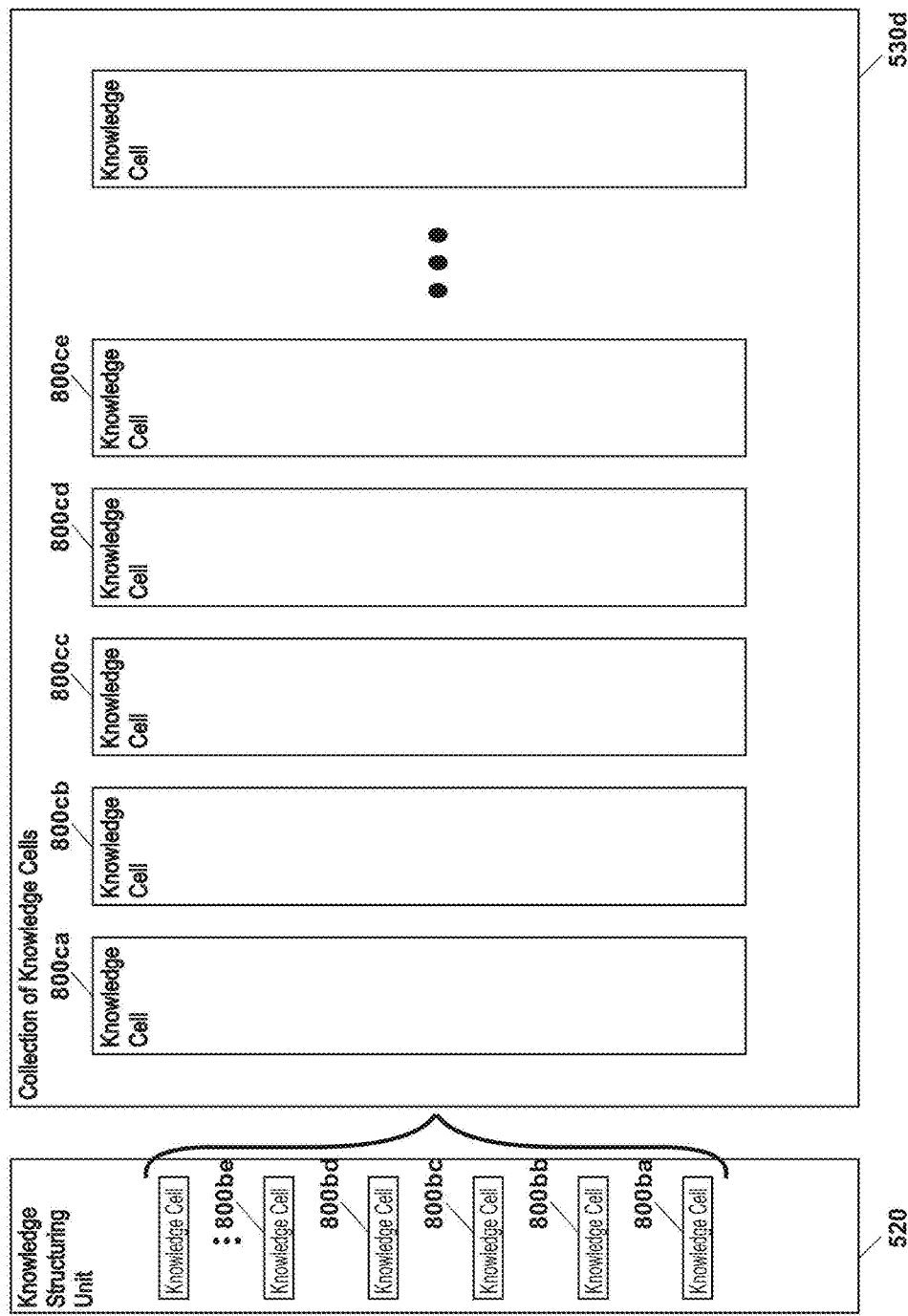

ARTIFICIALLY INTELLIGENT SYSTEMS, DEVICES, AND METHODS FOR LEARNING AND/OR USING VISUAL SURROUNDING FOR AUTONOMOUS OBJECT OPERATION

CROSS REFERENCE TO RELATED APPLICATION

This application is a continuation of, and claims priority under 35 U.S.C. § 120 from, nonprovisional U.S. patent application Ser. No. 15/245,046 entitled "ARTIFICIALLY INTELLIGENT SYSTEMS, DEVICES, AND METHODS FOR LEARNING AND/OR USING VISUAL SURROUNDING FOR AUTONOMOUS OBJECT OPERATION", filed on Aug. 23, 2016. The disclosure of the foregoing document is incorporated herein by reference.

FIELD

The disclosure generally relates to computing devices and/or systems. The disclosure includes devices, apparatuses, systems, and related methods for providing advanced learning, anticipating, decision making, automation, and/or other functionalities.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Applications and/or objects thereof commonly operate by receiving a user's operating directions in various circumstances. Instructions are then executed to effect the operation of an application and/or object thereof based on user's operating directions. Hence, applications and/or objects thereof are reliant on the user to direct their behaviors. Commonly employed application and/or object thereof operating techniques lack a way for a system to learn operation of an application and/or object thereof and enable autonomous operation of an application and/or object thereof.

SUMMARY OF THE INVENTION

In some aspects, the disclosure relates to a system for learning and using a visual surrounding for autonomous object operating. The system may be implemented at least in part on one or more computing devices. In some embodiments, the system comprises a processor circuit configured to execute instruction sets of an application, the application including an object. The system may further include a memory unit configured to store data. The system may further include a renderer configured to render digital pictures of a surrounding of the object of the application. The system may further include an artificial intelligence unit. In some embodiments, the artificial intelligence unit may be configured to: receive a first digital picture from the renderer. The artificial intelligence unit may be further configured to: receive one or more instruction sets for operating the object of the application. The artificial intelligence unit may be further configured to: learn the first digital picture correlated with the one or more instruction sets for operating the object of the application. The artificial intelligence unit may be further configured to: receive a new digital picture from the renderer. The artificial intelligence unit may be further configured to: anticipate the one or more instruction sets for operating the object of the application correlated with the first digital picture based on at least a partial match between the new digital picture and the first digital picture. The artificial intelligence unit may be further configured to: cause the processor circuit to execute the one or more instruction sets for operating the object of the application correlated with the first digital picture, the executing performed in response to the anticipating of the artificial intelligence unit, wherein the object of the application performs one or more operations defined by the one or more instruction sets for operating the object of the application correlated with the first digital picture, the one or more operations performed in response to the executing by the processor circuit.

In certain embodiments, the processor circuit includes one or more processor circuits. In further embodiments, the application includes a computer game, a virtual world, a CAD application, or a computer application. The application may include a 3D application or a 2D application. In further embodiments, the object includes an avatar, a user-controllable object, a system-controllable object, or an object of the application.

In some embodiments, at least one of: the processor circuit, the memory unit, the renderer, or the artificial intelligence unit are part of a device. In further embodiments, the memory unit includes one or more memory units. In further embodiments, the memory unit resides on a remote computing device or a remote computing system, the remote computing device or the remote computing system coupled to the processor circuit via a network or an interface. The remote computing device or the remote computing system may include a server, a cloud, a computing device, or a computing system accessible over the network or the interface.

In certain embodiments, the renderer includes one or more renderers. In further embodiments, the renderer is part of, operating on, or coupled to the processor circuit. In further embodiments, the renderer is part of, operating on, or coupled to a second processor circuit. In further embodiments, the renderer is part of a graphics circuit. In further embodiments, the renderer resides on a remote computing device or a remote computing system. In further embodiments, the renderer includes a circuit, a computing apparatus, or a computing system. In further embodiments, the renderer includes a graphics processing device, a graphics processing apparatus, a graphics processing system, or a graphics processing application that generates one or more digital pictures from a computer model.

In some embodiments, the digital pictures of the surrounding of the object of the application include digital pictures of a first-person view of the surrounding of the object of the application, digital pictures of a third-person view of the surrounding of the object of the application, digital pictures of a view from a front of the object of the application, digital pictures of a view from a side of the object of the application, digital pictures of a top-down view of the surrounding of the object of the application, digital pictures of a side-on view of the surrounding of the object of the application, digital pictures of an area of interest of the object of the application, or digital pictures of a screenshot of the surrounding of the object of the application.

In certain embodiments, the artificial intelligence unit is coupled to the renderer. In further embodiments, the artificial intelligence unit is coupled to the memory unit. In further embodiments, the artificial intelligence unit is part of, operating on, or coupled to the processor circuit. In further embodiments, the system further comprises: a second processor circuit, wherein the artificial intelligence unit is part of, operating on, or coupled to the second processor circuit. In further embodiments, the artificial intelligence unit is part of, operating on, or coupled to a remote computing device or a remote computing system. In further embodiments, the artificial intelligence unit includes a circuit, a computing apparatus, or a computing system attachable to the processor circuit. In further embodiments, the artificial intelligence unit is attachable to the application. In further embodiments, the artificial intelligence unit is attachable to the object of the application. In further embodiments, the artificial intelligence unit includes a circuit, a computing apparatus, or a computing system built into the processor circuit. In further embodiments, the artificial intelligence unit is built into the application. In further embodiments, the artificial intelligence unit is built into the object of the application. In further embodiments, the artificial intelligence unit is provided as a feature of the processor circuit. In further embodiments, the artificial intelligence unit is provided as a feature of the application. In further embodiments, the artificial intelligence unit is provided as a feature of the object of the application. In further embodiments, the artificial intelligence unit is further configured to: take control from, share control with, or release control to the processor circuit. In further embodiments, the artificial intelligence unit is further configured to: take control from, share control with, or release control to the application. In further embodiments, the artificial intelligence unit is further configured to: take control from, share control with, or release control to the object of the application.

In some embodiments, the first or the new digital picture includes a JPEG picture, a GIF picture, a TIFF picture, a PNG picture, a PDF picture, or a digitally encoded picture. In further embodiments, the first digital picture includes a stream of digital pictures and the new digital picture includes a stream of digital pictures. The stream of digital pictures may include a MPEG motion picture, an AVI motion picture, a FLV motion picture, a MOV motion picture, a RM motion picture, a SWF motion picture, a WMV motion picture, a DivX motion picture, or a digitally encoded motion picture.

In certain embodiments, the one or more instruction sets for operating the object of the application include one or more instruction sets that temporally correspond to the first digital picture. The one or more instruction sets that temporally correspond to the first digital picture may include one or more instruction sets executed at a time of a rendering the first digital picture. The one or more instruction sets that temporally correspond to the first digital picture may include one or more instruction sets executed prior to a rendering the first digital picture. The one or more instruction sets that temporally correspond to the first digital picture may include one or more instruction sets executed within a threshold period of time prior to a rendering the first digital picture. The one or more instruction sets that temporally correspond to the first digital picture may include one or more instruction sets executed subsequent to a rendering the first digital picture. The one or more instruction sets that temporally correspond to the first digital picture may include one or more instruction sets executed within a threshold period of time subsequent to a rendering the first digital picture. The one or more instruction sets that temporally correspond to the first digital picture may include one or more instruction sets executed within a threshold period of time prior to a rendering the first digital picture or a threshold period of time subsequent to the rendering the first digital picture. The one or more instruction sets that temporally correspond to the first digital picture may include one or more instruction sets executed from a start of a rendering a preceding digital picture to a start of a rendering the first digital picture. The one or more instruction sets that temporally correspond to the first digital picture may include one or more instruction sets executed from a start of a rendering the first digital picture to a start of a rendering a subsequent digital picture. The one or more instruction sets that temporally correspond to the first digital picture may include one or more instruction sets executed from a completion of a rendering a preceding digital picture to a completion of a rendering the first digital picture. The one or more instruction sets that temporally correspond to the first digital picture may include one or more instruction sets executed from a completion of a rendering the first digital picture to a completion of a rendering a subsequent digital picture.

In some embodiments, the one or more instruction sets for operating the object of the application are executed by the processor circuit. In further embodiments, the one or more instruction sets for operating the object of the application are part of the application. In further embodiments, the one or more instruction sets for operating the object of the application include one or more instruction sets executed in operating the object of the application. In further embodiments, the one or more instruction sets for operating the object of the application include one or more instruction sets for operating the application. In further embodiments, the one or more instruction sets for operating the object of the application include one or more inputs into the processor circuit. In further embodiments, the one or more instruction sets for operating the object of the application include values or states of one or more registers or elements of the processor circuit. In further embodiments, an instruction set includes at least one of: a command, a keyword, a symbol, an instruction, an operator, a variable, a value, an object, a data structure, a function, a parameter, a state, a signal, an input, an output, a character, a digit, or a reference thereto. In further embodiments, the one or more instruction sets for operating the object of the application include a source code, a bytecode, an intermediate code, a compiled code, an interpreted code, a translated code, a runtime code, an assembly code, a structured query language (SQL) code, or a machine code. In further embodiments, the one or more instruction sets for operating the object of the application include one or more code segments, lines of code, statements, instructions, functions, routines, subroutines, or basic blocks.

In certain embodiments, the receiving the one or more instruction sets for operating the object of the application includes obtaining the one or more instruction sets from the processor circuit. In further embodiments, the receiving the one or more instruction sets for operating the object of the application includes receiving the one or more instruction sets as they are executed by the processor circuit. In further embodiments, the receiving the one or more instruction sets for operating the object of the application includes receiving the one or more instruction sets for operating the object of the application from a register or an element of the processor circuit. In further embodiments, the receiving the one or more instruction sets for operating the object of the application includes receiving the one or more instruction sets for operating the object of the application from at least one of: the memory unit, a virtual machine, a runtime engine, a hard drive, a storage device, a peripheral device, a network connected device, or a user. In further embodiments, the receiving the one or more instruction sets for operating the object of the application includes receiving the one or more instruction sets from a plurality of processor circuits, applications, memory units, devices, virtual machines, runtime engines, hard drives, storage devices, peripheral devices, network connected devices, or users. In further embodiments, the receiving the one or more instruction sets for operating the object of the application includes receiving the one or more instruction sets for operating the object of the application from the application. In further embodiments, the receiving the one or more instruction sets for operating the object of the application includes receiving the one or more instruction sets for operating the object of the application from the object of the application. In further embodiments, the receiving the one or more instruction sets for operating the object of the application includes receiving the one or more instruction sets at a source code write time, a compile time, an interpretation time, a translation time, a linking time, a loading time, or a runtime. In further embodiments, the receiving the one or more instruction sets for operating the object of the application includes at least one of: tracing, profiling, or instrumentation of a source code, a bytecode, an intermediate code, a compiled code, an interpreted code, a translated code, a runtime code, an assembly code, a structured query language (SQL) code, or a machine code. In further embodiments, the receiving the one or more instruction sets for operating the object of the application includes at least one of: tracing, profiling, or instrumentation of a register of the processor circuit, the memory unit, a storage, or a repository where the one or more instruction sets for operating the object of the application are stored. In further embodiments, the receiving the one or more instruction sets for operating the object of the application includes at least one of: tracing, profiling, or instrumentation of the processor circuit, a virtual machine, a runtime engine, an operating system, an execution stack, a program counter, or a processing element. In further embodiments, the receiving the one or more instruction sets for operating the object of the application includes at least one of: tracing, profiling, or instrumentation of the processor circuit or tracing, profiling, or instrumentation of a component of the processor circuit. In further embodiments, the receiving the one or more instruction sets for operating the object of the application includes at least one of: tracing, profiling, or instrumentation of the application or the object of the application. In further embodiments, the receiving the one or more instruction sets for operating the object of the application includes at least one of: tracing, profiling, or instrumentation at a source code write time, a compile time, an interpretation time, a translation time, a linking time, a loading time, or a runtime. In further embodiments, the receiving the one or more instruction sets for operating the object of the application includes at least one of: tracing, profiling, or instrumentation of one or more code segments, lines of code, statements, instructions, functions, routines, subroutines, or basic blocks. In further embodiments, the receiving the one or more instruction sets for operating the object of the application includes at least one of: tracing, profiling, or instrumentation of a user input. In further embodiments, the receiving the one or more instruction sets for operating the object of the application includes at least one of: a manual, an automatic, a dynamic, or a just in time (JIT) tracing, profiling, or instrumentation of the application or the object of the application. In further embodiments, the receiving the one or more instruction sets for operating the object of the application includes utilizing at least one of: a .NET tool, a .NET application programming interface (API), a Java tool, a Java API, a logging tool, or an independent tool for obtaining instruction sets. In further embodiments, the receiving the one or more instruction sets for operating the object of the application includes utilizing an assembly language. In further embodiments, the receiving the one or more instruction sets for operating the object of the application includes utilizing a branch or a jump. In further embodiments, the receiving the one or more instruction sets for operating the object of the application includes a branch tracing or a simulation tracing.

In certain embodiments, the system further comprises: an interface configured to receive instruction sets, wherein the one or more instruction sets for operating the object of the application are received by the interface. The interface may include an acquisition interface.

In some embodiments, the first digital picture correlated with the one or more instruction sets for operating the object of the application includes an anticipatory digital picture whose correlated one or more instruction sets for operating the object of the application can be used for anticipation of one or more instruction sets to be executed in an operation of the object of the application. In further embodiments, the first digital picture correlated with the one or more instruction sets for operating the object of the application includes a unit of knowledge of how the object of the application operated in a visual surrounding. In further embodiments, the first digital picture correlated with the one or more instruction sets for operating the object of the application is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the first digital picture correlated with the one or more instruction sets for operating the object of the application is structured into a knowledge cell. The knowledge cell may include a unit of knowledge of how the object of the application operated in a visual surrounding. The knowledge cell may be included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the learning the first digital picture correlated with the one or more instruction sets for operating the object of the application includes correlating the first digital picture with the one or more instruction sets for operating the object of the application. The correlating the first digital picture with the one or more instruction sets for operating the object of the application may include generating a knowledge cell, the knowledge cell comprising the first digital picture correlated with the one or more instruction sets for operating the object of the application. The correlating the first digital picture with the one or more instruction sets for operating the object of the application may include structuring a unit of knowledge of how the device operated in a visual surrounding. In further embodiments, the learning the first digital picture correlated with the one or more instruction sets for operating the object of the application includes learning a user's knowledge, style, or methodology of operating the object of the application in a visual surrounding. In further embodiments, the learning the first digital picture correlated with the one or more instruction sets for operating the object of the application includes spontaneous learning the first digital picture correlated with the one or more instruction sets for operating the object of the application.

In some embodiments, the learning the first digital picture correlated with the one or more instruction sets for operating the object of the application includes storing, into the memory unit, the first digital picture correlated with the one or more instruction sets for operating the object of the application, the first digital picture correlated with the one or more instruction sets for operating the object of the application being part of a stored plurality of digital pictures correlated with one or more instruction sets for operating the object of the application. In further embodiments, the plurality of digital pictures correlated with one or more instruction sets for operating the object of the application include a neural network, a graph, a collection of sequences, a sequence, a collection of knowledge cells, a knowledgebase, a knowledge structure, or a data structure. In further embodiments, the plurality of digital pictures correlated with one or more instruction sets for operating the object of the application are organized into a neural network, a graph, a collection of sequences, a sequence, a collection of knowledge cells, a knowledgebase, a knowledge structure, or a data structure. In further embodiments, each of the plurality of digital pictures correlated with one or more instruction sets for operating the object of the application is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the plurality of digital pictures correlated with one or more instruction sets for operating the object of the application include a user's knowledge, style, or methodology of operating the object of the application in visual surroundings. In further embodiments, the plurality of digital pictures correlated with one or more instruction sets for operating the object of the application are stored on a remote computing device or a remote computing system. In further embodiments, the plurality of digital pictures correlated with one or more instruction sets for operating the object of the application include an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system.

In certain embodiments, the anticipating the one or more instruction sets for operating the object of the application correlated with the first digital picture based on at least a partial match between the new digital picture and the first digital picture includes comparing at least one portion of the new digital picture with at least one portion of the first digital picture. The at least one portion of the new digital picture may include at least one region, at least one feature, or at least one pixel of the new digital picture. The at least one portion of the first digital picture may include at least one region, at least one feature, or at least one pixel of the first digital picture. The comparing the at least one portion of the new digital picture with the at least one portion of the first digital picture may include comparing at least one region of the new digital picture with at least one region of the first digital picture. The comparing the at least one portion of the new digital picture with the at least one portion of the first digital picture may include comparing at least one feature of the new digital picture with at least one feature of the first digital picture. The comparing the at least one portion of the new digital picture with the at least one portion of the first digital picture may include comparing at least one pixel of the new digital picture with at least one pixel of the first digital picture. The comparing the at least one portion of the new digital picture with the at least one portion of the first digital picture may include at least one of: performing a color adjustment, performing a size adjustment, performing a content manipulation, utilizing a transparency, or utilizing a mask on the new or the first digital picture. The comparing the at least one portion of the new digital picture with the at least one portion of the first digital picture may include recognizing at least one person or object in the new digital picture and at least one person or object in the first digital picture, and comparing the at least one person or object from the new digital picture with the at least one person or object from the first digital picture.

In some embodiments, the anticipating the one or more instruction sets for operating the object of the application correlated with the first digital picture based on at least a partial match between the new digital picture and the first digital picture includes determining that there is at least a partial match between the new digital picture and the first digital picture. In further embodiments, the determining that there is at least a partial match between the new digital picture and the first digital picture includes determining that there is at least a partial match between one or more portions of the new digital picture and one or more portions of the first digital picture. In further embodiments, the determining that there is at least a partial match between the new digital picture and the first digital picture includes determining that a similarity between at least one portion of the new digital picture and at least one portion of the first digital picture exceeds a similarity threshold. In further embodiments, the determining that there is at least a partial match between the new digital picture and the first digital picture includes determining a substantial similarity between at least one portion of the new digital picture and at least one portion of the first digital picture. The at least one portion of the new digital picture may include at least one region, at least one feature, or at least one pixel of the new digital picture. The at least one portion of the first digital picture may include at least one region, at least one feature, or at least one pixel of the first digital picture. The substantial similarity may be achieved when a similarity between the at least one portion of the new digital picture and the at least one portion of the first digital picture exceeds a similarity threshold. The substantial similarity may be achieved when a number or a percentage of matching or partially matching regions from the new digital picture and from the first digital picture exceeds a threshold number or threshold percentage. The substantial similarity may be achieved when a number or a percentage of matching or partially matching features from the new digital picture and from the first digital picture exceeds a threshold number or threshold percentage. The substantial similarity may be achieved when a number or a percentage of matching or partially matching pixels from the new digital picture and from the first digital picture exceeds a threshold number or threshold percentage. The substantial similarity may be achieved when one or more same or similar persons or objects are recognized in the new digital picture and the first digital picture.

In certain embodiments, the determining that there is at least a partial match between the new digital picture and the first digital picture includes determining a match between at least a threshold number or percentage of portions of the new digital picture and at least a threshold number or percentage of portions of the first digital picture. A portion of the new or the first digital picture may include a region, a feature, or a pixel. The match may include a partial match. In further embodiments, the determining that there is at least a partial match between the new digital picture and the first digital picture includes determining a match between all but a threshold number or percentage of portions of the new digital picture and all but a threshold number or percentage of portions of the first digital picture. A portion of the new or the first digital picture may include a region, a feature, or a pixel. The match may include a partial match. In further embodiments, the determining that there is at least a partial match between the new digital picture and the first digital picture includes determining that a number or a percentage of matching regions from the new digital picture and from the first digital picture exceeds a threshold number or threshold percentage. The matching regions from the new digital picture and from the first digital picture may be determined factoring in at least one of: a location of a region, an importance of a region, a threshold for a similarity in a region, or a threshold for a difference in a region. In further embodiments, the determining that there is at least a partial match between the new digital picture and the first digital picture includes determining that a number or a percentage of matching features from the new digital picture and from the first digital picture exceeds a threshold number or threshold percentage. The matching features from the new digital picture and from the first digital picture may be determined factoring in at least one of: a type of a feature, an importance of a feature, a location of a feature, a threshold for a similarity in a feature, or a threshold for a difference in a feature. In further embodiments, the determining that there is at least a partial match between the new digital picture and the first digital picture includes determining that a number or a percentage of matching pixels from the new digital picture and from the first digital picture exceeds a threshold number or threshold percentage. The matching pixels from the new digital picture and from the first digital picture may be determined factoring in at least one of: a location of a pixel, a threshold for a similarity in a pixel, or a threshold for a difference in a pixel. In further embodiments, the determining that there is at least a partial match between the new digital picture and the first digital picture includes recognizing a same person or object in the new and the first digital pictures.

In some embodiments, the causing the processor circuit to execute the one or more instruction sets for operating the object of the application correlated with the first digital picture includes causing the processor circuit to execute the one or more instruction sets for operating the object of the application correlated with the first digital picture instead of or prior to an instruction set that would have been executed next. In further embodiments, the causing the processor circuit to execute the one or more instruction sets for operating the object of the application correlated with the first digital picture includes modifying one or more instruction sets of the processor circuit. In further embodiments, the causing the processor circuit to execute the one or more instruction sets for operating the object of the application correlated with the first digital picture includes modifying a register or an element of the processor circuit. In further embodiments, the causing the processor circuit to execute the one or more instruction sets for operating the object of the application correlated with the first digital picture includes inserting the one or more instruction sets for operating the object of the application correlated with the first digital picture into a register or an element of the processor circuit. In further embodiments, the causing the processor circuit to execute the one or more instruction sets for operating the object of the application correlated with the first digital picture includes redirecting the processor circuit to the one or more instruction sets for operating the object of the application correlated with the first digital picture. In further embodiments, the causing the processor circuit to execute the one or more instruction sets for operating the object of the application correlated with the first digital picture includes redirecting the processor circuit to one or more alternate instruction sets, the alternate instruction sets comprising the one or more instruction sets for operating the object of the application correlated with the first digital picture. In further embodiments, the causing the processor circuit to execute the one or more instruction sets for operating the object of the application correlated with the first digital picture includes transmitting, to the processor circuit for execution, the one or more instruction sets for operating the object of the application correlated with the first digital picture. In further embodiments, the causing the processor circuit to execute the one or more instruction sets for operating the object of the application correlated with the first digital picture includes issuing an interrupt to the processor circuit and executing the one or more instruction sets for operating the object of the application correlated with the first digital picture following the interrupt. In further embodiments, the causing the processor circuit to execute the one or more instruction sets for operating the object of the application correlated with the first digital picture includes causing the application to execute the one or more instruction sets for operating the object of the application correlated with the first digital picture. In further embodiments, the causing the processor circuit to execute the one or more instruction sets for operating the object of the application correlated with the first digital picture includes modifying the application with the one or more instruction sets for operating the object of the application correlated with the first digital picture. In further embodiments, the causing the processor circuit to execute the one or more instruction sets for operating the object of the application correlated with the first digital picture includes redirecting the application to the one or more instruction sets for operating the object of the application correlated with the first digital picture. In further embodiments, the causing the processor circuit to execute the one or more instruction sets for operating the object of the application correlated with the first digital picture includes redirecting the application to one or more alternate instruction sets, the alternate instruction sets comprising the one or more instruction sets for operating the object of the application correlated with the first digital picture. In further embodiments, the causing the processor circuit to execute the one or more instruction sets for operating the object of the application correlated with the first digital picture includes modifying one or more instruction sets of the application. In further embodiments, the causing the processor circuit to execute the one or more instruction sets for operating the object of the application correlated with the first digital picture includes modifying one or more instruction sets of the object of the application. In further embodiments, the causing the processor circuit to execute the one or more instruction sets for operating the object of the application correlated with the first digital picture includes modifying a source code, a bytecode, an intermediate code, a compiled code, an interpreted code, a translated code, a runtime code, an assembly code, or a machine code. In further embodiments, the causing the processor circuit to execute the one or more instruction sets for operating the object of the application correlated with the first digital picture includes modifying at least one of: the memory unit, a register of the processor circuit, a storage, or a repository where instruction sets are stored or used. In further embodiments, the causing the processor circuit to execute the one or more instruction sets for operating the object of the application correlated with the first digital picture includes modifying at least one of: an element of the processor circuit, a virtual machine, a runtime engine, an operating system, an execution stack, a program counter, or a user input. In further embodiments, the causing the processor circuit to execute the one or more instruction sets for operating the object of the application correlated with the first digital picture includes modifying one or more instruction sets at a source code write time, a compile time, an interpretation time, a translation time, a linking time, a loading time, or a runtime. In further embodiments, the causing the processor circuit to execute the one or more instruction sets for operating the object of the application correlated with the first digital picture includes modifying one or more code segments, lines of code, statements, instructions, functions, routines, subroutines, or basic blocks. In further embodiments, the causing the processor circuit to execute the one or more instruction sets for operating the object of the application correlated with the first digital picture includes a manual, an automatic, a dynamic, or a just in time (JIT) instrumentation of the application or the object of the application. In further embodiments, the causing the processor circuit to execute the one or more instruction sets for operating the object of the application correlated with the first digital picture includes utilizing one or more of a .NET tool, a .NET application programming interface (API), a Java tool, a Java API, an operating system tool, or an independent tool for modifying instruction sets. In further embodiments, the causing the processor circuit to execute the one or more instruction sets for operating the object of the application correlated with the first digital picture includes utilizing at least one of: a dynamic, an interpreted, or a scripting programming language. In further embodiments, the causing the processor circuit to execute the one or more instruction sets for operating the object of the application correlated with the first digital picture includes utilizing at least one of: a dynamic code, a dynamic class loading, or a reflection. In further embodiments, the causing the processor circuit to execute the one or more instruction sets for operating the object of the application correlated with the first digital picture includes utilizing an assembly language. In further embodiments, the causing the processor circuit to execute the one or more instruction sets for operating the object of the application correlated with the first digital picture includes utilizing at least one of: a metaprogramming, a self-modifying code, or an instruction set modification tool. In further embodiments, the causing the processor circuit to execute the one or more instruction sets for operating the object of the application correlated with the first digital picture includes utilizing at least one of: just in time (JIT) compiling, JIT interpretation, JIT translation, dynamic recompiling, or binary rewriting. In further embodiments, the causing the processor circuit to execute the one or more instruction sets for operating the object of the application correlated with the first digital picture includes utilizing at least one of: a dynamic expression creation, a dynamic expression execution, a dynamic function creation, or a dynamic function execution. In further embodiments, the causing the processor circuit to execute the one or more instruction sets for operating the object of the application correlated with the first digital picture includes adding or inserting additional code into a code of the application. In further embodiments, the causing the processor circuit to execute the one or more instruction sets for operating the object of the application correlated with the first digital picture includes at least one of: modifying, removing, rewriting, or overwriting a code of the application. In further embodiments, the causing the processor circuit to execute the one or more instruction sets for operating the object of the application correlated with the first digital picture includes at least one of: branching, redirecting, extending, or hot swapping a code of the application. The branching or redirecting the code may include inserting at least one of: a branch, a jump, or a means for redirecting an execution. In further embodiments, the causing the processor circuit to execute the one or more instruction sets for operating the object of the application correlated with the first digital picture includes implementing a user's knowledge, style, or methodology of operating the object of the application in a visual surrounding. In further embodiments, the system further comprises: an interface configured to cause execution of instruction sets, wherein the executing the one or more instruction sets for operating the object of the application correlated with the first digital picture is caused by the interface. The interface may include a modification interface.

In certain embodiments, the performing the one or more operations defined by the one or more instruction sets for operating the object of the application correlated with the first digital picture includes implementing a user's knowledge, style, or methodology of operating the object of the application in a visual surrounding.

In some embodiments, the artificial intelligence unit may be further configured to: receive at least one extra information. In further embodiments, the at least one extra information include one or more of: a time information, a location information, a computed information, an observed information, an acoustic information, or a contextual information. In further embodiments, the at least one extra information include one or more of: an information on a digital picture, an information on an object in the digital picture, an information on an instruction set, an information on the object of the application, an information on a visual surrounding of the object of the application, an information on the application, an information on the processor circuit, or an information on a user. In further embodiments, the artificial intelligence unit may be further configured to: learn the first digital picture correlated with the at least one extra information. The learning the first digital picture correlated with at least one extra information may include correlating the first digital picture with the at least one extra information. The learning the first digital picture correlated with at least one extra information may include storing the first digital picture correlated with the at least one extra information into the memory unit. In further embodiments, the anticipating the one or more instruction sets for operating the object of the application correlated with the first digital picture based on at least a partial match between the new digital picture and the first digital picture includes anticipating the one or more instruction sets for operating the object of the application correlated with the first digital picture based on at least a partial match between an extra information correlated with the new digital picture and an extra information correlated with the first digital picture. The anticipating the one or more instruction sets for operating the object of the application correlated with the first digital picture based on at least a partial match between an extra information correlated with the new digital picture and an extra information correlated with the first digital picture may include comparing an extra information correlated with the new digital picture and an extra information correlated with the first digital picture. The anticipating the one or more instruction sets for operating the object of the application correlated with the first digital picture based on at least a partial match between an extra information correlated with the new digital picture and an extra information correlated with the first digital picture may include determining that a similarity between an extra information correlated with the new digital picture and an extra information correlated with the first digital picture exceeds a similarity threshold.

In certain embodiments, the system further comprises: a user interface, wherein the artificial intelligence unit is further configured to: present, via the user interface, a user with an option to execute the one or more instruction sets for operating the object of the application correlated with the first digital picture.

In some embodiments, the system further comprises: a user interface, wherein the artificial intelligence unit is further configured to: receive, via the user interface, a user's selection to execute the one or more instruction sets for operating the object of the application correlated with the first digital picture.

In certain embodiments, the artificial intelligence unit may be further configured to: rate the executed one or more instruction sets for operating the object of the application correlated with the first digital picture. In further embodiments, the rating the executed one or more instruction sets for operating the object of the application correlated with the first digital picture includes displaying, on a display, the executed one or more instruction sets for operating the object of the application correlated with the first digital picture along with one or more rating values as options to be selected by a user. In further embodiments, the rating the executed one or more instruction sets for operating the object of the application correlated with the first digital picture includes rating the executed one or more instruction sets for operating the object of the application correlated with the first digital picture without a user input. In further embodiments, the rating the executed one or more instruction sets for operating the object of the application correlated with the first digital picture includes associating one or more rating values with the executed one or more instruction sets for operating the object of the application correlated with the first digital picture and storing the one or more rating values into the memory unit.

In some embodiments, the system further comprises: a user interface, wherein the artificial intelligence unit is further configured to: present, via the user interface, a user with an option to cancel the execution of the executed one or more instruction sets for operating the object of the application correlated with the first digital picture. In further embodiments, the canceling the execution of the executed one or more instruction sets for operating the object of the application correlated with the first digital picture includes restoring the processor circuit, the application, or the object of the application to a prior state. The restoring the processor circuit, the application, or the object of the application to a prior state may include saving the state of the processor circuit, the application, or the object of the application prior to executing the one or more instruction sets for operating the object of the application correlated with the first digital picture.

In certain embodiments, the system further comprises: an input device configured to receive a user's operating directions, the user's operating directions for instructing the processor circuit, the application, or the object of the application on how to operate the object of the application.

In some embodiments, the autonomous object operating includes a partially or a fully autonomous object operating. The partially autonomous object operating may include executing the one or more instruction sets for operating the object of the application correlated with the first digital picture responsive to a user confirmation. The fully autonomous object operating may include executing the one or more instruction sets for operating the object of the application correlated with the first digital picture without a user confirmation.

In certain embodiments, the artificial intelligence unit may be further configured to: receive a second digital picture from the renderer; receive additional one or more instruction sets for operating the object of the application; and learn the second digital picture correlated with the additional one or more instruction sets for operating the object of the application. In further embodiments, the second digital picture includes a second stream of digital pictures. In further embodiments, the learning the first digital picture correlated with the one or more instruction sets for operating the object of the application and the learning the second digital picture correlated with the additional one or more instruction sets for operating the object of the application include creating a connection between the first digital picture correlated with the one or more instruction sets for operating the object of the application and the second digital picture correlated with the additional one or more instruction sets for operating the object of the application. The connection may include or be associated with at least one of: an occurrence count, a weight, a parameter, or a data. In further embodiments, the learning the first digital picture correlated with the one or more instruction sets for operating the object of the application and the learning the second digital picture correlated with the additional one or more instruction sets for operating the object of the application include updating a connection between the first digital picture correlated with the one or more instruction sets for operating the object of the application and the second digital picture correlated with the additional one or more instruction sets for operating the object of the application. The updating the connection between the first digital picture correlated with the one or more instruction sets for operating the object of the application and the second digital picture correlated with the additional one or more instruction sets for operating the object of the application may include updating at least one of: an occurrence count, a weight, a parameter, or a data included in or associated with the connection. In further embodiments, the learning the first digital picture correlated with the one or more instruction sets for operating the object of the application includes storing the first digital picture correlated with the one or more instruction sets for operating the object of the application into a first node of a data structure, and wherein the learning the second digital picture correlated with the additional one or more instruction sets for operating the object of the application includes storing the second digital picture correlated with the additional one or more instruction sets for operating the object of the application into a second node of the data structure. The data structure may include a neural network, a graph, a collection of sequences, a sequence, a collection of knowledge cells, a knowledgebase, or a knowledge structure. The learning the first digital picture correlated with the one or more instruction sets for operating the object of the application and the learning the second digital picture correlated with the additional one or more instruction sets for operating the object of the application may include creating a connection between the first node and the second node. The learning the first digital picture correlated with the one or more instruction sets for operating the object of the application and the learning the second digital picture correlated with the additional one or more instruction sets for operating the object of the application may include updating a connection between the first node and the second node. In further embodiments, the first digital picture correlated with the one or more instruction sets for operating the object of the application is stored into a first node of a neural network and the second digital picture correlated with the additional one or more instruction sets for operating the object of the application is stored into a second node of the neural network. The first node and the second node may be connected by a connection. The first node may be part of a first layer of the neural network and the second node may be part of a second layer of the neural network. In further embodiments, the first digital picture correlated with the one or more instruction sets for operating the object of the application is stored into a first node of a graph and the second digital picture correlated with the additional one or more instruction sets for operating the object of the application is stored into a second node of the graph. The first node and the second node may be connected by a connection. In further embodiments, the first digital picture correlated with the one or more instruction sets for operating the object of the application is stored into a first node of a sequence and the second digital picture correlated with the additional one or more instruction sets for operating the object of the application is stored into a second node of the sequence.

In some aspects, the disclosure relates to a non-transitory computer storage medium having a computer program stored thereon, the program including instructions that when executed by one or more processor circuits cause the one or more processor circuits to perform operations comprising: receiving a first digital picture from a renderer, the renderer configured to render digital pictures of a surrounding of an object of an application. The operations may further include: receiving one or more instruction sets for operating the object of the application. The operations may further include: learning the first digital picture correlated with the one or more instruction sets for operating the object of the application. The operations may further include: receiving a new digital picture from the renderer. The operations may further include: anticipating the one or more instruction sets for operating the object of the application correlated with the first digital picture based on at least a partial match between the new digital picture and the first digital picture. The operations may further include: causing an execution of the one or more instruction sets for operating the object of the application correlated with the first digital picture, the causing performed in response to the anticipating the one or more instruction sets for operating the object of the application correlated with the first digital picture based on at least a partial match between the new digital picture and the first digital picture, wherein the object of the application performs one or more operations defined by the one or more instruction sets for operating the object of the application correlated with the first digital picture, the one or more operations performed in response to the execution.

In some aspects, the disclosure relates to a non-transitory computer storage medium having a computer program stored thereon, the program including instructions that when executed by one or more processor circuits cause the one or more processor circuits to perform operations comprising: receiving, by a first processor circuit of the one or more processor circuits, a first digital picture from a renderer, the renderer configured to render digital pictures of a surrounding of an object of an application. The operations may further include: receiving, by the first processor circuit of the one or more processor circuits, one or more instruction sets for operating the object of the application. The operations may further include: learning, by the first processor circuit of the one or more processor circuits, the first digital picture correlated with the one or more instruction sets for operating the object of the application. The operations may further include: receiving, by the first processor circuit of the one or more processor circuits, a new digital picture from the renderer. The operations may further include: anticipating, by the first processor circuit of the one or more processor circuits, the one or more instruction sets for operating the object of the application correlated with the first digital picture based on at least a partial match between the new digital picture and the first digital picture. The operations may further include: causing, by the first processor circuit of the one or more processor circuits, an execution, by a second processor circuit of the one or more processor circuits, of the one or more instruction sets for operating the object of the application correlated with the first digital picture, the causing performed in response to the anticipating the one or more instruction sets for operating the object of the application correlated with the first digital picture based on at least a partial match between the new digital picture and the first digital picture, wherein the object of the application performs one or more operations defined by the one or more instruction sets for operating the object of the application correlated with the first digital picture, the one or more operations performed in response to the execution.

In some aspects, the disclosure relates to a method comprising: (a) receiving a first digital picture from a renderer by a processor circuit, the renderer configured to render digital pictures of a surrounding of an object of an application. The method may further include: (b) receiving one or more instruction sets for operating the object of the application by the processor circuit. The method may further include: (c) learning the first digital picture correlated with the one or more instruction sets for operating the object of the application, the learning of (c) performed by the processor circuit. The method may further include: (d) receiving a new digital picture from the renderer by the processor circuit. The method may further include: (e) anticipating the one or more instruction sets for operating the object of the application correlated with the first digital picture based on at least a partial match between the new digital picture and the first digital picture, the anticipating of (e) performed by the processor circuit. The method may further include: (f) executing the one or more instruction sets for operating the object of the application correlated with the first digital picture, the executing of (f) performed in response to the anticipating of (e). The method may further include: (g) performing, by the object of the application, one or more operations defined by the one or more instruction sets for operating the object of the application correlated with the first digital picture, the one or more operations performed in response to the executing of (f).

In some aspects, the disclosure relates to a method comprising: (a) receiving a first digital picture from a renderer by a first processor circuit, the renderer configured to render digital pictures of a surrounding of an object of an application. The method may further include: (b) receiving one or more instruction sets for operating the object of the application by the first processor circuit. The method may further include: (c) learning the first digital picture correlated with the one or more instruction sets for operating the object of the application, the learning of (c) performed by the first processor circuit. The method may further include: (d) receiving a new digital picture from the renderer by the first processor circuit. The method may further include: (e) anticipating the one or more instruction sets for operating the object of the application correlated with the first digital picture based on at least a partial match between the new digital picture and the first digital picture, the anticipating of (e) performed by the first processor circuit. The method may further include: (f) executing, by a second processor circuit, the one or more instruction sets for operating the object of the application correlated with the first digital picture, the executing of (f) performed in response to the anticipating of (e). The method may further include: (g) performing, by the object of the application, one or more operations defined by the one or more instruction sets for operating the object of the application correlated with the first digital picture, the one or more operations performed in response to the executing of (f).

The operations or steps of the non-transitory computer storage mediums and/or the methods may be performed by any of the elements of the above described systems as applicable. The non-transitory computer storage mediums and/or the methods may include any of the operations, steps, and embodiments of the above described systems as applicable as well as the following embodiments.

In some embodiments, the one or more instruction sets for operating the object of the application include one or more instruction sets that temporally correspond to the first digital picture. In further embodiments, the one or more instruction sets that temporally correspond to the first digital picture include one or more instruction sets executed at a time of a rendering the first digital picture. In further embodiments, the one or more instruction sets that temporally correspond to the first digital picture include one or more instruction sets executed prior to a rendering the first digital picture. In further embodiments, the one or more instruction sets that temporally correspond to the first digital picture include one or more instruction sets executed within a threshold period of time prior to a rendering the first digital picture. In further embodiments, the one or more instruction sets that temporally correspond to the first digital picture include one or more instruction sets executed subsequent to a rendering the first digital picture. In further embodiments, the one or more instruction sets that temporally correspond to the first digital picture include one or more instruction sets executed within a threshold period of time subsequent to a rendering the first digital picture. In further embodiments, the one or more instruction sets that temporally correspond to the first digital picture include one or more instruction sets executed within a threshold period of time prior to a rendering the first digital picture or a threshold period of time subsequent to the rendering the first digital picture. In further embodiments, the one or more instruction sets that temporally correspond to the first digital picture include one or more instruction sets executed from a start of a rendering a preceding digital picture to a start of a rendering the first digital picture. In further embodiments, the one or more instruction sets that temporally correspond to the first digital picture include one or more instruction sets executed from a start of a rendering the first digital picture to a start of a rendering a subsequent digital picture. In further embodiments, the one or more instruction sets that temporally correspond to the first digital picture include one or more instruction sets executed from a completion of a rendering a preceding digital picture to a completion of a rendering the first digital picture. In further embodiments, the one or more instruction sets that temporally correspond to the first digital picture include one or more instruction sets executed from a completion of a rendering the first digital picture to a completion of a rendering a subsequent digital picture.

In certain embodiments, the one or more instruction sets for operating the object of the application are executed by a processor circuit. In further embodiments, the one or more instruction sets for operating the object of the application are part of the application. In further embodiments, the one or more instruction sets for operating the object of the application include one or more instruction sets executed in operating the object of the application. In further embodiments, the one or more instruction sets for operating the object of the application include one or more instruction sets for operating the application. In further embodiments, the one or more instruction sets for operating the object of the application include one or more inputs into a processor circuit. In further embodiments, the one or more instruction sets for operating the object of the application include values or states of one or more registers or elements of a processor circuit. In further embodiments, an instruction set includes at least one of: a command, a keyword, a symbol, an instruction, an operator, a variable, a value, an object, a data structure, a function, a parameter, a state, a signal, an input, an output, a character, a digit, or a reference thereto. In further embodiments, the one or more instruction sets for operating the object of the application include a source code, a bytecode, an intermediate code, a compiled code, an interpreted code, a translated code, a runtime code, an assembly code, a structured query language (SQL) code, or a machine code. In further embodiments, the one or more instruction sets for operating the object of the application include one or more code segments, lines of code, statements, instructions, functions, routines, subroutines, or basic blocks.

In some embodiments, the receiving the one or more instruction sets for operating the object of the application includes obtaining the one or more instruction sets from a processor circuit. In further embodiments, the receiving the one or more instruction sets for operating the object of the application includes receiving the one or more instruction sets as they are executed by a processor circuit. In further embodiments, the receiving the one or more instruction sets for operating the object of the application includes receiving the one or more instruction sets for operating the object of the application from a register or an element of a processor circuit. In further embodiments, the receiving the one or more instruction sets for operating the object of the application includes receiving the one or more instruction sets for operating the object of the application from at least one of: a memory unit, a virtual machine, a runtime engine, a hard drive, a storage device, a peripheral device, a network connected device, or a user. In further embodiments, the receiving the one or more instruction sets for operating the object of the application includes receiving the one or more instruction sets from a plurality of processor circuits, applications, memory units, devices, virtual machines, runtime engines, hard drives, storage devices, peripheral devices, network connected devices, or users. In further embodiments, the receiving the one or more instruction sets for operating the object of the application includes receiving the one or more instruction sets for operating the object of the application from the application. In further embodiments, the receiving the one or more instruction sets for operating the object of the application includes receiving the one or more instruction sets for operating the object of the application from the object of the application. In further embodiments, the receiving the one or more instruction sets for operating the object of the application includes receiving the one or more instruction sets at a source code write time, a compile time, an interpretation time, a translation time, a linking time, a loading time, or a runtime. In further embodiments, the receiving the one or more instruction sets for operating the object of the application includes at least one of: tracing, profiling, or instrumentation of a source code, a bytecode, an intermediate code, a compiled code, an interpreted code, a translated code, a runtime code, an assembly code, a structured query language (SQL) code, or a machine code. In further embodiments, the receiving the one or more instruction sets for operating the object of the application includes at least one of: tracing, profiling, or instrumentation of a register of a processor circuit, a memory unit, a storage, or a repository where the one or more instruction sets for operating the object of the application are stored. In further embodiments, the receiving the one or more instruction sets for operating the object of the application includes at least one of: tracing, profiling, or instrumentation of a processor circuit, a virtual machine, a runtime engine, an operating system, an execution stack, a program counter, or a processing element. In further embodiments, the receiving the one or more instruction sets for operating the object of the application includes at least one of: tracing, profiling, or instrumentation of a processor circuit or tracing, profiling, or instrumentation of a component of the processor circuit. In further embodiments, the receiving the one or more instruction sets for operating the object of the application includes at least one of: tracing, profiling, or instrumentation of the application or the object of the application. In further embodiments, the receiving the one or more instruction sets for operating the object of the application includes at least one of: tracing, profiling, or instrumentation at a source code write time, a compile time, an interpretation time, a translation time, a linking time, a loading time, or a runtime. In further embodiments, the receiving the one or more instruction sets for operating the object of the application includes at least one of: tracing, profiling, or instrumentation of one or more code segments, lines of code, statements, instructions, functions, routines, subroutines, or basic blocks. In further embodiments, the receiving the one or more instruction sets for operating the object of the application includes at least one of: tracing, profiling, or instrumentation of a user input. In further embodiments, the receiving the one or more instruction sets for operating the object of the application includes at least one of: a manual, an automatic, a dynamic, or a just in time (JIT) tracing, profiling, or instrumentation of the application or the object of the application. In further embodiments, the receiving the one or more instruction sets for operating the object of the application includes utilizing at least one of: a .NET tool, a .NET application programming interface (API), a Java tool, a Java API, a logging tool, or an independent tool for obtaining instruction sets. In further embodiments, the receiving the one or more instruction sets for operating the object of the application includes utilizing an assembly language. In further embodiments, the receiving the one or more instruction sets for operating the object of the application includes utilizing a branch or a jump. In further embodiments, the receiving the one or more instruction sets for operating the object of the application includes a branch tracing or a simulation tracing. In further embodiments, the receiving the one or more instruction sets for operating the object of the application includes receiving the one or more instruction sets for operating the object of the application by an interface. The interface may include an acquisition interface.

In certain embodiments, the first digital picture correlated with the one or more instruction sets for operating the object of the application includes an anticipatory digital picture whose correlated one or more instruction sets for operating the object of the application can be used for anticipation of one or more instruction sets to be executed in an operation of the object of the application. In further embodiments, the first digital picture correlated with the one or more instruction sets for operating the object of the application includes a unit of knowledge of how the object of the application operated in a visual surrounding. In further embodiments, the first digital picture correlated with the one or more instruction sets for operating the object of the application is included in a neuron, a node, a vertex, or an element of a data structure. In further embodiments, the data structure includes a neural network, a graph, a collection of sequences, a sequence, a collection of knowledge cells, a knowledgebase, or a knowledge structure. In further embodiments, some of the neurons, nodes, vertices, or elements are interconnected. In further embodiments, the first digital picture correlated with the one or more instruction sets for operating the object of the application is structured into a knowledge cell. In further embodiments, the knowledge cell includes a unit of knowledge of how the object of the application operated in a visual surrounding. In further embodiments, the knowledge cell is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the learning the first digital picture correlated with the one or more instruction sets for operating the object of the application includes correlating the first digital picture with the one or more instruction sets for operating the object of the application. In further embodiments, the correlating the first digital picture with the one or more instruction sets for operating the object of the application includes generating a knowledge cell, the knowledge cell comprising the first digital picture correlated with the one or more instruction sets for operating the object of the application. In further embodiments, the correlating the first digital picture with the one or more instruction sets for operating the object of the application includes structuring a unit of knowledge of how the device operated in a visual surrounding. In further embodiments, the learning the first digital picture correlated with the one or more instruction sets for operating the object of the application includes learning a user's knowledge, style, or methodology of operating the object of the application in a visual surrounding. In further embodiments, the learning the first digital picture correlated with the one or more instruction sets for operating the object of the application includes spontaneous learning the first digital picture correlated with the one or more instruction sets for operating the object of the application.

In some embodiments, the learning the first digital picture correlated with the one or more instruction sets for operating the object of the application includes storing, into a memory unit, the first digital picture correlated with the one or more instruction sets for operating the object of the application, the first digital picture correlated with the one or more instruction sets for operating the object of the application being part of a stored plurality of digital pictures correlated with one or more instruction sets for operating the object of the application. In further embodiments, the plurality of digital pictures correlated with one or more instruction sets for operating the object of the application include a neural network, a graph, a collection of sequences, a sequence, a collection of knowledge cells, a knowledgebase, a knowledge structure, or a data structure. In further embodiments, the plurality of digital pictures correlated with one or more instruction sets for operating the object of the application are organized into a neural network, a graph, a collection of sequences, a sequence, a collection of knowledge cells, a knowledgebase, a knowledge structure, or a data structure. In further embodiments, each of the plurality of digital pictures correlated with one or more instruction sets for operating the object of the application is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the plurality of digital pictures correlated with one or more instruction sets for operating the object of the application include a user's knowledge, style, or methodology of operating the object of the application in visual surroundings. In further embodiments, the plurality of digital pictures correlated with one or more instruction sets for operating the object of the application are stored on a remote computing device or a remote computing system. In further embodiments, the plurality of digital pictures correlated with one or more instruction sets for operating the object of the application include an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system.

In certain embodiments, the executing the one or more instruction sets for operating the object of the application correlated with the first digital picture includes executing the one or more instruction sets for operating the object of the application correlated with the first digital picture instead of or prior to an instruction set that would have been executed next. In further embodiments, the executing the one or more instruction sets for operating the object of the application correlated with the first digital picture includes modifying one or more instruction sets of a processor circuit. In further embodiments, the executing the one or more instruction sets for operating the object of the application correlated with the first digital picture includes modifying a register or an element of a processor circuit. In further embodiments, the executing the one or more instruction sets for operating the object of the application correlated with the first digital picture includes inserting the one or more instruction sets for operating the object of the application correlated with the first digital picture into a register or an element of a processor circuit. In further embodiments, the executing the one or more instruction sets for operating the object of the application correlated with the first digital picture includes redirecting a processor circuit to the one or more instruction sets for operating the object of the application correlated with the first digital picture. In further embodiments, the executing the one or more instruction sets for operating the object of the application correlated with the first digital picture includes redirecting a processor circuit to one or more alternate instruction sets, the alternate instruction sets comprising the one or more instruction sets for operating the object of the application correlated with the first digital picture. In further embodiments, the executing the one or more instruction sets for operating the object of the application correlated with the first digital picture includes transmitting, to a processor circuit for execution, the one or more instruction sets for operating the object of the application correlated with the first digital picture. In further embodiments, the executing the one or more instruction sets for operating the object of the application correlated with the first digital picture includes issuing an interrupt to a processor circuit and executing the one or more instruction sets for operating the object of the application correlated with the first digital picture following the interrupt. In further embodiments, the executing the one or more instruction sets for operating the object of the application correlated with the first digital picture includes causing the application to execute the one or more instruction sets for operating the object of the application correlated with the first digital picture. In further embodiments, the executing the one or more instruction sets for operating the object of the application correlated with the first digital picture includes modifying the application with the one or more instruction sets for operating the object of the application correlated with the first digital picture. In further embodiments, the executing the one or more instruction sets for operating the object of the application correlated with the first digital picture includes redirecting the application to the one or more instruction sets for operating the object of the application correlated with the first digital picture. In further embodiments, the executing the one or more instruction sets for operating the object of the application correlated with the first digital picture includes redirecting the application to one or more alternate instruction sets, the alternate instruction sets comprising the one or more instruction sets for operating the object of the application correlated with the first digital picture. In further embodiments, the executing the one or more instruction sets for operating the object of the application correlated with the first digital picture includes modifying one or more instruction sets of the application. In further embodiments, the executing the one or more instruction sets for operating the object of the application correlated with the first digital picture includes modifying one or more instruction sets of the object of the application. In further embodiments, the executing the one or more instruction sets for operating the object of the application correlated with the first digital picture includes modifying a source code, a bytecode, an intermediate code, a compiled code, an interpreted code, a translated code, a runtime code, an assembly code, or a machine code. In further embodiments, the executing the one or more instruction sets for operating the object of the application correlated with the first digital picture includes modifying at least one of: the memory unit, a register of a processor circuit, a storage, or a repository where instruction sets are stored or used. In further embodiments, the executing the one or more instruction sets for operating the object of the application correlated with the first digital picture includes modifying at least one of: an element of a processor circuit, a virtual machine, a runtime engine, an operating system, an execution stack, a program counter, or a user input. In further embodiments, the executing the one or more instruction sets for operating the object of the application correlated with the first digital picture includes modifying one or more instruction sets at a source code write time, a compile time, an interpretation time, a translation time, a linking time, a loading time, or a runtime. In further embodiments, the executing the one or more instruction sets for operating the object of the application correlated with the first digital picture includes modifying one or more code segments, lines of code, statements, instructions, functions, routines, subroutines, or basic blocks. In further embodiments, the executing the one or more instruction sets for operating the object of the application correlated with the first digital picture includes a manual, an automatic, a dynamic, or a just in time (JIT) instrumentation of the application or the object of the application. In further embodiments, the executing the one or more instruction sets for operating the object of the application correlated with the first digital picture includes utilizing one or more of a .NET tool, a .NET application programming interface (API), a Java tool, a Java API, an operating system tool, or an independent tool for modifying instruction sets. In further embodiments, the executing the one or more instruction sets for operating the object of the application correlated with the first digital picture includes utilizing at least one of: a dynamic, an interpreted, or a scripting programming language. In further embodiments, the executing the one or more instruction sets for operating the object of the application correlated with the first digital picture includes utilizing at least one of: a dynamic code, a dynamic class loading, or a reflection. In further embodiments, the executing the one or more instruction sets for operating the object of the application correlated with the first digital picture includes utilizing an assembly language. In further embodiments, the executing the one or more instruction sets for operating the object of the application correlated with the first digital picture includes utilizing at least one of: a metaprogramming, a self-modifying code, or an instruction set modification tool. In further embodiments, the executing the one or more instruction sets for operating the object of the application correlated with the first digital picture includes utilizing at least one of: just in time (JIT) compiling, JIT interpretation, JIT translation, dynamic recompiling, or binary rewriting. In further embodiments, the executing the one or more instruction sets for operating the object of the application correlated with the first digital picture includes utilizing at least one of: a dynamic expression creation, a dynamic expression execution, a dynamic function creation, or a dynamic function execution. In further embodiments, the executing the one or more instruction sets for operating the object of the application correlated with the first digital picture includes adding or inserting additional code into a code of the application. In further embodiments, the executing the one or more instruction sets for operating the object of the application correlated with the first digital picture includes at least one of: modifying, removing, rewriting, or overwriting a code of the application. In further embodiments, the executing the one or more instruction sets for operating the object of the application correlated with the first digital picture includes at least one of: branching, redirecting, extending, or hot swapping a code of the application. The branching or redirecting the code may include inserting at least one of: a branch, a jump, or a means for redirecting an execution. In further embodiments, the executing the one or more instruction sets for operating the object of the application correlated with the first digital picture includes implementing a user's knowledge, style, or methodology of operating the object of the application in a visual surrounding. In further embodiments, the executing the one or more instruction sets for operating the object of the application correlated with the first digital picture includes executing the one or more instruction sets for operating the object of the application correlated with the first digital picture via an interface. The interface may include a modification interface.

In certain embodiments, the performing, by the object of the application, one or more operations defined by the one or more instruction sets for operating the object of the application correlated with the first digital picture includes implementing a user's knowledge, style, or methodology of operating the object of the application in a visual surrounding.

In some embodiments, the operations of the non-transitory computer storage medium and/or the method further comprise: receiving at least one extra information. In further embodiments, the at least one extra information include one or more of: a time information, a location information, a computed information, an observed information, an acoustic information, or a contextual information. In further embodiments, the at least one extra information include one or more of: an information on a digital picture, an information on an object in the digital picture, an information on an instruction set, an information on the object of the application, an information on a visual surrounding of the object of the application, an information on the application, an information on a processor circuit, or an information on a user. In further embodiments, the operations of the non-transitory computer storage mediums and/or the methods further comprise: learning the first digital picture correlated with the at least one extra information. The learning the first digital picture correlated with at least one extra information may include correlating the first digital picture with the at least one extra information. The learning the first digital picture correlated with at least one extra information may include storing the first digital picture correlated with the at least one extra information into a memory unit. In further embodiments, the anticipating the one or more instruction sets for operating the object of the application correlated with the first digital picture based on at least a partial match between the new digital picture and the first digital picture includes anticipating the one or more instruction sets for operating the object of the application correlated with the first digital picture based on at least a partial match between an extra information correlated with the new digital picture and an extra information correlated with the first digital picture. The anticipating the one or more instruction sets for operating the object of the application correlated with the first digital picture based on at least a partial match between an extra information correlated with the new digital picture and an extra information correlated with the first digital picture may include comparing an extra information correlated with the new digital picture and an extra information correlated with the first digital picture. The anticipating the one or more instruction sets for operating the object of the application correlated with the first digital picture based on at least a partial match between an extra information correlated with the new digital picture and an extra information correlated with the first digital picture may include determining that a similarity between an extra information correlated with the new digital picture and an extra information correlated with the first digital picture exceeds a similarity threshold.

In certain embodiments, the operations of the non-transitory computer storage mediums and/or the methods further comprise: presenting, via a user interface, a user with an option to execute the one or more instruction sets for operating the object of the application correlated with the first digital picture.

In some embodiments, the operations of the non-transitory computer storage mediums and/or the methods further comprise: receiving, via a user interface, a user's selection to execute the one or more instruction sets for operating the object of the application correlated with the first digital picture.

In certain embodiments, the operations of the non-transitory computer storage mediums and/or the methods further comprise: rating the executed one or more instruction sets for operating the object of the application correlated with the first digital picture.

In some embodiments, the operations of the non-transitory computer storage mediums and/or the methods further comprise: presenting, via a user interface, a user with an option to cancel the execution of the executed one or more instruction sets for operating the object of the application correlated with the first digital picture.

In certain embodiments, the operations of the non-transitory computer storage mediums and/or the methods further comprise: receiving, via an input device, a user's operating directions, the user's operating directions for instructing a processor circuit, the application, or the object of the application on how to operate the object of the application.

In some embodiments, the operations of the non-transitory computer storage mediums and/or the methods further comprise: receiving a second digital picture from the renderer; receiving additional one or more instruction sets for operating the object of the application; and learning the second digital picture correlated with the additional one or more instruction sets for operating the object of the application. In further embodiments, the second digital picture includes a second stream of digital pictures. In further embodiments, the learning the first digital picture correlated with the one or more instruction sets for operating the object of the application and the learning the second digital picture correlated with the additional one or more instruction sets for operating the object of the application include creating a connection between the first digital picture correlated with the one or more instruction sets for operating the object of the application and the second digital picture correlated with the additional one or more instruction sets for operating the object of the application. The connection may include or be associated with at least one of: an occurrence count, a weight, a parameter, or a data. In further embodiments, the learning the first digital picture correlated with the one or more instruction sets for operating the object of the application and the learning the second digital picture correlated with the additional one or more instruction sets for operating the object of the application include updating a connection between the first digital picture correlated with the one or more instruction sets for operating the object of the application and the second digital picture correlated with the additional one or more instruction sets for operating the object of the application. The updating the connection between the first digital picture correlated with the one or more instruction sets for operating the object of the application and the second digital picture correlated with the additional one or more instruction sets for operating the object of the application may include updating at least one of: an occurrence count, a weight, a parameter, or a data included in or associated with the connection. In further embodiments, the learning the first digital picture correlated with the one or more instruction sets for operating the object of the application includes storing the first digital picture correlated with the one or more instruction sets for operating the object of the application into a first node of a data structure, and wherein the learning the second digital picture correlated with the additional one or more instruction sets for operating the object of the application includes storing the second digital picture correlated with the additional one or more instruction sets for operating the object of the application into a second node of the data structure. The data structure may include a neural network, a graph, a collection of sequences, a sequence, a collection of knowledge cells, a knowledgebase, or a knowledge structure. The learning the first digital picture correlated with the one or more instruction sets for operating the object of the application and the learning the second digital picture correlated with the additional one or more instruction sets for operating the object of the application may include creating a connection between the first node and the second node. The learning the first digital picture correlated with the one or more instruction sets for operating the object of the application and the learning the second digital picture correlated with the additional one or more instruction sets for operating the object of the application may include updating a connection between the first node and the second node. In further embodiments, the first digital picture correlated with the one or more instruction sets for operating the object of the application is stored into a first node of a neural network and the second digital picture correlated with the additional one or more instruction sets for operating the object of the application is stored into a second node of the neural network. The first node and the second node may be connected by a connection. The first node may be part of a first layer of the neural network and the second node may be part of a second layer of the neural network. In further embodiments, the first digital picture correlated with the one or more instruction sets for operating the object of the application is stored into a first node of a graph and the second digital picture correlated with the additional one or more instruction sets for operating the object of the application is stored into a second node of the graph. The first node and the second node may be connected by a connection. In further embodiments, the first digital picture correlated with the one or more instruction sets for operating the object of the application may be stored into a first node of a sequence and the second digital picture correlated with the additional one or more instruction sets for operating the object of the application may be stored into a second node of the sequence.

In some aspects, the disclosure relates to a system for learning a visual surrounding for autonomous object operating. The system may be implemented at least in part on one or more computing devices. In some embodiments, the system comprises a processor circuit configured to execute instruction sets of an application, the application including an object. The system may further include a memory unit configured to store data. The system may further include a renderer configured to render digital pictures of a surrounding of the object of the application. The system may further include an artificial intelligence unit. In some embodiments, the artificial intelligence unit may be configured to: receive a first digital picture from the renderer. The artificial intelligence unit may be further configured to: receive one or more instruction sets for operating the object of the application. The artificial intelligence unit may be further configured to: learn the first digital picture correlated with the one or more instruction sets for operating the object of the application.

In some aspects, the disclosure relates to a non-transitory computer storage medium having a computer program stored thereon, the program including instructions that when executed by one or more processor circuits cause the one or more processor circuits to perform operations comprising: receiving a first digital picture from a renderer, the renderer configured to render digital pictures of a surrounding of an object of an application. The operations may further include: receiving one or more instruction sets for operating the object of the application. The operations may further include: learning the first digital picture correlated with the one or more instruction sets for operating the object of the application.

In some aspects, the disclosure relates to a method comprising: (a) receiving a first digital picture from a renderer by a processor circuit, the renderer configured to render digital pictures of a surrounding of an object of an application. The method may further include: (b) receiving one or more instruction sets for operating the object of the application by the processor circuit. The method may further include: (c) learning the first digital picture correlated with the one or more instruction sets for operating the object of the application, the learning of (c) performed by the processor circuit.

The operations or steps of the non-transitory computer storage medium and/or the method may be performed by any of the elements of the above described systems as applicable. The non-transitory computer storage medium and/or the method may include any of the operations, steps, and embodiments of the above described systems as applicable as well as the following embodiments.

In some aspects, the disclosure relates to a system for using a visual surrounding for autonomous object operating. The system may be implemented at least in part on one or more computing devices. In some embodiments, the system comprises a processor circuit configured to execute instruction sets of an application, the application including an object. The system may further include a memory unit configured to store a plurality of digital pictures correlated with one or more instruction sets for operating the object of the application, the plurality including a first digital picture correlated with one or more instruction sets for operating the object of the application. The system may further include a renderer configured to render digital pictures of a surrounding of the object of the application. The system may further include an artificial intelligence unit. In some embodiments, the artificial intelligence unit may be configured to: access the first digital picture correlated with one or more instruction sets for operating the object of the application stored in the memory unit. The artificial intelligence unit may be further configured to: receive a new digital picture from the renderer. The artificial intelligence unit may be further configured to: anticipate the one or more instruction sets for operating the object of the application correlated with the first digital picture based on at least a partial match between the new digital picture and the first digital picture. The artificial intelligence unit may be further configured to: cause the processor circuit to execute the one or more instruction sets for operating the object of the application correlated with the first digital picture, the executing performed in response to the anticipating of the artificial intelligence unit, wherein the object of the application performs one or more operations defined by the one or more instruction sets for operating the object of the application correlated with the first digital picture, the one or more operations performed in response to the executing by the processor circuit.

In some aspects, the disclosure relates to a non-transitory computer storage medium having a computer program stored thereon, the program including instructions that when executed by one or more processor circuits cause the one or more processor circuits to perform operations comprising: accessing a memory unit that stores a plurality of digital pictures correlated with one or more instruction sets for operating an object of an application, the plurality including a first digital picture correlated with one or more instruction sets for operating the object of the application. The operations may further include: receiving a new digital picture from a renderer, the renderer configured to render digital pictures of a surrounding of the object of the application. The operations may further include: anticipating the one or more instruction sets for operating the object of the application correlated with the first digital picture based on at least a partial match between the new digital picture and the first digital picture. The operations may further include: causing an execution of the one or more instruction sets for operating the object of the application correlated with the first digital picture, the causing performed in response to the anticipating the one or more instruction sets for operating the object of the application correlated with the first digital picture based on at least a partial match between the new digital picture and the first digital picture, wherein the object of the application performs one or more operations defined by the one or more instruction sets for operating the object of the application correlated with the first digital picture, the one or more operations performed in response to the execution.

In some aspects, the disclosure relates to a method comprising: (a) accessing a memory unit that stores a plurality of digital pictures correlated with one or more instruction sets for operating an object of an application, the plurality including a first digital picture correlated with one or more instruction sets for operating the object of the application, the accessing of (a) performed by a processor circuit. The method may further include: (b) receiving a new digital picture from a renderer by the processor circuit, the renderer configured to render digital pictures of a surrounding of the object of the application. The method may further include: (c) anticipating the one or more instruction sets for operating the object of the application correlated with the first digital picture based on at least a partial match between the new digital picture and the first digital picture, the anticipating of (c) performed by the processor circuit. The method may further include: (d) executing the one or more instruction sets for operating the object of the application correlated with the first digital picture, the executing of (d) performed in response to the anticipating of (c). The method may further include: (e) performing, by the object of the application, one or more operations defined by the one or more instruction sets for operating the object of the application correlated with the first digital picture, the one or more operations performed in response to the executing of (d).

The operations or steps of the non-transitory computer storage medium and/or the method may be performed by any of the elements of the above described systems as applicable. The non-transitory computer storage medium and/or the method may include any of the operations, steps, and embodiments of the above described systems as applicable as well as the following embodiments.

In some aspects, the disclosure relates to a system for learning and using a visual surrounding for autonomous object operating. The system may be implemented at least in part on one or more computing devices. In some embodiments, the system comprises a processor circuit configured to execute instruction sets of an application, the application including an object. The system may further include a memory unit configured to store data. The system may further include a renderer configured to render streams of digital pictures of a surrounding of the object of the application. The system may further include an artificial intelligence unit. In some embodiments, the artificial intelligence unit may be configured to: receive a first stream of digital pictures from the renderer. In some embodiments, the artificial intelligence unit may be configured to: receive one or more instruction sets for operating the object of the application. In some embodiments, the artificial intelligence unit may be configured to: learn the first stream of digital pictures correlated with the one or more instruction sets for operating the object of the application. In some embodiments, the artificial intelligence unit may be configured to: receive a new stream of digital pictures from the renderer. In some embodiments, the artificial intelligence unit may be configured to: anticipate the one or more instruction sets for operating the object of the application correlated with the first stream of digital pictures based on at least a partial match between the new stream of digital pictures and the first stream of digital pictures. In some embodiments, the artificial intelligence unit may be configured to: cause the processor circuit to execute the one or more instruction sets for operating the object of the application correlated with the first stream of digital pictures, the executing performed in response to the anticipating of the artificial intelligence unit, wherein the object of the application performs one or more operations defined by the one or more instruction sets for operating the object of the application correlated with the first stream of digital pictures, the one or more operations performed in response to the executing by the processor circuit.

In some embodiments, the streams of digital pictures of the surrounding of the object of the application include streams of digital pictures of a first-person view of the surrounding of the object of the application, streams of digital pictures of a third-person view of the surrounding of the object of the application, streams of digital pictures of a view from a front of the object of the application, streams of digital pictures of a view from a side of the object of the application, streams of digital pictures of a top-down view of the surrounding of the object of the application, streams of digital pictures of a side-on view of the surrounding of the object of the application, streams of digital pictures of an area of interest of the object of the application, or streams of digital pictures of a screenshot of the surrounding of the object of the application.

In certain embodiments, the first stream of digital pictures includes one or more digital pictures and the new stream of digital pictures includes one or more digital pictures. In further embodiments, the first or the new stream of digital pictures includes a digital motion picture. The digital motion picture may include a MPEG motion picture, an AVI motion picture, a FLV motion picture, a MOV motion picture, a RM motion picture, a SWF motion picture, a WMV motion picture, a DivX motion picture, or a digitally encoded motion picture.

In some embodiments, the one or more instruction sets for operating the object of the application include one or more instruction sets that temporally correspond to the first stream of digital pictures. In further embodiments, the one or more instruction sets that temporally correspond to the first stream of digital pictures include one or more instruction sets executed at a time of a rendering the first stream of digital pictures. In further embodiments, the one or more instruction sets that temporally correspond to the first stream of digital pictures include one or more instruction sets executed prior to a rendering the first stream of digital pictures. In further embodiments, the one or more instruction sets that temporally correspond to the first stream of digital pictures include one or more instruction sets executed within a threshold period of time prior to a rendering the first stream of digital pictures. In further embodiments, the one or more instruction sets that temporally correspond to the first stream of digital pictures include one or more instruction sets executed subsequent to a rendering the first stream of digital pictures. In further embodiments, the one or more instruction sets that temporally correspond to the first stream of digital pictures include one or more instruction sets executed within a threshold period of time subsequent to a rendering the first stream of digital pictures. In further embodiments, the one or more instruction sets that temporally correspond to the first stream of digital pictures include one or more instruction sets executed within a threshold period of time prior to a rendering the first stream of digital pictures or a threshold period of time subsequent to the rendering the first stream of digital pictures. In further embodiments, the one or more instruction sets that temporally correspond to the first stream of digital pictures include one or more instruction sets executed from a start of a rendering the first stream of digital pictures to a start of a rendering a subsequent stream of digital pictures. In further embodiments, the one or more instruction sets that temporally correspond to the first stream of digital pictures include one or more instruction sets executed from a completion of a rendering a preceding stream of digital pictures to a completion of a rendering the first stream of digital pictures.

In certain embodiments, the first stream of digital pictures correlated with the one or more instruction sets for operating the object of the application includes an anticipatory stream of digital pictures whose correlated one or more instruction sets for operating the object of the application can be used for anticipation of one or more instruction sets to be executed in an operation of the object of the application. In further embodiments, the first stream of digital pictures correlated with the one or more instruction sets for operating the object of the application includes a unit of knowledge of how the object of the application operated in a visual surrounding. In further embodiments, the first stream of digital pictures correlated with the one or more instruction sets for operating the object of the application is included in a neuron, a node, a vertex, or an element of a data structure. In further embodiments, the data structure includes a neural network, a graph, a collection of sequences, a sequence, a collection of knowledge cells, a knowledgebase, or a knowledge structure. In further embodiments, some of the neurons, nodes, vertices, or elements are interconnected. In further embodiments, the first stream of digital pictures correlated with the one or more instruction sets for operating the object of the application is structured into a knowledge cell. In further embodiments, the knowledge cell includes a unit of knowledge of how the object of the application operated in a visual surrounding. In further embodiments, the knowledge cell is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the learning the first stream of digital pictures correlated with the one or more instruction sets for operating the object of the application includes correlating the first stream of digital pictures with the one or more instruction sets for operating the object of the application. In further embodiments, the correlating the first stream of digital pictures with the one or more instruction sets for operating the object of the application includes generating a knowledge cell, the knowledge cell comprising the first stream of digital pictures correlated with the one or more instruction sets for operating the object of the application. In further embodiments, the correlating the first stream of digital pictures with the one or more instruction sets for operating the object of the application includes structuring a unit of knowledge of how the device operated in a visual surrounding. In further embodiments, the learning the first stream of digital pictures correlated with the one or more instruction sets for operating the object of the application includes learning a user's knowledge, style, or methodology of operating the object of the application in a visual surrounding. In further embodiments, the learning the first stream of digital pictures correlated with the one or more instruction sets for operating the object of the application includes spontaneous learning the first stream of digital pictures correlated with the one or more instruction sets for operating the object of the application.

In some embodiments, the learning the first stream of digital pictures correlated with the one or more instruction sets for operating the object of the application includes storing, into the memory unit, the first stream of digital pictures correlated with the one or more instruction sets for operating the object of the application, the first stream of digital pictures correlated with the one or more instruction sets for operating the object of the application being part of a stored plurality of streams of digital pictures correlated with one or more instruction sets for operating the object of the application. In further embodiments, the plurality of streams of digital pictures correlated with one or more instruction sets for operating the object of the application include a neural network, a graph, a collection of sequences, a sequence, a collection of knowledge cells, a knowledgebase, a knowledge structure, or a data structure. In further embodiments, the plurality of streams of digital pictures correlated with one or more instruction sets for operating the object of the application are organized into a neural network, a graph, a collection of sequences, a sequence, a collection of knowledge cells, a knowledgebase, a knowledge structure, or a data structure. In further embodiments, each of the plurality of streams of digital pictures correlated with one or more instruction sets for operating the object of the application is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the plurality of streams of digital pictures correlated with one or more instruction sets for operating the object of the application include a user's knowledge, style, or methodology of operating the object of the application in visual surroundings. In further embodiments, the plurality of streams of digital pictures correlated with one or more instruction sets for operating the object of the application are stored on a remote computing device or a remote computing system. In further embodiments, the plurality of streams of digital pictures correlated with one or more instruction sets for operating the object of the application include an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system.

In certain embodiments, the anticipating the one or more instruction sets for operating the object of the application correlated with the first stream of digital pictures based on at least a partial match between the new stream of digital pictures and the first stream of digital pictures includes comparing at least one portion of the new stream of digital pictures with at least one portion of the first stream of digital pictures. In further embodiments, the at least one portion of the new stream of digital pictures include at least one digital picture, at least one region, at least one feature, or at least one pixel of the new stream of digital pictures. In further embodiments, the at least one portion of the first stream of digital pictures include at least one digital picture, at least one region, at least one feature, or at least one pixel of the first stream of digital pictures. In further embodiments, the comparing the at least one portion of the new stream of digital pictures with the at least one portion of the first stream of digital pictures includes comparing at least one digital picture of the new stream of digital pictures with at least one digital picture of the first stream of digital pictures. In further embodiments, the comparing the at least one portion of the new stream of digital pictures with the at least one portion of the first stream of digital pictures includes comparing at least one region of at least one digital picture of the new stream of digital pictures with at least one region of at least one digital picture of the first stream of digital pictures. In further embodiments, the comparing the at least one portion of the new stream of digital pictures with the at least one portion of the first stream of digital pictures includes comparing at least one feature of at least one digital picture of the new stream of digital pictures with at least one feature of at least one digital picture of the first stream of digital pictures. In further embodiments, the comparing the at least one portion of the new stream of digital pictures with the at least one portion of the first stream of digital pictures includes comparing at least one pixel of at least one digital picture of the new stream of digital pictures with at least one pixel of at least one digital picture of the first stream of digital pictures. In further embodiments, the comparing the at least one portion of the new stream of digital pictures with the at least one portion of the first stream of digital pictures includes at least one of: performing a color adjustment, performing a size adjustment, performing a content manipulation, performing temporal alignment, performing dynamic time warping, utilizing a transparency, or utilizing a mask on the new or the first stream of digital pictures. In further embodiments, the comparing the at least one portion of the new stream of digital pictures with the at least one portion of the first stream of digital pictures includes recognizing at least one person or object in the new stream of digital pictures and at least one person or object in the first stream of digital pictures, and comparing the at least one person or object from the new stream of digital pictures with the at least one person or object from the first stream of digital pictures.

In some embodiments, the anticipating the one or more instruction sets for operating the object of the application correlated with the first stream of digital pictures based on at least a partial match between the new stream of digital pictures and the first stream of digital pictures includes determining that there is at least a partial match between the new stream of digital pictures and the first stream of digital pictures. In further embodiments, the determining that there is at least a partial match between the new stream of digital pictures and the first stream of digital pictures includes determining that there is at least a partial match between one or more portions of the new stream of digital pictures and one or more portions of the first stream of digital pictures. In further embodiments, the determining that there is at least a partial match between the new stream of digital pictures and the first stream of digital pictures includes determining that a similarity between at least one portion of the new stream of digital pictures and at least one portion of the first stream of digital pictures exceeds a similarity threshold. In further embodiments, the determining that there is at least a partial match between the new stream of digital pictures and the first stream of digital pictures includes determining a substantial similarity between at least one portion of the new stream of digital pictures and at least one portion of the first stream of digital pictures. The at least one portion of the new stream of digital pictures may include at least one digital picture, at least one region, at least one feature, or at least one pixel of the new stream of digital pictures. The at least one portion of the first stream of digital pictures may include at least one digital picture, at least one region, at least one feature, or at least one pixel of the first stream of digital pictures. The substantial similarity may be achieved when a similarity between the at least one portion of the new stream of digital pictures and the at least one portion of the first stream of digital pictures exceeds a similarity threshold. The substantial similarity may be achieved when a number or a percentage of matching or partially matching digital pictures from the new stream of digital pictures and from the first stream of digital pictures exceeds a threshold number or threshold percentage. The substantial similarity may be achieved when a number or a percentage of matching or partially matching regions of at least one digital picture from the new stream of digital pictures and from the first stream of digital pictures exceeds a threshold number or threshold percentage. The substantial similarity may be achieved when a number or a percentage of matching or partially matching features of at least one digital picture from the new stream of digital pictures and from the first stream of digital pictures exceeds a threshold number or threshold percentage. The substantial similarity may be achieved when a number or a percentage of matching or partially matching pixels of at least one digital picture from the new stream of digital pictures and from the first stream of digital pictures exceeds a threshold number or threshold percentage. The substantial similarity may be achieved when one or more same or similar persons or objects are recognized in the new stream of digital pictures and the first stream of digital pictures. In further embodiments, the determining that there is at least a partial match between the new stream of digital pictures and the first stream of digital pictures includes determining a match between at least a threshold number or percentage of portions of the new stream of digital pictures and at least a threshold number or percentage of portions of the first stream of digital pictures. A portion of the new or the first stream of digital pictures may include a digital picture, a region, a feature, or a pixel. The match may include a partial match. In further embodiments, the determining that there is at least a partial match between the new stream of digital pictures and the first stream of digital pictures includes determining a match between all but a threshold number or percentage of portions of the new stream of digital pictures and all but a threshold number or percentage of portions of the first stream of digital pictures. A portion of the new or the first stream of digital pictures may include a digital picture, a region, a feature, or a pixel. The match may include a partial match. In further embodiments, the determining that there is at least a partial match between the new stream of digital pictures and the first stream of digital pictures includes determining that a number or a percentage of matching digital pictures from the new stream of digital pictures and from the first stream of digital pictures exceeds a threshold number or threshold percentage. The matching digital pictures from the new stream of digital pictures and from the first stream of digital pictures may be determined factoring in at least one of: an order of a digital picture in a stream of digital pictures, an importance of a digital picture, a threshold for a similarity in a digital picture, or a threshold for a difference in a digital picture. In further embodiments, the determining that there is at least a partial match between the new stream of digital pictures and the first stream of digital pictures includes determining that a number or a percentage of matching regions from at least one digital picture of the new stream of digital pictures and from at least one digital picture of the first stream of digital pictures exceeds a threshold number or threshold percentage. The matching regions from at least one digital picture of the new stream of digital pictures and from at least one digital picture of the first stream of digital pictures may be determined factoring in at least one of: a location of a region, an importance of a region, a threshold for a similarity in a region, or a threshold for a difference in a region. In further embodiments, the determining that there is at least a partial match between the new stream of digital pictures and the first stream of digital pictures includes determining that a number or a percentage of matching features from at least one digital picture of the new stream of digital pictures and from at least one digital picture of the first stream of digital pictures exceeds a threshold number or threshold percentage. The matching features from at least one digital picture of the new stream of digital pictures and from at least one digital picture of the first stream of digital pictures may be determined factoring in at least one of: a type of a feature, an importance of a feature, a location of a feature, a threshold for a similarity in a feature, or a threshold for a difference in a feature. In further embodiments, the determining that there is at least a partial match between the new stream of digital pictures and the first stream of digital pictures includes determining that a number or a percentage of matching pixels from at least one digital picture of the new stream of digital pictures and from at least one digital picture of the first stream of digital pictures exceeds a threshold number or threshold percentage. The matching pixels from at least one digital picture of the new stream of digital pictures and from at least one digital picture of the first stream of digital pictures may be determined factoring in at least one of: a location of a pixel, a threshold for a similarity in a pixel, or a threshold for a difference in a pixel. In further embodiments, the determining that there is at least a partial match between the new stream of digital pictures and the first stream of digital pictures includes recognizing a same person or object in the new and the first streams of digital pictures.

In some embodiments, the causing the processor circuit to execute the one or more instruction sets for operating the object of the application correlated with the first stream of digital pictures includes causing the processor circuit to execute the one or more instruction sets for operating the object of the application correlated with the first stream of digital pictures instead of or prior to an instruction set that would have been executed next. In further embodiments, the causing the processor circuit to execute the one or more instruction sets for operating the object of the application correlated with the first stream of digital pictures includes modifying one or more instruction sets of the processor circuit. In further embodiments, the causing the processor circuit to execute the one or more instruction sets for operating the object of the application correlated with the first stream of digital pictures includes modifying a register or an element of the processor circuit. In further embodiments, the causing the processor circuit to execute the one or more instruction sets for operating the object of the application correlated with the first stream of digital pictures includes inserting the one or more instruction sets for operating the object of the application correlated with the first stream of digital pictures into a register or an element of the processor circuit. In further embodiments, the causing the processor circuit to execute the one or more instruction sets for operating the object of the application correlated with the first stream of digital pictures includes redirecting the processor circuit to the one or more instruction sets for operating the object of the application correlated with the first stream of digital pictures. In further embodiments, the causing the processor circuit to execute the one or more instruction sets for operating the object of the application correlated with the first stream of digital pictures includes redirecting the processor circuit to one or more alternate instruction sets, the alternate instruction sets comprising the one or more instruction sets for operating the object of the application correlated with the first stream of digital pictures. In further embodiments, the causing the processor circuit to execute the one or more instruction sets for operating the object of the application correlated with the first stream of digital pictures includes transmitting, to the processor circuit for execution, the one or more instruction sets for operating the object of the application correlated with the first stream of digital pictures. In further embodiments, the causing the processor circuit to execute the one or more instruction sets for operating the object of the application correlated with the first stream of digital pictures includes issuing an interrupt to the processor circuit and executing the one or more instruction sets for operating the object of the application correlated with the first stream of digital pictures following the interrupt. In further embodiments, the causing the processor circuit to execute the one or more instruction sets for operating the object of the application correlated with the first stream of digital pictures includes causing the application to execute the one or more instruction sets for operating the object of the application correlated with the first stream of digital pictures. In further embodiments, the causing the processor circuit to execute the one or more instruction sets for operating the object of the application correlated with the first stream of digital pictures includes modifying the application with the one or more instruction sets for operating the object of the application correlated with the first stream of digital pictures. In further embodiments, the causing the processor circuit to execute the one or more instruction sets for operating the object of the application correlated with the first stream of digital pictures includes redirecting the application to the one or more instruction sets for operating the object of the application correlated with the first stream of digital pictures. In further embodiments, the causing the processor circuit to execute the one or more instruction sets for operating the object of the application correlated with the first stream of digital pictures includes redirecting the application to one or more alternate instruction sets, the alternate instruction sets comprising the one or more instruction sets for operating the object of the application correlated with the first stream of digital pictures. In further embodiments, the causing the processor circuit to execute the one or more instruction sets for operating the object of the application correlated with the first stream of digital pictures includes modifying one or more instruction sets of the application. In further embodiments, the causing the processor circuit to execute the one or more instruction sets for operating the object of the application correlated with the first stream of digital pictures includes modifying one or more instruction sets of the object of the application. In further embodiments, the causing the processor circuit to execute the one or more instruction sets for operating the object of the application correlated with the first stream of digital pictures includes modifying a source code, a bytecode, an intermediate code, a compiled code, an interpreted code, a translated code, a runtime code, an assembly code, or a machine code. In further embodiments, the causing the processor circuit to execute the one or more instruction sets for operating the object of the application correlated with the first stream of digital pictures includes modifying at least one of: the memory unit, a register of the processor circuit, a storage, or a repository where instruction sets are stored or used. In further embodiments, the causing the processor circuit to execute the one or more instruction sets for operating the object of the application correlated with the first stream of digital pictures includes modifying at least one of: an element of the processor circuit, a virtual machine, a runtime engine, an operating system, an execution stack, a program counter, or a user input. In further embodiments, the causing the processor circuit to execute the one or more instruction sets for operating the object of the application correlated with the first stream of digital pictures includes modifying one or more instruction sets at a source code write time, a compile time, an interpretation time, a translation time, a linking time, a loading time, or a runtime. In further embodiments, the causing the processor circuit to execute the one or more instruction sets for operating the object of the application correlated with the first stream of digital pictures includes modifying one or more code segments, lines of code, statements, instructions, functions, routines, subroutines, or basic blocks. In further embodiments, the causing the processor circuit to execute the one or more instruction sets for operating the object of the application correlated with the first stream of digital pictures includes a manual, an automatic, a dynamic, or a just in time (JIT) instrumentation of the application or the object of the application. In further embodiments, the causing the processor circuit to execute the one or more instruction sets for operating the object of the application correlated with the first stream of digital pictures includes utilizing one or more of a .NET tool, a .NET application programming interface (API), a Java tool, a Java API, an operating system tool, or an independent tool for modifying instruction sets. In further embodiments, the causing the processor circuit to execute the one or more instruction sets for operating the object of the application correlated with the first stream of digital pictures includes utilizing at least one of: a dynamic, an interpreted, or a scripting programming language. In further embodiments, the causing the processor circuit to execute the one or more instruction sets for operating the object of the application correlated with the first stream of digital pictures includes utilizing at least one of: a dynamic code, a dynamic class loading, or a reflection. In further embodiments, the causing the processor circuit to execute the one or more instruction sets for operating the object of the application correlated with the first stream of digital pictures includes utilizing an assembly language. In further embodiments, the causing the processor circuit to execute the one or more instruction sets for operating the object of the application correlated with the first stream of digital pictures includes utilizing at least one of: a metaprogramming, a self-modifying code, or an instruction set modification tool. In further embodiments, the causing the processor circuit to execute the one or more instruction sets for operating the object of the application correlated with the first stream of digital pictures includes utilizing at least one of: just in time (JIT) compiling, JIT interpretation, JIT translation, dynamic recompiling, or binary rewriting. In further embodiments, the causing the processor circuit to execute the one or more instruction sets for operating the object of the application correlated with the first stream of digital pictures includes utilizing at least one of: a dynamic expression creation, a dynamic expression execution, a dynamic function creation, or a dynamic function execution. In further embodiments, the causing the processor circuit to execute the one or more instruction sets for operating the object of the application correlated with the first stream of digital pictures includes adding or inserting additional code into a code of the application. In further embodiments, the causing the processor circuit to execute the one or more instruction sets for operating the object of the application correlated with the first stream of digital pictures includes at least one of: modifying, removing, rewriting, or overwriting a code of the application. In further embodiments, the causing the processor circuit to execute the one or more instruction sets for operating the object of the application correlated with the first stream of digital pictures includes at least one of: branching, redirecting, extending, or hot swapping a code of the application. The branching or redirecting the code may include inserting at least one of: a branch, a jump, or a means for redirecting an execution. In further embodiments, the causing the processor circuit to execute the one or more instruction sets for operating the object of the application correlated with the first stream of digital pictures includes implementing a user's knowledge, style, or methodology of operating the object of the application in a visual surrounding. In further embodiments, the system further comprises: an interface configured to cause execution of instruction sets, wherein the executing the one or more instruction sets for operating the object of the application correlated with the first stream of digital pictures is caused by the interface. The interface may include a modification interface.

In certain embodiments, the artificial intelligence unit may be further configured to: receive at least one extra information. In further embodiments, the at least one extra information include one or more of: a time information, a location information, a computed information, an observed information, an acoustic information, or a contextual information. In further embodiments, the at least one extra information include one or more of: an information on a stream of digital pictures, an information on an object in the stream of digital pictures, an information on an instruction set, an information on the object of the application, an information on a visual surrounding of the object of the application, an information on the application, an information on the processor circuit, or an information on a user. In further embodiments, the artificial intelligence unit may be further configured to: learn the first stream of digital pictures correlated with the at least one extra information. In further embodiments, the learning the first stream of digital pictures correlated with at least one extra information includes correlating the first stream of digital pictures with the at least one extra information. In further embodiments, the learning the first stream of digital pictures correlated with at least one extra information includes storing the first stream of digital pictures correlated with the at least one extra information into the memory unit. In further embodiments, the anticipating the one or more instruction sets for operating the object of the application correlated with the first stream of digital pictures based on at least a partial match between the new stream of digital pictures and the first stream of digital pictures includes anticipating the one or more instruction sets for operating the object of the application correlated with the first stream of digital pictures based on at least a partial match between an extra information correlated with the new stream of digital pictures and an extra information correlated with the first stream of digital pictures. The anticipating the one or more instruction sets for operating the object of the application correlated with the first stream of digital pictures based on at least a partial match between an extra information correlated with the new stream of digital pictures and an extra information correlated with the first stream of digital pictures may include comparing an extra information correlated with the new stream of digital pictures and an extra information correlated with the first stream of digital pictures. The anticipating the one or more instruction sets for operating the object of the application correlated with the first stream of digital pictures based on at least a partial match between an extra information correlated with the new stream of digital pictures and an extra information correlated with the first stream of digital pictures may include determining that a similarity between an extra information correlated with the new stream of digital pictures and an extra information correlated with the first stream of digital pictures exceeds a similarity threshold.

In some embodiments, the system further comprises: a user interface, wherein the artificial intelligence unit is further configured to: present, via the user interface, a user with an option to execute the one or more instruction sets for operating the object of the application correlated with the first stream of digital pictures.

In certain embodiments, the system further comprises: a user interface, wherein the artificial intelligence unit is further configured to: receive, via the user interface, a user's selection to execute the one or more instruction sets for operating the object of the application correlated with the first stream of digital pictures.

In some embodiments, the artificial intelligence unit may be further configured to: rate the executed one or more instruction sets for operating the object of the application correlated with the first stream of digital pictures. In further embodiments, the rating the executed one or more instruction sets for operating the object of the application correlated with the first stream of digital pictures includes displaying, on a display, the executed one or more instruction sets for operating the object of the application correlated with the first stream of digital pictures along with one or more rating values as options to be selected by a user. In further embodiments, the rating the executed one or more instruction sets for operating the object of the application correlated with the first stream of digital pictures includes rating the executed one or more instruction sets for operating the object of the application correlated with the first stream of digital pictures without a user input. In further embodiments, the rating the executed one or more instruction sets for operating the object of the application correlated with the first stream of digital pictures includes associating one or more rating values with the executed one or more instruction sets for operating the object of the application correlated with the first stream of digital pictures and storing the one or more rating values into the memory unit.

In certain embodiments, the system further comprises: a user interface, wherein the artificial intelligence unit is further configured to: present, via the user interface, a user with an option to cancel the execution of the executed one or more instruction sets for operating the object of the application correlated with the first stream of digital pictures. In further embodiments, the canceling the execution of the executed one or more instruction sets for operating the object of the application correlated with the first stream of digital pictures includes restoring the processor circuit, the application, or the object of the application to a prior state. The restoring the processor circuit, the application, or the object of the application to a prior state may include saving the state of the processor circuit, the application, or the object of the application prior to executing the one or more instruction sets for operating the object of the application correlated with the first stream of digital pictures.

In some embodiments, the system further comprises: an input device configured to receive a user's operating directions, the user's operating directions for instructing the processor circuit, the application, or the object of the application on how to operate the object of the application.

In certain embodiments, the autonomous object operating includes a partially or a fully autonomous object operating. In further embodiments, the partially autonomous object operating includes executing the one or more instruction sets for operating the object of the application correlated with the first stream of digital pictures responsive to a user confirmation. In further embodiments, the fully autonomous object operating includes executing the one or more instruction sets for operating the object of the application correlated with the first stream of digital pictures without a user confirmation.

In some embodiments, the artificial intelligence unit may be further configured to: receive a second stream of digital pictures from the renderer; receive additional one or more instruction sets for operating the object of the application; and learn the second stream of digital pictures correlated with the additional one or more instruction sets for operating the object of the application. In further embodiments, the second stream of digital pictures includes one or more digital pictures. In further embodiments, the learning the first stream of digital pictures correlated with the one or more instruction sets for operating the object of the application and the learning the second stream of digital pictures correlated with the additional one or more instruction sets for operating the object of the application include creating a connection between the first stream of digital pictures correlated with the one or more instruction sets for operating the object of the application and the second stream of digital pictures correlated with the additional one or more instruction sets for operating the object of the application. The connection may include or be associated with at least one of: an occurrence count, a weight, a parameter, or a data. In further embodiments, the learning the first stream of digital pictures correlated with the one or more instruction sets for operating the object of the application and the learning the second stream of digital pictures correlated with the additional one or more instruction sets for operating the object of the application include updating a connection between the first stream of digital pictures correlated with the one or more instruction sets for operating the object of the application and the second stream of digital pictures correlated with the additional one or more instruction sets for operating the object of the application. The updating the connection between the first stream of digital pictures correlated with the one or more instruction sets for operating the object of the application and the second stream of digital pictures correlated with the additional one or more instruction sets for operating the object of the application may include updating at least one of: an occurrence count, a weight, a parameter, or a data included in or associated with the connection. In further embodiments, the learning the first stream of digital pictures correlated with the one or more instruction sets for operating the object of the application includes storing the first stream of digital pictures correlated with the one or more instruction sets for operating the object of the application into a first node of a data structure, and wherein the learning the second stream of digital pictures correlated with the additional one or more instruction sets for operating the object of the application includes storing the second stream of digital pictures correlated with the additional one or more instruction sets for operating the object of the application into a second node of the data structure. The data structure may include a neural network, a graph, a collection of sequences, a sequence, a collection of knowledge cells, a knowledgebase, or a knowledge structure. The learning the first stream of digital pictures correlated with the one or more instruction sets for operating the object of the application and the learning the second stream of digital pictures correlated with the additional one or more instruction sets for operating the object of the application may include creating a connection between the first node and the second node. The learning the first stream of digital pictures correlated with the one or more instruction sets for operating the object of the application and the learning the second stream of digital pictures correlated with the additional one or more instruction sets for operating the object of the application may include updating a connection between the first node and the second node. In further embodiments, the first stream of digital pictures correlated with the one or more instruction sets for operating the object of the application is stored into a first node of a neural network and the second stream of digital pictures correlated with the additional one or more instruction sets for operating the object of the application is stored into a second node of the neural network. The first node and the second node may be connected by a connection. The first node may be part of a first layer of the neural network and the second node may be part of a second layer of the neural network. In further embodiments, the first stream of digital pictures correlated with the one or more instruction sets for operating the object of the application is stored into a first node of a graph and the second stream of digital pictures correlated with the additional one or more instruction sets for operating the object of the application is stored into a second node of the graph. The first node and the second node may be connected by a connection. In further embodiments, the first stream of digital pictures correlated with the one or more instruction sets for operating the object of the application is stored into a first node of a sequence and the second stream of digital pictures correlated with the additional one or more instruction sets for operating the object of the application is stored into a second node of the sequence.

In some aspects, the disclosure relates to a non-transitory computer storage medium having a computer program stored thereon, the program including instructions that when executed by one or more processor circuits cause the one or more processor circuits to perform operations comprising: receiving a first stream of digital pictures from a renderer, the renderer configured to render streams of digital pictures of a surrounding of an object of an application. The operations may further include: receiving one or more instruction sets for operating the object of the application. The operations may further include: learning the first stream of digital pictures correlated with the one or more instruction sets for operating the object of the application. The operations may further include: receiving a new stream of digital pictures from the renderer. The operations may further include: anticipating the one or more instruction sets for operating the object of the application correlated with the first stream of digital pictures based on at least a partial match between the new stream of digital pictures and the first stream of digital pictures. The operations may further include: causing an execution of the one or more instruction sets for operating the object of the application correlated with the first stream of digital pictures, the causing performed in response to the anticipating the one or more instruction sets for operating the object of the application correlated with the first stream of digital pictures based on at least a partial match between the new stream of digital pictures and the first stream of digital pictures, wherein the object of the application performs one or more operations defined by the one or more instruction sets for operating the object of the application correlated with the first stream of digital pictures, the one or more operations performed in response to the execution.

In some aspects, the disclosure relates to a non-transitory computer storage medium having a computer program stored thereon, the program including instructions that when executed by one or more processor circuits cause the one or more processor circuits to perform operations comprising: receiving, by a first processor circuit of the one or more processor circuits, a first stream of digital pictures from a renderer, the renderer configured to render streams of digital pictures of a surrounding of an object of an application. The operations may further include: receiving, by the first processor circuit of the one or more processor circuits, one or more instruction sets for operating the object of the application. The operations may further include: learning, by the first processor circuit of the one or more processor circuits, the first stream of digital pictures correlated with the one or more instruction sets for operating the object of the application. The operations may further include: receiving, by the first processor circuit of the one or more processor circuits, a new stream of digital pictures from the renderer. The operations may further include: anticipating, by the first processor circuit of the one or more processor circuits, the one or more instruction sets for operating the object of the application correlated with the first stream of digital pictures based on at least a partial match between the new stream of digital pictures and the first stream of digital pictures. The operations may further include: causing, by the first processor circuit of the one or more processor circuits, an execution, by a second processor circuit of the one or more processor circuits, of the one or more instruction sets for operating the object of the application correlated with the first stream of digital pictures, the causing performed in response to the anticipating the one or more instruction sets for operating the object of the application correlated with the first stream of digital pictures based on at least a partial match between the new stream of digital pictures and the first stream of digital pictures, wherein the object of the application performs one or more operations defined by the one or more instruction sets for operating the object of the application correlated with the first stream of digital pictures, the one or more operations performed in response to the execution.

In some aspects, the disclosure relates to a method comprising: (a) receiving a first stream of digital pictures from a renderer by a processor circuit, the renderer configured to render streams of digital pictures of a surrounding of an object of an application. The method may further include: (b) receiving one or more instruction sets for operating the object of the application by the processor circuit. The method may further include: (c) learning the first stream of digital pictures correlated with the one or more instruction sets for operating the object of the application, the learning of (c) performed by the processor circuit. The method may further include: (d) receiving a new stream of digital pictures from the renderer by the processor circuit. The method may further include: (e) anticipating the one or more instruction sets for operating the object of the application correlated with the first stream of digital pictures based on at least a partial match between the new stream of digital pictures and the first stream of digital pictures, the anticipating of (e) performed by the processor circuit. The method may further include: (f) executing the one or more instruction sets for operating the object of the application correlated with the first stream of digital pictures, the executing of (f) performed in response to the anticipating of (e). The method may further include: (g) performing, by the object of the application, one or more operations defined by the one or more instruction sets for operating the object of the application correlated with the first stream of digital pictures, the one or more operations performed in response to the executing of (f).

In some aspects, the disclosure relates to a method comprising: (a) receiving a first stream of digital pictures from a renderer by a first processor circuit, the renderer configured to render streams of digital pictures of a surrounding of an object of an application. The method may further include: (b) receiving one or more instruction sets for operating the object of the application by the first processor circuit. The method may further include: (c) learning the first stream of digital pictures correlated with the one or more instruction sets for operating the object of the application, the learning of (c) performed by the first processor circuit. The method may further include: (d) receiving a new stream of digital pictures from the renderer by the first processor circuit. The method may further include: (e) anticipating the one or more instruction sets for operating the object of the application correlated with the first stream of digital pictures based on at least a partial match between the new stream of digital pictures and the first stream of digital pictures, the anticipating of (e) performed by the first processor circuit. The method may further include: (f) executing, by a second processor circuit, the one or more instruction sets for operating the object of the application correlated with the first stream of digital pictures, the executing of (f) performed in response to the anticipating of (e). The method may further include: (g) performing, by the object of the application, one or more operations defined by the one or more instruction sets for operating the object of the application correlated with the first stream of digital pictures, the one or more operations performed in response to the executing of (f).

The operations or steps of the non-transitory computer storage mediums and/or the methods may be performed by any of the elements of the above described systems as applicable. The non-transitory computer storage mediums and/or the methods may include any of the operations, steps, and embodiments of the above described systems as applicable as well as the following embodiments.

In certain embodiments, the first stream of digital pictures correlated with the one or more instruction sets for operating the object of the application includes an anticipatory stream of digital pictures whose correlated one or more instruction sets for operating the object of the application can be used for anticipation of one or more instruction sets to be executed in an operation of the object of the application. In further embodiments, the first stream of digital pictures correlated with the one or more instruction sets for operating the object of the application includes a unit of knowledge of how the object of the application operated in a visual surrounding. In further embodiments, the first stream of digital pictures correlated with the one or more instruction sets for operating the object of the application is included in a neuron, a node, a vertex, or an element of a data structure. In further embodiments, the data structure includes a neural network, a graph, a collection of sequences, a sequence, a collection of knowledge cells, a knowledgebase, or a knowledge structure. In further embodiments, some of the neurons, nodes, vertices, or elements are interconnected. In further embodiments, the first stream of digital pictures correlated with the one or more instruction sets for operating the object of the application is structured into a knowledge cell. In further embodiments, the knowledge cell includes a unit of knowledge of how the object of the application operated in a visual surrounding. In further embodiments, the knowledge cell is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the learning the first stream of digital pictures correlated with the one or more instruction sets for operating the object of the application includes correlating the first stream of digital pictures with the one or more instruction sets for operating the object of the application. In further embodiments, the correlating the first stream of digital pictures with the one or more instruction sets for operating the object of the application includes generating a knowledge cell, the knowledge cell comprising the first stream of digital pictures correlated with the one or more instruction sets for operating the object of the application. In further embodiments, the correlating the first stream of digital pictures with the one or more instruction sets for operating the object of the application includes structuring a unit of knowledge of how the device operated in a visual surrounding. In further embodiments, the learning the first stream of digital pictures correlated with the one or more instruction sets for operating the object of the application includes learning a user's knowledge, style, or methodology of operating the object of the application in a visual surrounding. In further embodiments, the learning the first stream of digital pictures correlated with the one or more instruction sets for operating the object of the application includes spontaneous learning the first stream of digital pictures correlated with the one or more instruction sets for operating the object of the application.

In some embodiments, the learning the first stream of digital pictures correlated with the one or more instruction sets for operating the object of the application includes storing, into a memory unit, the first stream of digital pictures correlated with the one or more instruction sets for operating the object of the application, the first stream of digital pictures correlated with the one or more instruction sets for operating the object of the application being part of a stored plurality of streams of digital pictures correlated with one or more instruction sets for operating the object of the application. In further embodiments, the plurality of streams of digital pictures correlated with one or more instruction sets for operating the object of the application include a neural network, a graph, a collection of sequences, a sequence, a collection of knowledge cells, a knowledgebase, a knowledge structure, or a data structure. In further embodiments, the plurality of streams of digital pictures correlated with one or more instruction sets for operating the object of the application are organized into a neural network, a graph, a collection of sequences, a sequence, a collection of knowledge cells, a knowledgebase, a knowledge structure, or a data structure. In further embodiments, each of the plurality of streams of digital pictures correlated with one or more instruction sets for operating the object of the application is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the plurality of streams of digital pictures correlated with one or more instruction sets for operating the object of the application include a user's knowledge, style, or methodology of operating the object of the application in visual surroundings. In further embodiments, the plurality of streams of digital pictures correlated with one or more instruction sets for operating the object of the application are stored on a remote computing device or a remote computing system. In further embodiments, the plurality of streams of digital pictures correlated with one or more instruction sets for operating the object of the application include an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system.

In certain embodiments, the executing the one or more instruction sets for operating the object of the application correlated with the first stream of digital pictures includes executing the one or more instruction sets for operating the object of the application correlated with the first stream of digital pictures instead of or prior to an instruction set that would have been executed next. In further embodiments, the executing the one or more instruction sets for operating the object of the application correlated with the first stream of digital pictures includes modifying one or more instruction sets of a processor circuit. In further embodiments, the executing the one or more instruction sets for operating the object of the application correlated with the first stream of digital pictures includes modifying a register or an element of a processor circuit. In further embodiments, the executing the one or more instruction sets for operating the object of the application correlated with the first stream of digital pictures includes inserting the one or more instruction sets for operating the object of the application correlated with the first stream of digital pictures into a register or an element of a processor circuit. In further embodiments, the executing the one or more instruction sets for operating the object of the application correlated with the first stream of digital pictures includes redirecting a processor circuit to the one or more instruction sets for operating the object of the application correlated with the first stream of digital pictures. In further embodiments, the executing the one or more instruction sets for operating the object of the application correlated with the first stream of digital pictures includes redirecting a processor circuit to one or more alternate instruction sets, the alternate instruction sets comprising the one or more instruction sets for operating the object of the application correlated with the first stream of digital pictures. In further embodiments, the executing the one or more instruction sets for operating the object of the application correlated with the first stream of digital pictures includes transmitting, to a processor circuit for execution, the one or more instruction sets for operating the object of the application correlated with the first stream of digital pictures. In further embodiments, the executing the one or more instruction sets for operating the object of the application correlated with the first stream of digital pictures includes issuing an interrupt to a processor circuit and executing the one or more instruction sets for operating the object of the application correlated with the first stream of digital pictures following the interrupt. In further embodiments, the executing the one or more instruction sets for operating the object of the application correlated with the first stream of digital pictures includes causing the application to execute the one or more instruction sets for operating the object of the application correlated with the first stream of digital pictures. In further embodiments, the executing the one or more instruction sets for operating the object of the application correlated with the first stream of digital pictures includes modifying the application with the one or more instruction sets for operating the object of the application correlated with the first stream of digital pictures. In further embodiments, the executing the one or more instruction sets for operating the object of the application correlated with the first stream of digital pictures includes redirecting the application to the one or more instruction sets for operating the object of the application correlated with the first stream of digital pictures. In further embodiments, the executing the one or more instruction sets for operating the object of the application correlated with the first stream of digital pictures includes redirecting the application to one or more alternate instruction sets, the alternate instruction sets comprising the one or more instruction sets for operating the object of the application correlated with the first stream of digital pictures. In further embodiments, the executing the one or more instruction sets for operating the object of the application correlated with the first stream of digital pictures includes modifying one or more instruction sets of the application. In further embodiments, the executing the one or more instruction sets for operating the object of the application correlated with the first stream of digital pictures includes modifying one or more instruction sets of the object of the application. In further embodiments, the executing the one or more instruction sets for operating the object of the application correlated with the first stream of digital pictures includes modifying a source code, a bytecode, an intermediate code, a compiled code, an interpreted code, a translated code, a runtime code, an assembly code, or a machine code. In further embodiments, the executing the one or more instruction sets for operating the object of the application correlated with the first stream of digital pictures includes modifying at least one of: the memory unit, a register of a processor circuit, a storage, or a repository where instruction sets are stored or used. In further embodiments, the executing the one or more instruction sets for operating the object of the application correlated with the first stream of digital pictures includes modifying at least one of: an element of a processor circuit, a virtual machine, a runtime engine, an operating system, an execution stack, a program counter, or a user input. In further embodiments, the executing the one or more instruction sets for operating the object of the application correlated with the first stream of digital pictures includes modifying one or more instruction sets at a source code write time, a compile time, an interpretation time, a translation time, a linking time, a loading time, or a runtime. In further embodiments, the executing the one or more instruction sets for operating the object of the application correlated with the first stream of digital pictures includes modifying one or more code segments, lines of code, statements, instructions, functions, routines, subroutines, or basic blocks. In further embodiments, the executing the one or more instruction sets for operating the object of the application correlated with the first stream of digital pictures includes a manual, an automatic, a dynamic, or a just in time (JIT) instrumentation of the application or the object of the application. In further embodiments, the executing the one or more instruction sets for operating the object of the application correlated with the first stream of digital pictures includes utilizing one or more of a .NET tool, a .NET application programming interface (API), a Java tool, a Java API, an operating system tool, or an independent tool for modifying instruction sets. In further embodiments, the executing the one or more instruction sets for operating the object of the application correlated with the first stream of digital pictures includes utilizing at least one of: a dynamic, an interpreted, or a scripting programming language. In further embodiments, the executing the one or more instruction sets for operating the object of the application correlated with the first stream of digital pictures includes utilizing at least one of: a dynamic code, a dynamic class loading, or a reflection. In further embodiments, the executing the one or more instruction sets for operating the object of the application correlated with the first stream of digital pictures includes utilizing an assembly language. In further embodiments, the executing the one or more instruction sets for operating the object of the application correlated with the first stream of digital pictures includes utilizing at least one of: a metaprogramming, a self-modifying code, or an instruction set modification tool. In further embodiments, the executing the one or more instruction sets for operating the object of the application correlated with the first stream of digital pictures includes utilizing at least one of: just in time (JIT) compiling, JIT interpretation, JIT translation, dynamic recompiling, or binary rewriting. In further embodiments, the executing the one or more instruction sets for operating the object of the application correlated with the first stream of digital pictures includes utilizing at least one of: a dynamic expression creation, a dynamic expression execution, a dynamic function creation, or a dynamic function execution. In further embodiments, the executing the one or more instruction sets for operating the object of the application correlated with the first stream of digital pictures includes adding or inserting additional code into a code of the application. In further embodiments, the executing the one or more instruction sets for operating the object of the application correlated with the first stream of digital pictures includes at least one of: modifying, removing, rewriting, or overwriting a code of the application. In further embodiments, the executing the one or more instruction sets for operating the object of the application correlated with the first stream of digital pictures includes at least one of:

branching, redirecting, extending, or hot swapping a code of the application. The branching or redirecting the code may include inserting at least one of: a branch, a jump, or a means for redirecting an execution. In further embodiments, the executing the one or more instruction sets for operating the object of the application correlated with the first stream of digital pictures includes implementing a user's knowledge, style, or methodology of operating the object of the application in a visual surrounding. In further embodiments, the executing the one or more instruction sets for operating the object of the application correlated with the first stream of digital pictures includes executing the one or more instruction sets for operating the object of the application correlated with the first stream of digital pictures via an interface. The interface includes a modification interface.

In some embodiments, the operations of the non-transitory computer storage mediums and/or the methods further comprise: receiving at least one extra information. In further embodiments, the at least one extra information include one or more of: a time information, a location information, a computed information, an observed information, an acoustic information, or a contextual information. In further embodiments, the at least one extra information include one or more of: an information on a stream of digital pictures, an information on an object in the stream of digital pictures, an information on an instruction set, an information on the object of the application, an information on a visual surrounding of the object of the application, an information on the application, an information on a processor circuit, or an information on a user. In further embodiments, the operations of the non-transitory computer storage mediums and/or the methods further comprise: learning the first stream of digital pictures correlated with the at least one extra information. In further embodiments, the learning the first stream of digital pictures correlated with at least one extra information includes correlating the first stream of digital pictures with the at least one extra information. In further embodiments, the learning the first stream of digital pictures correlated with at least one extra information includes storing the first stream of digital pictures correlated with the at least one extra information into a memory unit. In further embodiments, the anticipating the one or more instruction sets for operating the object of the application correlated with the first stream of digital pictures based on at least a partial match between the new stream of digital pictures and the first stream of digital pictures includes anticipating the one or more instruction sets for operating the object of the application correlated with the first stream of digital pictures based on at least a partial match between an extra information correlated with the new stream of digital pictures and an extra information correlated with the first stream of digital pictures. In further embodiments, the anticipating the one or more instruction sets for operating the object of the application correlated with the first stream of digital pictures based on at least a partial match between an extra information correlated with the new stream of digital pictures and an extra information correlated with the first stream of digital pictures includes comparing an extra information correlated with the new stream of digital pictures and an extra information correlated with the first stream of digital pictures. The anticipating the one or more instruction sets for operating the object of the application correlated with the first stream of digital pictures based on at least a partial match between an extra information correlated with the new stream of digital pictures and an extra information correlated with the first stream of digital pictures may include determining that a similarity between an extra information correlated with the new stream of digital pictures and an extra information correlated with the first stream of digital pictures exceeds a similarity threshold.

In certain embodiments, the operations of the non-transitory computer storage mediums and/or the methods further comprise: presenting, via a user interface, a user with an option to execute the one or more instruction sets for operating the object of the application correlated with the first stream of digital pictures.

In some embodiments, the operations of the non-transitory computer storage mediums and/or the methods further comprise: receiving, via a user interface, a user's selection to execute the one or more instruction sets for operating the object of the application correlated with the first stream of digital pictures.

In certain embodiments, the operations of the non-transitory computer storage mediums and/or the methods further comprise: rating the executed one or more instruction sets for operating the object of the application correlated with the first stream of digital pictures.

In some embodiments, the operations of the non-transitory computer storage mediums and/or the methods further comprise: presenting, via a user interface, a user with an option to cancel the execution of the executed one or more instruction sets for operating the object of the application correlated with the first stream of digital pictures.

In certain embodiments, the operations of the non-transitory computer storage mediums and/or the methods further comprise: receiving, via an input device, a user's operating directions, the user's operating directions for instructing a processor circuit, the application, or the object of the application on how to operate the object of the application.

In some embodiments, the operations of the non-transitory computer storage mediums and/or the methods further comprise: receiving a second stream of digital pictures from the renderer; receiving additional one or more instruction sets for operating the object of the application; and learning the second stream of digital pictures correlated with the additional one or more instruction sets for operating the object of the application. In further embodiments, the second stream of digital pictures includes one or more digital pictures. In further embodiments, the learning the first stream of digital pictures correlated with the one or more instruction sets for operating the object of the application and the learning the second stream of digital pictures correlated with the additional one or more instruction sets for operating the object of the application include creating a connection between the first stream of digital pictures correlated with the one or more instruction sets for operating the object of the application and the second stream of digital pictures correlated with the additional one or more instruction sets for operating the object of the application. The connection may include or is associated with at least one of: an occurrence count, a weight, a parameter, or a data. In further embodiments, the learning the first stream of digital pictures correlated with the one or more instruction sets for operating the object of the application and the learning the second stream of digital pictures correlated with the additional one or more instruction sets for operating the object of the application include updating a connection between the first stream of digital pictures correlated with the one or more instruction sets for operating the object of the application and the second stream of digital pictures correlated with the additional one or more instruction sets for operating the object of the application. The updating the connection between the first stream of digital pictures correlated with the one or more instruction sets for operating the object of the application and the second stream of digital pictures correlated with the additional one or more instruction sets for operating the object of the application may include updating at least one of: an occurrence count, a weight, a parameter, or a data included in or associated with the connection. In further embodiments, the learning the first stream of digital pictures correlated with the one or more instruction sets for operating the object of the application includes storing the first stream of digital pictures correlated with the one or more instruction sets for operating the object of the application into a first node of a data structure, and wherein the learning the second stream of digital pictures correlated with the additional one or more instruction sets for operating the object of the application includes storing the second stream of digital pictures correlated with the additional one or more instruction sets for operating the object of the application into a second node of the data structure. The data structure may include a neural network, a graph, a collection of sequences, a sequence, a collection of knowledge cells, a knowledgebase, or a knowledge structure. The learning the first stream of digital pictures correlated with the one or more instruction sets for operating the object of the application and the learning the second stream of digital pictures correlated with the additional one or more instruction sets for operating the object of the application may include creating a connection between the first node and the second node. The learning the first stream of digital pictures correlated with the one or more instruction sets for operating the object of the application and the learning the second stream of digital pictures correlated with the additional one or more instruction sets for operating the object of the application may include updating a connection between the first node and the second node. In further embodiments, the first stream of digital pictures correlated with the one or more instruction sets for operating the object of the application is stored into a first node of a neural network and the second stream of digital pictures correlated with the additional one or more instruction sets for operating the object of the application is stored into a second node of the neural network. The first node and the second node may be connected by a connection. The first node may be part of a first layer of the neural network and the second node may be part of a second layer of the neural network. In further embodiments, the first stream of digital pictures correlated with the one or more instruction sets for operating the object of the application is stored into a first node of a graph and the second stream of digital pictures correlated with the additional one or more instruction sets for operating the object of the application is stored into a second node of the graph. The first node and the second node may be connected by a connection. In further embodiments, the first stream of digital pictures correlated with the one or more instruction sets for operating the object of the application is stored into a first node of a sequence and the second stream of digital pictures correlated with the additional one or more instruction sets for operating the object of the application is stored into a second node of the sequence.

In some aspects, the disclosure relates to a system for learning a visual surrounding for autonomous object operating. The system may be implemented at least in part on one or more computing devices. In some embodiments, the system comprises a processor circuit configured to execute instruction sets of an application, the application including an object. The system may further include a memory unit configured to store data. The system may further include a renderer configured to render streams of digital pictures of a surrounding of the object of the application. The system may further include an artificial intelligence unit. In some embodiments, the artificial intelligence unit may be configured to: receive a first stream of digital pictures from the renderer. The artificial intelligence unit may be further configured to: receive one or more instruction sets for operating the object of the application. The artificial intelligence unit may be further configured to: learn the first stream of digital pictures correlated with the one or more instruction sets for operating the object of the application.

In some aspects, the disclosure relates to a non-transitory computer storage medium having a computer program stored thereon, the program including instructions that when executed by one or more processor circuits cause the one or more processor circuits to perform operations comprising: receiving a first stream of digital pictures from a renderer, the renderer configured to render streams of digital pictures of a surrounding of an object of an application. The operations may further include: receiving one or more instruction sets for operating the object of the application. The operations may further include: learning the first stream of digital pictures correlated with the one or more instruction sets for operating the object of the application.

In some aspects, the disclosure relates to a method comprising: (a) receiving a first stream of digital pictures from a renderer by a processor circuit, the renderer configured to render streams of digital pictures of a surrounding of an object of an application. The method may further include: (b) receiving one or more instruction sets for operating the object of the application by the processor circuit. The method may further include: (c) learning the first stream of digital pictures correlated with the one or more instruction sets for operating the object of the application, the learning of (c) performed by the processor circuit.

The operations or steps of the non-transitory computer storage medium and/or the method may be performed by any of the elements of the above described systems as applicable. The non-transitory computer storage medium and/or the method may include any of the operations, steps, and embodiments of the above described systems as applicable as well as the following embodiments.

In some aspects, the disclosure relates to a system for using a visual surrounding for autonomous object operating. The system may be implemented at least in part on one or more computing devices. In some embodiments, the system comprises a processor circuit configured to execute instruction sets of an application, the application including an object. The system may further include a memory unit configured to store a plurality of streams of digital pictures correlated with one or more instruction sets for operating the object of the application, the plurality including a first stream of digital pictures correlated with one or more instruction sets for operating the object of the application. The system may further include a renderer configured to render streams of digital pictures of a surrounding of the object of the application. The system may further include an artificial intelligence unit. In some embodiments, the artificial intelligence unit may be configured to: access the first stream of digital pictures correlated with one or more instruction sets for operating the object of the application stored in the memory unit. The artificial intelligence unit may be further configured to: receive a new stream of digital pictures from the renderer. The artificial intelligence unit may be further configured to: anticipate the one or more instruction sets for operating the object of the application correlated with the first stream of digital pictures based on at least a partial match between the new stream of digital pictures and the first stream of digital pictures. The artificial intelligence unit may be further configured to: cause the processor circuit to execute the one or more instruction sets for operating the object of the application correlated with the first stream of digital pictures, the executing performed in response to the anticipating of the artificial intelligence unit, wherein the object of the application performs one or more operations defined by the one or more instruction sets for operating the object of the application correlated with the first stream of digital pictures, the one or more operations performed in response to the executing by the processor circuit.

In some aspects, the disclosure relates to a non-transitory computer storage medium having a computer program stored thereon, the program including instructions that when executed by one or more processor circuits cause the one or more processor circuits to perform operations comprising: accessing a memory unit that stores a plurality of streams of digital pictures correlated with one or more instruction sets for operating an object of an application, the plurality including a first stream of digital pictures correlated with one or more instruction sets for operating the object of the application. The operations may further include: receiving a new stream of digital pictures from a renderer, the renderer configured to render streams of digital pictures of a surrounding of the object of the application. The operations may further include: anticipating the one or more instruction sets for operating the object of the application correlated with the first stream of digital pictures based on at least a partial match between the new stream of digital pictures and the first stream of digital pictures. The operations may further include: causing an execution of the one or more instruction sets for operating the object of the application correlated with the first stream of digital pictures, the causing performed in response to the anticipating the one or more instruction sets for operating the object of the application correlated with the first stream of digital pictures based on at least a partial match between the new stream of digital pictures and the first stream of digital pictures, wherein the object of the application performs one or more operations defined by the one or more instruction sets for operating the object of the application correlated with the first stream of digital pictures, the one or more operations performed in response to the execution.

In some aspects, the disclosure relates to a method comprising: (a) accessing a memory unit that stores a plurality of streams of digital pictures correlated with one or more instruction sets for operating an object of an application, the plurality including a first stream of digital pictures correlated with one or more instruction sets for operating the object of the application, the accessing of (a) performed by a processor circuit. The method may further include: (b) receiving a new stream of digital pictures from a renderer by the processor circuit, the renderer configured to render streams of digital pictures of a surrounding of the object of the application. The method may further include: (c) anticipating the one or more instruction sets for operating the object of the application correlated with the first stream of digital pictures based on at least a partial match between the new stream of digital pictures and the first stream of digital pictures, the anticipating of (c) performed by the processor circuit. The method may further include: (d) executing the one or more instruction sets for operating the object of the application correlated with the first stream of digital pictures, the executing of (d) performed in response to the anticipating of (c). The method may further include: (e) performing, by the object of the application, one or more operations defined by the one or more instruction sets for operating the object of the application correlated with the first stream of digital pictures, the one or more operations performed in response to the executing of (d).

The operations or steps of the non-transitory computer storage medium and/or the method may be performed by any of the elements of the above described systems as applicable. The non-transitory computer storage medium and/or the method may include any of the operations, steps, and embodiments of the above described systems as applicable as well as the following embodiments.

In some aspects, the disclosure relates to a system for learning and using views of an application for autonomous application operating. The system may be implemented at least in part on one or more computing devices. In some embodiments, the system comprises a processor circuit configured to execute instruction sets of an application. The system may further include a memory unit configured to store data. The system may further include a renderer configured to render digital pictures of views of the application. The system may further include an artificial intelligence unit. In some embodiments, the artificial intelligence unit may be configured to: receive a first digital picture from the renderer. The artificial intelligence unit may be further configured to: receive one or more instruction sets for operating the application; The artificial intelligence unit may be further configured to: learn the first digital picture correlated with the one or more instruction sets for operating the application. The artificial intelligence unit may be further configured to: receive a new digital picture from the renderer. The artificial intelligence unit may be further configured to: anticipate the one or more instruction sets for operating the application correlated with the first digital picture based on at least a partial match between the new digital picture and the first digital picture. The artificial intelligence unit may be further configured to: cause the processor circuit to execute the one or more instruction sets for operating the application correlated with the first digital picture, the executing performed in response to the anticipating of the artificial intelligence unit, wherein the application performs one or more operations defined by the one or more instruction sets for operating the application correlated with the first digital picture, the one or more operations performed in response to the executing by the processor circuit.

In certain embodiments, the views of the application include views of one or more objects of the application. In further embodiments, the digital pictures of views of the application include digital pictures of a first-person view of the application, digital pictures of a third-person view of the application, digital pictures of a top-down view of the application, digital pictures of a side-on view of the application, digital pictures of an area of interest of the application, or digital pictures of a screenshot of the application.

In some embodiments, the one or more instruction sets for operating the application include one or more instruction sets executed in operating the application. In further embodiments, the one or more instruction sets for operating the application include one or more instruction sets for operating one or more objects of the application.

In certain embodiments, the first digital picture correlated with the one or more instruction sets for operating the application includes an anticipatory digital picture whose correlated one or more instruction sets for operating the application can be used for anticipation of one or more instruction sets to be executed in an operation of the application. In further embodiments, the first digital picture correlated with the one or more instruction sets for operating the application includes a unit of knowledge of how the application operated in a visual surrounding. In further embodiments, the learning the first digital picture correlated with the one or more instruction sets for operating the application includes learning a user's knowledge, style, or methodology of operating the application in a visual surrounding.

In some embodiments, the causing the processor circuit to execute the one or more instruction sets for operating the application correlated with the first digital picture includes implementing a user's knowledge, style, or methodology of operating the application in a visual surrounding.

In certain embodiments, the performing the one or more operations defined by the one or more instruction sets for operating the application correlated with the first digital picture includes implementing a user's knowledge, style, or methodology of operating the application in a visual surrounding.

In some embodiments, the artificial intelligence unit may be further configured to: receive a second digital picture from the renderer; receive additional one or more instruction sets for operating the application; and learn the second digital picture correlated with the additional one or more instruction sets for operating the application. In further embodiments, the second digital picture includes a second stream of digital pictures. In further embodiments, the learning the first digital picture correlated with the one or more instruction sets for operating the application and the learning the second digital picture correlated with the additional one or more instruction sets for operating the application include creating a connection between the first digital picture correlated with the one or more instruction sets for operating the application and the second digital picture correlated with the additional one or more instruction sets for operating the application. The connection may include or is associated with at least one of: an occurrence count, a weight, a parameter, or a data. In further embodiments, the learning the first digital picture correlated with the one or more instruction sets for operating the application and the learning the second digital picture correlated with the additional one or more instruction sets for operating the application include updating a connection between the first digital picture correlated with the one or more instruction sets for operating the application and the second digital picture correlated with the additional one or more instruction sets for operating the application. The updating the connection between the first digital picture correlated with the one or more instruction sets for operating the application and the second digital picture correlated with the additional one or more instruction sets for operating the application may include updating at least one of: an occurrence count, a weight, a parameter, or a data included in or associated with the connection. In further embodiments, the learning the first digital picture correlated with the one or more instruction sets for operating the application includes storing the first digital picture correlated with the one or more instruction sets for operating the application into a first node of a data structure, and wherein the learning the second digital picture correlated with the additional one or more instruction sets for operating the application includes storing the second digital picture correlated with the additional one or more instruction sets for operating the application into a second node of the data structure. The data structure may include a neural network, a graph, a collection of sequences, a sequence, a collection of knowledge cells, a knowledgebase, or a knowledge structure. The learning the first digital picture correlated with the one or more instruction sets for operating the application and the learning the second digital picture correlated with the additional one or more instruction sets for operating the application may include creating a connection between the first node and the second node. The learning the first digital picture correlated with the one or more instruction sets for operating the application and the learning the second digital picture correlated with the additional one or more instruction sets for operating the application include updating a connection between the first node and the second node. In further embodiments, the first digital picture correlated with the one or more instruction sets for operating the application is stored into a first node of a neural network and the second digital picture correlated with the additional one or more instruction sets for operating the application is stored into a second node of the neural network. The first node and the second node may be connected by a connection. The first node may be part of a first layer of the neural network and the second node may be part of a second layer of the neural network. In further embodiments, the first digital picture correlated with the one or more instruction sets for operating the application is stored into a first node of a graph and the second digital picture correlated with the additional one or more instruction sets for operating the application is stored into a second node of the graph. The first node and the second node may be connected by a connection. In further embodiments, the first digital picture correlated with the one or more instruction sets for operating the application is stored into a first node of a sequence and the second digital picture correlated with the additional one or more instruction sets for operating the application is stored into a second node of the sequence.

In some aspects, the disclosure relates to a non-transitory computer storage medium having a computer program stored thereon, the program including instructions that when executed by one or more processor circuits cause the one or more processor circuits to perform operations comprising: receiving a first digital picture from a renderer, the renderer configured to render digital pictures of views of an application. The operations may further include: receiving one or more instruction sets for operating the application. The operations may further include: learning the first digital picture correlated with the one or more instruction sets for operating the application. The operations may further include: receiving a new digital picture from the renderer. The operations may further include: anticipating the one or more instruction sets for operating the application correlated with the first digital picture based on at least a partial match between the new digital picture and the first digital picture. The operations may further include: causing an execution of the one or more instruction sets for operating the application correlated with the first digital picture, the causing performed in response to the anticipating the one or more instruction sets for operating the application correlated with the first digital picture based on at least a partial match between the new digital picture and the first digital picture, wherein the application performs one or more operations defined by the one or more instruction sets for operating the application correlated with the first digital picture, the one or more operations performed in response to the execution.

In some aspects, the disclosure relates to a non-transitory computer storage medium having a computer program stored thereon, the program including instructions that when executed by one or more processor circuits cause the one or more processor circuits to perform operations comprising: receiving, by a first processor circuit of the one or more processor circuits, a first digital picture from a renderer, the renderer configured to render digital pictures of views of an application. The operations may further include: receiving, by the first processor circuit of the one or more processor circuits, one or more instruction sets for operating the application. The operations may further include: learning, by the first processor circuit of the one or more processor circuits, the first digital picture correlated with the one or more instruction sets for operating the application. The operations may further include: receiving, by the first processor circuit of the one or more processor circuits, a new digital picture from the renderer. The operations may further include: anticipating, by the first processor circuit of the one or more processor circuits, the one or more instruction sets for operating the application correlated with the first digital picture based on at least a partial match between the new digital picture and the first digital picture. The operations may further include: causing, by the first processor circuit of the one or more processor circuits, an execution, by a second processor circuit of the one or more processor circuits, of the one or more instruction sets for operating the application correlated with the first digital picture, the causing performed in response to the anticipating the one or more instruction sets for operating the application correlated with the first digital picture based on at least a partial match between the new digital picture and the first digital picture, wherein the application performs one or more operations defined by the one or more instruction sets for operating the application correlated with the first digital picture, the one or more operations performed in response to the execution.

In some aspects, the disclosure relates to a method comprising: (a) receiving a first digital picture from a renderer by a processor circuit, the renderer configured to render digital pictures of views of an application. The method may further include: (b) receiving one or more instruction sets for operating the application by the processor circuit. The method may further include: (c) learning the first digital picture correlated with the one or more instruction sets for operating the application, the learning of (c) performed by the processor circuit. The method may further include: (d) receiving a new digital picture from the renderer by the processor circuit. The method may further include: (e) anticipating the one or more instruction sets for operating the application correlated with the first digital picture based on at least a partial match between the new digital picture and the first digital picture, the anticipating of (e) performed by the processor circuit. The method may further include: (f) executing the one or more instruction sets for operating the application correlated with the first digital picture, the executing of (f) performed in response to the anticipating of (e). The method may further include: (g) performing, by the application, one or more operations defined by the one or more instruction sets for operating the application correlated with the first digital picture, the one or more operations performed in response to the executing of (f).

In some aspects, the disclosure relates to a method comprising: (a) receiving a first digital picture from a renderer by a first processor circuit, the renderer configured to render digital pictures of views of an application. The method may further include: (b) receiving one or more instruction sets for operating the application by the first processor circuit. The method may further include: (c) learning the first digital picture correlated with the one or more instruction sets for operating the application, the learning of (c) performed by the first processor circuit. The method may further include: (d) receiving a new digital picture from the renderer by the first processor circuit. The method may further include: (e) anticipating the one or more instruction sets for operating the application correlated with the first digital picture based on at least a partial match between the new digital picture and the first digital picture, the anticipating of (e) performed by the first processor circuit. The method may further include: (f) executing, by a second processor circuit, the one or more instruction sets for operating the application correlated with the first digital picture, the executing of (f) performed in response to the anticipating of (e). The method may further include: (g) performing, by the application, one or more operations defined by the one or more instruction sets for operating the application correlated with the first digital picture, the one or more operations performed in response to the executing of (f).

The operations or steps of the non-transitory computer storage mediums and/or the methods may be performed by any of the elements of the above described systems as applicable. The non-transitory computer storage mediums and/or the methods may include any of the operations, steps, and embodiments of the above described systems as applicable as well as the following embodiments.

In further embodiments, the views of the application include views of one or more objects of the application. In further embodiments, the digital pictures of views of the application include digital pictures of a first-person view of the application, digital pictures of a third-person view of the application, digital pictures of a top-down view of the application, digital pictures of a side-on view of the application, digital pictures of an area of interest of the application, or digital pictures of a screenshot of the application.

In some embodiments, the one or more instruction sets for operating the application include one or more instruction sets of the application executed in operating the application. In further embodiments, the one or more instruction sets for operating the application include one or more instruction sets for operating one or more objects of the application.

In certain embodiments, the first digital picture correlated with the one or more instruction sets for operating the application includes an anticipatory digital picture whose correlated one or more instruction sets for operating the application can be used for anticipation of one or more instruction sets to be executed in an operation of the application. In further embodiments, the first digital picture correlated with the one or more instruction sets for operating the application includes a unit of knowledge of how the application operated in a visual surrounding. In further embodiments, the learning the first digital picture correlated with the one or more instruction sets for operating the application includes learning a user's knowledge, style, or methodology of operating the application in a visual surrounding.

In some embodiments, the executing the one or more instruction sets for operating the application correlated with the first digital picture includes implementing a user's knowledge, style, or methodology of operating the application in a visual surrounding.

In certain embodiments, the performing the one or more operations defined by the one or more instruction sets for operating the application correlated with the first digital picture includes implementing a user's knowledge, style, or methodology of operating the application in a visual surrounding.

In some embodiments, the operations of the non-transitory computer storage mediums and/or the methods further comprise: receiving a second digital picture from the renderer; receiving additional one or more instruction sets for operating the application; and learning the second digital picture correlated with the additional one or more instruction sets for operating the application. In further embodiments, the second digital picture includes a second stream of digital pictures. In further embodiments, the learning the first digital picture correlated with the one or more instruction sets for operating the application and the learning the second digital picture correlated with the additional one or more instruction sets for operating the application include creating a connection between the first digital picture correlated with the one or more instruction sets for operating the application and the second digital picture correlated with the additional one or more instruction sets for operating the application. The connection may include or be associated with at least one of: an occurrence count, a weight, a parameter, or a data. In further embodiments, the learning the first digital picture correlated with the one or more instruction sets for operating the application and the learning the second digital picture correlated with the additional one or more instruction sets for operating the application include updating a connection between the first digital picture correlated with the one or more instruction sets for operating the application and the second digital picture correlated with the additional one or more instruction sets for operating the application. The updating the connection between the first digital picture correlated with the one or more instruction sets for operating the application and the second digital picture correlated with the additional one or more instruction sets for operating the application may include updating at least one of: an occurrence count, a weight, a parameter, or a data included in or associated with the connection. In further embodiments, the learning the first digital picture correlated with the one or more instruction sets for operating the application includes storing the first digital picture correlated with the one or more instruction sets for operating the application into a first node of a data structure, and wherein the learning the second digital picture correlated with the additional one or more instruction sets for operating the application includes storing the second digital picture correlated with the additional one or more instruction sets for operating the application into a second node of the data structure. The data structure may include a neural network, a graph, a collection of sequences, a sequence, a collection of knowledge cells, a knowledgebase, or a knowledge structure. The learning the first digital picture correlated with the one or more instruction sets for operating the application and the learning the second digital picture correlated with the additional one or more instruction sets for operating the application may include creating a connection between the first node and the second node. The learning the first digital picture correlated with the one or more instruction sets for operating the application and the learning the second digital picture correlated with the additional one or more instruction sets for operating the application may include updating a connection between the first node and the second node. In further embodiments, the first digital picture correlated with the one or more instruction sets for operating the application is stored into a first node of a neural network and the second digital picture correlated with the additional one or more instruction sets for operating the application is stored into a second node of the neural network. The first node and the second node may be connected by a connection. The first node may be part of a first layer of the neural network and the second node may be part of a second layer of the neural network. In further embodiments, the first digital picture correlated with the one or more instruction sets for operating the application is stored into a first node of a graph and the second digital picture correlated with the additional one or more instruction sets for operating the application is stored into a second node of the graph. The first node and the second node may be connected by a connection. In further embodiments, the first digital picture correlated with the one or more instruction sets for operating the application is stored into a first node of a sequence and the second digital picture correlated with the additional one or more instruction sets for operating the application is stored into a second node of the sequence.

In some aspects, the disclosure relates to a system for learning views of an application for autonomous application operating. The system may be implemented at least in part on one or more computing devices. In some embodiments, the system comprises a processor circuit configured to execute instruction sets of an application. The system may further include a memory unit configured to store data. The system may further include a renderer configured to render digital pictures of views of the application. The system may further include an artificial intelligence unit. In some embodiments, the artificial intelligence unit may be configured to: receive a first digital picture from the renderer. The artificial intelligence unit may be further configured to: receive one or more instruction sets for operating the application. The artificial intelligence unit may be further configured to: learn the first digital picture correlated with the one or more instruction sets for operating the application.

In some aspects, the disclosure relates to a non-transitory computer storage medium having a computer program stored thereon, the program including instructions that when executed by one or more processor circuits cause the one or more processor circuits to perform operations comprising: receiving a first digital picture from a renderer, the renderer configured to render digital pictures of views of an application. The operations may further include: receiving one or more instruction sets for operating the application. The operations may further include: learning the first digital picture correlated with the one or more instruction sets for operating the application.

In some aspects, the disclosure relates to method comprising: (a) receiving a first digital picture from a renderer by a processor circuit, the renderer configured to render digital pictures of views of an application. The method may further include: (b) receiving one or more instruction sets for operating the application by the processor circuit. The method may further include: (c) learning the first digital picture correlated with the one or more instruction sets for operating the application, the learning of (c) performed by the processor circuit.

The operations or steps of the non-transitory computer storage medium and/or the method may be performed by any of the elements of the above described systems as applicable. The non-transitory computer storage medium and/or the method may include any of the operations, steps, and embodiments of the above described systems as applicable as well as the following embodiments.

In some aspects, the disclosure relates to a system for using views of an application for autonomous application operating. The system may be implemented at least in part on one or more computing devices. In some embodiments, the system comprises a processor circuit configured to execute instruction sets of an application. The system may further include a memory unit configured to store a plurality of digital pictures correlated with one or more instruction sets for operating the application, the plurality including a first digital picture correlated with one or more instruction sets for operating the application. The system may further include a renderer configured to render digital pictures of views of the application. The system may further include an artificial intelligence unit. In some embodiments, the artificial intelligence unit may be configured to: access the first digital picture correlated with one or more instruction sets for operating the application stored in the memory unit. The artificial intelligence unit may be further configured to: receive a new digital picture from the renderer. The artificial intelligence unit may be further configured to: anticipate the one or more instruction sets for operating the application correlated with the first digital picture based on at least a partial match between the new digital picture and the first digital picture. The artificial intelligence unit may be further configured to: cause the processor circuit to execute the one or more instruction sets for operating the application correlated with the first digital picture, the executing performed in response to the anticipating of the artificial intelligence unit, wherein the application performs one or more operations defined by the one or more instruction sets for operating the application correlated with the first digital picture, the one or more operations performed in response to the executing by the processor circuit.

In some aspects, the disclosure relates to a non-transitory computer storage medium having a computer program stored thereon, the program including instructions that when executed by one or more processor circuits cause the one or more processor circuits to perform operations comprising: accessing a memory unit that stores a plurality of digital pictures correlated with one or more instruction sets for operating an application, the plurality including a first digital picture correlated with one or more instruction sets for operating the application. The operations may further include: receiving a new digital picture from a renderer, the renderer configured to render digital pictures of views of the application. The operations may further include: anticipating the one or more instruction sets for operating the application correlated with the first digital picture based on at least a partial match between the new digital picture and the first digital picture. The operations may further include: causing an execution of the one or more instruction sets for operating the application correlated with the first digital picture, the causing performed in response to the anticipating the one or more instruction sets for operating the application correlated with the first digital picture based on at least a partial match between the new digital picture and the first digital picture, wherein the application performs one or more operations defined by the one or more instruction sets for operating the application correlated with the first digital picture, the one or more operations performed in response to the execution.

In some aspects, the disclosure relates to a method comprising: (a) accessing a memory unit that stores a plurality of digital pictures correlated with one or more instruction sets for operating an application, the plurality including a first digital picture correlated with one or more instruction sets for operating the application, the accessing of (a) performed by a processor circuit. The method may further include: (b) receiving a new digital picture from a renderer by the processor circuit, the renderer configured to render digital pictures of views of the application. The method may further include: (c) anticipating the one or more instruction sets for operating the application correlated with the first digital picture based on at least a partial match between the new digital picture and the first digital picture, the anticipating of (c) performed by the processor circuit. The method may further include: (d) executing the one or more instruction sets for operating the application correlated with the first digital picture, the executing of (d) performed in response to the anticipating of (c). The method may further include: (e) performing, by the application, one or more operations defined by the one or more instruction sets for operating the application correlated with the first digital picture, the one or more operations performed in response to the executing of (d).

The operations or steps of the non-transitory computer storage medium and/or the method may be performed by any of the elements of the above described systems as applicable. The non-transitory computer storage medium and/or the method may include any of the operations, steps, and embodiments of the above described systems as applicable as well as the following embodiments.

In some aspects, the disclosure relates to a system for learning and using views of an application for autonomous application operating. The system may be implemented at least in part on one or more computing devices. In some embodiments, the system comprises a processor circuit configured to execute instruction sets of an application. The system may further include a memory unit configured to store data. The system may further include a renderer configured to render streams of digital pictures of views of the application. The system may further include an artificial intelligence unit. In some embodiments, the artificial intelligence unit may be configured to: receive a first stream of digital pictures from the renderer. The artificial intelligence unit may be further configured to: receive one or more instruction sets for operating the application. The artificial intelligence unit may be further configured to: learn the first stream of digital pictures correlated with the one or more instruction sets for operating the application. The artificial intelligence unit may be further configured to: receive a new stream of digital pictures from the renderer. The artificial intelligence unit may be further configured to: anticipate the one or more instruction sets for operating the application correlated with the first stream of digital pictures based on at least a partial match between the new stream of digital pictures and the first stream of digital pictures. The artificial intelligence unit may be further configured to: cause the processor circuit to execute the one or more instruction sets for operating the application correlated with the first stream of digital pictures, the executing performed in response to the anticipating of the artificial intelligence unit, wherein the application performs one or more operations defined by the one or more instruction sets for operating the application correlated with the first stream of digital pictures, the one or more operations performed in response to the executing by the processor circuit.

In certain embodiments, the views of the application include views of one or more objects of the application. In further embodiments, the streams of digital pictures of views of the application include streams of digital pictures of a first-person view of the application, streams of digital pictures of a third-person view of the application, streams of digital pictures of a top-down view of the application, streams of digital pictures of a side-on view of the application, streams of digital pictures of an area of interest of the application, or streams of digital pictures of a screenshot of the application.

In some embodiments, the one or more instruction sets for operating the application include one or more instruction sets executed in operating the application. In further embodiments, the one or more instruction sets for operating the application include one or more instruction sets for operating one or more objects of the application.

In further embodiments, the first stream of digital pictures correlated with the one or more instruction sets for operating the application includes an anticipatory stream of digital pictures whose correlated one or more instruction sets for operating the application can be used for anticipation of one or more instruction sets to be executed in an operation of the application. In further embodiments, the first stream of digital pictures correlated with the one or more instruction sets for operating the application includes a unit of knowledge of how the application operated in a visual surrounding. In further embodiments, the learning the first stream of digital pictures correlated with the one or more instruction sets for operating the application includes learning a user's knowledge, style, or methodology of operating the application in a visual surrounding.

In certain embodiments, the causing the processor circuit to execute the one or more instruction sets for operating the application correlated with the first stream of digital pictures includes implementing a user's knowledge, style, or methodology of operating the application in a visual surrounding.

In some embodiments, the performing the one or more operations defined by the one or more instruction sets for operating the application correlated with the first stream of digital pictures includes implementing a user's knowledge, style, or methodology of operating the application in a visual surrounding.

In certain embodiments, the artificial intelligence unit may be further configured to: receive a second stream of digital pictures from the renderer; receive additional one or more instruction sets for operating the application; and learn the second stream of digital pictures correlated with the additional one or more instruction sets for operating the application. In further embodiments, the second stream of digital pictures includes one or more digital pictures. In further embodiments, the learning the first stream of digital pictures correlated with the one or more instruction sets for operating the application and the learning the second stream of digital pictures correlated with the additional one or more instruction sets for operating the application include creating a connection between the first stream of digital pictures correlated with the one or more instruction sets for operating the application and the second stream of digital pictures correlated with the additional one or more instruction sets for operating the application. The connection may include or is associated with at least one of: an occurrence count, a weight, a parameter, or a data. In further embodiments, the learning the first stream of digital pictures correlated with the one or more instruction sets for operating the application and the learning the second stream of digital pictures correlated with the additional one or more instruction sets for operating the application include updating a connection between the first stream of digital pictures correlated with the one or more instruction sets for operating the application and the second stream of digital pictures correlated with the additional one or more instruction sets for operating the application. The updating the connection between the first stream of digital pictures correlated with the one or more instruction sets for operating the application and the second stream of digital pictures correlated with the additional one or more instruction sets for operating the application may include updating at least one of: an occurrence count, a weight, a parameter, or a data included in or associated with the connection. In further embodiments, the learning the first stream of digital pictures correlated with the one or more instruction sets for operating the application includes storing the first stream of digital pictures correlated with the one or more instruction sets for operating the application into a first node of a data structure, and wherein the learning the second stream of digital pictures correlated with the additional one or more instruction sets for operating the application includes storing the second stream of digital pictures correlated with the additional one or more instruction sets for operating the application into a second node of the data structure. The data structure may include a neural network, a graph, a collection of sequences, a sequence, a collection of knowledge cells, a knowledgebase, or a knowledge structure. The learning the first stream of digital pictures correlated with the one or more instruction sets for operating the application and the learning the second stream of digital pictures correlated with the additional one or more instruction sets for operating the application may include creating a connection between the first node and the second node. The learning the first stream of digital pictures correlated with the one or more instruction sets for operating the application and the learning the second stream of digital pictures correlated with the additional one or more instruction sets for operating the application may include updating a connection between the first node and the second node. In further embodiments, the first stream of digital pictures correlated with the one or more instruction sets for operating the application is stored into a first node of a neural network and the second stream of digital pictures correlated with the additional one or more instruction sets for operating the application is stored into a second node of the neural network. The first node and the second node may be connected by a connection. The first node may be part of a first layer of the neural network and the second node may be part of a second layer of the neural network. In further embodiments, the first stream of digital pictures correlated with the one or more instruction sets for operating the application is stored into a first node of a graph and the second stream of digital pictures correlated with the additional one or more instruction sets for operating the application is stored into a second node of the graph. The first node and the second node may be connected by a connection. In further embodiments, the first stream of digital pictures correlated with the one or more instruction sets for operating the application is stored into a first node of a sequence and the second stream of digital pictures correlated with the additional one or more instruction sets for operating the application is stored into a second node of the sequence.

In some aspects, the disclosure relates to a non-transitory computer storage medium having a computer program stored thereon, the program including instructions that when executed by one or more processor circuits cause the one or more processor circuits to perform operations comprising: receiving a first stream of digital pictures from a renderer, the renderer configured to render streams of digital pictures of views of an application. The operations may further include: receiving one or more instruction sets for operating the application. The operations may further include: learning the first stream of digital pictures correlated with the one or more instruction sets for operating the application. The operations may further include: receiving a new stream of digital pictures from the renderer. The operations may further include: anticipating the one or more instruction sets for operating the application correlated with the first stream of digital pictures based on at least a partial match between the new stream of digital pictures and the first stream of digital pictures. The operations may further include: causing an execution of the one or more instruction sets for operating the application correlated with the first stream of digital pictures, the causing performed in response to the anticipating the one or more instruction sets for operating the application correlated with the first stream of digital pictures based on at least a partial match between the new stream of digital pictures and the first stream of digital pictures, wherein the application performs one or more operations defined by the one or more instruction sets for operating the application correlated with the first stream of digital pictures, the one or more operations performed in response to the execution.

In some aspects, the disclosure relates to a non-transitory computer storage medium having a computer program stored thereon, the program including instructions that when executed by one or more processor circuits cause the one or more processor circuits to perform operations comprising: receiving, by a first processor circuit of the one or more processor circuits, a first stream of digital pictures from a renderer, the renderer configured to render streams of digital pictures of views of an application. The operations may further include: receiving, by the first processor circuit of the one or more processor circuits, one or more instruction sets for operating the application. The operations may further include: learning, by the first processor circuit of the one or more processor circuits, the first stream of digital pictures correlated with the one or more instruction sets for operating the application. The operations may further include: receiving, by the first processor circuit of the one or more processor circuits, a new stream of digital pictures from the renderer. The operations may further include: anticipating, by the first processor circuit of the one or more processor circuits, the one or more instruction sets for operating the application correlated with the first stream of digital pictures based on at least a partial match between the new stream of digital pictures and the first stream of digital pictures. The operations may further include: causing, by the first processor circuit of the one or more processor circuits, an execution, by a second processor circuit of the one or more processor circuits, of the one or more instruction sets for operating the application correlated with the first stream of digital pictures, the causing performed in response to the anticipating the one or more instruction sets for operating the application correlated with the first stream of digital pictures based on at least a partial match between the new stream of digital pictures and the first stream of digital pictures, wherein the application performs one or more operations defined by the one or more instruction sets for operating the application correlated with the first stream of digital pictures, the one or more operations performed in response to the execution.

In some aspects, the disclosure relates to a method comprising: (a) receiving a first stream of digital pictures from a renderer by a processor circuit, the renderer configured to render streams of digital pictures of views of an application. The method may further include: (b) receiving one or more instruction sets for operating the application by the processor circuit. The method may further include: (c) learning the first stream of digital pictures correlated with the one or more instruction sets for operating the application, the learning of (c) performed by the processor circuit. The method may further include: (d) receiving a new stream of digital pictures from the renderer by the processor circuit. The method may further include: (e) anticipating the one or more instruction sets for operating the application correlated with the first stream of digital pictures based on at least a partial match between the new stream of digital pictures and the first stream of digital pictures, the anticipating of (e) performed by the processor circuit. The method may further include: (f) executing the one or more instruction sets for operating the application correlated with the first stream of digital pictures, the executing of (f) performed in response to the anticipating of (e). The method may further include: (g) performing, by the application, one or more operations defined by the one or more instruction sets for operating the application correlated with the first stream of digital pictures, the one or more operations performed in response to the executing of (f).

In some aspects, the disclosure relates to a method comprising: (a) receiving a first stream of digital pictures from a renderer by a first processor circuit, the renderer configured to render streams of digital pictures of views of an application. The method may further include: (b) receiving one or more instruction sets for operating the application by the first processor circuit. The method may further include: (c) learning the first stream of digital pictures correlated with the one or more instruction sets for operating the application, the learning of (c) performed by the first processor circuit. The method may further include: (d) receiving a new stream of digital pictures from the renderer by the first processor circuit. The method may further include: (e) anticipating the one or more instruction sets for operating the application correlated with the first stream of digital pictures based on at least a partial match between the new stream of digital pictures and the first stream of digital pictures, the anticipating of (e) performed by the first processor circuit. The method may further include: (f) executing, by a second processor circuit, the one or more instruction sets for operating the application correlated with the first stream of digital pictures, the executing of (f) performed in response to the anticipating of (e). The method may further include: (g) performing, by the application, one or more operations defined by the one or more instruction sets for operating the application correlated with the first stream of digital pictures, the one or more operations performed in response to the executing of (f).

The operations or steps of the non-transitory computer storage mediums and/or the methods may be performed by any of the elements of the above described systems as applicable. The non-transitory computer storage mediums and/or the methods may include any of the operations, steps, and embodiments of the above described systems as applicable as well as the following embodiments.

In certain embodiments, the views of the application include views of one or more objects of the application. In further embodiments, the streams of digital pictures of views of the application include streams of digital pictures of a first-person view of the application, streams of digital pictures of a third-person view of the application, streams of digital pictures of a top-down view of the application, streams of digital pictures of a side-on view of the application, streams of digital pictures of an area of interest of the application, or streams of digital pictures of a screenshot of the application.

In some embodiments, the one or more instruction sets for operating the application include one or more instruction sets of the application executed in operating the application. In further embodiments, the one or more instruction sets for operating the application include one or more instruction sets for operating one or more objects of the application.

In certain embodiments, the first stream of digital pictures correlated with the one or more instruction sets for operating the application includes an anticipatory stream of digital pictures whose correlated one or more instruction sets for operating the application can be used for anticipation of one or more instruction sets to be executed in an operation of the application. In further embodiments, the first stream of digital pictures correlated with the one or more instruction sets for operating the application includes a unit of knowledge of how the application operated in a visual surrounding. In further embodiments, the learning the first stream of digital pictures correlated with the one or more instruction sets for operating the application includes learning a user's knowledge, style, or methodology of operating the application in a visual surrounding.

In some embodiments, the executing the one or more instruction sets for operating the application correlated with the first stream of digital pictures includes implementing a user's knowledge, style, or methodology of operating the application in a visual surrounding.

In certain embodiments, the performing the one or more operations defined by the one or more instruction sets for operating the application correlated with the first stream of digital pictures includes implementing a user's knowledge, style, or methodology of operating the application in a visual surrounding.

In some embodiments, the operations of the non-transitory computer storage mediums and/or the methods further comprise: receiving a second stream of digital pictures from the renderer; receiving additional one or more instruction sets for operating the application; and learning the second stream of digital pictures correlated with the additional one or more instruction sets for operating the application. In further embodiments, the second stream of digital pictures includes one or more digital pictures. In further embodiments, the learning the first stream of digital pictures correlated with the one or more instruction sets for operating the application and the learning the second stream of digital pictures correlated with the additional one or more instruction sets for operating the application include creating a connection between the first stream of digital pictures correlated with the one or more instruction sets for operating the application and the second stream of digital pictures correlated with the additional one or more instruction sets for operating the application. The connection may include or be associated with at least one of: an occurrence count, a weight, a parameter, or a data. In further embodiments, the learning the first stream of digital pictures correlated with the one or more instruction sets for operating the application and the learning the second stream of digital pictures correlated with the additional one or more instruction sets for operating the application include updating a connection between the first stream of digital pictures correlated with the one or more instruction sets for operating the application and the second stream of digital pictures correlated with the additional one or more instruction sets for operating the application. The updating the connection between the first stream of digital pictures correlated with the one or more instruction sets for operating the application and the second stream of digital pictures correlated with the additional one or more instruction sets for operating the application may include updating at least one of: an occurrence count, a weight, a parameter, or a data included in or associated with the connection. In further embodiments, the learning the first stream of digital pictures correlated with the one or more instruction sets for operating the application includes storing the first stream of digital pictures correlated with the one or more instruction sets for operating the application into a first node of a data structure, and wherein the learning the second stream of digital pictures correlated with the additional one or more instruction sets for operating the application includes storing the second stream of digital pictures correlated with the additional one or more instruction sets for operating the application into a second node of the data structure. The data structure may include a neural network, a graph, a collection of sequences, a sequence, a collection of knowledge cells, a knowledgebase, or a knowledge structure. The learning the first stream of digital pictures correlated with the one or more instruction sets for operating the application and the learning the second stream of digital pictures correlated with the additional one or more instruction sets for operating the application may include creating a connection between the first node and the second node. The learning the first stream of digital pictures correlated with the one or more instruction sets for operating the application and the learning the second stream of digital pictures correlated with the additional one or more instruction sets for operating the application may include updating a connection between the first node and the second node. In further embodiments, the first stream of digital pictures correlated with the one or more instruction sets for operating the application is stored into a first node of a neural network and the second stream of digital pictures correlated with the additional one or more instruction sets for operating the application is stored into a second node of the neural network. The first node and the second node may be connected by a connection. The first node may be part of a first layer of the neural network and the second node may be part of a second layer of the neural network. In further embodiments, the first stream of digital pictures correlated with the one or more instruction sets for operating the application is stored into a first node of a graph and the second stream of digital pictures correlated with the additional one or more instruction sets for operating the application is stored into a second node of the graph. The first node and the second node may be connected by a connection. In further embodiments, the first stream of digital pictures correlated with the one or more instruction sets for operating the application is stored into a first node of a sequence and the second stream of digital pictures correlated with the additional one or more instruction sets for operating the application is stored into a second node of the sequence.

In some aspects, the disclosure relates to a system for learning views of an application for autonomous application operating. The system may be implemented at least in part on one or more computing devices. In some embodiments, the system comprises a processor circuit configured to execute instruction sets of an application. The system may further include a memory unit configured to store data. The system may further include a renderer configured to render streams of digital pictures of views of the application. The system may further include an artificial intelligence unit. In some embodiments, the artificial intelligence unit may be configured to: receive a first stream of digital pictures from the renderer. The artificial intelligence unit may be further configured to: receive one or more instruction sets for operating the application. The artificial intelligence unit may be further configured to: learn the first stream of digital pictures correlated with the one or more instruction sets for operating the application.

In some aspects, the disclosure relates to a non-transitory computer storage medium having a computer program stored thereon, the program including instructions that when executed by one or more processor circuits cause the one or more processor circuits to perform operations comprising: receiving a first stream of digital pictures from a renderer, the renderer configured to render streams of digital pictures of views of an application. The operations may further include: receiving one or more instruction sets for operating the application. The operations may further include: learning the first stream of digital pictures correlated with the one or more instruction sets for operating the application.

In some aspects, the disclosure relates to a method comprising: (a) receiving a first stream of digital pictures from a renderer by a processor circuit, the renderer configured to render streams of digital pictures of views of an application.

The method may further include: (b) receiving one or more instruction sets for operating the application by the processor circuit. The method may further include: (c) learning the first stream of digital pictures correlated with the one or more instruction sets for operating the application, the learning of (c) performed by the processor circuit.

The operations or steps of the non-transitory computer storage medium and/or the method may be performed by any of the elements of the above described systems as applicable. The non-transitory computer storage medium and/or the method may include any of the operations, steps, and embodiments of the above described systems as applicable as well as the following embodiments.

In some aspects, the disclosure relates to a system for using views of an application for autonomous application operating. The system may be implemented at least in part on one or more computing devices. In some embodiments, the system comprises a processor circuit configured to execute instruction sets of an application. The system may further include a memory unit configured to store a plurality of streams of digital pictures correlated with one or more instruction sets for operating the application, the plurality including a first stream of digital pictures correlated with one or more instruction sets for operating the application. The system may further include a renderer configured to render streams of digital pictures of views of the application. The system may further include an artificial intelligence unit. In some embodiments, the artificial intelligence unit may be configured to: access the first stream of digital pictures correlated with one or more instruction sets for operating the application stored in the memory unit. The artificial intelligence unit may be further configured to: receive a new stream of digital pictures from the renderer. The artificial intelligence unit may be further configured to: anticipate the one or more instruction sets for operating the application correlated with the first stream of digital pictures based on at least a partial match between the new stream of digital pictures and the first stream of digital pictures. The artificial intelligence unit may be further configured to: cause the processor circuit to execute the one or more instruction sets for operating the application correlated with the first stream of digital pictures, the executing performed in response to the anticipating of the artificial intelligence unit, wherein the application performs one or more operations defined by the one or more instruction sets for operating the application correlated with the first stream of digital pictures, the one or more operations performed in response to the executing by the processor circuit.

In some aspects, the disclosure relates to a non-transitory computer storage medium having a computer program stored thereon, the program including instructions that when executed by one or more processor circuits cause the one or more processor circuits to perform operations comprising: accessing a memory unit that stores a plurality of streams of digital pictures correlated with one or more instruction sets for operating an application, the plurality including a first stream of digital pictures correlated with one or more instruction sets for operating the application. The operations may further include: receiving a new stream of digital pictures from a renderer, the renderer configured to render streams of digital pictures of views of the application. The operations may further include: anticipating the one or more instruction sets for operating the application correlated with the first stream of digital pictures based on at least a partial match between the new stream of digital pictures and the first stream of digital pictures. The operations may further include: causing an execution of the one or more instruction sets for operating the application correlated with the first stream of digital pictures, the causing performed in response to the anticipating the one or more instruction sets for operating the application correlated with the first stream of digital pictures based on at least a partial match between the new stream of digital pictures and the first stream of digital pictures, wherein the application performs one or more operations defined by the one or more instruction sets for operating the application correlated with the first stream of digital pictures, the one or more operations performed in response to the execution.

In some aspects, the disclosure relates to a method comprising: (a) accessing a memory unit that stores a plurality of streams of digital pictures correlated with one or more instruction sets for operating an application, the plurality including a first stream of digital pictures correlated with one or more instruction sets for operating the application, the accessing of (a) performed by a processor circuit. The method may further include: (b) receiving a new stream of digital pictures from a renderer by the processor circuit, the renderer configured to render streams of digital pictures of views of the application. The method may further include: (c) anticipating the one or more instruction sets for operating the application correlated with the first stream of digital pictures based on at least a partial match between the new stream of digital pictures and the first stream of digital pictures, the anticipating of (c) performed by the processor circuit. The method may further include: (d) executing the one or more instruction sets for operating the application correlated with the first stream of digital pictures, the executing of (d) performed in response to the anticipating of (c). The method may further include: (e) performing, by the application, one or more operations defined by the one or more instruction sets for operating the application correlated with the first stream of digital pictures, the one or more operations performed in response to the executing of (d).

The operations or steps of the non-transitory computer storage medium and/or the method may be performed by any of the elements of the above described systems as applicable. The non-transitory computer storage medium and/or the method may include any of the operations, steps, and embodiments of the above described systems as applicable as well as the following embodiments.

Other features and advantages of the disclosure will become apparent from the following description, including the claims and drawings.

BRIEF DESCRIPTION OF THE DRAWINGS

FIG. 16 illustrates an embodiment of learning Knowledge Cells 800 comprising one or more Digital Pictures 525 correlated with any Instruction Sets 526 and/or Extra Info 527 using Collection of Knowledge Cells 530d.

FIG. 17 illustrates an embodiment of learning Knowledge Cells 800 comprising one or more Digital Pictures 525 correlated with any Instruction Sets 526 and/or Extra Info 527 using Neural Network 530a.

FIG. 24 illustrates an embodiment of determining anticipatory Instruction Sets 526 using Neural Network 530a.

FIG. 34 illustrates an exemplary embodiment of Avatar 180a within 3D Computer Game 18a.

Figure 1:
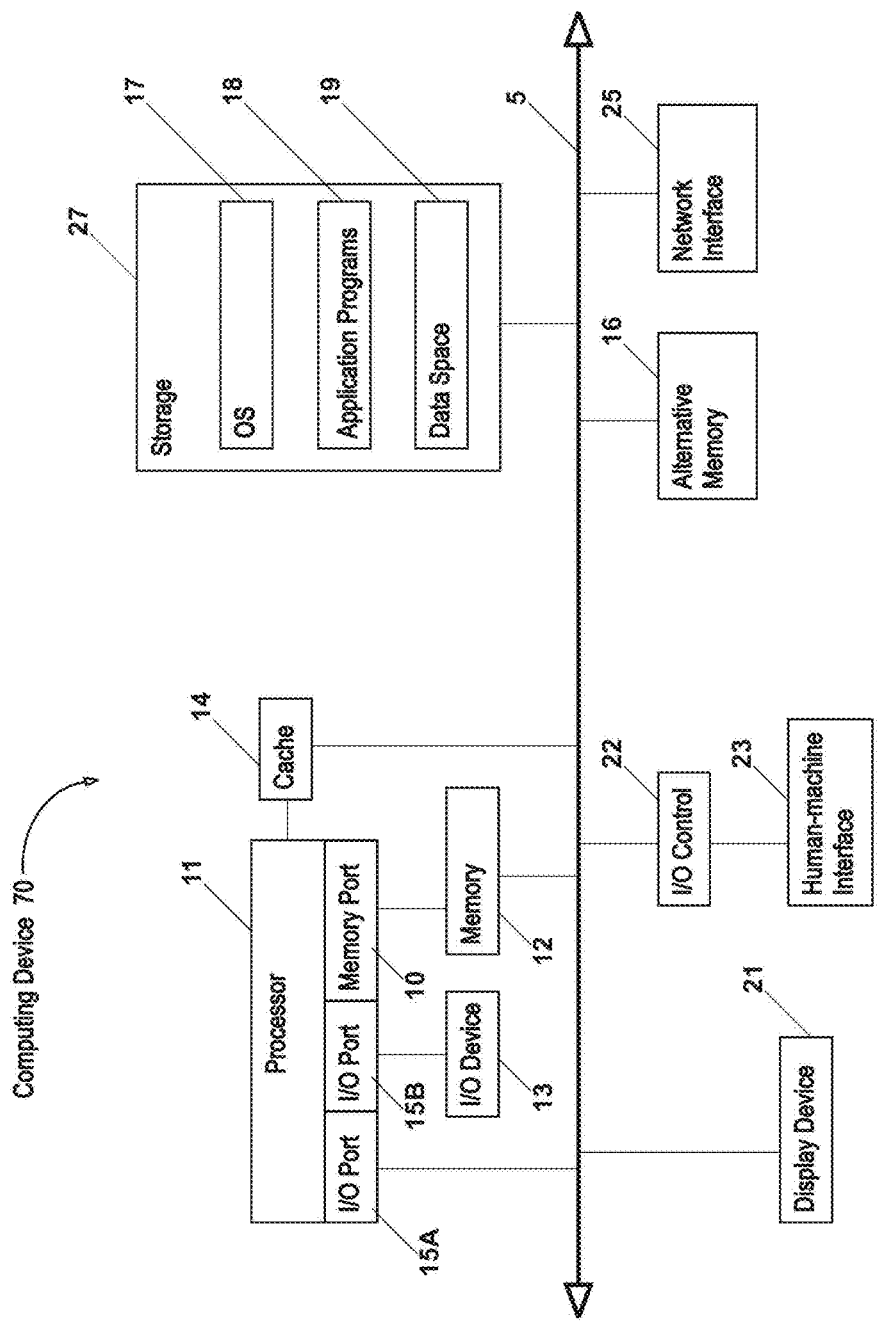
FIG. 1 illustrates a block diagram of Computing Device 70 that can provide processing capabilities used in some of the disclosed embodiments.

Like reference numerals in different figures indicate like elements. Horizontal or vertical " . . . " or other such indicia may be used to indicate additional instances of the same type of element n, m, x, or other such letters or indicia represent integers or other sequential numbers that follow the sequence where they are indicated. It should be noted that n, m, x, or other such letters or indicia may represent different numbers in different elements even where the elements are depicted in the same figure. In general, n, m, x, or other such letters or indicia may follow the sequence and/or context where they are indicated. Any of these or other such letters or indicia may be used interchangeably depending on the context and space available. The drawings are not necessarily to scale, with emphasis instead being placed upon illustrating the embodiments, principles, and concepts of the disclosure. A line or arrow between any of the disclosed elements comprises an interface that enables the coupling, connection, and/or interaction between the elements.

DETAILED DESCRIPTION

The disclosed artificially intelligent devices, systems, and methods for learning and/or using visual surrounding for autonomous object operation comprise apparatuses, systems, methods, features, functionalities, and/or applications that enable learning one or more digital pictures of an object's surrounding along with correlated instruction sets for operating the object, storing this knowledge in a knowledgebase (i.e. neural network, graph, sequences, etc.), and autonomously operating an object. The disclosed artificially intelligent devices, systems, and methods for learning and/or using visual surrounding for autonomous object operation, any of their elements, any of their embodiments, or a combination thereof can generally be referred to as VSAOO, VSAOO Unit, or as other similar name or reference.

Referring now to FIG. 1, an embodiment is illustrated of Computing Device 70 (also referred to as computing system or other similar name or reference, etc.) that can provide processing capabilities used in some embodiments of the forthcoming disclosure. Later described devices, systems, and methods, in combination with processing capabilities of Computing Device 70, enable learning and/or using an object's visual surrounding for autonomous object operation and/or other functionalities described herein. Various embodiments of the disclosed devices, systems, and methods include hardware, functions, logic, programs, and/or a combination thereof that can be provided or implemented on any type or form of computing, computing enabled, or other device such as a mobile device, a computer, a computing enabled telephone, a server, a cloud device, a gaming device, a television device, a digital camera, a GPS receiver, a media player, an embedded device, a supercomputer, a wearable device, an implantable device, or any other type or form of computing, computing enabled, or other device or system capable of performing the operations described herein.

In some designs, Computing Device 70 comprises hardware, processing techniques or capabilities, programs, or a combination thereof. Computing Device 70 includes one or more central processing units, which may also be referred to as processors 11. Processor 11 includes one or more memory ports 10 and/or one or more input-output ports, also referred to as I/O ports 15, such as I/O ports 15A and 15B. Processor 11 may be special or general purpose. Computing Device 70 may further include memory 12, which can be connected to the remainder of the components of Computing Device 70 via bus 5. Memory 12 can be connected to processor 11 via memory port 10. Computing Device 70 may also include display device 21 such as a monitor, projector, glasses, and/or other display device. Computing Device 70 may also include Human-machine Interface 23 such as a keyboard, a pointing device, a mouse, a touchscreen, a joystick, and/or other input device that can be connected with the remainder of the Computing Device 70 components via I/O control 22. In some implementations, Human-machine Interface 23 can be connected with bus 5 or directly connected with specific components of Computing Device 70. Computing Device 70 may include additional elements, such as one or more input/output devices 13. Processor 11 may include or be interfaced with cache memory 14. Storage 27 may include memory, which provides an operating system, also referred to as OS 17, additional application programs 18 operating on OS 17, and/or data space 19 in which additional data or information can be stored. Alternative memory device 16 can be connected to the remaining components of Computing Device 70 via bus 5. Network interface 25 can also be connected with bus 5 and be used to communicate with external computing devices via a network. Some or all described elements of Computing Device 70 can be directly or operatively connected or coupled with each other using any other connection means known in art. Other additional elements may be included as needed, or some of the disclosed ones may be excluded, or a combination thereof may be utilized in alternate implementations of Computing Device 70.

Processor 11 includes any logic circuitry that can respond to or process instructions fetched from memory 12 or other element. Processor 11 may also include any combination of hardware and/or processing techniques or capabilities for implementing or executing logic functions or programs. Processor 11 may include a single core or a multi core processor. Processor 11 includes the functionality for loading operating system 17 and operating any application programs 18 thereon. In some embodiments, Processor 11 can be provided in a microprocessing or a processing unit, such as, for example, Snapdragon processor produced by Qualcomm Inc., processor by Intel Corporation of Mountain View, Calif., processor manufactured by Motorola Corporation of Schaumburg, Ill.; processor manufactured by Transmeta Corporation of Santa Clara, Calif.; the RS/6000 processor, processor manufactured by International Business Machines of White Plains, N.Y.; processor manufactured by Advanced Micro Devices of Sunnyvale, Calif., or any computing unit for performing similar functions. In other embodiments, processor 11 can be provided in a graphics processing unit (GPU), visual processing unit (VPU), or other highly parallel processing unit or circuit such as, for example, nVidia GeForce line of GPUs, AMD Radeon line of GPUs, and/or others. Such GPUs or other highly parallel processing units may provide superior performance in processing operations on neural networks and/or other data structures. In further embodiments, processor 11 can be provided in a micro controller such as, for example, Texas instruments, Atmel, Microchip Technology, ARM, Silicon Labs, Intel, and/or other lines of micro controllers, and/or others. In further embodiments, processor 11 includes any circuit (i.e. logic circuit, etc.) or device for performing logic operations. Computing Device 70 can be based on one or more of the aforementioned or other processors capable of operating as described herein.

Memory 12 includes one or more memory chips capable of storing data and allowing any storage location to be accessed by processor 11 and/or other element. Examples of Memory 12 include static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), and/or others. Memory 12 can be based on any of the above described memory chips, or any other available memory chips capable of operating as described herein. In some embodiments, processor 11 can communicate with memory 12 via a system bus 5. In other embodiments, processor 11 can communicate directly with memory 12 via a memory port 10.

Processor 11 can communicate directly with cache memory 14 via a connection means such as a secondary bus which may also sometimes be referred to as a backside bus. In some embodiments, processor 11 can communicate with cache memory 14 using the system bus 5. Cache memory 14 may typically have a faster response time than main memory 12 and can include a type of memory which is considered faster than main memory 12, such as for example SRAM, BSRAM, or EDRAM. Cache memory includes any structure such as multilevel caches, for example. In some embodiments, processor 11 can communicate with one or more I/O devices 13 via a system bus 5. Various busses can be used to connect processor 11 to any of the I/O devices 13, such as a VESA VL bus, an ISA bus, an EISA bus, a MicroChannel Architecture (MCA) bus, a PCI bus, a PCI-X bus, a PCI-Express bus, a NuBus, and/or others. In some embodiments, processor 11 can communicate directly with I/O device 13 via HyperTransport, Rapid I/O, or InfiniBand. In further embodiments, local busses and direct communication can be mixed. For example, processor 11 can communicate with an I/O device 13 using a local interconnect bus and communicate with another I/O device 13 directly. Similar configurations can be used for any other components described herein.

Computing Device 70 may further include alternative memory such as a SD memory slot, a USB memory stick, an optical drive such as a CD-ROM drive, a CD-R/RW drive, a DVD-ROM drive or a BlueRay disc, a hard-drive, and/or any other device comprising non-volatile memory suitable for storing data or installing application programs. Computing Device 70 may further include a storage device 27 comprising any type or form of non-volatile memory for storing an operating system (OS) such as any type or form of Windows OS, Mac OS, Unix OS, Linux OS, Android OS, iPhone OS, mobile version of Windows OS, an embedded OS, or any other OS that can operate on Computing Device 70. Computing Device 70 may also include application programs 18, and/or data space 19 for storing additional data or information. In some embodiments, alternative memory 16 can be used as or similar to storage device 27. Additionally, OS 17 and/or application programs 18 can be operable from a bootable medium, such as for example, a flash drive, a micro SD card, a bootable CD or DVD, and/or other bootable medium.

Application Program 18 (also referred to as program, computer program, application, script, code, or other similar name or reference) comprises instructions that can provide functionality when executed by processor 11. Application program 18 can be implemented in a high-level procedural or object-oriented programming language, or in a low-level machine or assembly language. Any language used can be compiled, interpreted, or otherwise translated into machine language. Application program 18 can be deployed in any form including as a stand-alone program or as a module, component, subroutine, or other unit suitable for use in a computing system. Application program 18 does not necessarily correspond to a file in a file system. A program can be stored in a portion of a file that may hold other programs or data, in a single file dedicated to the program, or in multiple files (i.e. files that store one or more modules, sub programs, or portions of code, etc.). Application Program 18 can be delivered in various forms such as, for example, executable file, library, script, plugin, addon, applet, interface, console application, web application, application service provider (ASP)-type application, cloud application, operating system, and/or other forms. Application program 18 can be deployed to be executed on one computing device or on multiple computing devices (i.e. cloud, distributed, or parallel computing, etc.), or at one site or distributed across multiple sites interconnected by a communication network. Examples of Application Program 18 include computer game, virtual world, web browser, media application, word processing application, spreadsheet application, database application, forms-based application, global positioning system (GPS) application, 2D application, 3D application, operating system, factory automation application, device control application, vehicle control application, and/or other application or program.

Network interface 25 can be utilized for interfacing Computing Device 70 with other devices via a network through a variety of connections including standard telephone lines, wired or wireless connections, LAN or WAN links (i.e. 802.11, T1, T3, 56 kb, X.25, etc.), broadband connections (i.e. ISDN, Frame Relay, ATM, etc.), or a combination thereof. Examples of networks include the Internet, an intranet, an extranet, a local area network (LAN), a wide area network (WAN), a personal area network (PAN), a home area network (HAN), a campus area network (CAN), a metropolitan area network (MAN), a global area network (GAN), a storage area network (SAN), virtual network, a virtual private network (VPN), Bluetooth network, a wireless network, a wireless LAN, a radio network, a HomePNA, a power line communication network, a G.hn network, an optical fiber network, an Ethernet network, an active networking network, a client-server network, a peer-to-peer network, a bus network, a star network, a ring network, a mesh network, a star-bus network, a tree network, a hierarchical topology network, and/or other networks. Network interface 25 may include a built-in network adapter, network interface card, PCMCIA network card, card bus network adapter, wireless network adapter, Bluetooth network adapter, WiFi network adapter, USB network adapter, modem, and/or any other device suitable for interfacing Computing Device 70 with any type of network capable of communication and/or operations described herein.

Still referring to FIG. 1, I/O devices 13 may be present in various shapes or forms in Computing Device 70. Examples of I/O device 13 capable of input include a joystick, a keyboard, a mouse, a trackpad, a trackpoint, a touchscreen, a trackball, a microphone, a drawing tablet, a glove, a tactile input device, a still or video camera, and/or other input device. Examples of I/O device 13 capable of output include a video display, a touchscreen, a projector, a glasses, a speaker, a tactile output device, and/or other output device. Examples of I/O device 13 capable of input and output include a disk drive, an optical storage device, a modem, a network card, and/or other input/output device. I/O device 13 can be interfaced with processor 11 via an I/O port 15, for example. I/O device 13 can also be controlled by I/O control 22 in some implementations. I/O control 22 may control one or more I/O devices such as Human-machine Interface 23 (i.e. keyboard, pointing device, touchscreen, joystick, mouse, optical pen, etc.). I/O control 22 enables any type or form of a device such as, for example, a video camera or microphone to be interfaced with other components of Computing Device 70. Furthermore, I/O device 13 may also provide storage such as or similar to storage 27, and/or alternative memory such as or similar to alternative memory 16 in some implementations.

An output interface such as a graphical user interface, an acoustic output interface, a tactile output interface, any device driver (i.e. audio, video, or other driver), and/or other output interface or system can be utilized to process output from elements of Computing Device 70 for conveyance on an output device such as Display 21. In some aspects, Display 21 or other output device itself may include an output interface for processing output from elements of Computing Device 70. Further, an input interface such as a keyboard listener, a touchscreen listener, a mouse listener, any device driver (i.e. audio, video, keyboard, mouse, touchscreen, or other driver), a speech recognizer, a video interpreter, and/or other input interface or system can be utilized to process input from Human-machine Interface 23 or other input device for use by elements of Computing Device 70. In some aspects, Human-machine Interface 23 or other input device itself may include an input interface for processing input for use by elements of Computing Device 70.

Computing Device 70 may include or be connected to multiple display devices 21. Display devices 21 can each be of the same or different type or form. Computing Device 70 and/or its elements comprise any type or form of suitable hardware, programs, or a combination thereof to support, enable, or provide for the connection and use of multiple display devices 21. In one example, Computing Device 70 includes any type or form of video adapter, video card, driver, and/or library to interface, communicate, connect, or otherwise use display devices 21. In some aspects, a video adapter may include multiple connectors to interface to multiple display devices 21. In other aspects, Computing Device 70 includes multiple video adapters, with each video adapter connected to one or more display devices 21. In some embodiments, Computing Device's 70 operating system can be configured for using multiple displays 21. In other embodiments, one or more display devices 21 can be provided by one or more other computing devices such as remote computing devices connected to Computing Device 70 via a network.

In some embodiments, I/O device 13 can be a bridge between system bus 5 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, and/or other bus.

Computing Device 70 can operate under the control of operating system 17, which may support Computing Device's 70 basic functions, interface with and manage hardware resources, interface with and manage peripherals, provide common services for application programs, schedule tasks, and/or perform other functionalities. A modern operating system enables features and functionalities such as a high resolution display, graphical user interface (GUI), touchscreen, cellular network connectivity (i.e. mobile operating system, etc.), Bluetooth connectivity, WiFi connectivity, global positioning system (GPS) capabilities, mobile navigation, microphone, speaker, still picture camera, video camera, voice recorder, speech recognition, music player, video player, near field communication, personal digital assistant (PDA), and/or other features, functionalities, or applications. For example, Computing Device 70 can use any conventional operating system, any embedded operating system, any real-time operating system, any open source operating system, any video gaming operating system, any proprietary operating system, any online operating system, any operating system for mobile computing devices, or any other operating system capable of running on Computing Device 70 and performing operations described herein. Example of operating systems include Windows XP, Windows 7, Windows 8, etc. manufactured by Microsoft Corporation of Redmond, Wash.; Mac OS, iPhone OS, etc. manufactured by Apple Computer of Cupertino, Calif.; OS/2 manufactured by International Business Machines of Armonk, N.Y.; Linux, a freely-available operating system distributed by Caldera Corp. of Salt Lake City, Utah; or any type or form of a Unix operating system, among others. Any operating systems such as the ones for Android devices can similarly be utilized.

Computing Device 70 can be implemented as or be part of various different model architectures such as web services, distributed computing, grid computing, cloud computing, and/or other architectures. For example, in addition to the traditional desktop, server, or mobile operating system architectures, a cloud-based operating system can be utilized to provide the structure on which embodiments of the disclosure can be implemented. Other aspects of Computing Device 70 can also be implemented in the cloud without departing from the spirit and scope of the disclosure. For example, memory, storage, processing, and/or other elements can be hosted in the cloud. In some embodiments, Computing Device 70 can be implemented on multiple devices. For example, a portion of Computing Device 70 can be implemented on a mobile device and another portion can be implemented on wearable electronics.

Computing Device 70 can be or include any mobile device, a mobile phone, a smartphone (i.e. iPhone, Windows phone, Blackberry, Android phone, etc.), a tablet, a personal digital assistant (PDA), wearable electronics, implantable electronics, or another mobile device capable of implementing the functionalities described herein. In other embodiments, Computing Device 70 can be or include an embedded device, which can be any device or system with a dedicated function within another device or system. Embedded systems range from the simplest ones dedicated to one task with no user interface to complex ones with advanced user interface that may resemble modern desktop computer systems. Examples of devices comprising an embedded device include a mobile telephone, a personal digital assistant (PDA), a gaming device, a media player, a digital still or video camera, a pager, a television device, a set-top box, a personal navigation device, a global positioning system (GPS) receiver, a portable storage device (i.e. a USB flash drive, etc.), a digital watch, a DVD player, a printer, a microwave oven, a washing machine, a dishwasher, a gateway, a router, a hub, an automobile entertainment system, an automobile navigation system, a refrigerator, a washing machine, a factory automation device, an assembly line device, a factory floor monitoring device, a thermostat, an automobile, a factory controller, a telephone, a network bridge, and/or other devices. An embedded device can operate under the control of an operating system for embedded devices such as MicroC/OS-II, QNX, VxWorks, eCos, TinyOS, Windows Embedded, Embedded Linux, and/or other embedded device operating systems.

Various implementations of the disclosed devices, systems, and methods can be realized in digital electronic circuitry, integrated circuitry, logic gates, specially designed application specific integrated circuits (ASICs), field programmable gate arrays (FPGAs), computer hardware, firmware, programs, virtual machines, and/or combinations thereof including their structural, logical, and/or physical equivalents.

The disclosed devices, systems, and methods may include clients and servers. A client and server are generally remote from each other and typically interact via a network. The relationship of a client and server may arise by virtue of computer programs running on their respective computers and having a client-server relationship to each other.

The disclosed devices, systems, and methods can be implemented in a computing system that includes a back end component, a middleware component, a front end component, or any combination thereof. The components of the system can be interconnected by any form or medium of digital data communication such as, for example, a network.

Computing Device 70 may include or be interfaced with a computer program product comprising instructions or logic encoded on a computer-readable medium. Such instructions or logic, when executed, may configure or cause a processor to perform the operations and/or functionalities disclosed herein. For example, a computer program can be provided or encoded on a computer-readable medium such as an optical medium (i.e. DVD-ROM, etc.), flash drive, hard drive, any memory, firmware, or other medium. Computer program can be installed onto a computing device to cause the computing device to perform the operations and/or functionalities disclosed herein. Machine-readable medium, computer-readable medium, or other such terms may refer to any computer program product, apparatus, and/or device for providing instructions and/or data to a programmable processor. As such, machine-readable medium includes any medium that can send or receive machine instructions as a machine-readable signal. Examples of a machine-readable medium include a volatile and/or non-volatile medium, a removable and/or non-removable medium, a communication medium, a storage medium, and/or other medium. A communication medium, for example, can transmit computer readable instructions and/or data in a modulated data signal such as a carrier wave or other transport technique, and may include any other form of information delivery medium known in art. A non-transitory machine-readable medium comprises all machine-readable media except for a transitory, propagating signal.

In some embodiments, the disclosed artificially intelligent devices, systems, and methods for learning and/or using visual surrounding for autonomous object operation, or elements thereof, can be implemented entirely or in part in a device (i.e. microchip, circuitry, logic gates, electronic device, computing device, special or general purpose processor, etc.) or system that comprises (i.e. hard coded, internally stored, etc.) or is provided with (i.e. externally stored, etc.) instructions for implementing VSAOO functionalities. As such, the disclosed artificially intelligent devices, systems, and methods for learning and/or using visual surrounding for autonomous object operation, or elements thereof, may include the processing, memory, storage, and/or other features, functionalities, and embodiments of Computing Device 70 or elements thereof. Such device or system can operate on its own (i.e. standalone device or system, etc.), be embedded in another device or system (i.e. a television device, an oven, a refrigerator, a vehicle, an industrial machine, a robot, a smartphone, and/or any other device or system capable of housing the elements needed for VSAOO functionalities), work in combination with other devices or systems, or be available in any other configuration. In other embodiments, the disclosed artificially intelligent devices, systems, and methods for learning and/or using visual surrounding for autonomous object operation, or elements thereof, may include Alternative Memory 16 that provides instructions for implementing VSAOO functionalities to one or more Processors 11. In further embodiments, the disclosed artificially intelligent devices, systems, and methods for learning and/or using visual surrounding for autonomous object operation, or elements thereof, can be implemented entirely or in part as a computer program and executed by one or more Processors 11. Such program can be implemented in one or more modules or units of a single or multiple computer programs. Such program may be able to attach to or interface with, inspect, and/or take control of another application program to implement VSAOO functionalities. In further embodiments, the disclosed artificially intelligent devices, systems, and methods for learning and/or using visual surrounding for autonomous object operation, or elements thereof, can be implemented as a network, web, distributed, cloud, or other such application accessed on one or more remote computing devices (i.e. servers, cloud, etc.) via Network Interface 25, such remote computing devices including processing capabilities and instructions for implementing VSAOO functionalities. In further embodiments, the disclosed artificially intelligent devices, systems, and methods for learning and/or using visual surrounding for autonomous object operation, or elements thereof, can be (1) attached to or interfaced with any computing device or application program, (2) included as a feature of an operating system, (3) built (i.e. hard coded, etc.) into any computing device or application program, and/or (4) available in any other configuration to provide its functionalities.

In yet other embodiments, the disclosed artificially intelligent devices, systems, and methods for learning and/or using visual surrounding for autonomous object operation, or elements thereof, can be implemented at least in part in a computer program such as Java application or program. Java provides a robust and flexible environment for application programs including flexible user interfaces, robust security, built-in network protocols, powerful application programming interfaces, database or DBMS connectivity and interfacing functionalities, file manipulation capabilities, support for networked applications, and/or other features or functionalities. Application programs based on Java can be portable across many devices, yet leverage each device's native capabilities. Java supports the feature sets of most smartphones and a broad range of connected devices while still fitting within their resource constraints. Various Java platforms include virtual machine features comprising a runtime environment for application programs. Java platforms provide a wide range of user-level functionalities that can be implemented in application programs such as displaying text and graphics, playing and recording audio content, displaying and recording visual content, communicating with another computing device, and/or other functionalities. It should be understood that the disclosed artificially intelligent devices, systems, and methods for learning and/or using visual surrounding for autonomous object operation, or elements thereof, are programming language, platform, and operating system independent. Examples of programming languages that can be used instead of or in addition to Java include C, C++, Cobol, Python, Java Script, Tcl, Visual Basic, Pascal, VB Script, Perl, PHP, Ruby, and/or other programming languages capable of implementing the functionalities described herein.

Where a reference to a specific file or file type is used herein, other files, file types, or formats can be substituted.

Where a reference to a data structure is used herein, it should be understood that any variety of data structures can be used such as, for example, array, list, linked list, doubly linked list, queue, tree, heap, graph, map, grid, matrix, multi-dimensional matrix, table, database, database management system (DBMS), file, neural network, and/or any other type or form of a data structure including a custom one. A data structure may include one or more fields or data fields that are part of or associated with the data structure. A field or data field may include a data, an object, a data structure, and/or any other element or a reference/pointer thereto. A data structure can be stored in one or more memories, files, or other repositories. A data structure and/or any elements thereof, when stored in a memory, file, or other repository, may be stored in a different arrangement than the arrangement of the data structure and/or any elements thereof. For example, a sequence of elements can be stored in an arrangement other than a sequence in a memory, file, or other repository.

Where a reference to a repository is used herein, it should be understood that a repository may be or include one or more files or file systems, one or more storage locations or structures, one or more storage systems, one or more data structures or objects, one or more memory locations or structures, and/or other storage, memory, or data arrangements.

Where a reference to an interface is used herein, it should be understood that the interface comprises any hardware, device, system, program, method, and/or combination thereof that enable direct or operative coupling, connection, and/or interaction of the elements between which the interface is indicated. A line or arrow shown in the figures between any of the depicted elements comprises such interface. Examples of an interface include a direct connection, an operative connection, a wired connection (i.e. wire, cable, etc.), a wireless connection, a device, a network, a bus, a circuit, a firmware, a driver, a bridge, a program, a combination thereof, and/or others.

Where a reference to an element coupled or connected to another element is used herein, it should be understood that the element may be in communication or any other interactive relationship with the other element. Furthermore, an element coupled or connected to another element can be coupled or connected to any other element in alternate implementations. Terms coupled, connected, interfaced, or other such terms may be used interchangeably herein depending on context.

Where a reference to an element matching another element is used herein, it should be understood that the element may be equivalent or similar to the other element. Therefore, the term match or matching can refer to total equivalence or similarity depending on context.

Where a reference to a device is used herein, it should be understood that the device may include or be referred to as a system, and vice versa depending on context, since a device may include a system of elements and a system may be embodied in a device.

Where a reference to a processor or processor circuit is used herein, it should be understood that one or more processors or processor circuits can be utilized instead. For example, one or more parallel processors or processor circuits can be utilized. Any other arrangement or plurality of processors or processor circuits can be utilized.

Where a mention of a function, method, routine, subroutine, or other such procedure is used herein, it should be understood that the function, method, routine, subroutine, or other such procedure comprises a call, reference, or pointer to the function, method, routine, subroutine, or other such procedure.

Where a mention of data, object, data structure, item, element, or thing is used herein, it should be understood that the data, object, data structure, item, element, or thing comprises a reference or pointer to the data, object, data structure, item, element, or thing.

The term collection of elements can refer to plurality of elements without implying that the collection is an element itself.

Figure 2:
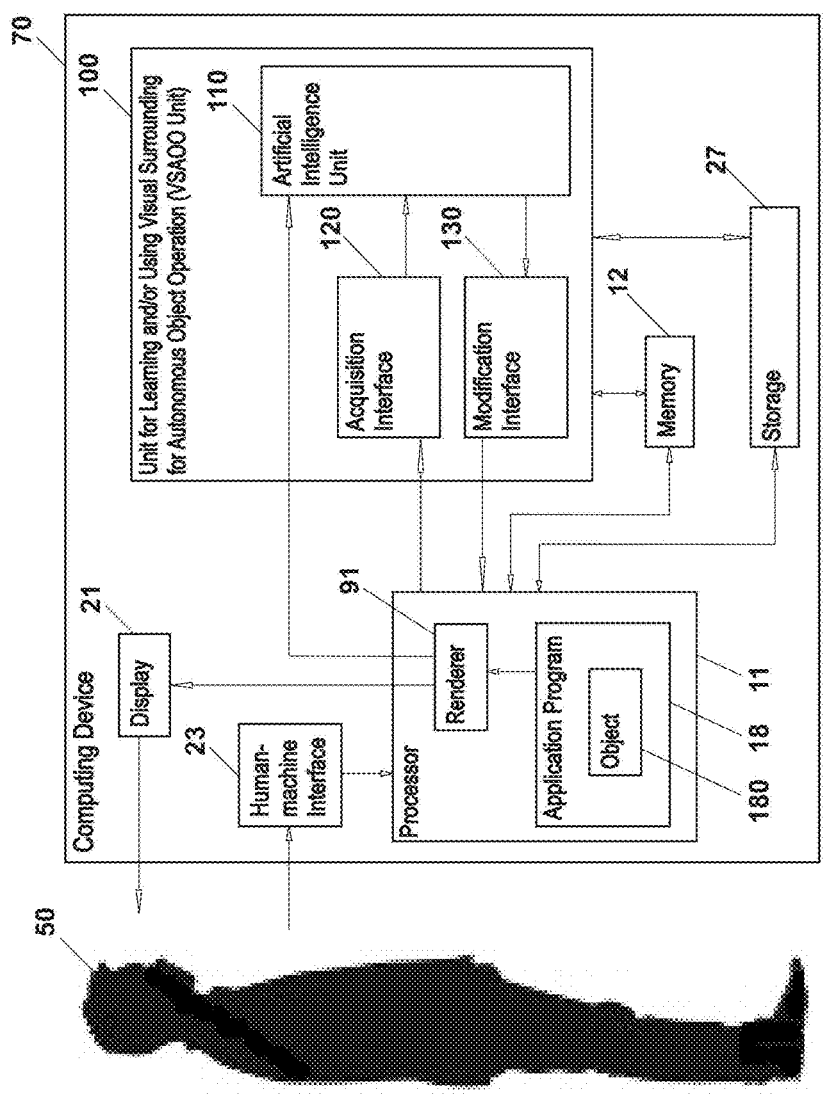
FIG. 2 illustrates an embodiment of Computing Device 70 comprising Unit for Learning and/or Using Visual Surrounding for Autonomous Object Operation (VSAOO Unit 100).

Referring to FIG. 2, an embodiment of Computing Device 70 comprising Unit for Learning and/or Using Visual Surrounding for Autonomous Object Operation (VSAOO Unit 100) is illustrated. Computing Device 70 also comprises interconnected Processor 11, Human-machine Interface 23, Memory 12, and Storage 27. Processor 11 may include or execute Application Program 18 and Renderer 91. Application Program 18 may include Object 180. VSAOO Unit 100 comprises interconnected Artificial Intelligence Unit 110, Acquisition Interface 120, and Modification Interface 130. Other additional elements can be included as needed, or some of the disclosed ones can be excluded, or a combination thereof can be utilized in alternate embodiments.

In one example, the teaching presented by the disclosure can be implemented in a device or system for learning and/or using visual surrounding for autonomous object operation. The device or system may include a processor circuit (i.e. Processor 11, etc.) configured to execute instruction sets (i.e. Instruction Sets 526, etc.) of an application (i.e. Application Program 18, etc.), the application including an object (i.e. Object 180, etc.). The device or system may further include a memory unit (i.e. Memory 12, etc.) configured to store data. The device or system may further include a renderer (i.e. Renderer 91, etc.) configured to render digital pictures (i.e. Digital Pictures 525, etc.) of a surrounding of the object of the application. The device or system may further include an artificial intelligence unit (i.e. Artificial Intelligence Unit 110, etc.). The artificial intelligence unit may be configured to receive a first digital picture from the renderer. The artificial intelligence unit may also be configured to receive one or more instruction sets for operating the object of the application. The artificial intelligence unit may also be configured to learn the first digital picture correlated with the one or more instruction sets for operating the object of the application. The artificial intelligence unit may also be configured to receive a new digital picture from the renderer. The artificial intelligence unit may also be configured to anticipate the one or more instruction sets for operating the object of the application correlated with the first digital picture based on at least a partial match between the new digital picture and the first digital picture. The artificial intelligence unit may also be configured to cause the processor circuit to execute the one or more instruction sets for operating the object of the application correlated with the first digital picture, the executing performed in response to the anticipating of the artificial intelligence unit, wherein the object of the application performs one or more operations defined by the one or more instruction sets for operating the object of the application correlated with the first digital picture, the one or more operations performed in response to the executing by the processor circuit. Any of the operations of the described elements can be performed repeatedly and/or in different orders in alternate implementations. In some embodiments, a stream of digital pictures can be used instead of or in addition to any digital picture such as, for example, using a first stream of digital pictures instead of the first digital picture. In other embodiments, the renderer may be configured to render digital pictures of views of the application instead of or in addition to views of a visual surrounding of the object of the application. Also, the artificial intelligence unit may be configured to receive one or more instruction sets for operating the application (including one or more objects therein, etc.) instead of or in addition to the one or more instruction sets for operating the object of the application. In such embodiments, the system may learn operation of the application (including one or more objects therein, etc.) related the views of the application. Other additional elements can be included as needed, or some of the disclosed ones can be excluded, or a combination thereof can be utilized in alternate embodiments. The device or system for learning and/or using visual surrounding for autonomous object operation may include any actions or operations of any of the disclosed methods such as methods 6100, 6200, 6300, 6400, 6500, and/or 6600 (all later described).

User 50 (also referred to simply as user or other similar name or reference) comprises a human user or non-human user. A non-human User 50 includes any device, system, program, and/or other mechanism for operating or controlling Application Program 18, Object 180 (later described), Computing Device 70, and/or elements thereof. For example, User 50 may issue an operating direction to Application Program 18 responsive to which Application Program's 18 instructions or instruction sets may be executed by Processor 11 to perform a desired operation with/on Object 180. User's 50 operating directions comprise any user inputted data (i.e. values, text, symbols, etc.), directions (i.e. move right, move up, move forward, copy an item, click on a link, etc.), instructions or instruction sets (i.e. manually inputted instructions or instruction sets, etc.), and/or other inputs or information. A non-human User 50 can utilize more suitable interfaces instead of, or in addition to, Human-machine Interface 23 and/or Display 21 for controlling Application Program 18, Object 180, Computing Device 70, and/or elements thereof. Examples of such interfaces include an application programming interface (API), bridge (i.e. bridge between applications, devices, or systems, etc.), driver, socket, direct or operative connection, handle, function/routine/subroutine, and/or other interfaces.

Object 180 comprises an object of Application Program 18. In some aspects, Object 180 includes an avatar. In other aspects, Object 180 includes a user-controllable object. In further aspects, Object 180 includes an object controlled by a system, program, and/or other mechanism for controlling or operating an object. As Application Program 18 may include any Application Program 18 such as a computer game, a virtual world, a web browser, a media application, a word processing application, a spreadsheet application, a database application, a GPS application, a forms-based application, a 2D application, a 3D application, an operating system, a factory automation application, a device control application, a vehicle control application, and/or others, various Objects 180 can be utilized in such Application Programs 18 examples of which include a text (i.e. character, word, sentence, etc.), a number, a picture, a form element (i.e. text field, radio button, push button, check box, etc.), a graphical user interface (GUI) element, a 2D shape (i.e. point, line, square, rectangle, circle, triangle, etc.), a 3D shape (i.e. cube, sphere, etc.), a 2D model, a 3D model, a data or database element, a spreadsheet element, a link, and/or others as applicable. In general, Object 180 comprises any object of Application Program 18. Object 180 may perform one or more operations within Application Program 18. In one example, an avatar Object 180 may perform operations including moving, maneuvering, jumping, running, shooting, and/or other operations within a game or virtual world Application Program 18. In another example, a character Object 180 may perform operations including appearing (i.e. when typed, etc.), disappearing (i.e. when deleted, etc.), formatting (i.e. bolding, italicizing, underlining, color changing, resizing, etc.), and/or other operations within a word processing Application Program 18. In another example, a picture Object 180 may perform operations including resizing, color adjusting, contrast adjusting, content manipulation, and/or other operations within a picture editing Application Program 18. While all possible variations of operations on/by/with Object 180 are too voluminous to list and limited only by Object's 180 and/or Application Program's 18 design, and/or user's utilization, any other operations on/by/with Object 180 can be implemented.

Renderer 91 comprises the functionality for rendering or generating one or more Digital Pictures 525, and/or other functionalities. Renderer 91 comprises the functionality for rendering or generating one or more Digital Pictures 525 of Application Program 18. In some aspects, as a camera is used to capture digital pictures depicting a physical environment, Renderer 91 can be used to render or generate Digital Pictures 525 depicting a computer modeled or represented environment. As such, Renderer 91 can be used to render or generate views of Application Program 18. In some designs, Renderer 91 can be used to render or generate one or more Digital Pictures 525 depicting a view of an Object's 180 visual surrounding in a 3D Application Program 18 (i.e. 3D computer game, virtual world application, CAD application, etc.). In one example, a view may include a first-person view or perspective such as a view through an avatar's eyes that shows objects around the avatar, but does not typically show the avatar itself. First-person view may sometimes include the avatar's hands, feet, other body parts, and/or objects that the avatar is holding. In another example, a view may include a third-person view or perspective such as a view that shows an avatar as well as objects around the avatar from an observer's point of view. In a further example, a view may include a view from a front of an avatar. In a further example, a view may include a view from a side of an avatar. In a further example, a view may include any stationary or movable view such as a view through a simulated camera in a 3D Application Program 18. In other designs, Renderer 91 can be used to render or generate one or more Digital Pictures 525 depicting a view of a 2D Application Program 18. In one example, a view may include a screenshot or portion thereof of a 2D Application Program 18. In a further example, a view may include an area of interest of a 2D Application Program 18. In a further example, a view may include a top-down view of a 2D Application Program 18. In a further example, a view may include a side-on view of a 2D Application Program 18. Any other view can be utilized in alternate designs. Any view utilized in a 3D Application Program 18 can similarly be utilized in a 2D Application Program 18 as applicable, and vice versa. In some implementations, Renderer 91 may include any graphics processing device, apparatus, system, or application that may render or generate one or more Digital Pictures 525 from a computer (i.e. 3D, 2D, etc.) model or representation. In some aspects, rendering, when used casually, may refer to rendering or generating one or more Digital Pictures 525 from a computer model or representation, providing the one or more Digital Pictures 525 to a display device, and/or displaying of the one or more Digital Pictures 525 on a display device. In some embodiments, Renderer 91 can be a program executing or operating on Processor 11. In one example, Renderer 91 can be provided in a rendering engine such as Direct3D, OpenGL, Mantle, and/or other programs or systems for rendering or processing 3D or 2D graphics. In other embodiments, Renderer 91 can be part of, embedded into, or built into Processor 11. In further embodiments, Renderer 91 can be a hardware element coupled to Processor 11 and/or other elements. In further embodiments, Renderer 91 can be a program or hardware element that is part of or embedded into another element. In one example, a graphics card and/or its graphics processing unit (i.e. GPU, etc.) may typically include Renderer 91. In another example, VSAOO Unit 100 may include Renderer 91. In a further example, Application Program 18 may include Renderer 91. In general, Renderer 91 can be implemented in any suitable configuration to provide its functionalities. Renderer 91 may render or generate one or more Digital Pictures 525 or streams of Digital Pictures 525 (i.e. motion pictures, video, etc.) in various formats examples of which include JPEG, GIF, TIFF, PNG, PDF, MPEG, AVI, FLV, MOV, RM, SWF, WMV, DivX, and/or others. In some designs, Renderer 91 can render or generate different Digital Pictures 525 of Object's 180 visual surrounding or of views of Application Program 18 for displaying on Display 21 and for facilitating learning functionalities herein. For example, a third-person view may be displayed on Display 21 for User 50 to see and a first-person view may be used to facilitate learning functionalities herein. In some implementations of non-graphical Application Programs 18 such as simulations, calculations, and/or others, Renderer 91 may render or generate one or more Digital Pictures 525 of Object's 180 visual surrounding or of views of Application Program 18 to facilitate learning functionalities herein where the one or more Digital Pictures 525 are never displayed. In some aspects, instead of or in addition to Renderer 91, one or more Digital Pictures 525 of Object's 180 visual surrounding or of views of Application Program 18 can be obtained from any element of a computing device or system that can provide Digital Pictures 525 of Object's 180 visual surrounding or of views of Application Program 18. Examples of such elements include a graphics circuit, a graphics system, a graphics driver, a graphics interface, and/or others.

VSAOO Unit 100 comprises any hardware, programs, or a combination thereof. VSAOO Unit 100 comprises the functionality for learning the operation of Object 180 in various visual surroundings. VSAOO Unit 100 comprises the functionality for structuring and/or storing this knowledge in a knowledgebase (i.e. neural network, graph, sequences, other repository, etc.). VSAOO Unit 100 comprises the functionality for enabling autonomous operation of Object 180 in various visual surroundings. VSAOO Unit 100 comprises the functionality for interfacing with or attaching to Application Program 18, Object 180, Processor 11, and/or other processing element. VSAOO Unit 100 comprises the functionality for obtaining instruction sets, data, and/or other information used, implemented, and/or executed by Application Program 18, Object 180, Processor 11, and/or other processing element. VSAOO Unit 100 comprises the functionality for modifying instruction sets, data, and/or other information used, implemented, and/or executed by Application Program 18, Object 180, Processor 11, and/or other processing element. VSAOO Unit 100 comprises the functionality for learning and/or implementing User's 50 knowledge, methodology, or style of operating Object 180 in various visual surroundings. VSAOO Unit 100 comprises learning, anticipating, decision making, automation, and/or other functionalities disclosed herein. Statistical, artificial intelligence, machine learning, and/or other models or techniques are utilized to implement the disclosed devices, systems, and methods.

When the disclosed VSAOO Unit 100 functionalities are applied on Application Program 18, Object 180, Processor 11, and/or other processing element, Object 180 may become autonomous. VSAOO Unit 100 may take control from, share control with, and/or release control to Application Program 18, Object 180, Processor 11, and/or other processing element to implement autonomous operation of Object 180. VSAOO Unit 100 may take control from, share control with, and/or release control to Application Program 18, Object 180, Processor 11, and/or other processing element automatically or after prompting User 50 to allow it. In some aspects, Application Program 18, Object 180, Processor 11, and/or other processing element may include or be provided with anticipatory instructions or instruction sets that User 50 did not issue or cause to be executed. Such anticipatory instructions or instruction sets include instruction sets that User 50 may want or is likely to issue or cause to be executed. Anticipatory instructions or instruction sets can be generated by VSAOO Unit 100 or elements thereof based on the visual surrounding of Object 180. As such, Application Program 18, Object 180, Processor 11, and/or other processing element may include or be provided with some or all original instructions or instruction sets and/or any anticipatory instructions or instruction sets generated by VSAOO Unit 100. Therefore, autonomous Object 180 operating may include executing some or all original instructions or instruction sets and/or any anticipatory instructions or instruction sets generated by VSAOO Unit 100. In one example, VSAOO Unit 100 can overwrite or rewrite the original instructions or instruction sets of Application Program 18, Object 180, Processor 11, and/or other processing element with VSAOO Unit 100-generated instructions or instruction sets. In another example, VSAOO Unit 100 can insert or embed VSAOO Unit 100-generated instructions or instruction sets among the original instructions or instruction sets of Application Program 18, Object 180, Processor 11, and/or other processing element. In a further example, VSAOO Unit 100 can branch, redirect, or jump to VSAOO Unit 100-generated instructions or instruction sets from the original instructions or instruction sets of Application Program 18, Object 180, Processor 11, and/or other processing element.

In some embodiments, autonomous Object 180 operating comprises determining, by VSAOO Unit 100, a next instruction or instruction set to be executed based on Object's 180 visual surrounding prior to the user issuing or causing to be executed the next instruction or instruction set. In yet other embodiments, autonomous Object 180 operating comprises determining, by VSAOO Unit 100, a next instruction or instruction set to be executed based on Object's 180 visual surrounding prior to the system receiving the next instruction or instruction set.

In some embodiments, autonomous Object 180 operating includes a partially or fully autonomous operating. In an example involving partially autonomous Object 180 operating, a user confirms VSAOO Unit 100-generated instructions or instruction sets prior to their execution. In an example involving fully autonomous application operating, VSAOO Unit 100-generated instructions or instruction sets are executed without user or other system confirmation (i.e. automatically, etc.).

In some embodiments, a combination of VSAOO Unit 100 and other systems and/or techniques can be utilized to implement Object's 180 operation. In one example, VSAOO Unit 100 may be a primary or preferred system for implementing Object's 180 operation. While operating autonomously under the control of VSAOO Unit 100, Object 180 may encounter a visual surrounding that has not been encountered or learned before. In such situations, User 50 and/or non-VSAOO system may take control of Object's 180 operation. VSAOO Unit 100 may take control again when Object 180 encounters a previously learned visual surrounding. Naturally, VSAOO Unit 100 can learn Object's 180 operation in visual surroundings while User 50 and/or non-VSAOO system is in control of Object 180, thereby reducing or eliminating the need for future involvement of User 50 and/or non-VSAOO system. In another example, User 50 and/or non-VSAOO system may be a primary or preferred system for control of Object's 180 operation. While operating under the control of User 50 and/or non-VSAOO system, User 50 and/or non-VSAOO system may release control to VSAOO Unit 100 for any reason (i.e. User 50 gets tired or distracted, non-VSAOO system gets stuck or cannot make a decision, etc.), at which point Object 180 can be controlled by VSAOO Unit 100. In some designs, VSAOO Unit 100 may take control in certain special visual surroundings where VSAOO Unit 100 may offer superior performance even though User 50 and/or non-VSAOO system may generally be preferred. Once Object 180 leaves such special visual surrounding, VSAOO Unit 100 may release control to User 50 and/or a non-VSAOO system. In general, VSAOO Unit 100 can take control from, share control with, or release control to User 50, non-VSAOO system, and/or other system or process at any time, under any circumstances, and remain in control for any period of time as needed.

In some embodiments, VSAOO Unit 100 may control one or more sub-elements of Object 180 while User 50 and/or non-VSAOO system may control other one or more sub-elements of Object 180.

It should be understood that a reference to autonomous operating of Object 180 may include autonomous operating of Application Program 18, Processor 11, Computing Device 70, and/or other processing element depending on context.

Acquisition Interface 120 comprises the functionality for obtaining or receiving instruction sets, data, and/or other information. Acquisition Interface 120 comprises the functionality for obtaining or receiving instruction sets, data, and/or other information from Application Program 18, Object 180, Processor 11, and/or other processing element. Acquisition Interface 120 comprises the functionality for obtaining or receiving instruction sets, data, and/or other information at runtime. In some aspects, an instruction set may include any computer command, instruction, signal, or input used in Application Program 18, Object 180, Processor 11, and/or other processing element. Therefore, the terms instruction set, command, instruction, signal, input, or other such terms may be used interchangeably herein depending on context. Acquisition Interface 120 also comprises the functionality for attaching to or interfacing with Application Program 18, Object 180, Processor 11, and/or other processing element. In one example, Acquisition Interface 120 comprises the functionality to access and/or read runtime engine/environment, virtual machine, operating system, compiler, just-in-time (JIT) compiler, interpreter, translator, execution stack, file, object, data structure, and/or other computing system elements. In another example, Acquisition Interface 120 comprises the functionality to access and/or read memory, storage, bus, interfaces, and/or other computing system elements. In a further example, Acquisition Interface 120 comprises the functionality to access and/or read Processor 11 registers and/or other Processor 11 elements. In a further example, Acquisition Interface 120 comprises the functionality to access and/or read inputs and/or outputs of Application Program 18, Object 180, Processor 11, and/or other processing element. In a further example, Acquisition Interface 120 comprises the functionality to access and/or read functions, methods, procedures, routines, subroutines, and/or other elements of Application Program 18 and/or Object 180. In a further example, Acquisition Interface 120 comprises the functionality to access and/or read source code, bytecode, compiled, interpreted, or otherwise translated code, machine code, and/or other code. In a further example, Acquisition Interface 120 comprises the functionality to access and/or read values, variables, parameters, and/or other data or information. Acquisition Interface 120 also comprises the functionality for transmitting the obtained instruction sets, data, and/or other information to Artificial Intelligence Unit 110 and/or other element. As such, Acquisition Interface 120 provides input into Artificial Intelligence Unit 110 for knowledge structuring, anticipating, decision making, and/or other functionalities later in the process. Acquisition Interface 120 also comprises other disclosed functionalities.

Acquisition Interface 120 can employ various techniques for obtaining instruction sets, data, and/or other information. In one example, Acquisition Interface 120 can attach to and/or obtain Application Program's 18, Object's 180, Processor's 11, and/or other processing element's instruction sets, data, and/or other information through tracing or profiling techniques. Tracing or profiling may be used for outputting Application Program's 18, Object's 180, Processor's 11, and/or other processing element's instruction sets, data, and/or other information at runtime. For instance, tracing or profiling may include adding trace code (i.e. instrumentation, etc.) to an application and/or outputting trace information to a specific target. The outputted trace information (i.e. instruction sets, data, and/or other information, etc.) can then be provided to or recorded into a file, data structure, repository, an application, and/or other system or target that may receive such trace information. As such, Acquisition Interface 120 can utilize tracing or profiling to obtain instruction sets, data, and/or other information and provide them as input into Artificial Intelligence Unit 110. In some aspects, instrumentation can be performed in source code, bytecode, compiled, interpreted, or otherwise translated code, machine code, and/or other code. In other aspects, instrumentation can be performed in various elements of a computing system such as memory, virtual machine, runtime engine/environment, operating system, compiler, interpreter, translator, processor registers, execution stack, program counter, and/or other elements. In yet other aspects, instrumentation can be performed in various abstraction layers of a computing system such as in software layer (i.e. Application Program 18, Object 180, etc.), in virtual machine (if VM is used), in operating system, in Processor 11, and/or in other layers or areas that may exist in a particular computing system implementation. In yet other aspects, instrumentation can be performed at various time periods in an application's execution such as source code write time, compile time, interpretation time, translation time, linking time, loading time, runtime, and/or other time periods. In yet other aspects, instrumentation can be performed at various granularities or code segments such as some or all lines of code, some or all statements, some or all instructions or instruction sets, some or all basic blocks, some or all functions/routines/subroutines, and/or some or all other code segments.

In some embodiments, Application Program 18 can be automatically instrumented. In one example, Acquisition Interface 120 can access Application Program's 18 source code, bytecode, or machine code and select instrumentation points of interest. Selecting instrumentation points may include finding locations in the source code, bytecode, or machine code corresponding to function calls, function entries, function exits, object creations, object destructions, event handler calls, new lines (i.e. to instrument all lines of code, etc.), thread creations, throws, and/or other points of interest. Instrumentation code can then be inserted at the instrumentation points of interest to output Application Program's 18 instruction sets, data, and/or other information. In response to executing instrumentation code, Application Program's 18 instruction sets, data, and/or other information may be received by Acquisition Interface 120. In some aspects, Application Program's 18 source code, bytecode, or machine code can be dynamically instrumented. For example, instrumentation code can be dynamically inserted into Application Program 18 at runtime.

In other embodiments, Application Program 18 can be manually instrumented. In one example, a programmer can instrument an object's function call by placing an instrumenting instruction immediately after the function call as in the following example.

Object1.moveLeft(51);
traceApplication('Object1.moveLeft(51);');

In another example, an instrumenting instruction can be placed immediately before the function call, or at the beginning, end, or anywhere within the function itself. A programmer may instrument all function calls or only function calls of interest. In a further example, a programmer can instrument all lines of code or only code lines of interest. In a further example, a programmer can instrument other elements utilized or implemented within Application Program 18 such as objects and/or any of their functions, data structures and/or any of their functions, event handlers and/or any of their functions, threads and/or any of their functions, and/or other elements or functions. Similar instrumentation as in the preceding examples can be performed automatically or dynamically. In some designs where manual code instrumentation is utilized, Acquisition Interface 120 can optionally be omitted and Application Program's 18 instruction sets, data, and/or other information may be transmitted directly to Artificial Intelligence Unit 110. Instrumentation and/or other techniques described with respect to Application Program 18 similarly apply to Object 180.

In some embodiments, VSAOO Unit 100 can be selective in learning instruction sets, data, and/or other information to those implemented, utilized, or related to an object, data structure, repository, thread, function, and/or other element of Application Program 18. In some aspects, Acquisition Interface 120 can obtain Application Program's 18 instruction sets, data, and/or other information implemented, utilized, or related to a certain object in an object oriented Application Program 18.

In some embodiments, various computing systems and/or platforms may provide native tools for obtaining instruction sets, data, and/or other information. Also, independent vendors may provide portable tools with similar functionalities that can be utilized across different computing systems and/or platforms. These native and portable tools may provide a wide range of functionalities to obtain runtime and other information such as instrumentation, tracing or profiling, logging application or system messages, outputting custom text messages, outputting objects or data structures, outputting functions/routines/subroutines or their invocations, outputting variable or parameter values, outputting thread or process behaviors, outputting call or other stacks, outputting processor registers, providing runtime memory access, providing inputs and/or outputs, performing live application monitoring, and/or other capabilities. One of ordinary skill in art will understand that, while all possible variations of the techniques to obtain instruction sets, data, and/or other information are too voluminous to describe, these techniques are within the scope of this disclosure.

In one example, obtaining instruction sets, data, and/or other information can be implemented through the .NET platform's native tools for application tracing or profiling such as System.Diagnostics.Trace, System.Diagnostics.Debug, and System.Diagnostics.TraceSource classes for tracing execution flow, and System. Diagnostics. Process, System.Diagnostics.EventLog, and System. Diagnostics. PerformanceCounter classes for profiling code, accessing local and remote processes, starting and stopping system processes, and interacting with Windows event logs, etc. For instance, a set of trace switches can be created that output an application's information. The switches can be configured using the .config file. For a Web application, this may typically be Web.config file associated with the project. In a Windows application, this file may typically be named applicationName.exe.config. Trace code can be added to application code automatically or manually as previously described. Appropriate listener can be created where the trace output is received. Trace code may output trace messages to a specific target such as a file, a log, a database, an object, a data structure, and/or other repository or system. Acquisition Interface 120 or Artificial Intelligence Unit 110 can then read or obtain the trace information from these targets. In some aspects, trace code may output trace messages directly to Acquisition Interface 120. In other aspects, trace code may output trace messages directly to Artificial Intelligence Unit 110. In the case of outputting trace messages to Acquisition Interface 120 or directly to Artificial Intelligence Unit 110, custom listeners can be built to accommodate these specific targets. Other platforms, tools, and/or techniques can provide equivalent or similar functionalities as the above described ones.

In another example, obtaining instruction sets, data, and/or other information can be implemented through the .NET platform's Profiling API that can be used to create a custom profiler application for tracing, monitoring, interfacing with, and/or managing a profiled application. The Profiling API provides an interface that includes methods to notify the profiler of events in the profiled application. The Profiling API may also provide an interface to enable the profiler to call back into the profiled application to obtain information about the state of the profiled application. The Profiling API may further provide call stack profiling functionalities. Call stack (also referred to as execution stack, control stack, runtime stack, machine stack, the stack, etc.) includes a data structure that can store information about active subroutines of an application. The Profiling API may provide a stack snapshot method, which enables a trace of the stack at a particular point in time. The Profiling API may also provide a shadow stack method, which tracks the call stack at every instant. A shadow stack can obtain function arguments, return values, and information about generic instantiations. A function such as FunctionEnter can be utilized to notify the profiler that control is being passed to a function and can provide information about the stack frame and function arguments. A function such as FunctionLeave can be utilized to notify the profiler that a function is about to return to the caller and can provide information about the stack frame and function return value. An alternative to call stack profiling includes call stack sampling in which the profiler can periodically examine the stack. In some aspects, the Profiling API enables the profiler to change the in-memory code stream for a routine before it is just-in-time (JIT) compiled where the profiler can dynamically add instrumentation code to all or particular routines of interest. Other platforms, tools, and/or techniques may provide equivalent or similar functionalities as the above described ones.

In a further example, obtaining instruction sets, data, and/or other information can be implemented through Java platform's APIs for application tracing or profiling such as Java Virtual Machine Profiling Interface (JVMPI), Java Virtual Machine Tool Interface (JVMTI), and/or other APIs or tools. These APIs can be used for instrumentation of an application, for notification of Java Virtual Machine (VM) events, and/or other functionalities. One of the tracing or profiling techniques that can be utilized includes bytecode instrumentation. The profiler can insert bytecodes into all or some of the classes. In application execution profiling, for example, these bytecodes may include methodEntry and methodExit calls. In memory profiling, for example, the bytecodes may be inserted after each new or after each constructor. In some aspects, insertion of instrumentation bytecode can be performed either by a post-compiler or a custom class loader. An alternative to bytecode instrumentation includes monitoring events generated by the JVMPI or JVMTI interfaces. Both APIs can generate events for method entry/exit, object allocation, and/or other events. In some aspects, JVMTI can be utilized for dynamic bytecode instrumentation where insertion of instrumentation bytecodes is performed at runtime. The profiler may insert the necessary instrumentation when a selected class is invoked in an application. This can be accomplished using the JVMTI's redefineClasses method, for example. This approach also enables changing of the level of profiling as the application is running. If needed, these changes can be made adaptively without restarting the application. Other platforms, tools, and/or techniques may provide equivalent or similar functionalities as the above described ones.

In a further example, obtaining instruction sets, data, and/or other information can be implemented through JVMTI's programming interface that enables creation of software agents that can monitor and control a Java application. An agent may use the functionality of the interface to register for notification of events as they occur in the application, and to query and control the application. A JVMTI agent may use JVMTI functions to extract information from a Java application. A JVMTI agent can be utilized to obtain an application's runtime information such as method calls, memory allocation, CPU utilization, lock contention, and/or other information. JVMTI may include functions to obtain information about variables, fields, methods, classes, and/or other information. JVMTI may also provide notification for numerous events such as method entry and exit, exception, field access and modification, thread start and end, and/or other events. Examples of JVMTI built-in methods include GetMethodName to obtain the name of an invoked method, GetThreadInfo to obtain information for a specific thread, GetClassSignature to obtain information about the class of an object, GetStackTrace to obtain information about the stack including information about stack frames, and/or other methods. Other platforms, tools, and/or techniques may provide equivalent or similar functionalities as the above described ones.

In a further example, obtaining instruction sets, data, and/or other information can be implemented through java.lang.Runtime class that provides an interface for application tracing or profiling. Examples of methods provided in java.lang.Runtime that can be used to obtain an application's instruction sets, data, and/or other information include tracemethodcalls, traceinstructions, and/or other methods. These methods prompt the Java Virtual Machine to output trace information for a method or instruction in the virtual machine as it is executed. The destination of trace output may be system dependent and include a file, a listener, and/or other destinations where Acquisition Interface 120, Artificial Intelligence Unit 110, and/or other disclosed elements can access needed information. In addition to tracing or profiling tools native to their respective computing systems and/or platforms, many independent tools exist that provide tracing or profiling functionalities on more than one computing system and/or platform. Examples of these tools include Pin, DynamoRIO, KernInst, DynInst, Kprobes, OpenPAT, DTrace, SystemTap, and/or others. Other platforms, tools, and/or techniques may provide equivalent or similar functionalities as the above described ones.

In a further example, obtaining instruction sets, data, and/or other information can be implemented through logging tools of the platform and/or operating system on which an application runs. Some logging tools may include nearly full feature sets of the tracing or profiling tools previously described. In one example, Visual Basic enables logging of runtime messages through its Microsoft.VisualBasic.Logging namespace that provides a log listener where the log listener may direct logging output to a file and/or other target. In another example, Java enables logging through its java.util.logging class. In some aspects, obtaining an application's instruction sets, data, and/or other information can be implemented through logging capabilities of the operating system on which an application runs. For example, Windows NT features centralized log service that applications and operating-system components can utilize to report their events including any messages. Windows NT provides functionalities for system, application, security, and/or other logging. An application log may include events logged by applications. Windows NT, for example, may include support for defining an event source (i.e. application that created the event, etc.). Windows Vista, for example, supports a structured XML log-format and designated log types to allow applications to more precisely log events and to help interpret the events. Examples of different types of event logs include administrative, operational, analytic, debug, and/or other log types including any of their subcategories. Examples of event attributes that can be utilized include eventID, level, task, opcode, keywords, and/or other event attributes. Windows wevtutil tool enables access to events, their structures, registered event publishers, and/or their configuration even before the events are fired. Wevtutil supports capabilities such as retrieval of the names of all logs on a computing device; retrieval of configuration information for a specific log; retrieval of event publishers on a computing device; reading events from an event log, from a log file, or using a structured query; exporting events from an event log, from a log file, or using a structured query to a specific target; and/or other capabilities. Operating system logs can be utilized solely if they contain sufficient information on an application's instruction sets, data, and/or other information. Alternatively, operating system logs can be utilized in combination with another source of information (i.e. trace information, call stack, processor registers, memory, etc.) to reconstruct the application's instruction sets, data, and/or other information needed for Artificial Intelligence Unit 110 and/or other elements. In addition to logging capabilities native to their respective platforms and/or operating systems, many independent tools exist that provide logging on different platforms and/or operating systems. Examples of these tools include Log4j, Logback, SmartInspect, NLog, log 4net, Microsoft Enterprise Library, ObjectGuy Framework, and/or others. Other platforms, tools, and/or techniques may provide equivalent or similar functionalities as the above described ones.

In a further example, obtaining instruction sets, data, and/or other information can be implemented through tracing or profiling the operating system on which an application runs. As in tracing or profiling an application, one of the techniques that can be utilized includes adding instrumentation code to the operating system's source code. Such instrumentation code can be added to the operating system's source code before kernel compilation or recompilation, for instance. This type of instrumentation may involve defining or finding locations in the operating system's source code where instrumentation code may be inserted. Kernel instrumentation can also be performed without the need for kernel recompilation or rebooting. In some aspects, instrumentation code can be added at locations of interest through binary rewriting of compiled kernel code. In other aspects, kernel instrumentation can be performed dynamically where instrumentation code is added and/or removed where needed at runtime. For instance, dynamic instrumentation may overwrite kernel code with a branch instruction that redirects execution to instrumentation code or instrumentation routine. In yet other aspects, kernel instrumentation can be performed using just-in-time (JIT) dynamic instrumentation where execution may be redirected to a copy of kernel's code segment that includes instrumentation code. This type of instrumentation may include a JIT compiler and creation of a copy of the original code segment having instrumentation code or calls to instrumentation routines embedded into the original code segment. Instrumentation of the operating system may enable total system visibility including visibility into an application's behavior by enabling generation of low level trace information. Other platforms, tools, and/or techniques may provide equivalent or similar functionalities as the above described ones.

In a further example, obtaining instruction sets, data, and/or other information can be implemented through tracing or profiling the processor on which an application runs. For example, some Intel processors provide Intel Processor Trace (i.e. Intel PT, etc.), a low-level tracing feature that enables recording executed instruction sets, and/or other data or information of one or more applications. Intel PT is facilitated by the Processor Trace Decoder Library along with its related tools. Intel PT is a low-overhead execution tracing feature that records information about application execution on each hardware thread using dedicated hardware facilities. The recorded execution/trace information is collected in data packets that can be buffered internally before being sent to a memory subsystem or another system or element (i.e. Acquisition Interface 120, Artificial Intelligence Unit 110, etc.). Intel PT also enables navigating the recorded execution/trace information via reverse stepping commands. Intel PT can be included in an operating system's core files and provided as a feature of the operating system. Intel PT can trace globally some or all applications running on an operating system. Acquisition Interface 120 or Artificial Intelligence Unit 110 can read or obtain the recorded execution/trace information from Intel PT. Other platforms, tools, and/or techniques may provide equivalent or similar functionalities as the above described ones.

In a further example, obtaining instruction sets, data, and/or other information can be implemented through branch tracing or profiling. Branch tracing may include an abbreviated instruction trace in which only the successful branch instruction sets are traced or recorded. Branch tracing can be implemented through utilizing dedicated processor commands, for example. Executed branches may be saved into special branch trace store area of memory. With the availability and reference to a compiler listing of the application together with branch trace information, a full path of executed instruction sets can be reconstructed. The full path can also be reconstructed with a memory dump (containing the program storage) and branch trace information. In some aspects, branch tracing can be utilized for pre-learning or automated learning of an application's instruction sets, data, and/or other information where a number of application simulations (i.e. simulations of likely/common operations, etc.) are performed. As such, the application's operation can be learned automatically saving the time that would be needed to learn the application's operation directed by a user. Other platforms, tools, and/or techniques may provide equivalent or similar functionalities as the above described ones.

In a further example, obtaining instruction sets, data, and/or other information can be implemented through assembly language. Assembly language is a low-level programming language for a computer or other programmable device in which there is a strong correlation between the language and the architecture's machine instruction sets. Syntax, addressing modes, operands, and/or other elements of an assembly language instruction set may translate directly into numeric (i.e. binary, etc.) representations of that particular instruction set. Because of this direct relationship with the architecture's machine instruction sets, assembly language can be a powerful tool for tracing or profiling an application's execution in processor registers, memory, and/or other computing system components. For example, using assembly language, memory locations of a loaded application can be accessed, instrumented, and/or otherwise manipulated. In some aspects, assembly language can be used to rewrite or overwrite original in-memory instruction sets of an application with instrumentation instruction sets. In other aspects, assembly language can be used to redirect application's execution to instrumentation routine/subroutine or other code segment elsewhere in memory by inserting a jump into the application's in-memory code, by redirecting program counter, or by other techniques. Some operating systems may implement protection from changes to applications loaded into memory. Operating system, processor, or other low level commands such as Linux mprotect command or similar commands in other operating systems may be used to unprotect the protected locations in memory before the change. In yet other aspects, assembly language can be used to obtain instruction sets, data, and/or other information through accessing and/or reading instruction register, program counter, other processor registers, memory locations, and/or other components of a computing system. In yet other aspects, high-level programming languages may call or execute an external assembly language program to facilitate obtaining instruction sets, data, and/or other information as previously described. In yet other aspects, relatively low-level programming languages such as C may allow embedding assembly language directly in their source code such as, for example, using asm keyword of C. Other platforms, tools, and/or techniques may provide equivalent or similar functionalities as the above described ones.

In a further example, it may be sufficient to obtain user or other inputs, variables, parameters, and/or other data in some procedural, simple object oriented, or other applications. In one instance, a simple procedural application executes a sequence of instruction sets until the end of the program. During its execution, the application may receive user or other input, store the input in a variable, and perform calculations using the variable to reach a result. The value of the variable can be obtained or traced. In another instance, a more complex procedural application comprises one or more functions/routines/subroutines each of which may include a sequence of instruction sets. The application may execute a main sequence of instruction sets with a branch to a function/routine/subroutine. During its execution, the application may receive user or other input, store the input in a variable, and pass the variable as a parameter to the function/routine/subroutine. The function/routine/subroutine may perform calculations using the parameter and return a value that the rest of the application can use to reach a result. The value of the variable or parameter passed to the function/routine/subroutine, and/or return value can be obtained or traced. Values of user or other inputs, variables, parameters, and/or other items of interest can be obtained through previously described tracing, instrumentation, and/or other techniques. Other platforms, tools, and/or techniques may provide equivalent or similar functionalities as the above described ones.

Figure 3:
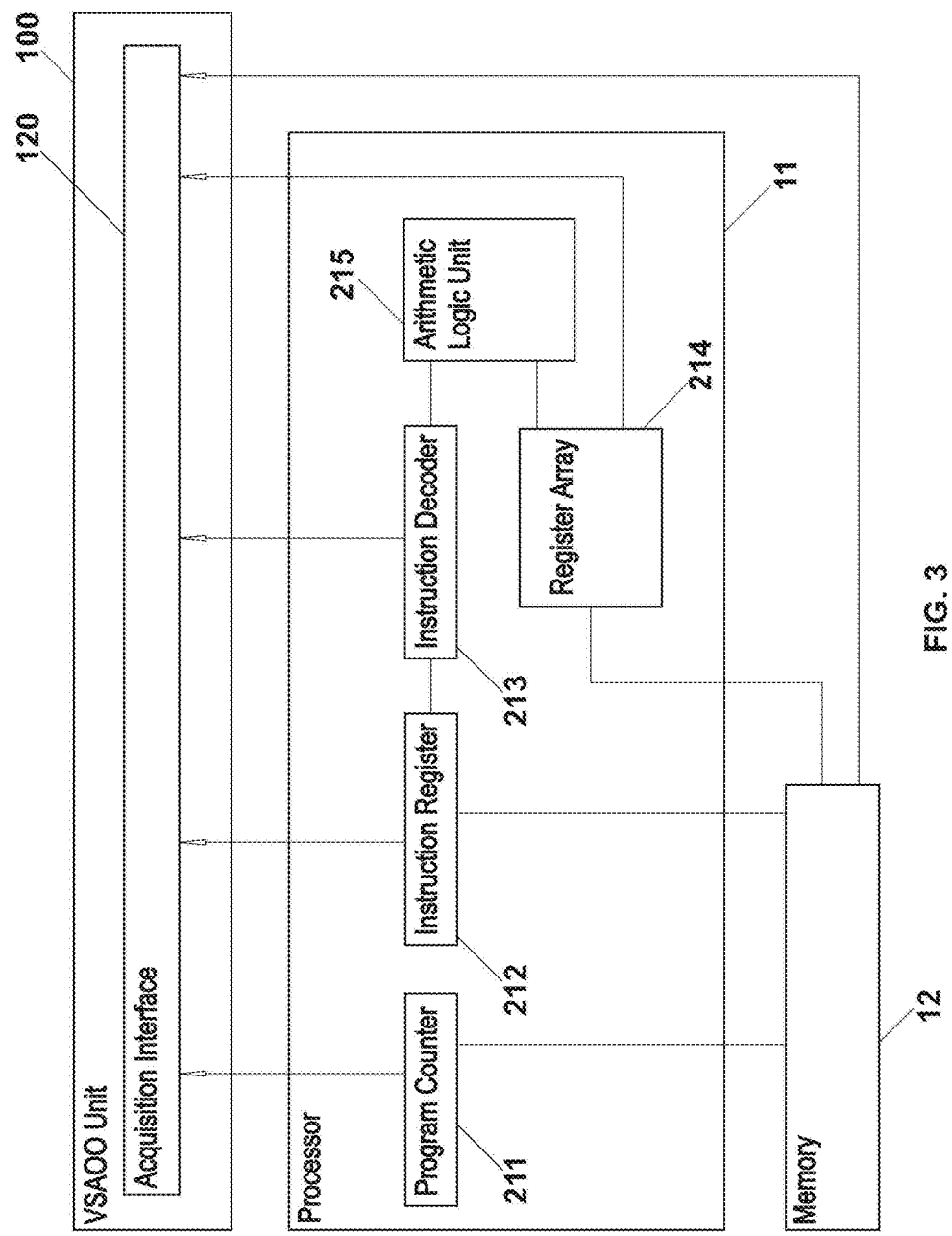
FIG. 3 illustrates some embodiments of obtaining instruction sets, data, and/or other information through tracing, profiling, or sampling of Processor 11 registers, memory, or other computing system components.

Referring to FIG. 3, in yet another example, obtaining instruction sets, data, and/or other information may be implemented through tracing, profiling, or sampling of instruction sets or data in processor registers, memory, or other computing system components where instruction sets, data, and/or other information may be stored or utilized. For example, Instruction Register 212 may be part of Processor 11 and it may store the instruction set currently being executed or decoded. In some processors, Program Counter 211 (also referred to as instruction pointer, instruction address register, instruction counter, or part of instruction sequencer) may be incremented after fetching an instruction set, and it may hold or point to the memory address of the next instruction set to be executed. In a processor where the incrementation precedes the fetch, Program Counter 211 may point to the current instruction set being executed. In the instruction cycle, an instruction set may be loaded into Instruction Register 212 after Processor 11 fetches it from location in Memory 12 pointed to by Program Counter 211. Instruction Register 212 may hold the instruction set while it is decoded by Instruction Decoder 213, prepared, and executed. In some aspects, data (i.e. operands, etc.) needed for instruction set execution may be loaded from Memory 12 into a register within Register Array 214. In other aspects, the data may be loaded directly into Arithmetic Logic Unit 215. For instance, as instruction sets pass through Instruction Register 212 during application execution, they may be transmitted to Acquisition Interface 120 as shown. Examples of the steps in execution of a machine instruction set may include decoding the opcode (i.e. portion of a machine instruction set that may specify the operation to be performed), determining where the operands may be located (depending on architecture, operands may be in registers, the stack, memory, I/O ports, etc.), retrieving the operands, allocating processor resources to execute the instruction set (needed in some types of processors), performing the operation indicated by the instruction set, saving the results of execution, and/or other execution steps. Examples of the types of machine instruction sets that can be utilized include arithmetic, data handling, logical, program control, as well as special and/or other instruction set types. In addition to the ones described or shown, examples of other computing system or processor components that can be used during an instruction cycle include memory address register (MAR) that may hold the address of a memory block to be read from or written to; memory data register (MDR) that may hold data fetched from memory or data waiting to be stored in memory; data registers that may hold numeric values, characters, small bit arrays, or other data; address registers that may hold addresses used by instruction sets that indirectly access memory; general purpose registers (GPRs) that may store both data and addresses; conditional registers that may hold truth values often used to determine whether some instruction set should or should not be executed; floating point registers (FPRs) that may store floating point numbers; constant registers that may hold read-only values such as zero, one, or pi; special purpose registers (SPRs) such as status register, program counter, or stack pointer that may hold information on program state; machine-specific registers that may store data and settings related to a particular processor; Register Array 214 that may include an array of any number of processor registers; Arithmetic Logic Unit 215 that may perform arithmetic and logic operations; control unit that may direct processor's operation; and/or other circuits or components. Tracing, profiling, or sampling of processor registers, memory, or other computing system components can be implemented in a program, combination of hardware and program, or purely hardware system. Dedicated hardware may be built to perform tracing, profiling, or sampling of processor registers or any computing system components with marginal or no impact to computing overhead.

One of ordinary skill in art will recognize that FIG. 3 depicts one of many implementations of processor or computing system components, and that various additional components can be included, or some of the disclosed ones can be excluded, or a combination thereof can be utilized in alternate implementations. Processor or computing system components may be arranged or connected differently in alternate implementations. Processor or computing system components may also be connected with external elements using various connections. For instance, the connection between Instruction Register 212 and Acquisition Interface 120 may include any number or types of connections such as, for example, a dedicated connection for each bit of Instruction Register 212 (i.e. 32 connections for a 32 bit Instruction Register 212, etc.). Any of the described or other connections or interfaces may be implemented among any processor or computing system components and Acquisition Interface 120 or other elements.

Other additional techniques or elements may be utilized as needed for obtaining instruction sets, data, and/or other information, or some of the disclosed techniques or elements may be excluded, or a combination thereof may be utilized in alternate embodiments.

Referring to FIGS. 4A-4E, some embodiments of Instruction Sets 526 are illustrated. In some aspects, Instruction Set 526 includes one or more instructions or commands of Application Program 18. For example, Instruction Set 526 may include one or more instructions or commands of a high-level programming language such as Java or SQL, a low-level language such as assembly or machine language, an intermediate language or construct such as bytecode, and/or any other language or construct. In other aspects, Instruction Set 526 includes one or more instructions or commands related to Object 180. For example, Instruction Set 526 may include one or more instructions or commands for operating Object 180. In further aspects, Instruction Set 526 includes one or more inputs into and/or outputs from Processor 11, Application Program 18, Object 180, and/or other processing element. In further aspects, Instruction Set 526 includes one or more values or states of registers and/or other components of Processor 11, and/or other processing element. In general, Instruction Set 526 may include one or more instructions, commands, keywords, symbols (i.e. parentheses, brackets, commas, semicolons, etc.), operators (i.e. =, <, >, etc.), variables, values, objects, data structures, functions (i.e. Function1( ), FIRST( ), MIN( ), SQRT( ), etc.), parameters, states, signals, inputs, outputs, characters, digits, references thereto, and/or other elements.

Figure 4A:
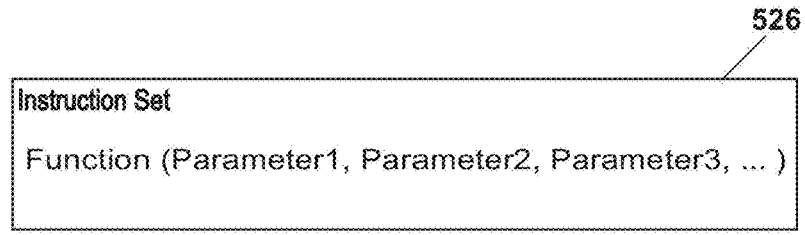
FIGS. 4A-4E illustrate some embodiments of Instruction Sets 526.
Figure 4B:
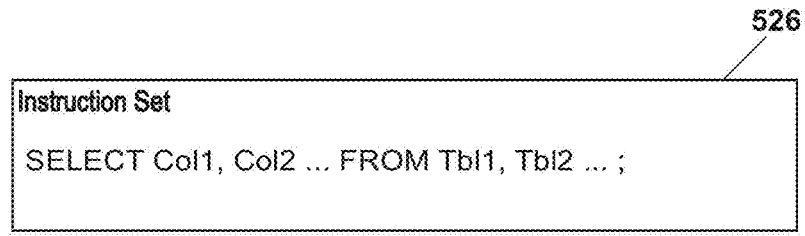
Figure 4C:
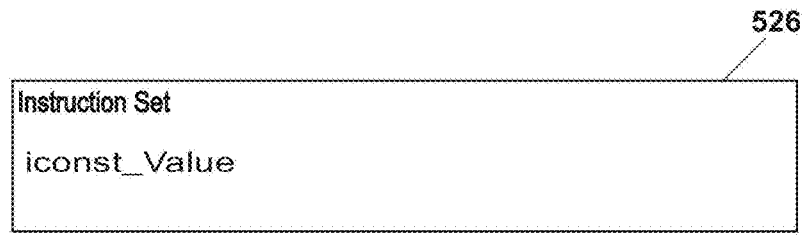
Figure 4D:
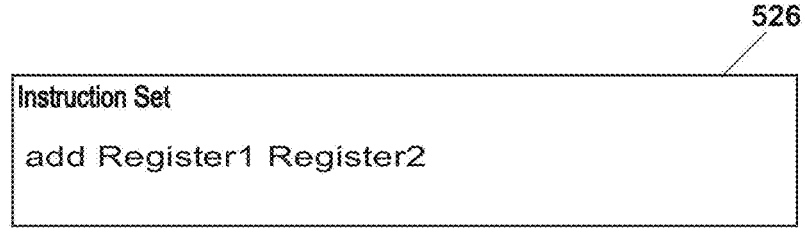
Figure 4E:
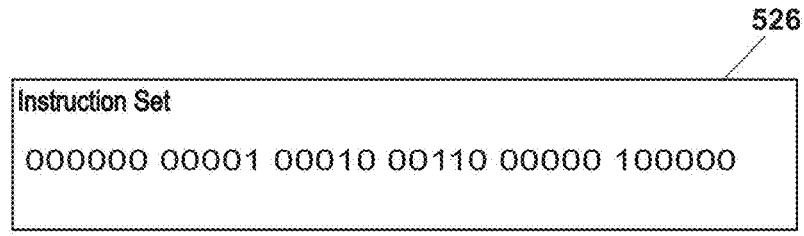

In an embodiment shown in FIG. 4A, Instruction Set 526 includes code of a high-level programming language (i.e. Java, C++, etc.) comprising the following function call construct: Function1 (Parameter1, Parameter2, Parameter3, . . . ). An example of a function call applying the above construct includes the following Instruction Set 526: moveTo(Object1, 11, 30). The function or reference thereto "moveTo(Object1, 11, 30)" may be an Instruction Set 526 directing Object1 to move to a location with coordinates 11 and 30, for example. In another embodiment shown in FIG. 4B, Instruction Set 526 includes structured query language (SQL). In a further embodiment shown in FIG. 4C, Instruction Set 526 includes bytecode (i.e. Java bytecode, Python bytecode, CLR bytecode, etc.). In a further embodiment shown in FIG. 4D, Instruction Set 526 includes assembly code. In a further embodiment shown in FIG. 4E, Instruction Set 526 includes machine code.

Figure 5A:
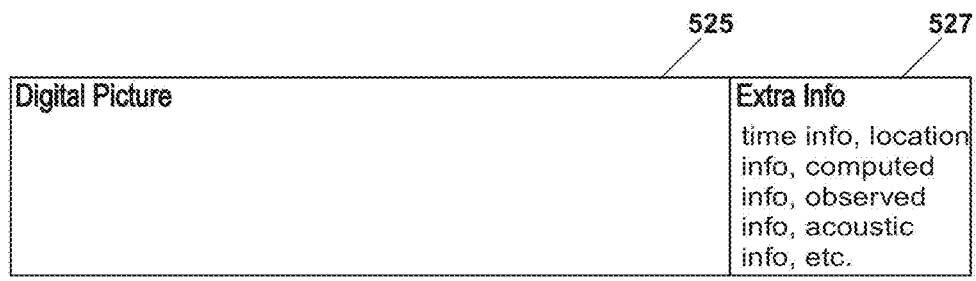
FIGS. 5A-5B illustrate some embodiments of Extra Information 527.
Figure 5B:
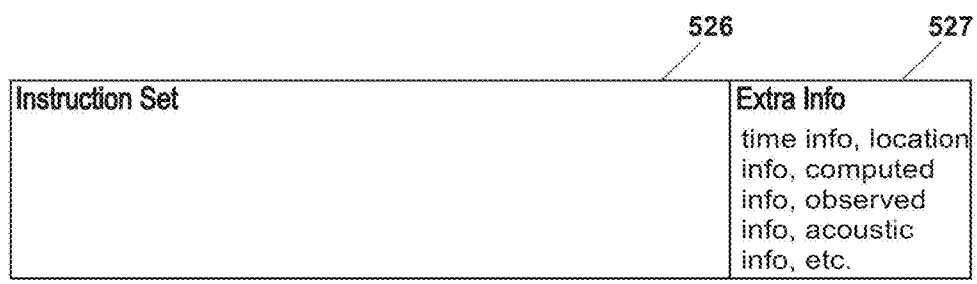

Referring to FIGS. 5A-5B, some embodiments of Extra Information 527 (also referred to as Extra Info 527) are illustrated. In an embodiment shown in FIG. 5A, Digital Picture 525 may include or be associated with Extra Info

527. In an embodiment shown in FIG. 5B, Instruction Set 526 may include or be associated with Extra Info 527.

Extra Info 527 comprises the functionality for storing any information useful in comparisons or decision making performed in autonomous Object 180 operation, and/or other functionalities. One or more Extra Infos 527 can be stored in, appended to, or associated with a Digital Picture 525, Instruction Set 526, and/or other element. In some embodiments, the system can obtain Extra Info 527 at a time of rendering or receiving of Digital Picture 525. In other embodiments, the system can obtain Extra Info 527 at a time of acquisition of Instruction Set 526. In general, the system or any element thereof can obtain Extra Info 527 at any time. Examples of Extra Info 527 include time information, location information, computed information, observed information, acoustic information, contextual information, and/or other information. Any information can be utilized that can provide information for enhanced comparisons or decision making performed in autonomous Object 180 operation. Which information is utilized and/or stored in Extra Info 527 can be set by a user, by VSAOO system administrator, or automatically by the system. Extra Info 527 may include or be referred to as contextual information, and vice versa. Therefore, these terms may be used interchangeably herein depending on context.

In some aspects, time information (i.e. time stamp, etc.) can be utilized and/or stored in Extra Info 527. Time information can be useful in comparisons or decision making performed in autonomous Object 180 operation related to a specific time period. For example, Extra Info 527 may include time information related to when Object 180 performed an operation. Time information can be obtained from the system clock, online clock, oscillator, or other time source. In other aspects, location information (i.e. coordinates, etc.) can be utilized and/or stored in Extra Info 527. Location information can be useful in comparisons or decision making performed in autonomous Object 180 operation related to a specific place. For example, Extra Info 527 may include location information related to where Object 180 performed an operation. Location information can be obtained from Application Program's 18 engine (i.e. game engine in which the game is implemented, etc.), runtime environment, functions for providing location information on objects, and/or others. For example, location (i.e. coordinates, vector-defined position, absolute or relative position, etc.) of Object 180 in a 3D engine or environment can be obtained by utilizing a function such as GameObject.Find ("ObjectN").transform.position in Unity 3D Engine, GetActorLocation( ) in Unreal Engine, getPosition( ) in Torque 3D, and/or other similar function or method in other 2D and 3D engines or environments. Furthermore, location (i.e. coordinates, etc.) of Object 180 on a screen can be obtained by utilizing WorldToScreen( ) or similar function or method in various 2D or 3D engines or environments. In further aspects, computed information can be utilized and/or stored in Extra Info 527. Computed information can be useful in comparisons or decision making performed in autonomous Object 180 operation where information can be calculated, inferred, or derived from other available information. VSAOO Unit 100 may include computational functionalities to create Extra Info 527 by performing calculations or inferences using other information. In one example, Object's 180 speed can be computed or estimated from the Object's 180 location and/or time information. In another example, Object's 180 bearing (i.e. angle or direction of movement, etc.) can be computed or estimated from the Object's 180 location information by utilizing Pythagorean theorem, trigonometry, and/or other theorems, formulas, or disciplines. In a further example, speeds, bearings, distances, and/or other properties of objects around Object 180 can similarly be computed or inferred, thereby providing geospatial and situational awareness and/or capabilities to Object 180. In further aspects, observed information can be utilized and/or stored in Extra Info 527. Observed information can be useful in comparisons or decision making performed in autonomous Object 180 operation related to a specific object or environment. For example, an object or environment can be recognized by processing one or more Digital Pictures 525 from Renderer 91. Any features, functionalities, and embodiments of Picture Recognizer 350 (later described) can be utilized for such recognizing. For example, trees recognized in the background of one or more Digital Pictures 525 from Renderer 91 may indicate a park or forest. In further aspects, acoustic information can be utilized and/or stored in Extra Info 527. Acoustic information can be useful in comparisons or decision making performed in autonomous Object 180 operation related to a specific sound or accosting environment. For example, an object or environment can be recognized by processing digital sound from a sound processing system (not shown), sound processor, sound program, or other sound provider. Any features, functionalities, and embodiments of a speech or sound recognizer (not shown) known in art can be utilized for such recognizing. For example, sound of a horn recognized in digital sound of Object's 180 acoustic surrounding may indicate a proximal vehicle. In some designs where acoustic information includes one or more digital sound samples of Object's 180 acoustic surrounding, the digital sound samples can be learned and/or used similar to Digital Pictures 525 of Object's 180 visual surrounding. In such designs, both Digital Pictures 525 and digital sound samples of Object's 180 surrounding can be learned and/or used for autonomous Object 180 operation. In further aspects, other information can be utilized and/or stored in Extra Info 527. Examples of such other information include user specific information (i.e. skill level, age, gender, etc.), group user information (i.e. access level, etc.), version of Application Program 18, the type of Application Program 18, the type of Object 180, the name of Object 180, the allegiance of Object 180, the type of Processor 11, the type of Computing Device 70, and/or other information all of which can be obtained from various devices, systems, repositories, functions, or elements of Computing Device 70, Processor 11, Application Program 18, Object 18, and/or other processing elements.

Figure 6:
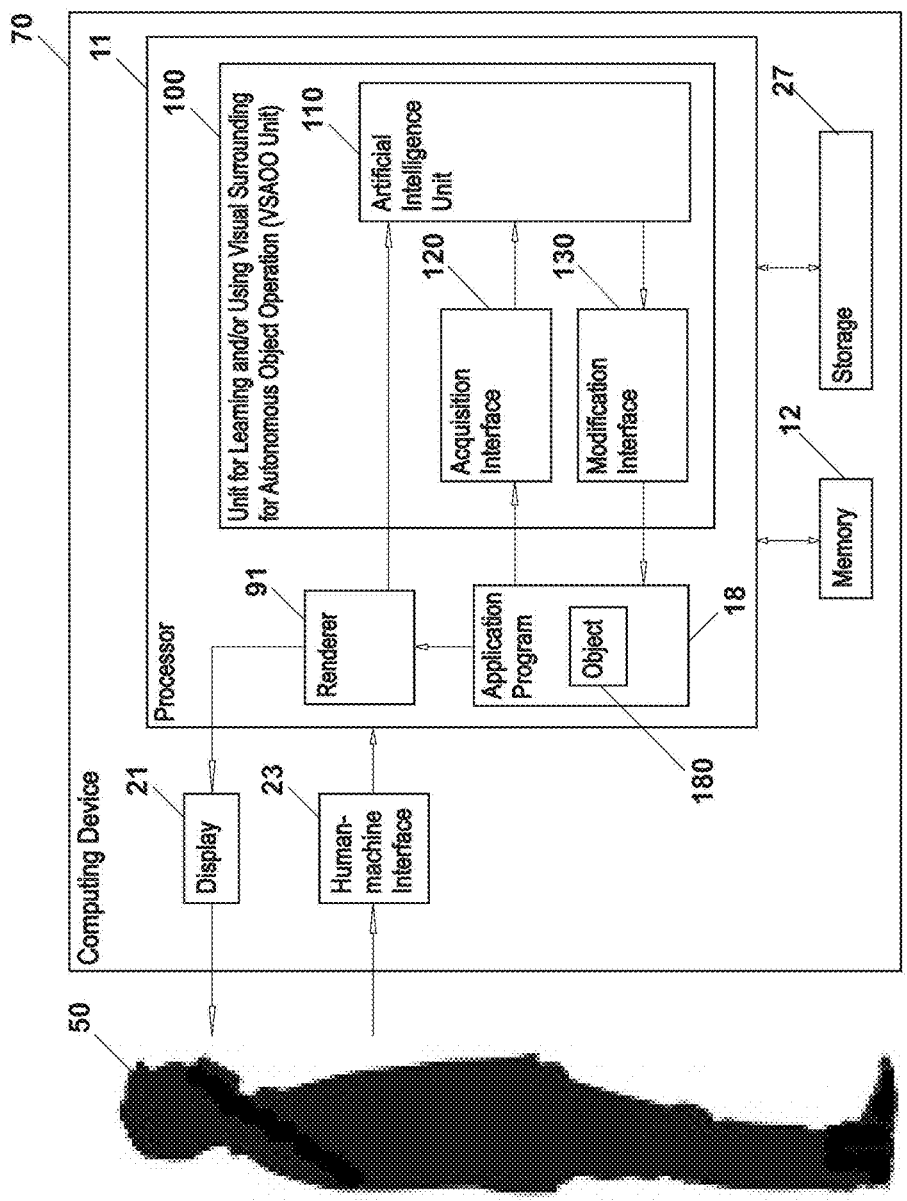
FIG. 6 illustrates an embodiment where VSAOO Unit 100 is part of or operating on Processor 11.

Referring to FIG. 6, an embodiment where VSAOO Unit 100 is part of or operating on Processor 11 is illustrated. In one example, VSAOO Unit 100 may be a hardware element or circuit embedded or built into Processor 11. In another example, VSAOO Unit 100 may be a program operating on Processor 11.

Figure 7:
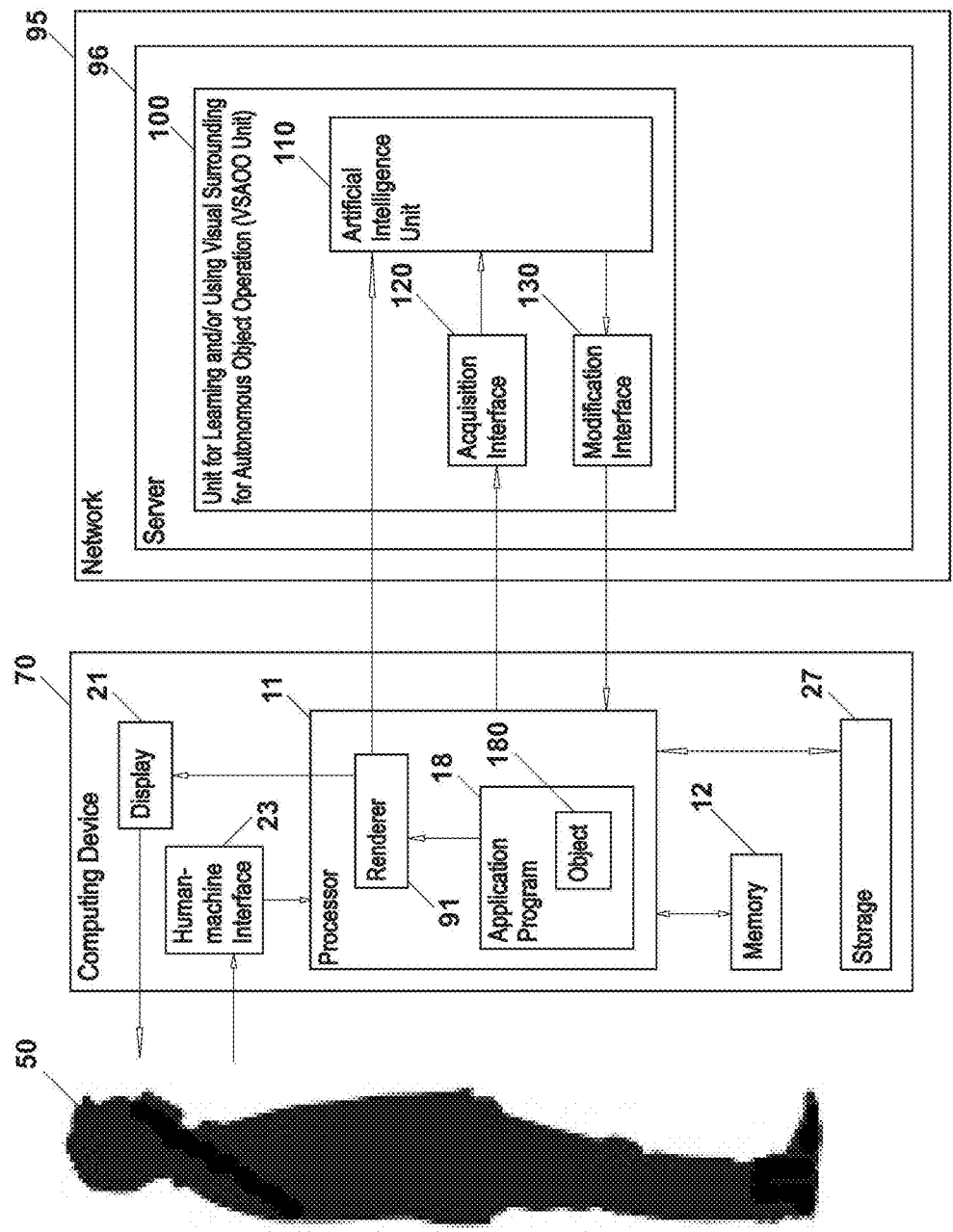
FIG. 7 illustrates an embodiment where VSAOO Unit 100 resides on Server 96 accessible over Network 95.

Referring to FIG. 7, an embodiment where VSAOO Unit 100 resides on Server 96 accessible over Network 95 is illustrated. Any number of Computing Devices 70, Processors 11, Application Programs 18, and/or other elements may connect to such remote VSAOO Unit 100 and the remote VSAOO Unit 100 may learn operations of their Objects 180 in various visual surroundings. In turn, any number of Computing Devices 70, Processors 11, Application Programs 18, and/or other elements can utilize the remote VSAOO Unit 100 for autonomous operation of their Objects 180. A remote VSAOO Unit 100 can be offered as a network service (i.e. online application, etc.). In some aspects, a remote VSAOO Unit 100 (i.e. global VSAOO Unit 100, etc.) may reside on the Internet and be available to all the world's Computing Devices 70, Processors 11, Application Programs 18, and/or other elements configured to transmit operations of their Objects 180 in various visual surroundings and/or configured to utilize the remote VSAOO Unit 100 for autonomous operation of their Objects 180. For example, multiple players (i.e. Users 50, etc.) may play a computer game (i.e. Application Program 18, etc.) running on their respective Computing Devices 70 where the Computing Devices 70 and/or elements thereof may be configured to transmit operations of computer game's Object 180 in various visual surroundings to a remote VSAOO Unit 100. Such remote VSAOO Unit 100 enables learning of the players' collective knowledge of operating Object 180 in various visual surroundings. Server 96 may be or include any type or form of a remote computing device such as an application server, a network service server, a cloud server, a cloud, and/or other remote computing device. Server 96 may include any features, functionalities, and embodiments of the previously described Computing Device 70. It should be understood that Server 96 does not have to be a separate computing device and that Server 96, its elements, or its functionalities can be implemented on Computing Device 70. Network 95 may include various networks, connection types, protocols, interfaces, APIs, and/or other elements or techniques known in art all of which are within the scope of this disclosure. Any of the previously described networks, network or connection types, networking interfaces, and/or other networking elements or techniques can similarly be utilized. Any of the disclosed elements may reside on Server 96 in alternate implementations. In one example, Artificial Intelligence Unit 110 can reside on Server 96 and Acquisition Interface 120 and/or Modification Interface 130 can reside on Computing Device 70. In another example, Knowledgebase 530 (later described) can reside on Server 96 and the rest of the elements of VSAOO Unit 100 can reside on Computing Device 70. Any other combination of local and remote elements can be implemented.

Figure 8:
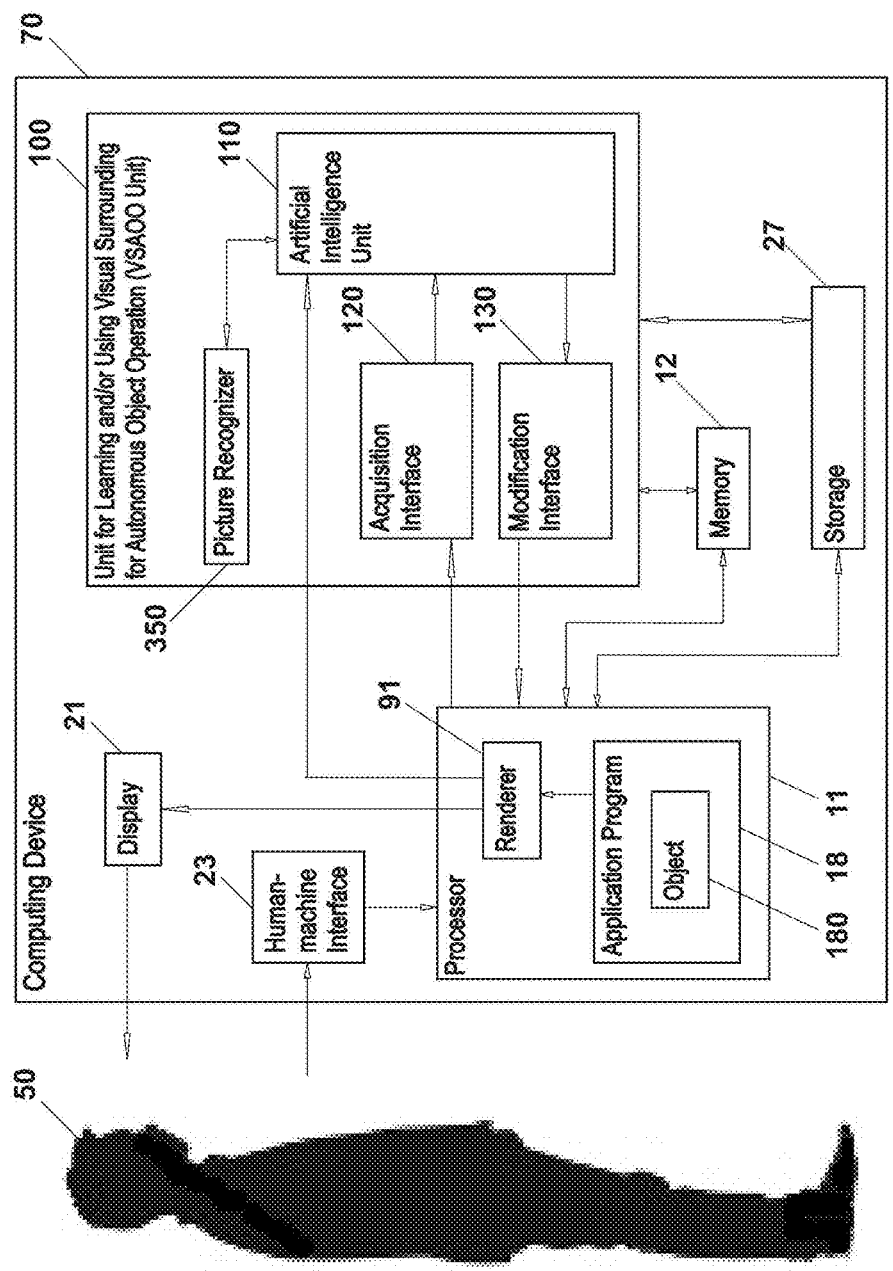
FIG. 8 illustrates an embodiment of VSAOO Unit 100 comprising Picture Recognizer 350.

Referring to FIG. 8, an embodiment of VSAOO Unit 100 comprising Picture Recognizer 350 is illustrated. VSAOO Unit 100 can utilize Picture Recognizer 350 to detect or recognize persons, objects, and/or their activities in one or more digital pictures from Renderer 91. In general, VSAOO Unit 100 and/or other disclosed elements can use Picture Recognizer 350 for any operation supported by Picture Recognizer 350. Picture Recognizer 350 comprises the functionality for detecting or recognizing persons or objects in visual data. Picture Recognizer 350 comprises the functionality for detecting or recognizing activities in visual data. Picture Recognizer 350 comprises the functionality for tracking persons, objects, and/or their activities in visual data. Picture Recognizer 350 comprises other disclosed functionalities. Visual data includes digital motion pictures, digital still pictures (i.e. bitmaps, etc.), and/or other visual data. Examples of file formats that can be utilized to store visual data include AVI, DivX, MPEG, JPEG, GIF, TIFF, PNG, PDF, and/or other file formats. Picture Recognizer 350 may detect or recognize a person and/or his/her activities as well as track the person and/or his/her activities in one or more digital pictures or streams of digital pictures (i.e. motion pictures, video, etc.). Picture Recognizer 350 may detect or recognize a human head or face, upper body, full body, or portions/combinations thereof. In some aspects, Picture Recognizer 350 may detect or recognize persons, objects, and/or their activities from a digital picture by comparing regions of pixels from the digital picture with collections of pixels comprising known persons, objects, and/or their activities. The collections of pixels comprising known persons, objects, and/or their activities can be learned or manually, programmatically, or otherwise defined. The collections of pixels comprising known persons, objects, and/or their activities can be stored in any data structure or repository (i.e. one or more files, database, etc.) that resides locally on Computing Device 70, or remotely on a remote computing device (i.e. server, cloud, etc.) accessible over a network. In other aspects, Picture Recognizer 350 may detect or recognize persons, objects, and/or their activities from a digital picture by comparing features (i.e. lines, edges, ridges, corners, blobs, regions, etc.) of the digital picture with features of known persons, objects, and/or their activities. The features of known persons, objects, and/or their activities can be learned or manually, programmatically, or otherwise defined. The features of known persons, objects, and/or their activities can be stored in any data structure or repository (i.e. neural network, one or more files, database, etc.) that resides locally on Computing Device 70, or remotely on a remote computing device (i.e. server, cloud, etc.) accessible over a network. Typical steps or elements in a feature oriented picture recognition include pre-processing, feature extraction, detection/segmentation, decision-making, and/or others, or a combination thereof, each of which may include its own sub-steps or sub-elements depending on the application. In further aspects, Picture Recognizer 350 may detect or recognize multiple persons, objects, and/or their activities from a digital picture using the aforementioned pixel or feature comparisons, and/or other detection or recognition techniques. For example, a picture may depict two persons in two of its regions both of whom Picture Recognizer 350 can detect simultaneously. In further aspects, where persons, objects, and/or their activities span multiple pictures, Picture Recognizer 350 may detect or recognize persons, objects, and/or their activities by applying the aforementioned pixel or feature comparisons and/or other detection or recognition techniques over a stream of digital pictures (i.e. motion picture, video, etc.). For example, once a person is detected in a digital picture (i.e. frame, etc.) of a stream of digital pictures (i.e. motion picture, video, etc.), the region of pixels comprising the detected person or the person's features can be searched in other pictures of the stream of digital pictures, thereby tracking the person through the stream of digital pictures. In further aspects, Picture Recognizer 350 may detect or recognize a person's activities by identifying and/or analyzing differences between a detected region of pixels of one picture (i.e. frame, etc.) and detected regions of pixels of other pictures in a stream of digital pictures. For example, a region of pixels comprising a person's face can be detected in multiple consecutive pictures of a stream of digital pictures (i.e. motion picture, video, etc.). Differences among the detected regions of the consecutive pictures may be identified in the mouth part of the person's face to indicate smiling or speaking activity. Any technique for recognizing speech from mouth/lip movements can be used in this and other examples. In further aspects, Picture Recognizer 350 may detect or recognize persons, objects, and/or their activities using one or more artificial neural networks, which may include statistical techniques. Examples of artificial neural networks that can be used in Picture Recognizer 350 include convolutional neural networks (CNNs), time delay neural networks (TDNNs), deep neural networks, and/or others. In one example, picture recognition techniques and/or tools involving convolutional neural networks may include identifying and/or analyzing tiled and/or overlapping regions or features of a digital picture, which may then be used to search for pictures with matching regions or features. In another example, features of different convolutional neural networks responsible for spatial and temporal streams can be fused to detect persons, objects, and/or their activities in streams of digital pictures (i.e. motion pictures, videos, etc.). In general, Picture Recognizer 350 may include any machine learning, deep learning, and/or other artificial intelligence techniques. Any other techniques known in art can be utilized in Picture Recognizer 350. For example, thresholds for similarity, statistical, and/or optimization techniques can be utilized to determine a match in any of the above-described detection or recognition techniques. Picture Recognizer 350 comprises any features, functionalities, and embodiments of Similarity Comparison 125 (later described).

In some exemplary embodiments, object recognition techniques and/or tools such as OpenCV (Open Source Computer Vision) library, CamFind API, Kooaba, 6px API, Dextro API, and/or others can be utilized for detecting or recognizing objects (i.e. objects, animals, people, etc.) in digital pictures. In some aspects, object recognition techniques and/or tools involve identifying and/or analyzing object features such as lines, edges, ridges, corners, blobs, regions, and/or their relative positions, sizes, shapes, etc., which may then be used to search for pictures with matching features. For example, OpenCV library can detect an object (i.e. car, pedestrian, door, building, animal, person, etc.) in one or more digital pictures rendered or generated by Renderer 91 or stored in an electronic repository, which can then be utilized in VSAOO Unit 100, Artificial Intelligence Unit 110, and/or other elements.

In other exemplary embodiments, facial recognition techniques and/or tools such as OpenCV (Open Source Computer Vision) library, Animetrics FaceR API, Lambda Labs Facial Recognition API, Face++ SDK, Neven Vision (also known as N-Vision) Engine, and/or others can be utilized for detecting or recognizing faces in digital pictures. In some aspects, facial recognition techniques and/or tools involve identifying and/or analyzing facial features such as the relative position, size, and/or shape of the eyes, nose, cheekbones, jaw, etc., which may then be used to search for pictures with matching features. For example, FaceR API can detect a person's face in one or more digital pictures rendered or generated by Renderer 91 or stored in an electronic repository, which can then be utilized in VSAOO Unit 100, Artificial Intelligence Unit 110, and/or other elements.

Figure 9:
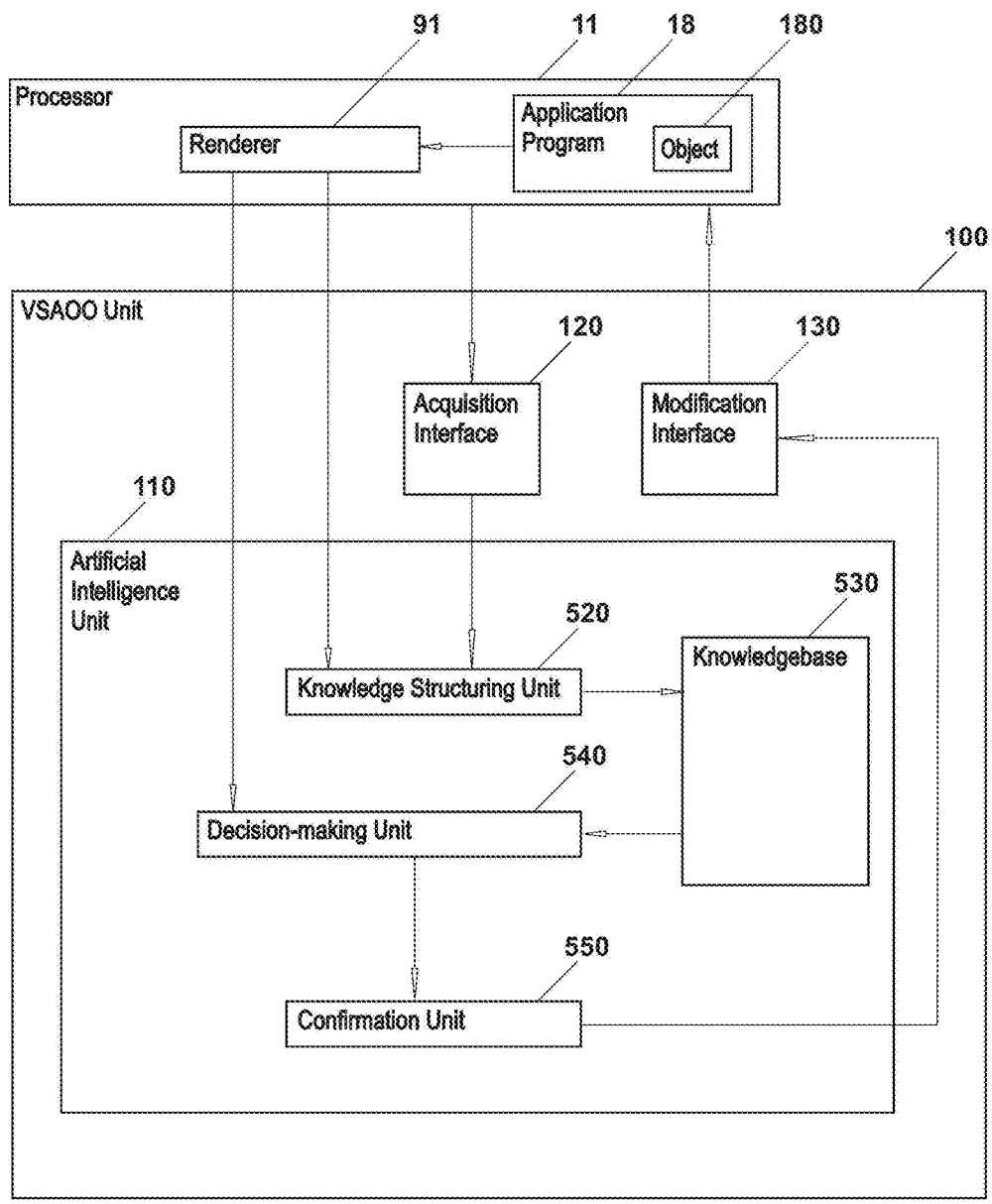
FIG. 9 illustrates an embodiment of Artificial Intelligence Unit 110.

Referring to FIG. 9, an embodiment of Artificial Intelligence Unit 110 is illustrated. Artificial Intelligence Unit 110 comprises interconnected Knowledge Structuring Unit 520, Knowledgebase 530, Decision-making Unit 540, and Confirmation Unit 550. Other additional elements can be included as needed, or some of the disclosed ones can be excluded, or a combination thereof can be utilized in alternate embodiments.

Artificial Intelligence Unit 110 comprises the functionality for learning Object's 180 operation in various visual surroundings. Artificial Intelligence Unit 110 comprises the functionality for learning one or more digital pictures correlated with any instruction sets, data, and/or other information. In some aspects, Artificial Intelligence Unit 110 comprises the functionality for learning one or more Digital Pictures 525 of Object's 180 visual surrounding correlated with any Instruction Sets 526 and/or Extra Info 527. The Instruction Sets 526 may be used or executed in operating Object 180. In other aspects, Artificial Intelligence Unit 110 comprises the functionality for learning one or more Digital Pictures 525 of Object's 180 visual surrounding some of which may not be correlated with any Instruction Sets 526 and/or Extra Info 527. Further, Artificial Intelligence Unit 110 comprises the functionality for anticipating Object's 180 operation in various visual surroundings. Artificial Intelligence Unit 110 comprises the functionality for anticipating one or more instruction sets, data, and/or other information. Artificial Intelligence Unit 110 comprises the functionality for anticipating one or more Instruction Sets 526 based on one or more incoming Digital Pictures 525 of Object's 180 visual surrounding. Artificial Intelligence Unit 110 comprises the functionality for anticipating one or more Instruction Sets 526 to be used or executed in Object's 180 autonomous operation. Artificial Intelligence Unit 110 also comprises other disclosed functionalities.

Knowledge Structuring Unit 520, Knowledgebase 530, and Decision-making Unit 540 are described later.

Confirmation Unit 550 comprises the functionality for confirming, modifying, evaluating (i.e. rating, etc.), and/or canceling one or more anticipatory Instruction Sets 526, and/or other functionalities. Confirmation Unit 550 is an optional element that can be omitted depending on implementation. In some embodiments, Confirmation Unit 550 can serve as a means of confirming anticipatory Instruction Sets 526. For example, Decision-making Unit 540 may determine one or more anticipatory Instruction Sets 526 and provide them to User 50 for confirmation. User 50 may be provided with an interface (i.e. graphical user interface, selectable list of anticipatory Instruction Sets 526, etc.) to approve or confirm execution of the anticipatory Instruction Sets 526. In some aspects, Confirmation Unit 550 can automate User 50 confirmation. In one example, if one or more incoming Digital Pictures 525 from Renderer 91 and one or more Digital Pictures 525 from a Knowledge Cell 800 were found to be a perfect or highly similar match, anticipatory Instruction Sets 526 correlated with the one or more Digital Pictures 525 from the Knowledge Cell 800 can be automatically executed without User's 50 confirmation. Conversely, if one or more incoming Digital Pictures 525 from Renderer 91 and one or more Digital Pictures 525 from a Knowledge Cell 800 were found to be less than a highly similar match, anticipatory Instruction Sets 526 correlated with the one or more Digital Pictures 525 from the Knowledge Cell 800 can be presented to User 50 for confirmation and/or modifying. A threshold that defines a highly or otherwise similar match can be utilized in such implementations. Such threshold can be defined by a user, by VSAOO system administrator, or automatically by the system based on experience, testing, inquiry, analysis, synthesis, or other techniques, knowledge, or input. In other embodiments, Confirmation Unit 550 can serve as a means of modifying or editing anticipatory Instruction Sets 526. For example, Decision-making Unit 540 may determine one or more anticipatory Instruction Sets 526 and provide them to User 50 for modification. User 50 may be provided with an interface (i.e. graphical user interface, etc.) to modify the anticipatory Instruction Sets 526 before their execution. In further embodiments, Confirmation Unit 550 can serve as a means of evaluating or rating anticipatory Instruction Sets 526 if they matched User's 50 intended operation. For example, Decision-making Unit 540 may determine one or more anticipatory Instruction Sets 526, which the system may automatically execute. User 50 may be provided with an interface (i.e. graphical user interface, etc.) to rate (i.e. on a scale from 0 to 1, etc.) how well Decision-making Unit 540 predicted the executed anticipatory Instruction Sets 526. In some aspects, rating can be automatic and based on a particular function or method that rates how well the anticipatory Instruction Sets 526 matched the desired operation. In one example, a rating function or method can assign a higher rating to anticipatory Instruction Sets 526 that were least modified in the confirmation process. In another example, a rating function or method can assign a higher rating to anticipatory Instruction Sets 526 that were canceled least number of times by User 50. Any other automatic rating function or method can be utilized. In yet other embodiments, Confirmation Unit 550 can serve as a means of canceling anticipatory Instruction Sets 526 if they did not match User's 50 intended operation. For example, Decision-making Unit 540 may determine one or more anticipatory Instruction Sets 526, which the system may automatically execute. The system may save the state of Computing Device 70, Processor 11 (save its register values, etc.), Application Program 18 (i.e. save its variables, data structures, objects, location of its current instruction, etc.), Object 180, and/or other processing elements before executing anticipatory Instruction Sets 526. User 50 may be provided with an interface (i.e. graphical user interface, selectable list of prior executed anticipatory Instruction Sets 526, etc.) to cancel one or more of the prior executed anticipatory Instruction Sets 526, and restore Computing Device 70, Processor 11, Application Program 18, Object 180, and/or other processing elements to a prior state. In some aspects, Confirmation Unit 550 can optionally be disabled or omitted in order to provide an uninterrupted operation of Computing Device 70, Processor 11, Application Program 18, and/or Object 180. For example, a form based application may be suitable for implementing the user confirmation step, whereas, a game application may be less suitable for implementing such interrupting step due to the real time nature of game application's operation.

Figure 10:
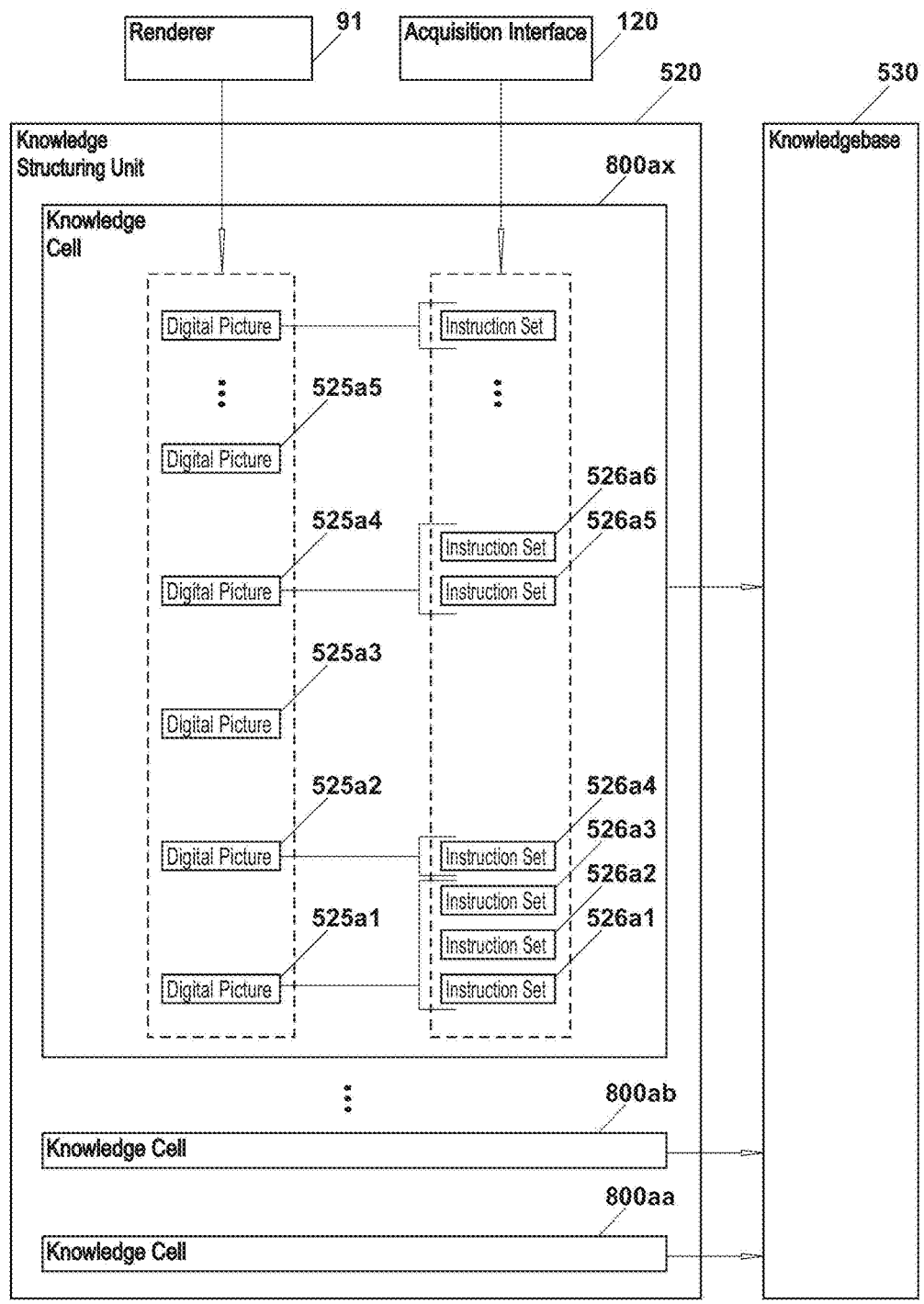
FIG. 10 illustrates an embodiment of Knowledge Structuring Unit 520 correlating individual Digital Pictures 525 with any Instruction Sets 526 and/or Extra Info 527.

Referring to FIG. 10, an embodiment of Knowledge Structuring Unit 520 correlating individual Digital Pictures 525 with any Instruction Sets 526 and/or Extra Info 527 is illustrated. Knowledge Structuring Unit 520 comprises the functionality for structuring the knowledge of Object's 180 operation in various visual surroundings, and/or other functionalities. Knowledge Structuring Unit 520 comprises the functionality for correlating one or more Digital Pictures 525 of Object's 180 visual surrounding with any Instruction Sets 526 and/or Extra Info 527. The Instruction Sets 526 may be used or executed in operating Object 180. Knowledge Structuring Unit 520 comprises the functionality for creating or generating Knowledge Cell 800 and storing one or more Digital Pictures 525 correlated with any Instruction Sets 526 and/or Extra Info 527 into the Knowledge Cell 800. As such, Knowledge Cell 800 comprises the functionality for storing one or more Digital Pictures 525 correlated with any Instruction Sets 526 and/or Extra Info 527. Knowledge Cell 800 includes a unit of knowledge of how Object 180 operated in a visual surrounding. Once created or generated, Knowledge Cells 800 can be used in/as neurons, nodes, vertices, or other elements in any of the data structures or arrangements (i.e. neural networks, graphs, sequences, etc.) used for storing the knowledge of Object's 180 operation in various visual surroundings, thereby facilitating learning functionalities herein. It should be noted that Extra Info 527 may be optionally used in some implementations to enable enhanced comparisons or decision making in autonomous Object 180 operation where applicable, and that Extra Info 527 can be omitted in alternate implementations.

In some embodiments, Knowledge Structuring Unit 520 receives one or more Digital Pictures 525 from Renderer 91. Knowledge Structuring Unit 520 may also receive one or more Instruction Sets 526 from Acquisition Interface 120. Knowledge Structuring Unit 520 may further receive any Extra Info 527. Although, Extra Info 527 is not shown in this and/or other figures for clarity of illustration, it should be noted that any Digital Picture 525, Instruction Set 526, and/or other element may include or be associated with Extra Info 527. Knowledge Structuring Unit 520 may correlate one or more Digital Pictures 525 with any Instruction Sets 526 and/or Extra Info 527. Knowledge Structuring Unit 520 may then create Knowledge Cell 800 and store the one or more Digital Pictures 525 correlated with Instruction Sets 526 and/or Extra Info 527 into the Knowledge Cell 800. Knowledge Cell 800 may include any data structure or arrangement that can facilitate such storing. For example, Knowledge Structuring Unit 520 may create Knowledge Cell 800$ax$ and structure within it Digital Picture 525$a1$ correlated with Instruction Sets 526$a1$-526$a3$ and/or any Extra Info 527 (not shown). Knowledge Structuring Unit 520 may further structure within Knowledge Cell 800$ax$ a Digital Picture 525$a2$ correlated with Instruction Set 526$a4$ and/or any Extra Info 527 (not shown). Knowledge Structuring Unit 520 may further structure within Knowledge Cell 800$ax$ a Digital Picture 525$a3$ without a correlated Instruction Set 526 and/or Extra Info 527. Knowledge Structuring Unit 520 may further structure within Knowledge Cell 800$ax$ a Digital Picture 525$a4$ correlated with Instruction Sets 526$a5$-526$a6$ and/or any Extra Info 527 (not shown). Knowledge Structuring Unit 520 may further structure within Knowledge Cell 800$ax$ a Digital Picture 525$a5$ without a correlated Instruction Set 526 and/or Extra Info 527. Knowledge Structuring Unit 520 may structure within Knowledge Cell 800$ax$ additional Digital Pictures 525 correlated with any number (including zero [i.e. uncorrelated]) of Instruction Sets 526 and/or Extra Info 527 by following the same logic as described above.

In some embodiments, Knowledge Structuring Unit 520 may correlate a Digital Picture 525 with one or more temporally corresponding Instruction Sets 526 and/or Extra Info 527. This way, Knowledge Structuring Unit 520 can structure the knowledge of Object's 180 operation at or around the time of the rendering or processing of Digital Pictures 525 of Object's 180 visual surrounding. Such functionality enables spontaneous or seamless learning of Object's 180 operation in various visual surroundings as user operates Object 180 in real life situations. In some designs, Knowledge Structuring Unit 520 may receive a stream of Instruction Sets 526 used or executed to effect Object's 180 operations as well as a stream of Digital Pictures 525 of Object's 180 visual surrounding as the operations are performed. Knowledge Structuring Unit 520 can then correlate Digital Pictures 525 from the stream of Digital Pictures 525 with temporally corresponding Instruction Sets 526 from the stream of Instruction Sets 526 and/or any Extra Info 527. Digital Pictures 525 without a temporally corresponding Instruction Set 526 may be uncorrelated, for instance. In some aspects, Instruction Sets 526 and/or Extra Info 527 that temporally correspond to a Digital Picture 525 may include Instruction Sets 526 used and/or Extra Info 527 obtained at the time of rendering or processing the Digital Picture 525. In other aspects, Instruction Sets 526 and/or Extra Info 527 that temporally correspond to a Digital Picture 525 may include Instruction Sets 526 used and/or Extra Info 527 obtained within a certain time period before and/or after rendering or processing the Digital Picture 525. For example, Instruction Sets 526 and/or Extra Info 527 that temporally correspond to a Digital Picture 525 may include Instruction Sets 526 used and/or Extra Info 527 obtained within 50 milliseconds, 1 second, 3 seconds, 20 seconds, 1 minute, 41 minutes, 2 hours, or any other time period before and/or after rendering or processing the Digital Picture 525. Such time periods can be defined by a user, by VSAOO system administrator, or automatically by the system based on experience, testing, inquiry, analysis, synthesis, or other techniques, knowledge, or input. In other aspects, Instruction Sets 526 and/or Extra Info 527 that temporally correspond to a Digital Picture 525 may include Instruction Sets 526 used and/or Extra Info 527 obtained from the time of rendering or processing of the Digital Picture 525 to the time of rendering or processing of a next Digital Picture 525. In further aspects, Instruction Sets 526 and/or Extra Info 527 that temporally correspond to a Digital Picture 525 may include Instruction Sets 526 used and/or Extra Info 527 obtained from the time of rendering or processing of a previous Digital Picture 525 to the time of rendering or processing of the Digital Picture 525. Any other temporal relationship or correspondence between Digital Pictures 525 and correlated Instruction Sets 526 and/or Extra Info 527 can be implemented.

In some embodiments, Knowledge Structuring Unit 520 can structure the knowledge of Object's 180 operation in a visual surrounding into any number of Knowledge Cells 800. In some aspects, Knowledge Structuring Unit 520 can structure into a Knowledge Cell 800 a single Digital Picture 525 correlated with any Instruction Sets 526 and/or Extra Info 527. In other aspects, Knowledge Structuring Unit 520 can structure into a Knowledge Cell 800 any number (i.e. 2, 3, 5, 8, 19, 33, 99, 1715, 21822, 393477, 6122805, etc.) of Digital Pictures 525 correlated with any Instruction Sets 526 and/or Extra Info 527. In a special case, Knowledge Structuring Unit 520 can structure all Digital Pictures 525 correlated with any Instruction Sets 526 and/or Extra Info 527 into a single long Knowledge Cell 800. In further aspects, Knowledge Structuring Unit 520 can structure Digital Pictures 525 correlated with any Instruction Sets 526 and/or Extra Info 527 into a plurality of Knowledge Cells 800. In a special case, Knowledge Structuring Unit 520 can store periodic streams of Digital Pictures 525 correlated with any Instruction Sets 526 and/or Extra Info 527 into a plurality of Knowledge Cells 800 such as hourly, daily, weekly, monthly, yearly, or other periodic Knowledge Cells 800.

In some embodiments, Knowledge Structuring Unit 520 may be responsive to a triggering object, action, event, time, and/or other stimulus. In some aspects, the system can detect or recognize an object in Object's 180 visual surrounding, and Knowledge Structuring Unit 520 can structure into a Knowledge Cell 800 one or more Digital Pictures 525 correlated with any Instruction Sets 526 and/or Extra Info 527 related to the object. For example, Knowledge Structuring Unit 520 can structure into a Knowledge Cell 800 one or more Digital Pictures 525 depicting a detected opponent correlated with any Instruction Sets 526 causing Object 180 (i.e. avatar, user controllable object, etc.) to shoot the opponent in a game application. Knowledge Structuring Unit 520 can also structure into the Knowledge Cell 800 any Extra Info 527 (i.e. time, location, computed, observed, acoustic, and/or other information, etc.). In other aspects, the system can detect or recognize a specific action or operation performed by an object in Object's 180 visual surrounding, and Knowledge Structuring Unit 520 can structure into a Knowledge Cell 800 one or more Digital Pictures 525 correlated with any Instruction Sets 526 and/or Extra Info 527 related to the action or operation. For example, Knowledge Structuring Unit 520 can structure into a Knowledge Cell 800 one or more Digital Pictures 525 depicting a detected opponent shooting at Object 180 (i.e. avatar, user controllable object, etc.) correlated with any Instruction Sets 526 causing Object 180 to block the opponent's shots in a game application. Knowledge Structuring Unit 520 can also structure into the Knowledge Cell 800 any Extra Info 527 (i.e. time, location, computed, observed, acoustic, and/or other information, etc.). Any features, functionalities, and embodiments of Picture Recognizer 350 can be utilized in the aforementioned detecting or recognizing. In general, Knowledge Structuring Unit 520 can structure into a Knowledge Cell 800 any Digital Pictures 525 correlated with any Instruction Sets 526 and/or Extra Info 527 related to any triggering object, action, event, time, and/or other stimulus.

In some embodiments, a plurality of views and/or plurality of Renderers 91 can be utilized. In one example, Digital Pictures 525 of different angles or sides of Object 180 may be rendered or generated by one or more Renderers 91. In another example, views from different sub-elements of Object 180 may be rendered or generated by one or more Renderers 91. Using multiple views may provide additional visual detail in learning and/or using Object's 180 visual surrounding for autonomous Object 180 operation. In some designs where multiple views are utilized, multiple VSAOO Units 100 can also be utilized (i.e. one VSAOO Unit 100 for each view, etc.). In such designs, Digital Pictures 525 of each view of Object's 180 visual surrounding can be correlated with any Instruction Sets 526 and/or Extra Info 527 as previously described. In other designs where multiple views are utilized, collective Digital Pictures 525 of multiple views of Object's 180 visual surrounding can be correlated with any Instruction Sets 526 and/or Extra Info 527. Any combination of the aforementioned multiple views and/or other techniques or elements can be implemented in alternate embodiments.

Figure 11:
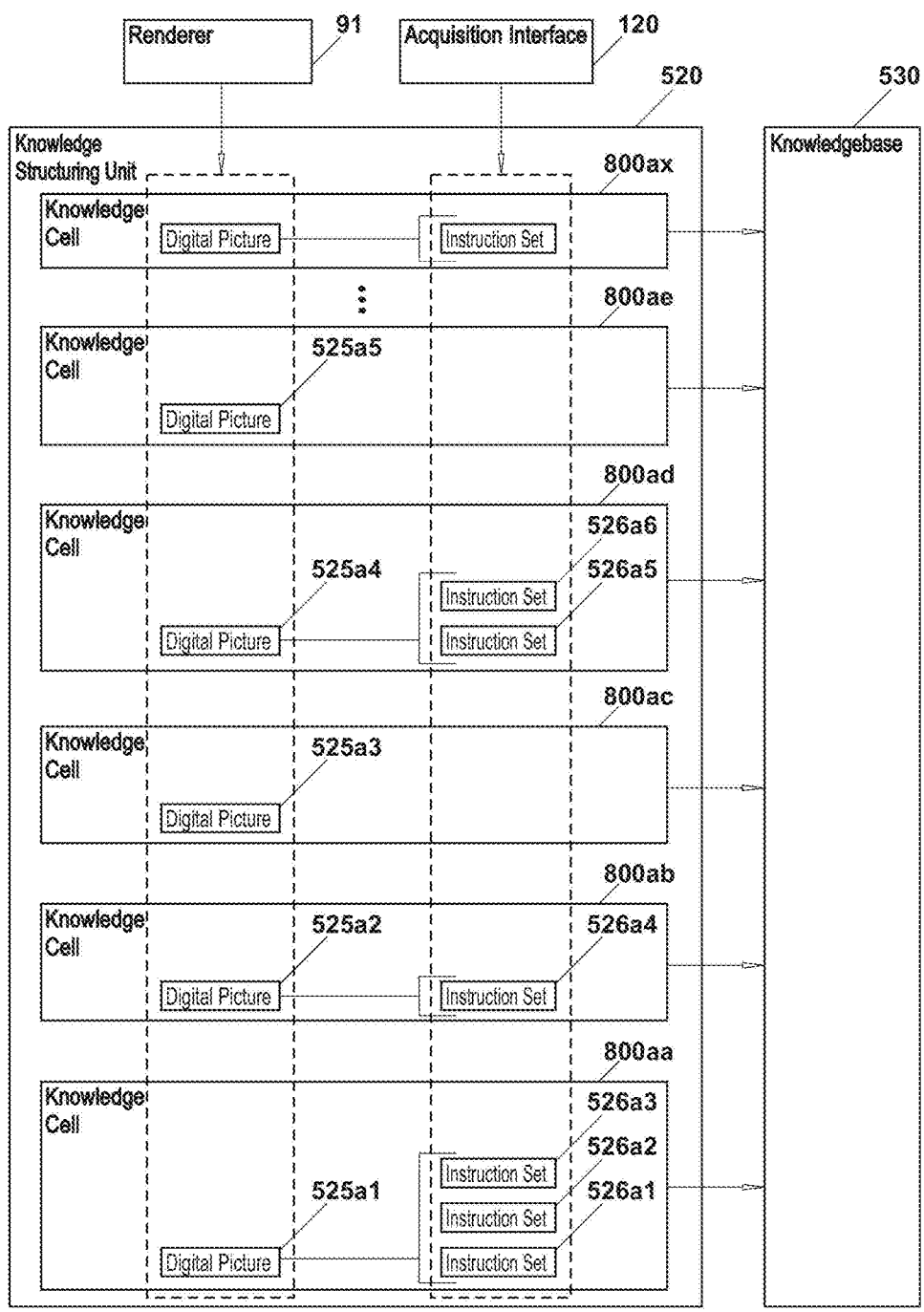
FIG. 11 illustrates another embodiment of Knowledge Structuring Unit 520 correlating individual Digital Pictures 525 with any Instruction Sets 526 and/or Extra Info 527.

Referring to FIG. 11, another embodiment of Knowledge Structuring Unit 520 correlating individual Digital Pictures 525 with any Instruction Sets 526 and/or Extra Info 527 is illustrated. In such embodiments, Knowledge Structuring Unit 520 may generate Knowledge Cells 800 each comprising a single Digital Picture 525 correlated with any Instruction Sets 526 and/or Extra Info 527.

Figure 12:
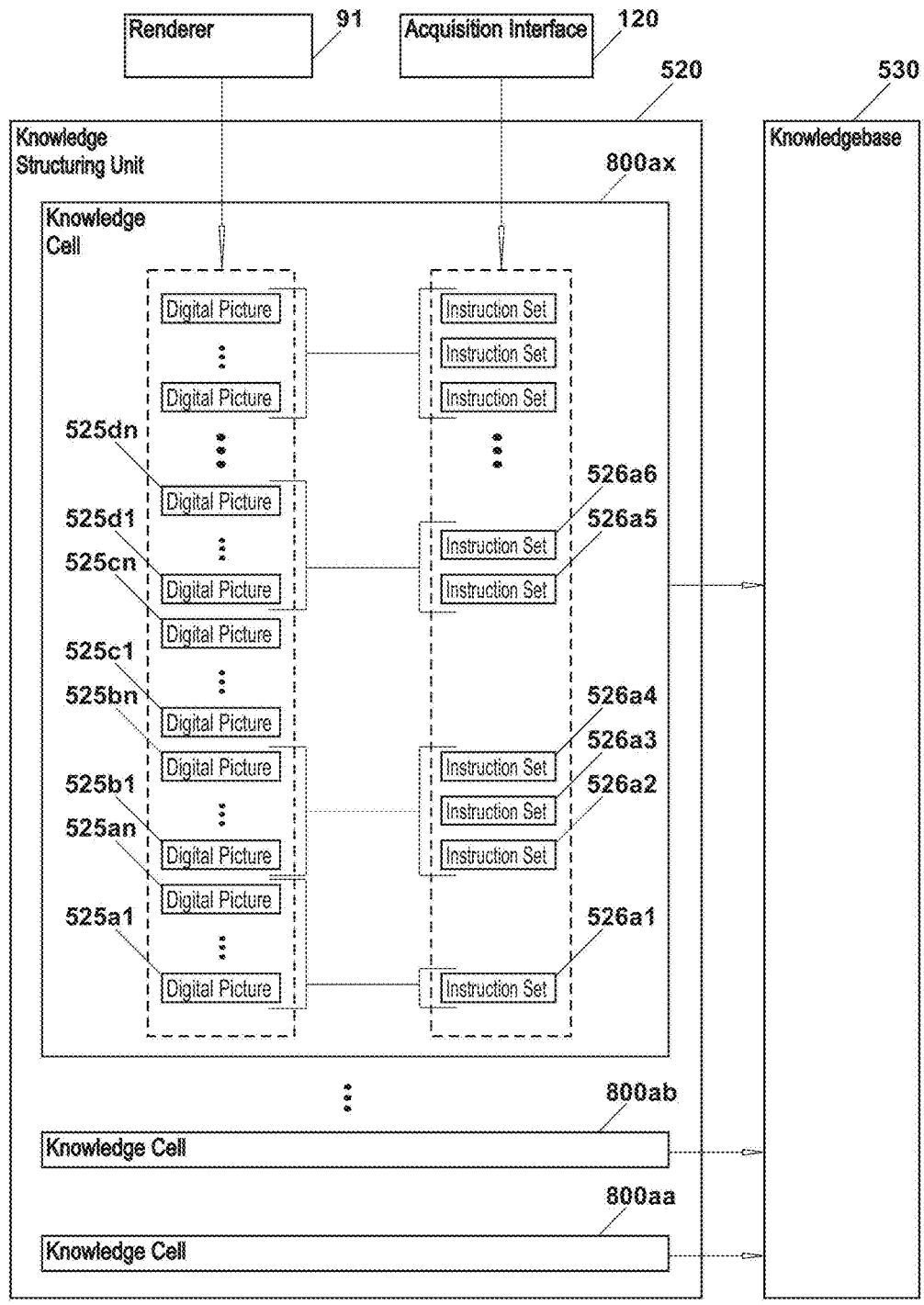
FIG. 12 illustrates an embodiment of Knowledge Structuring Unit 520 correlating streams of Digital Pictures 525 with any Instruction Sets 526 and/or Extra Info 527.

Referring to FIG. 12, an embodiment of Knowledge Structuring Unit 520 correlating streams of Digital Pictures 525 with any Instruction Sets 526 and/or Extra Info 527 is illustrated. In some aspects, a stream of Digital Pictures 525 may include a collection, a group, a sequence, or other plurality of Digital Pictures 525. In other aspects, a stream of Digital Pictures 525 may include one or more Digital Pictures 525. In further aspects, a stream of Digital Pictures 525 may include a digital motion picture (i.e. digital video, etc.) or portion thereof. For example, Knowledge Structuring Unit 520 may create Knowledge Cell 800ax and structure within it a stream of Digital Pictures 525a1-525an correlated with Instruction Set 526a1 and/or any Extra Info 527 (not shown). Knowledge Structuring Unit 520 may further structure within Knowledge Cell 800ax a stream of Digital Pictures 525b1-525bn correlated with Instruction Sets 526a2-526a4 and/or and Extra Info 527 (not shown). Knowledge Structuring Unit 520 may further structure within Knowledge Cell 800ax a stream of Digital Pictures 525c1-525cn without correlated Instruction Sets 526 and/or Extra Info 527. Knowledge Structuring Unit 520 may further structure within Knowledge Cell 800ax a stream of Digital Pictures 525d1-525dn correlated with Instruction Sets 526a5-526a6 and/or any Extra Info 527 (not shown). Knowledge Structuring Unit 520 may further structure within Knowledge Cell 800*ax* additional streams of Digital Pictures 525 correlated with any number (including zero [i.e. uncorrelated]) of Instruction Sets 526 and/or Extra Info 527 by following the same logic as described above. The number of Digital Pictures 525 in some or all streams of Digital Pictures 525*a*1-525*an*, 525*b*1-525*bn*, etc. may be equal or different. It should be noted that n or other such letters or indicia may follow the sequence and/or context where they are indicated. Also, a same letter or indicia such as n may represent a different number in different elements of a drawing.

Figure 13:
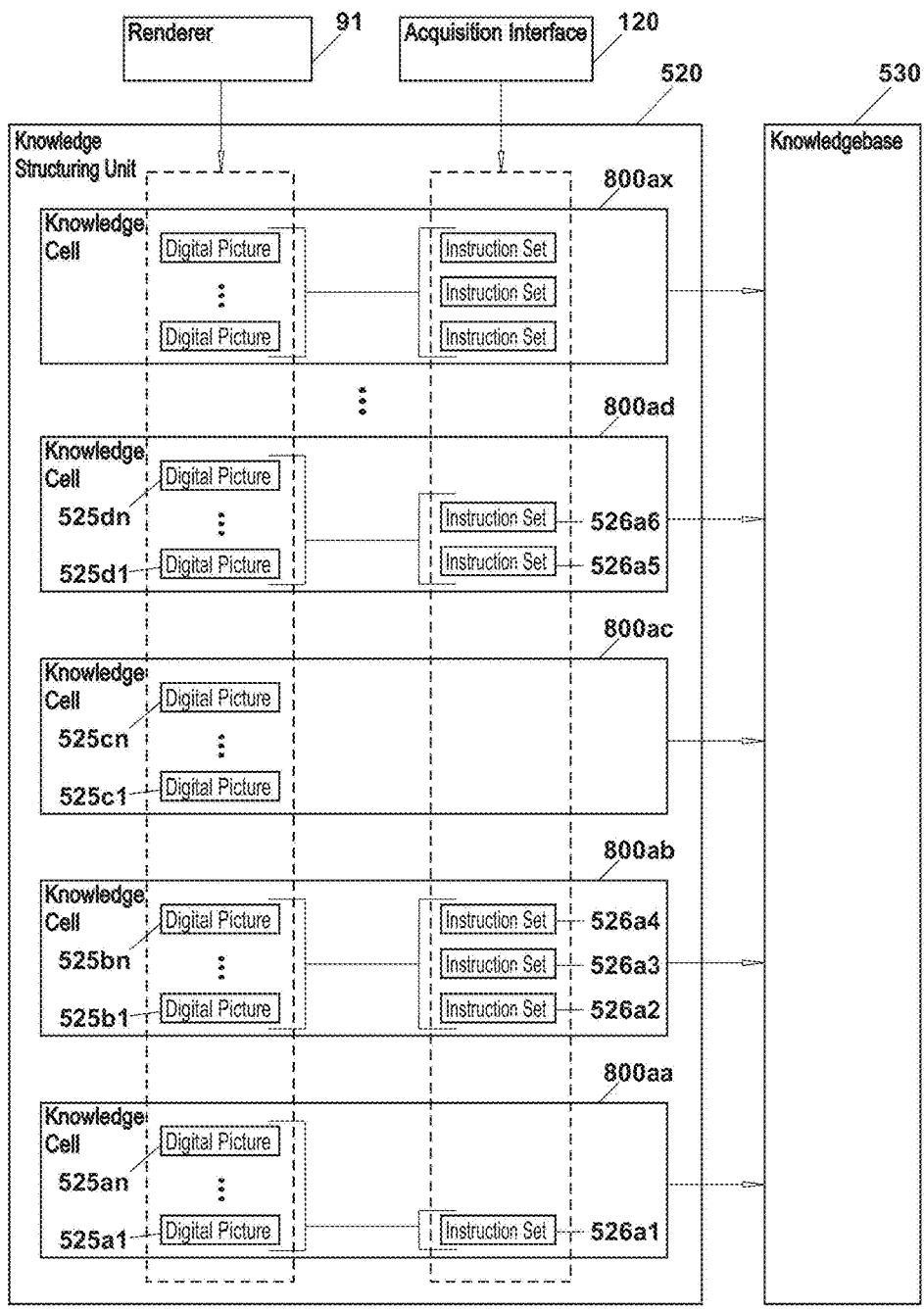
FIG. 13 illustrates another embodiment of Knowledge Structuring Unit 520 correlating streams of Digital Pictures 525 with any Instruction Sets 526 and/or Extra Info 527.

Referring to FIG. 13, another embodiment of Knowledge Structuring Unit 520 correlating streams of Digital Pictures 525 with any Instruction Sets 526 and/or Extra Info 527 is illustrated. In such embodiments, Knowledge Structuring Unit 520 may generate Knowledge Cells 800 each comprising a single stream of Digital Pictures 525 correlated with any Instruction Sets 526 and/or Extra Info 527.

Knowledgebase 530 comprises the functionality for storing the knowledge of an object's operation in various visual surroundings, and/or other functionalities. Knowledgebase 530 comprises the functionality for storing one or more Digital Pictures 525 of Object's 180 visual surrounding correlated with any Instruction Sets 526 and/or Extra Info 527. The Instruction Sets 526 may be used or executed in operating Object 180. Knowledgebase 530 comprises the functionality for storing one or more Knowledge Cells 800 each including one or more Digital Pictures 525 of Object's 180 visual surrounding correlated with any Instruction Sets 526 and/or Extra Info 527. In some aspects, Digital Pictures 525 correlated with Instruction Sets 526 and/or Extra Info 527 can be stored directly within Knowledgebase 530 without using Knowledge Cells 800 as the intermediary data structures. In some embodiments, Knowledgebase 530 may be or include Neural Network 530*a* (later described). In other embodiments, Knowledgebase 530 may be or include Graph 530*b* (later described). In further embodiments, Knowledgebase 530 may be or include Collection of Sequences 530*c* (later described). In further embodiments, Knowledgebase 530 may be or include Sequence 533 (later described). In further embodiments, Knowledgebase 530 may be or include Collection of Knowledge Cells 530*d* (later described). In general, Knowledgebase 530 may be or include any data structure or arrangement capable of storing the knowledge of an object's operation in various visual surroundings. Knowledgebase 530 may reside locally on Computing Device 70, or remotely (i.e. remote Knowledgebase 530, etc.) on a remote computing device (i.e. server, cloud, etc.) accessible over a network.

In some embodiments, Knowledgebase 530 from one Computing Device 70 or VSAOO Unit 100 can be transferred to one or more other Computing Devices 70 or VSAOO Units 100. Therefore, the knowledge of Object's 180 operation in various visual surroundings learned on one Computing Device 70 or VSAOO Unit 100 can be transferred to one or more other Computing Devices 70 or VSAOO Units 100. In one example, Knowledgebase 530 can be copied or downloaded to a file or other repository from one Computing Device 70 or VSAOO Unit 100 and loaded or inserted into another Computing Device 70 or VSAOO Unit 100. In another example, Knowledgebase 530 from one Computing Device 70 or VSAOO Unit 100 can be available on a server accessible by other Computing Devices 70 or VSAOO Units 100 over a network. Once loaded into or accessed by a receiving Computing Device 70 or VSAOO Unit 100, the receiving Computing Device 70 or VSAOO Unit 100 can then implement the knowledge of Object's 180 operation in various visual surroundings learned on the originating Computing Device 70 or VSAOO Unit 100.

In some embodiments, multiple Knowledgebases 530 (i.e. from different Computing Devices 70 or VSAOO Units 100, etc.) can be combined to accumulate collective knowledge of operating Object 180 in various visual surroundings. In one example, one Knowledgebase 530 can be appended to another Knowledgebase 530 such as appending one Collection of Sequences 530*c* (later described) to another Collection of Sequences 530*c*, appending one Sequence 533 (later described) to another Sequence 533, appending one Collection of Knowledge Cells 530*d* (later described) to another Collection of Knowledge Cells 530*d*, and/or appending other data structures or elements thereof. In another example, elements of one Knowledgebase 530 can be copied into another Knowledgebase 530 such as copying one Collection of Sequences 530*c* into another Collection of Sequences 530*c*, copying one Collection of Knowledge Cells 530*d* into another Collection of Knowledge Cells 530*d*, and/or copying other data structures or elements thereof. In a further example, in the case of Knowledgebase 530 being or including Graph 530*b* or graph-like data structure (i.e. Neural Network 530*a*, tree, etc.), a union can be utilized to combine two or more Graphs 530*b* or graph-like data structures. For instance, a union of two Graphs 530*b* or graph-like data structures may include a union of their vertex (i.e. node, etc.) sets and their edge (i.e. connection, etc.) sets. Any other operations or combination thereof on graphs or graph-like data structures can be utilized to combine Graphs 530*b* or graph-like data structures. In a further example, one Knowledgebase 530 can be combined with another Knowledgebase 530 through later described learning processes where Knowledge Cells 800 may be applied one at a time and connected with prior and/or subsequent Knowledge Cells 800 such as in Graph 530*b* or Neural Network 530*a*. In such embodiments, instead of Knowledge Cells 800 generated by Knowledge Structuring Unit 520, the learning process may utilize Knowledge Cells 800 from one Knowledgebase 530 to apply them onto another Knowledgebase 530. Any other techniques known in art including custom techniques for combining data structures can be utilized for combining Knowledgebases 530 in alternate implementations. In any of the aforementioned and/or other combining techniques, similarity of elements (i.e. nodes/vertices, edges/connections, etc.) can be utilized in determining whether an element from one Knowledgebase 530 matches an element from another Knowledgebase 530, and substantially or otherwise similar elements may be considered a match for combining purposes in some designs. Any features, functionalities, and embodiments of Similarity Comparison 125 (later described) can be used in such similarity determinations. A combined Knowledgebase 530 can be offered as a network service (i.e. online application, etc.), downloadable file, or other repository to all VSAOO Units 100 configured to utilize the combined Knowledgebase 530. For example, a player (i.e. User 50, etc.) of a computer game (i.e. Application Program 18, etc.) interfaced with VSAOO Unit 100 having access to a combined Knowledgebase 530 can use a collective knowledge for Object's 180 operation in various visual surroundings learned from multiple players (i.e. Users 50, etc.) for autonomous operating of one or more Objects 180 that the player may be charged with controlling or operating.

Figure 14:
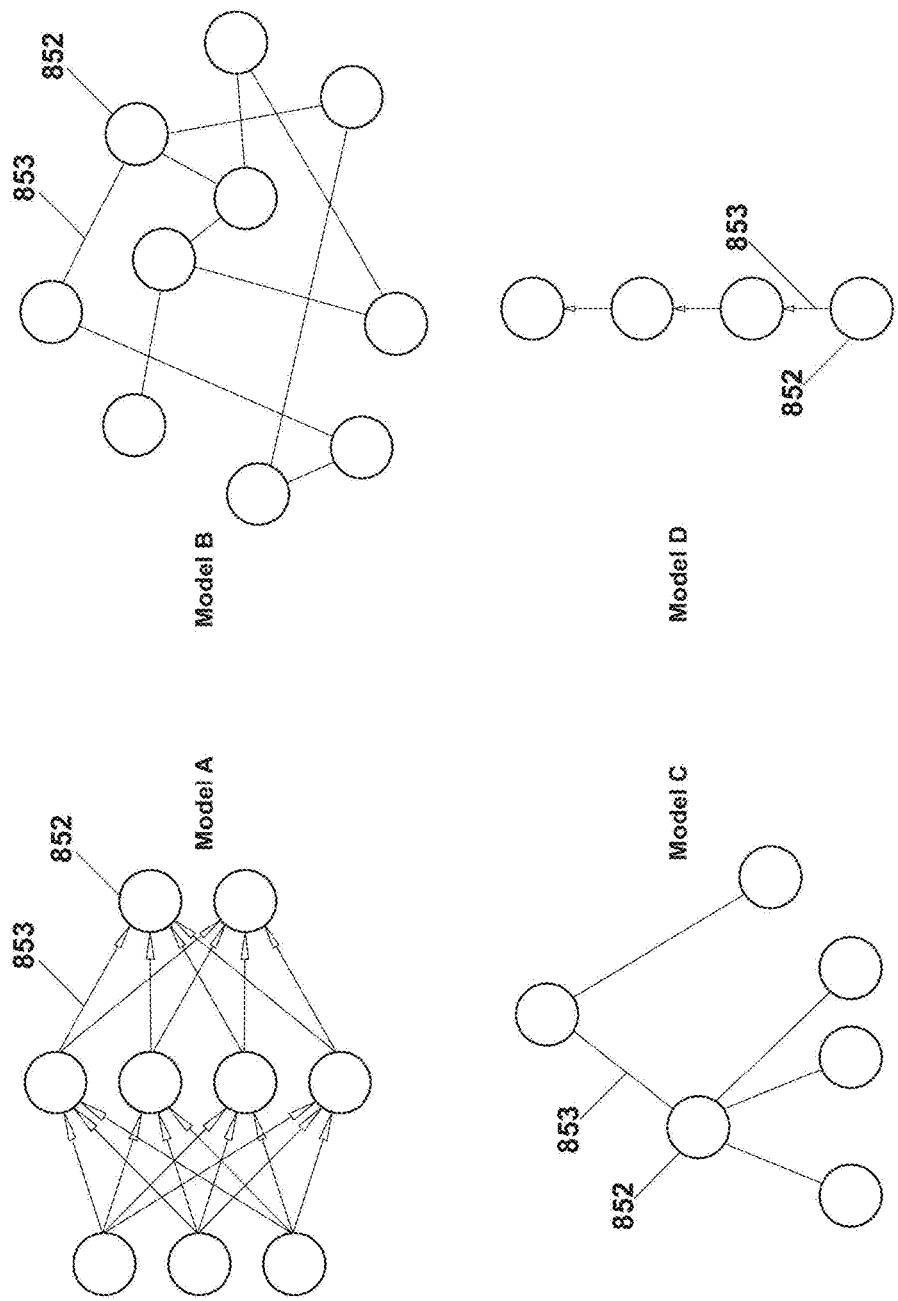
FIG. 14 illustrates various artificial intelligence methods, systems, and/or models that can be utilized in VSAOO Unit 100 embodiments.

Referring to FIG. 14, the disclosed artificially intelligent systems, devices, and methods for learning and/or using visual surrounding for autonomous object operation may include various artificial intelligence models and/or techniques. The disclosed systems, devices, and methods are independent of the artificial intelligence model and/or technique used and any model and/or technique can be utilized to facilitate the functionalities described herein. Examples of these models and/or techniques include deep learning, supervised learning, unsupervised learning, neural networks (i.e. convolutional neural network, recurrent neural network, deep neural network, etc.), search-based, logic and/or fuzzy logic-based, optimization-based, tree/graph/other data structure-based, hierarchical, symbolic and/or sub-symbolic, evolutionary, genetic, multi-agent, deterministic, probabilistic, statistical, and/or other models and/or techniques.

In one example shown in Model A, the disclosed artificially intelligent systems, devices, and methods for learning and/or using visual surrounding for autonomous object operation may include a neural network (also referred to as artificial neural network, etc.). As such, machine learning, knowledge structuring or representation, decision making, pattern recognition, and/or other artificial intelligence functionalities may include a network of Nodes 852 (also referred to as neurons, etc.) and Connections 853 similar to that of a brain. Node 852 can store any data, object, data structure, and/or other item, or reference thereto. Node 852 may also include a function for transforming or manipulating any data, object, data structure, and/or other item. Examples of such transformation functions include mathematical functions (i.e. addition, subtraction, multiplication, division, sin, cos, log, derivative, integral, etc.), object manipulation functions (i.e. creating an object, modifying an object, deleting an object, appending objects, etc.), data structure manipulation functions (i.e. creating a data structure, modifying a data structure, deleting a data structure, creating a data field, modifying a data field, deleting a data field, etc.), and/or other transformation functions. Connection 853 may include or be associated with a value such as a symbolic label or numeric attribute (i.e. weight, cost, capacity, length, etc.). A computational model can be utilized to compute values from inputs based on a pre-programmed or learned function or method. For example, a neural network may include one or more input neurons that can be activated by inputs. Activations of these neurons can then be passed on, weighted, and transformed by a function to other neurons. Neural networks may range from those with only one layer of single direction logic to multi-layer of multi-directional feedback loops. A neural network can use weights to change the parameters of the network's throughput. A neural network can learn by input from its environment or from self-teaching using written-in rules. A neural network can be utilized as a predictive modeling approach in machine learning. An exemplary embodiment of a neural network (i.e. Neural Network 530a, etc.) is described later.

In another example shown in Model B, the disclosed artificially intelligent systems, devices, and methods for learning and/or using visual surrounding for autonomous object operation may include a graph or graph-like data structure. As such, machine learning, knowledge structuring or representation, decision making, pattern recognition, and/or other artificial intelligence functionalities may include Nodes 852 (also referred to as vertices or points, etc.) and Connections 853 (also referred to as edges, arrows, lines, arcs, etc.) organized as a graph. In general, any Node 852 in a graph can be connected to any other Node 852. A Connection 853 may include unordered pair of Nodes 852 in an undirected graph or ordered pair of Nodes 852 in a directed graph. Nodes 852 can be part of the graph structure or external entities represented by indices or references. A graph can be utilized as a predictive modeling approach in machine learning. Nodes 852, Connections 853, and/or other elements or operations of a graph may include any features, functionalities, and embodiments of the aforementioned Nodes 852, Connections 853, and/or other elements or operations of a neural network, and vice versa. An exemplary embodiment of a graph (i.e. Graph 530b, etc.) is described later.

In a further example shown in Model C, the disclosed artificially intelligent systems, devices, and methods for learning and/or using visual surrounding for autonomous object operation may include a tree or tree-like data structure. As such, machine learning, knowledge structuring or representation, decision making, pattern recognition, and/or other artificial intelligence functionalities may include Nodes 852 and Connections 853 (also referred to as references, edges, etc.) organized as a tree. In general, a Node 852 in a tree can be connected to any number (i.e. including zero, etc.) of children Nodes 852. A tree can be utilized as a predictive modeling approach in machine learning. Nodes 852, Connections 853, and/or other elements or operations of a tree may include any features, functionalities, and embodiments of the aforementioned Nodes 852, Connections 853, and/or other elements or operations of a neural network and/or graph, and vice versa.

In a further example shown in Model D, the disclosed artificially intelligent systems, devices, and methods for learning and/or using visual surrounding for autonomous object operation may include a sequence or sequence-like data structure. As such, machine learning, knowledge structuring or representation, decision making, pattern recognition, and/or other artificial intelligence functionalities may include a structure of Nodes 852 and/or Connections 853 organized as a sequence. In some aspects, Connections 853 may be optionally omitted from a sequence as the sequential order of Nodes 852 in a sequence may be implied in the structure. A sequence can be utilized as a predictive modeling approach in machine learning. Nodes 852, Connections 853, and/or other elements or operations of a sequence may include any features, functionalities, and embodiments of the aforementioned Nodes 852, Connections 853, and/or other elements or operations of a neural network, graph, and/or tree, and vice versa. An exemplary embodiment of a sequence (i.e. Collection of Sequences 530c, Sequence 533, etc.) is described later.

In yet another example, the disclosed artificially intelligent systems, devices, and methods for learning and/or using visual surrounding for autonomous object operation may include a search-based model and/or technique. As such, machine learning, knowledge structuring or representation, decision making, pattern recognition, and/or other artificial intelligence functionalities may include searching through a collection of possible solutions. For example, a search method can search through a neural network, graph, tree, sequence, or other data structure that includes data elements of interest. A search may use heuristics to limit the search for solutions by eliminating choices that are unlikely to lead to the goal. Heuristic techniques may provide a best guess solution. A search can also include optimization. For example, a search may begin with a guess and then refine the guess incrementally until no more refinements can be made. In a further example, the disclosed systems, devices, and methods may include logic-based model and/or technique. As such, machine learning, knowledge structuring or representation, decision making, pattern recognition, and/or other artificial intelligence functionalities can use formal or other type of logic. Logic based models may involve making inferences or deriving conclusions from a set of premises. As such, a logic based system can extend existing knowledge or create new knowledge automatically using inferences. Examples of the types of logic that can be utilized include propositional or sentential logic that comprises logic of statements which can be true or false; first-order logic that allows the use of quantifiers and predicates and that can express facts about objects, their properties, and their relations with each other; fuzzy logic that allows degrees of truth to be represented as a value between 0 and 1 rather than simply 0 (false) or 1 (true), which can be used for uncertain reasoning; subjective logic that comprises a type of probabilistic logic that may take uncertainty and belief into account, which can be suitable for modeling and analyzing situations involving uncertainty, incomplete knowledge and different world views; and/or other types of logic. In a further example, the disclosed systems, devices, and methods may include a probabilistic model and/or technique. As such, machine learning, knowledge structuring or representation, decision making, pattern recognition, and/or other artificial intelligence functionalities can be implemented to operate with incomplete or uncertain information where probabilities may affect outcomes. Bayesian network, among other models, is an example of a probabilistic tool used for purposes such as reasoning, learning, planning, perception, and/or others. One of ordinary skill in art will understand that the aforementioned artificial intelligence models and/or techniques are described merely as examples of a variety of possible implementations, and that while all possible artificial intelligence models and/or techniques are too voluminous to describe, other artificial intelligence models and/or techniques known in art are within the scope of this disclosure. One of ordinary skill in art will also recognize that an intelligent system may solve a specific problem by using any model and/or technique that works such as, for example, some systems can be symbolic and logical, some can be sub-symbolic neural networks, some can be deterministic or probabilistic, some can be hierarchical, some may include searching techniques, some may include optimization techniques, while others may use other or a combination of models and/or techniques. In general, any artificial intelligence model and/or technique can be utilized that can facilitate the functionalities described herein.

Figure 15A:
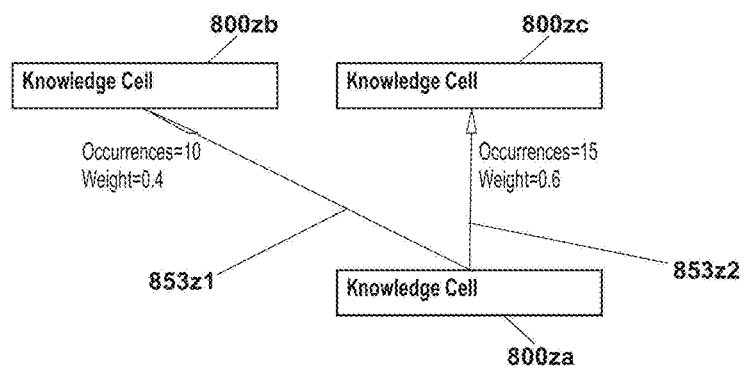
FIGS. 15A-15C illustrate embodiments of interconnected Knowledge Cells 800 and updating weights of Connections 853.
Figure 15B:
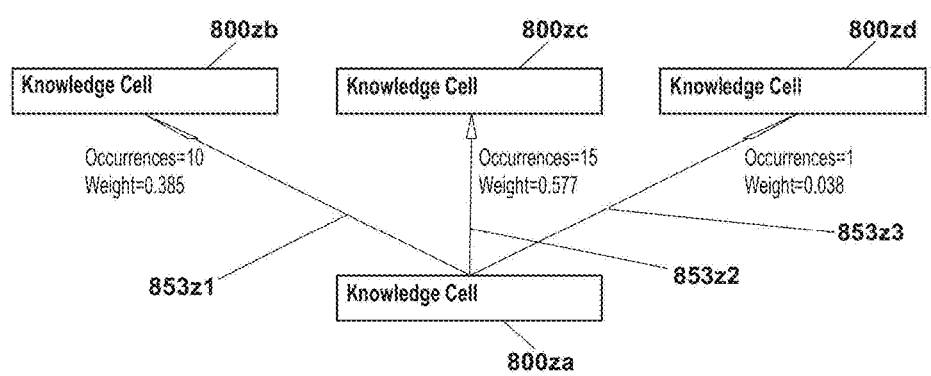
Figure 15C:
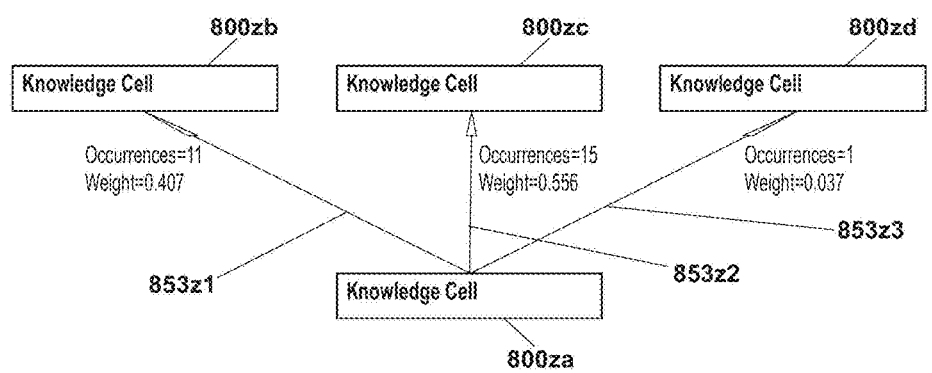

Referring to FIGS. 15A-15C, embodiments of interconnected Knowledge Cells 800 and updating weights of Connections 853 are illustrated. As shown for example in FIG. 15A, Knowledge Cell 800$za$ is connected to Knowledge Cell 800$zb$ and Knowledge Cell 800$zc$ by Connection 853$z1$ and Connection 853$z2$, respectively. Each of Connection 853$z1$ and Connection 853$z2$ may include or be associated with occurrence count, weight, and/or other parameter or data. The number of occurrences may track or store the number of observations that a Knowledge Cell 800 was followed by another Knowledge Cell 800 indicating a connection or relationship between them. For example, Knowledge Cell 800$za$ was followed by Knowledge Cell 800$zb$ 10 times as indicated by the number of occurrences of Connection 853$z1$. Also, Knowledge Cell 800$za$ was followed by Knowledge Cell 800$zc$ 15 times as indicated by the number of occurrences of Connection 853$z2$. The weight of Connection 853$z1$ can be calculated or determined as the number of occurrences of Connection 853$z1$ divided by the sum of occurrences of all connections (i.e. Connection 853$z1$ and Connection 853$z2$, etc.) originating from Knowledge Cell 800$za$. Therefore, the weight of Connection 853$z1$ can be calculated or determined as $10/(10+15)=0.4$, for example. Also, the weight of Connection 853$z2$ can be calculated or determined as $15/(10+15)=0.6$, for example. Therefore, the sum of weights of Connection 853$z1$, Connection 853$z2$, and/or any other Connections 853 originating from Knowledge Cell 800$za$ may equal to 1 or 100%. As shown for example in FIG. 15B, in the case that Knowledge Cell 800$zd$ is inserted and an observation is made that Knowledge Cell 800$zd$ follows Knowledge Cell 800$za$, Connection 853$z3$ can be created between Knowledge Cell 800$za$ and Knowledge Cell 800$zd$. The occurrence count of Connection 853$z3$ can be set to 1 and weight determined as $1/(10+15+1)=0.038$. The weights of all other connections (i.e. Connection 853$z1$, Connection 853$z2$, etc.) originating from Knowledge Cell 800$za$ may be updated to account for the creation of Connection 853$z3$. Therefore, the weight of Connection 853$z1$ can be updated as $10/(10+15+1)=0.385$. The weight of Connection 853$z2$ can also be updated as $15/(10+15+1)=0.577$. As shown for example in FIG. 15C, in the case that an additional occurrence of Connection 853$z1$ is observed (i.e. Knowledge Cell 800$zb$ followed Knowledge Cell 800$za$, etc.), occurrence count of Connection 853$z1$ and weights of all connections (i.e. Connection 853$z1$, Connection 853$z2$, and Connection 853$z3$, etc.) originating from Knowledge Cell 800$za$ may be updated to account for this observation. The occurrence count of Connection 853$z1$ can be increased by 1 and its weight updated as $11/(11+15+1)=0.407$. The weight of Connection 853$z2$ can also be updated as $15/(11+15+1)=0.556$. The weight of Connection 853$z3$ can also be updated as $1/(11+15+1)=0.037$.

Referring to FIG. 16, an embodiment of learning Knowledge Cells 800 comprising one or more Digital Pictures 525 correlated with any Instruction Sets 526 and/or Extra Info 527 using Collection of Knowledge Cells 530$d$ is illustrated. Collection of Knowledge Cells 530$d$ comprises the functionality for storing any number of Knowledge Cells 800. In some aspects, Knowledge Cells 800 may be stored into or applied onto Collection of Knowledge Cells 530$d$ in a learning or training process. In effect, Collection of Knowledge Cells 530$d$ may store Knowledge Cells 800 that can later be used to enable autonomous Object 180 operation. In some embodiments, Knowledge Structuring Unit 520 structures or generates Knowledge Cells 800 as previously described and the system applies them onto Collection of Knowledge Cells 530$d$, thereby implementing learning Object's 180 operation in various visual surroundings. The term apply or applying may refer to storing, copying, inserting, updating, or other similar action, therefore, these terms may be used interchangeably herein depending on context. The system can perform Similarity Comparisons 125 (later described) of a newly structured Knowledge Cell 800 from Knowledge Structuring Unit 520 with Knowledge Cells 800 in Collection of Knowledge Cells 530$d$. If a substantially similar Knowledge Cell 800 is not found in Collection of Knowledge Cells 530$d$, the system may insert (i.e. copy, store, etc.) the Knowledge Cell 800 from Knowledge Structuring Unit 520 into Collection of Knowledge Cells 530$d$, for example. On the other hand, if a substantially similar Knowledge Cell 800 is found in Collection of Knowledge Cells 530$d$, the system may optionally omit inserting the Knowledge Cell 800 from Knowledge Structuring Unit 520 as inserting a substantially similar Knowledge Cell 800 may not add much or any additional knowledge to the Collection of Knowledge Cells 530$d$, for example. Also, inserting a substantially similar Knowledge Cell 800 can optionally be omitted to save storage resources and limit the number of Knowledge Cells 800 that may later need to be processed or compared. Any features, functionalities, and embodiments of Similarity Comparison 125, importance index (later described), similarity index (later described), and/or other disclosed elements can be utilized to facilitate determination of substantial or other similarity and whether to insert a newly structured Knowledge Cell 800 into Collection of Knowledge Cells 530d.

For example, the system can perform Similarity Comparisons 125 (later described) of Knowledge Cell 800ba from Knowledge Structuring Unit 520 with Knowledge Cells 800 in Collection of Knowledge Cells 530d. In the case that a substantially similar match is found between Knowledge Cell 800ba and any of the Knowledge Cells 800 in Collection of Knowledge Cells 530d, the system may perform no action. The system can then perform Similarity Comparisons 125 of Knowledge Cell 800bb from Knowledge Structuring Unit 520 with Knowledge Cells 800 in Collection of Knowledge Cells 530d. In the case that a substantially similar match is not found, the system may insert a new Knowledge Cell 800 into Collection of Knowledge Cells 530d and copy Knowledge Cell 800bb into the inserted new Knowledge Cell 800. The system can then perform Similarity Comparisons 125 of Knowledge Cell 800bc from Knowledge Structuring Unit 520 with Knowledge Cells 800 in Collection of Knowledge Cells 530d. In the case that a substantially similar match is found between Knowledge Cell 800bc and any of the Knowledge Cells 800 in Collection of Knowledge Cells 530d, the system may perform no action. The system can then perform Similarity Comparisons 125 of Knowledge Cell 800bd from Knowledge Structuring Unit 520 with Knowledge Cells 800 in Collection of Knowledge Cells 530d. In the case that a substantially similar match is not found, the system may insert a new Knowledge Cell 800 into Collection of Knowledge Cells 530d and copy Knowledge Cell 800bd into the inserted new Knowledge Cell 800. The system can then perform Similarity Comparisons 125 of Knowledge Cell 800be from Knowledge Structuring Unit 520 with Knowledge Cells 800 in Collection of Knowledge Cells 530d. In the case that a substantially similar match is not found, the system may insert a new Knowledge Cell 800 into Collection of Knowledge Cells 530d and copy Knowledge Cell 800be into the inserted new Knowledge Cell 800. Applying any additional Knowledge Cells 800 from Knowledge Structuring Unit 520 onto Collection of Knowledge Cells 530d follows similar logic or process as the above-described.

Figure 17:
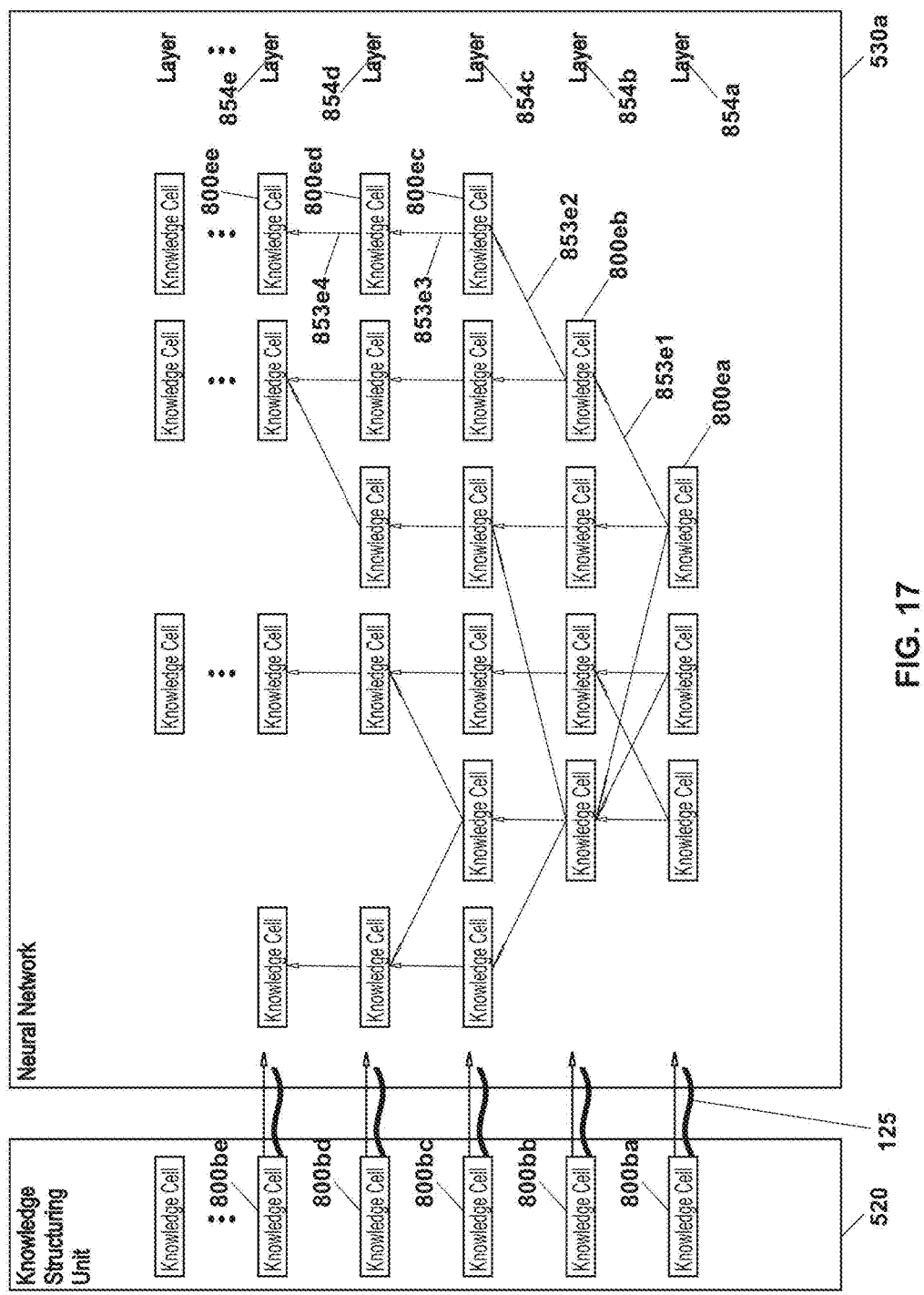

Referring to FIG. 17, an embodiment of learning Knowledge Cells 800 comprising one or more Digital Pictures 525 correlated with any Instruction Sets 526 and/or Extra Info 527 using Neural Network 530a is illustrated. Neural Network 530a includes a number of neurons or Nodes 852 interconnected by Connections 853 as previously described. Knowledge Cells 800 are shown instead of Nodes 852 to simplify the illustration as Node 852 includes a Knowledge Cell 800, for example. Therefore, Knowledge Cells 800 and Nodes 852 can be used interchangeably herein depending on context. It should be noted that Node 852 may include other elements and/or functionalities instead of or in addition to Knowledge Cell 800. In some aspects, Knowledge Cells 800 may be stored into or applied onto Neural Network 530a individually or collectively in a learning or training process. In some designs, Neural Network 530a comprises a number of Layers 854 each of which may include one or more Knowledge Cells 800. Knowledge Cells 800 in successive Layers 854 can be connected by Connections 853. Connection 853 may include or be associated with occurrence count, weight, and/or other parameter or data as previously described. Neural Network 530a may include any number of Layers 854 comprising any number of Knowledge Cells 800. In some aspects, Neural Network 530a may store Knowledge Cells 800 interconnected by Connections 853 where following a path through the Neural Network 530a can later be used to enable autonomous Object 180 operation. It should be understood that, in some embodiments, Knowledge Cells 800 in one Layer 854 of Neural Network 530a need not be connected only with Knowledge Cells 800 in a successive Layer 854, but also in any other Layer 854, thereby creating shortcuts (i.e. shortcut Connections 853, etc.) through Neural Network 530a. A Knowledge Cell 800 can also be connected to itself such as, for example, in recurrent neural networks. In general, any Knowledge Cell 800 can be connected with any other Knowledge Cell 800 anywhere else in Neural Network 530a. In further embodiments, back-propagation of any data or information can be implemented. In one example, back-propagation of similarity (i.e. similarity index, etc.) of compared Knowledge Cells 800 in a path through Neural Network 530a can be implemented. In another example, back-propagation of errors can be implemented. Such back-propagations can then be used to adjust occurrence counts and/or weights of Connections 853 for better future predictions, for example. Any other back-propagation can be implemented for other purposes. Any combination of Nodes 852 (i.e. Nodes 852 comprising Knowledge Cells 800, etc.), Connections 853, Layers 854, and/or other elements or techniques can be implemented in alternate embodiments. Neural Network 530a may include any type or form of a neural network known in art such as a feed-forward neural network, a back-propagating neural network, a recurrent neural network, a convolutional neural network, deep neural network, and/or others including a custom neural network.

In some embodiments, Knowledge Structuring Unit 520 structures or generates Knowledge Cells 800 and the system applies them onto Neural Network 530a, thereby implementing learning Object's 180 operation in various visual surroundings. The system can perform Similarity Comparisons 125 (later described) of a Knowledge Cell 800 from Knowledge Structuring Unit 520 with Knowledge Cells 800 in a corresponding Layer 854 of Neural Network 530a. If a substantially similar Knowledge Cell 800 is not found in the corresponding Layer 854 of Neural Network 530a, the system may insert (i.e. copy, store, etc.) the Knowledge Cell 800 from Knowledge Structuring Unit 520 into the corresponding Layer 854 of Neural Network 530a, and create a Connection 853 to the inserted Knowledge Cell 800 from a Knowledge Cell 800 in a prior Layer 854 including assigning an occurrence count to the new Connection 853, calculating a weight of the new Connection 853, and updating any other Connections 853 originating from the Knowledge Cell 800 in the prior Layer 854. On the other hand, if a substantially similar Knowledge Cell 800 is found in the corresponding Layer 854 of Neural Network 530a, the system may update occurrence count and weight of Connection 853 to that Knowledge Cell 800 from a Knowledge Cell 800 in a prior Layer 854, and update any other Connections 853 originating from the Knowledge Cell 800 in the prior Layer 854.

For example, the system can perform Similarity Comparisons 125 (later described) of Knowledge Cell 800ba from Knowledge Structuring Unit 520 with Knowledge Cells 800 in Layer 854a of Neural Network 530a. In the case that a substantially similar match is found between Knowledge Cell 800ba and Knowledge Cell 800ea, the system may perform no action since Knowledge Cell 800ea is the initial Knowledge Cell 800. The system can then perform Similarity Comparisons 125 of Knowledge Cell 800bb from Knowledge Structuring Unit 520 with Knowledge Cells 800 in Layer 854b of Neural Network 530a. In the case that a substantially similar match is found between Knowledge Cell 800bb and Knowledge Cell 800eb, the system may update occurrence count and weight of Connection 853e1 between Knowledge Cell 800ea and Knowledge Cell 800eb, and update weights of other Connections 853 originating from Knowledge Cell 800ea as previously described. The system can then perform Similarity Comparisons 125 of Knowledge Cell 800bc from Knowledge Structuring Unit 520 with Knowledge Cells 800 in Layer 854c of Neural Network 530a. In the case that a substantially similar match is not found, the system may insert Knowledge Cell 800ec into Layer 854c and copy Knowledge Cell 800bc into the inserted Knowledge Cell 800ec. The system may also create Connection 853e2 between Knowledge Cell 800eb and Knowledge Cell 800ec with occurrence count of 1 and weight calculated based on the occurrence count as previously described. The system may also update weights of other Connections 853 (one in this example) originating from Knowledge Cell 800eb as previously described. The system can then perform Similarity Comparisons 125 of Knowledge Cell 800bd from Knowledge Structuring Unit 520 with Knowledge Cells 800 in Layer 854d of Neural Network 530a. In the case that a substantially similar match is not found, the system may insert Knowledge Cell 800ed into Layer 854d and copy Knowledge Cell 800bd into the inserted Knowledge Cell 800ed. The system may also create Connection 853e3 between Knowledge Cell 800ec and Knowledge Cell 800ed with occurrence count of 1 and weight of 1. The system can then perform Similarity Comparisons 125 of Knowledge Cell 800be from Knowledge Structuring Unit 520 with Knowledge Cells 800 in Layer 854e of Neural Network 530a. In the case that a substantially similar match is not found, the system may insert Knowledge Cell 800ee into Layer 854e and copy Knowledge Cell 800be into the inserted Knowledge Cell 800ee. The system may also create Connection 853e4 between Knowledge Cell 800ed and Knowledge Cell 800ee with occurrence count of 1 and weight of 1. Applying any additional Knowledge Cells 800 from Knowledge Structuring Unit 520 onto Neural Network 530a follows similar logic or process as the above-described.

Similarity Comparison 125 comprises the functionality for comparing or matching Knowledge Cells 800 or portions thereof, and/or other functionalities. Similarity Comparison 125 comprises the functionality for comparing or matching Digital Pictures 525 or portions thereof. Similarity Comparison 125 comprises the functionality for comparing or matching streams of Digital Pictures 525 or portions thereof. Similarity Comparison 125 comprises the functionality for comparing or matching Instruction Sets 526, Extra Info 527, text (i.e. characters, words, phrases, etc.), pictures, sounds, data, and/or other elements or portions thereof. Similarity Comparison 125 may include functions, rules, and/or logic for performing matching or comparisons and for determining that while a perfect match is not found, a similar or partial match has been found. In some aspects, Similarity Comparison 125 may include determining substantial similarity or substantial match of compared elements. In other aspects, a partial match may include a substantial or otherwise similar match, and vice versa. Although, substantial similarity or substantial match is frequently used herein, it should be understood that any level of similarity, however high or low, may be utilized as defined by the rules (i.e. thresholds, etc.) for similarity. The rules for similarity or similar match can be defined by a user, by VSAOO system administrator, or automatically by the system based on experience, testing, inquiry, analysis, synthesis, or other techniques, knowledge, or input. In some designs, Similarity Comparison 125 comprises the functionality to automatically define appropriately strict rules for determining similarity of the compared elements. Similarity Comparison 125 can therefore set, reset, and/or adjust the strictness of the rules for finding or determining similarity of the compared elements, thereby fine tuning Similarity Comparison 125 so that the rules for determining similarity are appropriately strict. In some aspects, the rules for determining similarity may include a similarity threshold. As such, Similarity Comparison 125 can determine similarity of compared elements if their similarity exceeds a similarity threshold. In other aspects, the rules for determining similarity may include a difference threshold. As such, Similarity Comparison 125 can determine similarity of compared elements if their difference is lower than a difference threshold. In further aspects, the rules for determining similarity may include other thresholds.

In some embodiments, in determining similarity of Knowledge Cells 800, Similarity Comparison 125 can compare one or more Digital Pictures 525 or portions (i.e. regions, features, pixels, etc.) thereof from one Knowledge Cell 800 with one or more Digital Pictures 525 or portions thereof from another Knowledge Cell 800. In some aspects, total equivalence is achieved when all Digital Pictures 525 or portions thereof of the compared Knowledge Cells 800 match. If total equivalence is not found, Similarity Comparison 125 may attempt to determine substantial or other similarity. Any features, functionalities, and embodiments of the previously described Picture Recognizer 350 can be used in determining such substantial similarity.

In some embodiments where compared Knowledge Cells 800 include a single Digital Picture 525, Similarity Comparison 125 can compare Digital Picture 525 from one Knowledge Cell 800 with Digital Picture 525 from another Knowledge Cell 800 using comparison techniques for individual pictures described below. In some embodiments where compared Knowledge Cells 800 include streams of Digital Pictures 525 (i.e. motion pictures, videos, etc.), Similarity Comparison 125 can compare a stream of Digital Pictures 525 from one Knowledge Cell 800 with a stream of Digital Pictures 525 from another Knowledge Cell 800. Such comparison may include comparing Digital Pictures 525 from one Knowledge Cell 800 with corresponding (i.e. similarly positioned, temporally related, etc.) Digital Pictures 525 from another Knowledge Cell 800. In one example, a $67^{th}$ Digital Picture 525 from one Knowledge Cell 800 can be compared with a $67^{th}$ Digital Picture 525 from another Knowledge Cell 800. In another example, a $67^{th}$ Digital Picture 525 from one Knowledge Cell 800 can be compared with a number of Digital Picture 525 around (i.e. preceding and/or following) a $67^{th}$ Digital Picture 525 from another Knowledge Cell 800. This way, flexibility can be implemented in finding a substantially similar Digital Picture 525 if the Digital Pictures 525 in the compared Knowledge Cells 800 are not perfectly aligned. In other aspects, Similarity Comparison 125 can utilize Dynamic Time Warping (DTW) and/or other techniques know in art for comparing and/or aligning temporal sequences (i.e. streams of Digital Pictures 525, etc.) that may vary in time or speed. Once the corresponding (i.e. similarly positioned, temporally related, time warped/aligned, etc.) Digital Pictures 525 in the compared streams of Digital Pictures 525 are compared and their substantial similarity determined using comparison techniques for individual pictures described below, Similarity Comparison 125 can utilize a threshold for the number or percentage of matching or substantially matching Digital Pictures 525 for determining substantial similarity of the compared Knowledge Cells 800. In some aspects, substantial similarity can be achieved when most of the Digital Pictures 525 or portions (i.e. regions, features, pixels, etc.) thereof of the compared Knowledge Cells 800 match or substantially match. In other aspects, substantial similarity can be achieved when at least a threshold number or percentage of Digital Pictures 525 or portions thereof of the compared Knowledge Cells 800 match or substantially match. Similarly, substantial similarity can be achieved when a number or percentage of matching or substantially matching Digital Pictures 525 or portions thereof of the compared Knowledge Cells 800 exceeds a threshold. In further aspects, substantial similarity can be achieved when all but a threshold number or percentage of Digital Pictures 525 or portions thereof of the compared Knowledge Cells 800 match or substantially match. Such thresholds can be defined by a user, by VSAOO system administrator, or automatically by the system based on experience, testing, inquiry, analysis, synthesis, or other techniques, knowledge, or input. In one example, substantial similarity can be achieved when at least 1, 2, 3, 4, or any other threshold number of Digital Pictures 525 or portions thereof of the compared Knowledge Cells 800 match or substantially match. Similarly, substantial similarity can be achieved when the number of matching or substantially matching Digital Pictures 525 or portions thereof of the compared Knowledge Cells 800 exceeds 1, 2, 3, 4, or any other threshold number. In another example, substantial similarity can be achieved when at least 10%, 21%, 30%, 49%, 66%, 89%, 93%, or any other percentage of Digital Pictures 525 or portions thereof of the compared Knowledge Cells 800 match or substantially match. Similarly, substantial similarity can be achieved when the percentage of matching or substantially matching Digital Pictures 525 or portions thereof of the compared Knowledge Cells 800 exceeds 10%, 21%, 30%, 49%, 66%, 89%, 93%, or any other threshold percentage. In other embodiments, substantial similarity of the compared Knowledge Cells 800 can be achieved in terms of matches or substantial matches in more important (i.e. as indicated by importance index [later described], etc.) Digital Pictures 525 or portions thereof, thereby tolerating mismatches in less important Digital Pictures 525 or portions thereof. In one example, substantial similarity can be achieved when matches or substantial matches are found with respect to more substantive Digital Pictures 525 (i.e. pictures comprising content of interest [i.e. persons, objects, etc.], etc.) or portions thereof of the compared Knowledge Cells 800, thereby tolerating mismatches in less substantive Digital Pictures 525 (i.e. pictures comprising background, insignificant content, etc.) or portions thereof. In another example, substantial similarity can be achieved when matches or substantial matches are found in earlier Digital Pictures 525 or portions thereof of the compared Knowledge Cells 800, thereby tolerating mismatches in later Digital Pictures 525 or portions thereof. In general, any importance or weight can be assigned to any Digital Picture 525 or portion thereof, and/or other elements. In some designs, Similarity Comparison 125 can be configured to omit any Digital Picture 525 or portion thereof from the comparison. In one example, less substantive Digital Pictures 525 or portions thereof can be omitted. In another example, some or all Digital Pictures 525 or portions thereof related to a specific time period can be omitted. In a further example, later Digital Pictures 525 or portions thereof can be omitted.

In further embodiments, substantial similarity can be achieved taking into account the number of Digital Pictures 525 of the compared Knowledge Cells 800. For example, substantial similarity can be achieved if the number, in addition to the content, of Digital Pictures 525 of the compared Knowledge Cells 800 match or substantially match. In further embodiments, substantial similarity can be achieved taking into account the objects detected within Digital Pictures 525 and/or other features of Digital Pictures 525 of the compared Knowledge Cells 800. For example, substantial similarity can be achieved if same or similar objects are detected in Digital Pictures 525 of the compared Knowledge Cells 800. Any features, functionalities, and embodiments of Picture Recognizer 350 can be used in such detection. In some aspects, Similarity Comparison 125 can compare the number, objects detected, and/or other features of Digital Pictures 525 as an initial check before proceeding to further detailed comparisons.

Similarity Comparison 125 can automatically adjust (i.e. increase or decrease) the strictness of the rules for determining substantial similarity of Knowledge Cells 800. In some aspects, such adjustment in strictness can be done by Similarity Comparison 125 in response to determining that total equivalence of compared Knowledge Cells 800 had not been found. Similarity Comparison 125 can keep adjusting the strictness of the rules until substantially similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 95%, etc.) of Digital Pictures 525 or portions thereof from the compared Knowledge Cells 800. If the comparison does not determine substantial similarity of compared Knowledge Cells 800, Similarity Comparison 125 may decide to decrease the strictness of the rules. In response, Similarity Comparison 125 may attempt to find fewer matching or substantially matching Digital Pictures 525 or portions thereof than in the previous attempt using stricter rules. If the comparison still does not determine substantial similarity of compared Knowledge Cells 800, Similarity Comparison 125 may further decrease (i.e. down to a certain minimum strictness or threshold, etc.) the strictness by requiring fewer Digital Pictures 525 or portions thereof to match or substantially match, thereby further increasing a chance of finding substantial similarity in compared Knowledge Cells 800. In further aspects, an adjustment in strictness can be done by Similarity Comparison 125 in response to determining that multiple substantially similar Knowledge Cells 800 had been found. Similarity Comparison 125 can keep adjusting the strictness of the rules until a best of the substantially similar Knowledge Cells 800 is found. For example, Similarity Comparison 125 may attempt to find a match or substantial match in a certain percentage (i.e. 70%, etc.) of Digital Pictures 525 or portions thereof from the compared Knowledge Cells 800. If the comparison determines a number of substantially similar Knowledge Cells 800, Similarity Comparison 125 may decide to increase the strictness of the rules to decrease the number of substantially similar Knowledge Cells 800. In response, Similarity Comparison 125 may attempt to find more matching or substantially matching Digital Pictures 525 or portions thereof in addition to the earlier found Digital Pictures 525 or portions thereof to limit the number of substantially similar Knowledge Cells 800. If the comparison still provides more than one substantially similar Knowledge Cell 800, Similarity Comparison 125 may further increase the strictness by requiring additional Digital Pictures 525 or portions thereof to match or substantially match, thereby further narrowing the number of substantially similar Knowledge Cells 800 until a best substantially similar Knowledge Cells 800 is found.

In some embodiments, in determining substantial similarity of individual Digital Pictures 525 (i.e. Digital Pictures 525 from the compared Knowledge Cells 800, etc.), Similarity Comparison 125 can compare one or more regions of one Digital Picture 525 with one or more regions of another Digital Picture 525. A region may include a collection of pixels. In some aspects, a region may include detected or recognized content of interest such as an object or person. Such region may be detected using any features, functionalities, and embodiments of Picture Recognizer 350. In other aspects, a region may include content defined using a picture segmentation technique. Examples of picture segmentation techniques include thresholding, clustering, region-growing, edge detection, curve propagation, level sets, graph partitioning, model-based segmentation, trainable segmentation (i.e. artificial neural networks, etc.), and/or others. In further aspects, a region may include content defined using any technique. In further aspects, a region may include any arbitrary region comprising any arbitrary content. Once regions of the compared Digital Pictures 525 are known, Similarity Comparison 125 can compare the regions to determine substantial similarity of the compared Digital Pictures 525. In some aspects, total equivalence is found when all regions of one Digital Picture 525 match all regions of another Digital Picture 525. In other aspects, if total equivalence is not found, Similarity Comparison 125 may attempt to determine substantial similarity of compared Digital Pictures 525. In one example, substantial similarity can be achieved when most of the regions of the compared Digital Picture 525 match or substantially match. In another example, substantial similarity can be achieved when at least a threshold number (i.e. 1, 2, 5, 11, 39, etc.) or percentage (i.e. 38%, 63%, 77%, 84%, 98%, etc.) of regions of the compared Digital Pictures 525 match or substantially match. Similarly, substantial similarity can be achieved when the number or percentage of matching or substantially matching regions of the compared Digital Pictures 525 exceeds a threshold number (i.e. 1, 2, 5, 11, 39, etc.) or a threshold percentage (i.e. 48%, 63%, 77%, 84%, 98%, etc.). In a further example, substantial similarity can be achieved when all but a threshold number or percentage of regions of the compared Digital Pictures 525 match or substantially match. Such thresholds can be defined by a user, by VSAOO system administrator, or automatically by the system based on experience, testing, inquiry, analysis, synthesis, and/or other techniques, knowledge, or input. In further aspects, Similarity Comparison 125 can utilize the type of regions for determining substantial similarity of Digital Pictures 525. For example, substantial similarity can be achieved when matches or substantial matches are found with respect to more substantive, larger, and/or other regions, thereby tolerating mismatches in less substantive, smaller, and/or other regions. In further aspects, Similarity Comparison 125 can utilize the importance (i.e. as indicated by importance index [later described], etc.) of regions for determining substantial similarity of Digital Pictures 525. For example, substantial similarity can be achieved when matches or substantial matches are found with respect to more important regions such as the above described more substantive, larger, and/or other regions, thereby tolerating mismatches in less important regions such as less substantive, smaller, and/or other regions. In further aspects, Similarity Comparison 125 can omit some of the regions from the comparison in determining substantial similarity of Digital Pictures 525. In one example, isolated regions can be omitted from comparison. In another example, less substantive or smaller regions can be omitted from comparison. In general, any region can be omitted from comparison. In further aspects, Similarity Comparison 125 can focus on certain regions of interest from the compared Digital Pictures 525. For example, substantial similarity can be achieved when matches or substantial matches are found with respect to regions comprising persons or parts (i.e. head, arm, leg, etc.) thereof, large objects, close objects, and/or other content of interest, thereby tolerating mismatches in regions comprising the background, insignificant content, and/or other content. In further aspects, Similarity Comparison 125 can detect or recognize persons or objects in the compared Digital Pictures 525 using regions. Any features, functionalities, and embodiments of Picture Recognizer 350 can be used in such detection or recognition. Once a person or object is detected in a Digital Picture 525, Similarity Comparison 125 may attempt to detect the person or object in the compared Digital Picture 525. In one example, substantial similarity can be achieved when the compared Digital Pictures 525 comprise one or more same persons or objects. In another example concerning streams of Digital Pictures 525, substantial similarity can be achieved when the compared streams of Digital Pictures 525 comprise a detected person or object in at least a threshold number or percentage of their pictures.

Similarity Comparison 125 can automatically adjust (i.e. increase or decrease) the strictness of the rules for determining substantial similarity of Digital Pictures 525 using regions. In some aspects, such adjustment in strictness can be done by Similarity Comparison 125 in response to determining that total equivalence of compared Digital Pictures 525 had not been found. Similarity Comparison 125 can keep adjusting the strictness rules until a substantial similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 74%, etc.) of regions from the compared Digital Pictures 525. If the comparison does not determine substantial similarity of compared Digital Pictures 525, Similarity Comparison 125 may decide to decrease the strictness of the rules. In response, Similarity Comparison 125 may attempt to find fewer matching or substantially matching regions than in the previous attempt using stricter rules. If the comparison still does not determine substantial similarity of compared Digital Pictures 525, Similarity Comparison 125 may further decrease the strictness (i.e. down to a certain minimum strictness or threshold, etc.) by requiring fewer regions to match or substantially match, thereby further increasing a chance of finding substantial similarity in compared Digital Pictures 525.

Where a reference to a region is used herein it should be understood that a portion of a region or a collection of regions can be used instead of or in addition to the region. In one example, instead of or in addition to regions, individual pixels and/or features that constitute a region can be compared. In another example, instead of or in addition to regions, collections of regions can be compared. As such, any operations, rules, logic, and/or functions operating on regions similarly apply to any portion of a region and/or any collection of regions. In general, whole regions, portions of a region, and/or collections of regions, including any operations thereon, can be combined to arrive at desired results. Some or all of the above-described rules, logic, and/or techniques can be utilized alone or in combination with each other or with other rules, logic, and/or techniques. One of ordinary skill in art will recognize that other techniques known in art for determining similarity of digital pictures, streams of digital pictures, and/or other data that would be too voluminous to describe are within the scope of this disclosure.

In some embodiments, in determining substantial similarity of individual Digital Pictures 525 (i.e. Digital Pictures 525 from the compared Knowledge Cells 800, etc.), Similarity Comparison 125 can compare one or more features of one Digital Picture 525 with one or more features of another Digital Picture 525. A feature may include a collection of pixels. Some of the steps or elements in a feature oriented technique include pre-processing, feature extraction, detection/segmentation, decision-making, and/or others, or a combination thereof, each of which may include its own sub-steps or sub-elements depending on the application. Examples of features that can be used include lines, edges, ridges, corners, blobs, and/or others. Examples of feature extraction techniques include Canny, Sobe, Kayyali, Harris & Stephens et al, SUSAN, Level Curve Curvature, FAST, Laplacian of Gaussian, Difference of Gaussians, Determinant of Hessian, MSER, PCBR, Grey-level Blobs, and/or others. Once features of the compared Digital Pictures 525 are known, Similarity Comparison 125 can compare the features to determine substantial similarity. In some aspects, total equivalence is found when all features of one Digital Picture 525 match all features of another Digital Picture 525. In other aspects, if total equivalence is not found, Similarity Comparison 125 may attempt to determine substantial similarity of compared Digital Pictures 525. In one example, substantial similarity can be achieved when most of the features of the compared Digital Picture 525 match or substantially match. In another example, substantial similarity can be achieved when at least a threshold number (i.e. 3, 22, 47, 93, 128, 431, etc.) or percentage (i.e. 49%, 53%, 68%, 72%, 95%, etc.) of features of the compared Digital Pictures 525 match or substantially match. Similarly, substantial similarity can be achieved when the number or percentage of matching or substantially matching features of the compared Digital Pictures 525 exceeds a threshold number (i.e. 3, 22, 47, 93, 128, 431, etc.) or a threshold percentage (i.e. 49%, 53%, 68%, 72%, 95%, etc.). In a further example, substantial similarity can be achieved when all but a threshold number or percentage of features of the compared Digital Pictures 525 match or substantially match. Such thresholds can be defined by a user, by VSAOO system administrator, or automatically by the system based on experience, testing, inquiry, analysis, synthesis, and/or other techniques, knowledge, or input. In further aspects, Similarity Comparison 125 can utilize the type of features for determining substantial similarity of Digital Pictures 525. In one example, substantial similarity can be achieved when matches or substantial matches are found with respect to edges, thereby tolerating mismatches in blobs. In another example, substantial similarity can be achieved when matches or substantial matches are found with respect to more substantive, larger, and/or other features, thereby tolerating mismatches in less substantive, smaller, and/or other features. In further aspects, Similarity Comparison 125 can utilize the importance (i.e. as indicated by importance index [later described], etc.) of features for determining substantial similarity of Digital Pictures 525. For example, substantial similarity can be achieved when matches or substantial matches are found with respect to more important features such as the above described more substantive, larger, and/or other features, thereby tolerating mismatches in less important features such as less substantive, smaller, and/or other features. In further aspects, Similarity Comparison 125 can omit some of the features from the comparison in determining substantial similarity of Digital Pictures 525. In one example, isolated features can be omitted from comparison. In another example, less substantive or smaller features can be omitted from comparison. In general, any feature can be omitted from comparison. In further aspects, Similarity Comparison 125 can focus on features in certain regions of interest of the compared Digital Pictures 525. For example, substantial similarity can be achieved when matches or substantial matches are found with respect to features in regions comprising persons or parts (i.e. head, arm, leg, etc.) thereof, large objects, close objects, and/or other objects, thereby tolerating mismatches in features of regions comprising the background, insignificant content, and/or other regions. In further aspects, Similarity Comparison 125 can detect or recognize persons or objects in the compared Digital Pictures 525. Any features, functionalities, and embodiments of Picture Recognizer 350 can be used in such detection or recognition. Once a person or object is detected in a Digital Picture 525, Similarity Comparison 125 may attempt to detect the person or object in the compared Digital Picture 525. In one example, substantial similarity can be achieved when the compared Digital Pictures 525 comprise one or more same persons or objects. In another example concerning streams of Digital Pictures 525, substantial similarity can be achieved when the compared streams of Digital Pictures 525 comprise a detected person or object in at least a threshold number or percentage of their pictures. In further aspects, Similarity Comparison 125 may include identifying and/or analyzing tiled and/or overlapping features, which can then be combined (i.e. similar to some process steps in convolutional neural networks, etc.) and compared to determine substantial similarity of Digital Pictures 525.

Similarity Comparison 125 can automatically adjust (i.e. increase or decrease) the strictness of the rules for determining substantial similarity of Digital Pictures 525 using features. In some aspects, such adjustment in strictness can be done by Similarity Comparison 125 in response to determining that total equivalence of compared Digital Pictures 525 had not been found. Similarity Comparison 125 can keep adjusting the strictness rules until a substantial similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 89%, etc.) of features from the compared Digital Pictures 525. If the comparison does not determine substantial similarity of compared Digital Pictures 525, Similarity Comparison 125 may decide to decrease the strictness of the rules. In response, Similarity Comparison 125 may attempt to find fewer matching or substantially matching features than in the previous attempt using stricter rules. If the comparison still does not determine substantial similarity of compared Digital Pictures 525, Similarity Comparison 125 may further decrease the strictness (i.e. down to a certain minimum strictness or threshold, etc.) by requiring fewer features to match or substantially match, thereby further increasing a chance of finding substantial similarity in compared Digital Pictures 525.

Where a reference to a feature is used herein it should be understood that a portion of a feature or a collection of features can be used instead of or in addition to the feature. In one example, instead of or in addition to features, individual pixels that constitute a feature can be compared. In another example, instead of or in addition to features, collections of features can be compared. In a further example, levels of features where a feature on one level includes one or more features from another level (i.e. prior level, etc.) can be compared. As such, any operations, rules, logic, and/or functions operating on features similarly apply to any portion of a feature and/or any collection of features. In general, whole features, portions of a feature, and/or collections of features, including any operations thereon, can be combined to arrive at desired results. Some or all of the above-described rules, logic, and/or techniques can be utilized alone or in combination with each other or with other rules, logic, and/or techniques. One of ordinary skill in art will recognize that other techniques known in art for determining similarity of digital pictures, streams of digital pictures, and/or other data that would be too voluminous to describe are within the scope of this disclosure.

In some embodiments, in determining substantial similarity of individual Digital Pictures 525 (i.e. Digital Pictures 525 from the compared Knowledge Cells 800, etc.), Similarity Comparison 125 can compare pixels of one Digital Picture 525 with pixels of another Digital Picture 525. In some aspects, total equivalence is found when all pixels of one Digital Picture 525 match all pixels of another Digital Picture 525. In other aspects, if total equivalence is not found, Similarity Comparison 125 may attempt to determine substantial similarity. In one example, substantial similarity can be achieved when most of the pixels from the compared Digital Pictures 525 match or substantially match. In another example, substantial similarity can be achieved when at least a threshold number (i.e. 449, 2219, 92229, 442990, 1000028, etc.) or percentage (i.e. 39%, 45%, 58%, 72%, 92%, etc.) of pixels from the compared Digital Pictures 525 match or substantially match. Similarly, substantial similarity can be achieved when the number or percentage of matching or substantially matching pixels from the compared Digital Pictures 525 exceeds a threshold number (i.e. 449, 2219, 92229, 442990, 1000028, etc.) or a threshold percentage (i.e. 39%, 45%, 58%, 72%, 92%, etc.). In a further example, substantial similarity can be achieved when all but a threshold number or percentage of pixels from the compared Digital Pictures 525 match or substantially match. Such thresholds can be defined by a user, by VSAOO system administrator, or automatically by the system based on experience, testing, inquiry, analysis, synthesis, and/or other techniques, knowledge, or input. In further aspects, Similarity Comparison 125 can omit some of the pixels from the comparison in determining substantial similarity of Digital Pictures 525. In one example, pixels composing the background or any insignificant content can be omitted from comparison. In general, any pixel can be omitted from comparison. In further aspects, Similarity Comparison 125 can focus on pixels in certain regions of interest in determining substantial similarity of Digital Pictures 525. For example, substantial similarity can be achieved when matches or substantial matches are found with respect to pixels in regions comprising persons or parts (i.e. head, arm, leg, etc.) thereof, large objects, close objects, and/or other content of interest, thereby tolerating mismatches in pixels in regions comprising the background, insignificant content, and/or other content.

Similarity Comparison 125 can automatically adjust (i.e. increase or decrease) the strictness of the rules for determining substantial similarity of Digital Pictures 525 using pixels. In some aspects, such adjustment in strictness can be done by Similarity Comparison 125 in response to determining that total equivalence of compared Digital Pictures 525 had not been found. Similarity Comparison 125 can keep adjusting the strictness rules until a substantial similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 77%, etc.) of pixels from the compared Digital Pictures 525. If the comparison does not determine substantial similarity of compared Digital Pictures 525, Similarity Comparison 125 may decide to decrease the strictness of the rules. In response, Similarity Comparison 125 may attempt to find fewer matching or substantially matching pixels than in the previous attempt using stricter rules. If the comparison still does not determine substantial similarity of compared Digital Pictures 525, Similarity Comparison 125 may further decrease the strictness (i.e. down to a certain minimum strictness or threshold, etc.) by requiring fewer pixels to match or substantially match, thereby further increasing a chance of finding substantial similarity in compared Digital Pictures 525.

Where a reference to a pixel is used herein it should be understood that a collection of pixels can be used instead of or in addition to the pixel. For example, instead of or in addition to pixels, collections of pixels can be compared. As such, any operations, rules, logic, and/or functions operating on pixels similarly apply to any collection of pixels. In general, pixels and/or collections of pixels, including any operations thereon, can be combined to arrive at desired results. Some or all of the above-described rules, logic, and/or techniques can be utilized alone or in combination with each other or with other rules, logic, and/or techniques. Any of the previously described features, functionalities, and embodiments of Similarity Comparison 125 for determining substantial similarity of Digital Pictures 525 using regions and/or features can similarly be used for pixels. One of ordinary skill in art will recognize that other techniques known in art for determining similarity of digital pictures, streams of digital pictures, and/or other data that would be too voluminous to describe are within the scope of this disclosure.

Other aspects or properties of digital pictures or pixels can be taken into account by Similarity Comparison 125 in digital picture comparisons. Examples of such aspects or properties include color adjustment, size adjustment, content manipulation, transparency (i.e. alpha channel, etc.), use of mask, and/or others. In some implementations, as digital pictures can be captured by various picture taking equipment, in various environments, and under various lighting conditions, Similarity Comparison 125 can adjust lighting or color of pixels or otherwise manipulate pixels before or during comparison. Lighting or color adjustment (also referred to as gray balance, neutral balance, white balance, etc.) may generally include manipulating or rebalancing the intensities of the colors (i.e. red, green, and/or blue if RGB color model is used, etc.) of one or more pixels. For example, Similarity Comparison 125 can adjust lighting or color of all pixels of one picture to make it more comparable to another picture. Similarity Comparison 125 can also incrementally adjust the pixels such as increasing or decreasing the red, green, and/or blue pixel values by a certain amount in each cycle of comparisons in order to find a substantially similar match at one of the incremental adjustment levels. Any of the publically available, custom, or other lighting or color adjustment techniques or programs can be utilized such as color filters, color balancing, color correction, and/or others. In other implementations, Similarity Comparison 125 can resize or otherwise transform a digital picture before or during comparison. Such resizing or transformation may include increasing or decreasing the number of pixels of a digital picture. For example, Similarity Comparison 125 can increase or decrease the size of a digital picture proportionally (i.e. increase or decrease length and/or width keeping aspect ratio constant, etc.) to equate its size with the size of another digital picture. Similarity Comparison 125 can also incrementally resize a digital picture such as increasing or decreasing the size of the digital picture proportionally by a certain amount in each cycle of comparisons in order to find a substantially similar match at one of the incremental sizes. Any of the publically available, custom, or other digital picture resizing techniques or programs can be utilized such as nearest-neighbor interpolation, bilinear interpolation, bicubic interpolation, and/or others. In further implementations, Similarity Comparison 125 can manipulate content (i.e. all pixels, one or more regions, one or more depicted objects/persons, etc.) of a digital picture before or during comparison. Such content manipulation may include moving, centering, aligning, resizing, transforming, and/or otherwise manipulating content of a digital picture. For example, Similarity Comparison 125 can move, center, or align content of one picture to make it more comparable to another picture. Any of the publically available, custom, or other digital picture manipulation techniques or programs can be utilized such as pixel moving, warping, distorting, aforementioned interpolations, and/or others. In further implementations, in digital pictures comprising transparency features or functionalities, Similarity Comparison 125 can utilize a threshold for acceptable number or percentage transparency difference similar to the below-described threshold for the acceptable color difference. Alternatively, transparency can be applied to one or more pixels of a digital picture and color difference may then be determined between compared pixels taking into account the transparency related color effect. Alternatively, transparent pixels can be excluded from comparison. In further implementations, certain regions or subsets of pixels can be ignored or excluded during comparison using a mask. In general, any region or subset of a picture determined to contain no content of interest can be excluded from comparison using a mask. Examples of such regions or subsets include background, transparent or partially transparent regions, regions comprising insignificant content, or any arbitrary region or subset. Similarity Comparison 125 can perform any other pre-processing or manipulation of digital pictures or pixels before or during comparison.

In any of the comparisons involving digital pictures or pixels, Similarity Comparison 125 can utilize a threshold for acceptable number or percentage difference in determining a match for each compared pixel. A pixel in a digital picture can be encoded using various techniques such as RGB (i.e. red, green, blue), CMYK (i.e. cyan, magenta, yellow, and key [black]), binary value, hexadecimal value, numeric value, and/or others. For instance, in RGB color scheme, each of red, green, and blue colors is encoded with a value 0-255 or its binary equivalent. In one example, a threshold for acceptable difference (i.e. absolute difference, etc.) can be set at 10 for each of the three colors. Therefore, a pixel encoded as R130, G240, B50 matches or is sufficiently similar to a compared pixel encoded as R135, G231, B57 because the differences in all three colors fall within the acceptable difference threshold (i.e. 10 in this example, etc.). Furthermore, a pixel encoded as R130, G240, B50 does not match or is not sufficiently similar to a compared pixel encoded as R143, G231, B57 because the difference in red value falls outside the acceptable difference threshold. Any other number threshold can be used such as 1, 3, 8, 15, 23, 77, 132, 197, 243, and/or others. A threshold for acceptable percentage difference can similarly be utilized such as 0.12%, 2%, 7%, 14%, 23%, 36%, 65%, and/or others. In some aspects, a threshold for acceptable number or percentage difference in red, green, and blue can be set to be different for each color. A similar difference determination can be utilized in pixels encoded in any other color scheme. The aforementioned thresholds can be defined by a user, by VSAOO system administrator, or automatically by the system based on experience, testing, inquiry, analysis, synthesis, or other techniques, knowledge, or input.

In some embodiments, Similarity Comparison 125 can compare one or more Extra Info 527 (i.e. time information, location information, computed information, observed information, acoustic information, contextual information, and/or other information, etc.) in addition to or instead of comparing Digital Pictures 525 or portions thereof in determining substantial similarity of Knowledge Cells 800. Extra Info 527 can be set to be less, equally, or more important (i.e. as indicated by importance index [later described], etc.) than Digital Pictures 525, regions, features, pixels, and/or other elements in the comparison. Since Extra Info 527 may include any contextual or other information that can be useful in determining similarity of any compared elements, Extra Info 527 can be used to enhance any of the aforementioned similarity determinations.

In some embodiments, Similarity Comparison 125 can also compare one or more Instruction Sets 526 in addition to or instead of comparing Digital Pictures 525 or portions thereof in determining substantial similarity of Knowledge Cells 800. In some aspects, Similarity Comparison 125 can compare portions of Instruction Sets 526 to determine substantial similarity of Instruction Sets 526. Similar thresholds for the number or percentage of matching portions of the compared Digital Pictures 525 can be utilized in Instruction Set 526 comparisons. Such thresholds can be defined by a user, by VSAOO system administrator, or automatically by the system based on experience, testing, inquiry, analysis, synthesis, and/or other techniques, knowledge, or input. In other aspects, Similarity Comparison 125 can compare text (i.e. character comparison, word/phrase search/comparison, semantic comparison, etc.) or other data (i.e. bit comparison, object or data structure comparison, etc.) to determine substantial similarity of Instruction Sets 526. Any other comparison technique can be utilized in comparing Instruction Sets 526 in alternate implementations. Instruction Sets 526 can be set to be less, equally, or more important (i.e. as indicated by importance index [later described], etc.) than Digital Pictures 525, regions, features, pixels, Extra Info 527, and/or other elements in the comparison.

In some embodiments, an importance index (not shown) or other importance ranking technique can be used in any of the previously described comparisons or other processing involving elements of different importance. Importance index indicates importance of the element to or with which the index is assigned or associated. For example, importance index may indicate importance of a Knowledge Cell 800, Digital Picture 525, Instruction Set 526, Extra Info 527, region, feature, and/or other element to or with which the index is assigned or associated. In some aspects, importance index on a scale from 0 to 1 can be utilized, although, any other range can also be utilized. Importance index can be stored in or associated with the element to which the index pertains. Association of importance indexes can be implemented using a table where one column comprises elements and another column comprises their associated importance indexes, for example. Importance indexes of various elements can be defined by a user, by VSAOO system administrator, or automatically by the system based on experience, testing, inquiry, analysis, synthesis, or other techniques, knowledge, or input. In one example, a higher Importance index can be assigned to more substantive Digital Pictures 525 (i.e. pictures comprising content of interest [i.e. persons, objects, etc.], etc.). In another example, a higher importance index can be assigned to Digital Pictures 525 that are correlated with Instruction Sets 526. Any importance index can be assigned to or associated with any element described herein. Any importance ranking technique can be utilized as or instead of importance index in alternate embodiments.

In some embodiments, Similarity Comparison 125 may generate a similarity index (not shown) for any compared elements. Similarity index indicates how well an element is matched with another element. For example, similarity index indicates how well a Knowledge Cell 800, Digital Picture 527, Instruction Set 526, Extra Info 527, region, feature, and/or other element is matched with a compared element. In some aspects, similarity index on a scale from 0 to 1 can be utilized, although, any other range can also be utilized. Similarity index can be generated by Similarity Comparison 125 whether substantial or other similarity between the compared elements is achieved or not. In one example, similarity index can be determined for a Knowledge Cell 800 based on a ratio/percentage of matched or substantially matched Digital Pictures 525 relative to the number of Digital Pictures 525 in the compared Knowledge Cell 800. Specifically, similarity index of 0.93 is determined if 93% of Digital Pictures 525 of one Knowledge Cell 800 match or substantially match Digital Pictures 525 of another Knowledge Cell 800. In some designs, importance (i.e. as indicated by importance index, etc.) of one or more Digital Pictures 525 can be included in the calculation of a weighted similarity index. Similar determination of similarity index can be implemented with Digital Pictures 525, Instruction Sets 526, Extra Info 527, regions, features, pixels, and/or other elements or portions thereof. Any combination of the aforementioned similarity index determinations or calculations can be utilized in alternate embodiments. Any similarity ranking technique can be utilized to determine or calculate similarity index in alternate embodiments.

Figure 18:
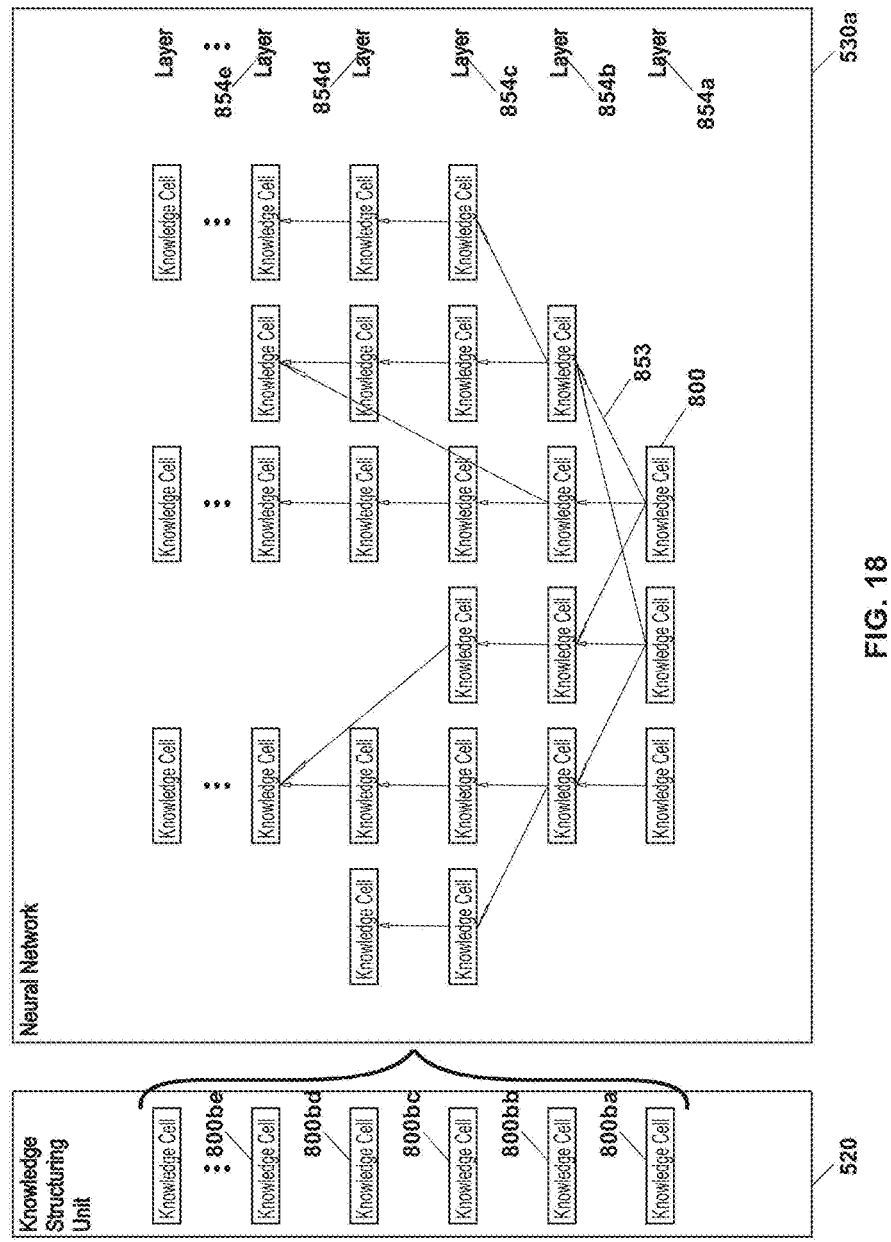
FIG. 18 illustrates an embodiment of learning Knowledge Cells 800 comprising one or more Digital Pictures 525 correlated with any Instruction Sets 526 and/or Extra Info 527 using Neural Network 530a comprising shortcut Connections 853.

Referring to FIG. 18, an embodiment of learning Knowledge Cells 800 comprising one or more Digital Pictures 525 correlated with any Instruction Sets 526 and/or Extra Info 527 using Neural Network 530a comprising shortcut Connections 853 is illustrated. In some designs, Knowledge Cells 800 in one Layer 854 of Neural Network 530a can be connected with Knowledge Cells 800 in any Layer 854, not only in a successive Layer 854, thereby creating shortcuts (i.e. shortcut Connections 853, etc.) through Neural Network 530a. In some aspects, creating a shortcut Connection 853 can be implemented by performing Similarity Comparisons 125 of a Knowledge Cell 800 from Knowledge Structuring Unit 520 with Knowledge Cells 800 in any Layer 854 when applying (i.e. storing, copying, etc.) the Knowledge Cell 800 from Knowledge Structuring Unit 520 onto Neural Network 530a. Once created, shortcut Connections 853 enable a wider variety of Knowledge Cells 800 to be considered when selecting a path through Neural Network 530a. In some embodiments, Knowledge Structuring Unit 520 structures or generates Knowledge Cells 800 and the system applies them onto Neural Network 530a, thereby implementing learning Object's 180 operation in various visual surroundings. The system can perform Similarity Comparisons 125 of a Knowledge Cell 800 from Knowledge Structuring Unit 520 with Knowledge Cells 800 in a corresponding and/or other Layers 854 of Neural Network 530a. If a substantially similar Knowledge Cell 800 is not found in the corresponding or other Layers 854 of Neural Network 530a, the system may insert (i.e. copy, store, etc.) the Knowledge Cell 800 from Knowledge Structuring Unit 520 into the corresponding (or another) Layer 854 of Neural Network 530a, and create a Connection 853 to the inserted Knowledge Cell 800 from a prior Knowledge Cell 800 including assigning an occurrence count to the new Connection 853, calculating a weight of the new Connection 853, and updating any other Connections 853 originating from the prior Knowledge Cell 800. On the other hand, if a substantially similar Knowledge Cell 800 is found in the corresponding or other Layers 854 of Neural Network 530a, the system may update occurrence count and weight of Connection 853 to that Knowledge Cell 800 from a prior Knowledge Cell 800, and update any other Connections 853 originating from the prior Knowledge Cell 800. Any of the previously described and/or other techniques for comparing, inserting, updating, and/or other operations on Knowledge Cells 800, Connections 853, Layers 854, and/or other elements can similarly be utilized in Neural Network 530a that comprises shortcut Connections 853.

Figure 19:
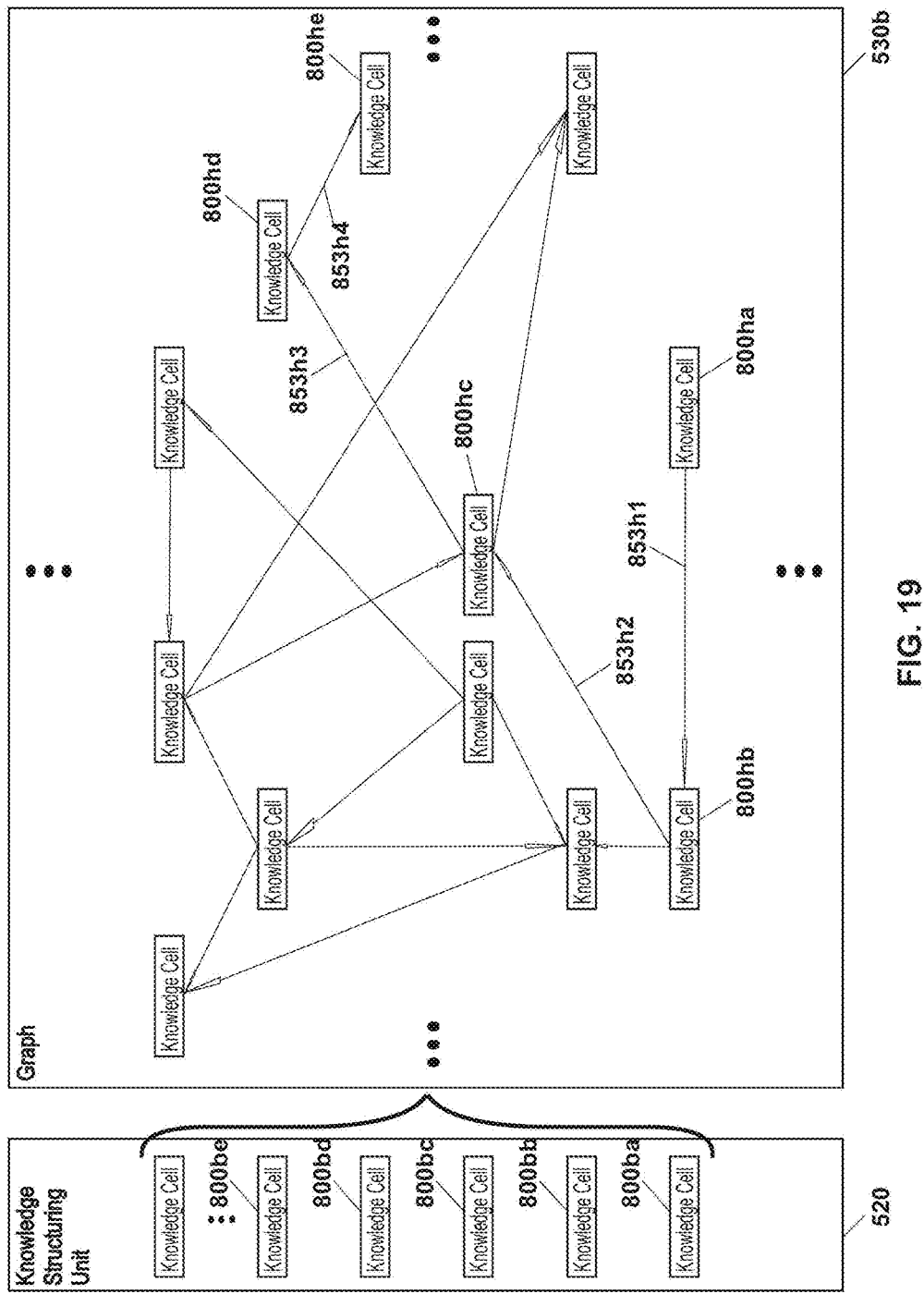
FIG. 19 illustrates an embodiment of learning Knowledge Cells 800 comprising one or more Digital Pictures 525 correlated with any Instruction Sets 526 and/or Extra Info 527 using Graph 530b.

Referring to FIG. 19, an embodiment of learning Knowledge Cells 800 comprising one or more Digital Pictures 525 correlated with any Instruction Sets 526 and/or Extra Info 527 using Graph 530b is illustrated. In some aspects, any Knowledge Cell 800 can be connected with any other Knowledge Cell 800 in Graph 530b. In other aspects, any Knowledge Cell 800 can be connected with itself and/or any other Knowledge Cell 800 in Graph 530b. In some embodiments, Knowledge Structuring Unit 520 structures or generates Knowledge Cells 800 and the system applies (i.e. store, copy, etc.) them onto Graph 530b, thereby implementing learning Object's 180 operation in various visual surroundings. The system can perform Similarity Comparisons 125 of a Knowledge Cell 800 from Knowledge Structuring Unit 520 with Knowledge Cells 800 in Graph 530b. If a substantially similar Knowledge Cell 800 is not found in Graph 530b, the system may insert (i.e. copy, store, etc.) the Knowledge Cell 800 from Knowledge Structuring Unit 520 into Graph 530b, and create a Connection 853 to the inserted Knowledge Cell 800 from a prior Knowledge Cell 800 including assigning an occurrence count to the new Connection 853, calculating a weight of the new Connection 853, and updating any other Connections 853 originating from the prior Knowledge Cell 800. On the other hand, if a substantially similar Knowledge Cell 800 is found in Graph 530b, the system may update occurrence count and weight of Connection 853 to that Knowledge Cell 800 from a prior Knowledge Cell 800, and update any other Connections 853 originating from the prior Knowledge Cell 800. Any of the previously described and/or other techniques for comparing, inserting, updating, and/or other operations on Knowledge Cells 800, Connections 853, and/or other elements can similarly be utilized in Graph 530b.

For example, the system can perform Similarity Comparisons 125 of Knowledge Cell 800ba from Knowledge Structuring Unit 520 with Knowledge Cells 800 in Graph

530*b*. In the case that a substantially similar match is not found, the system may insert Knowledge Cell 800*ha* into Graph 530*b* and copy Knowledge Cell 800*ba* into the inserted Knowledge Cell 800*ha*. The system can then perform Similarity Comparisons 125 of Knowledge Cell 800*bb* from Knowledge Structuring Unit 520 with Knowledge Cells 800 in Graph 530*b*. In the case that a substantially similar match is found between Knowledge Cell 800*bb* and Knowledge Cell 800*hb*, the system may create Connection 853*h*1 between Knowledge Cell 800*ha* and Knowledge Cell 800*hb* with occurrence count of 1 and weight of 1. The system can then perform Similarity Comparisons 125 of Knowledge Cell 800*bc* from Knowledge Structuring Unit 520 with Knowledge Cells 800 in Graph 530*b*. In the case that a substantially similar match is found between Knowledge Cell 800*bc* and Knowledge Cell 800*hc*, the system may update occurrence count and weight of Connection 853*h*2 between Knowledge Cell 800*hb* and Knowledge Cell 800*hc*, and update weights of other outgoing Connections 853 (one in this example) originating from Knowledge Cell 800*hb* as previously described. The system can then perform Similarity Comparisons 125 of Knowledge Cell 800*bd* from Knowledge Structuring Unit 520 with Knowledge Cells 800 in Graph 530*b*. In the case that a substantially similar match is not found, the system may insert Knowledge Cell 800*hd* into Graph 530*b* and copy Knowledge Cell 800*bd* into the inserted Knowledge Cell 800*hd*. The system may also create Connection 853*h*3 between Knowledge Cell 800*hc* and Knowledge Cell 800*hd* with occurrence count of 1 and weight calculated based on the occurrence count as previously described. The system may also update weights of other outgoing Connections 853 (one in this example) originating from Knowledge Cell 800*hc* as previously described. The system can then perform Similarity Comparisons 125 of Knowledge Cell 800*be* from Knowledge Structuring Unit 520 with Knowledge Cells 800 in Graph 530*b*. In the case that a substantially similar match is not found, the system may insert Knowledge Cell 800*he* into Graph 530*b* and copy Knowledge Cell 800*be* into the inserted Knowledge Cell 800*he*. The system may also create Connection 853*h*4 between Knowledge Cell 800*hd* and Knowledge Cell 800*he* with occurrence count of 1 and weight of 1. Applying any additional Knowledge Cells 800 from Knowledge Structuring Unit 520 onto Graph 530*b* follows similar logic or process as the above-described.

Figure 20:
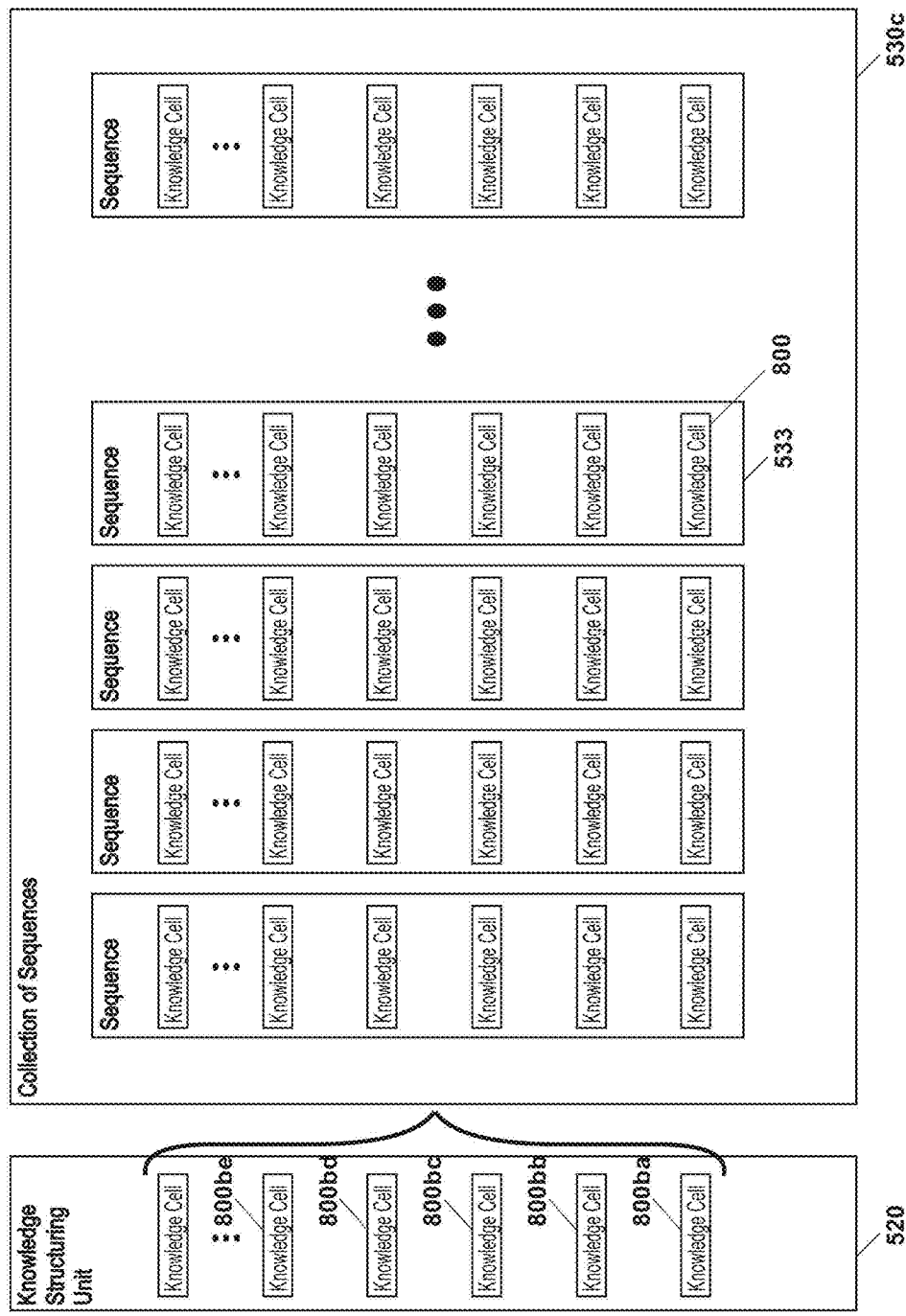
FIG. 20 illustrates an embodiment of learning Knowledge Cells 800 comprising one or more Digital Pictures 525 correlated with any Instruction Sets 526 and/or Extra Info 527 using Collection of Sequences 530c.

Referring to FIG. 20, an embodiment of learning Knowledge Cells 800 comprising one or more Digital Pictures 525 correlated with any Instruction Sets 526 and/or Extra Info 527 using Collection of Sequences 530*c* is illustrated. Collection of Sequences 530*c* comprises the functionality for storing one or more Sequences 533. Sequence 533 comprises the functionality for storing multiple Knowledge Cells 800. In some aspects, a Sequence 533 may include Knowledge Cells 800 relating to a single operation of Object 180. For example, Knowledge Structuring Unit 520 structures or generates Knowledge Cells 800 and the system applies them onto Collection of Sequences 530*c*, thereby implementing learning Object's 180 operation in various visual surroundings. The system can perform Similarity Comparisons 125 of Knowledge Cells 800 from Knowledge Structuring Unit 520 with corresponding Knowledge Cells 800 in Sequences 533 of Collection of Sequences 530*c* to find a Sequence 533 comprising Knowledge Cells 800 that are substantially similar to the Knowledge Cells 800 from Knowledge Structuring Unit 520. If Sequence 533 comprising such substantially similar Knowledge Cells 800 is not found in Collection of Sequences 530*c*, the system may create a new Sequence 533 comprising the Knowledge Cells 800 from Knowledge Structuring Unit 520 and insert (i.e. copy, store, etc.) the new Sequence 533 into Collection of Sequences 530*c*. On the other hand, if Sequence 533 comprising substantially similar Knowledge Cells 800 is found in Collection of Sequences 530*c*, the system may optionally omit inserting the Knowledge Cells 800 from Knowledge Structuring Unit 520 into Collection of Sequences 530*c* as inserting a similar Sequence 533 may not add much or any additional knowledge. This approach can save storage resources and limit the number of Knowledge Cells 800 that may later need to be processed or compared. In other aspects, a Sequence 533 may include Knowledge Cells 800 relating to a part of an operation of Object 180. Similar learning process as the above described can be utilized in such implementations. In further aspects, one or more long Sequences 533 each including Knowledge Cells 800 of multiple operations of Object 180 can be utilized. In one example, Knowledge Cells 800 of all operations can be stored in a single long Sequence 533 in which case Collection of Sequences 530*c* as a separate element can be omitted. In another example, Knowledge Cells 800 of multiple operations can be included in a plurality of long Sequences 533 such as hourly, daily, weekly, monthly, yearly, or other periodic or other Sequences 533. Similarity Comparisons 125 can be performed by traversing the one or more long Sequences 533 to find a match or substantially similar match. For instance, the system can perform Similarity Comparisons 125 of Knowledge Cells 800 from Knowledge Structuring Unit 520 with corresponding Knowledge Cells 800 in subsequences of a long Sequence 533 in incremental or other traversing pattern to find a subsequence comprising Knowledge Cells 800 that are substantially similar to the Knowledge Cells 800 from Knowledge Structuring Unit 520. The incremental traversing pattern may start from one end of a long Sequence 533 and move the comparison subsequence up or down one or any number of incremental Knowledge Cells 800 at a time. Other traversing patterns or methods can be employed such as starting from the middle of the Sequence 533 and subdividing the resulting subsequences in a recursive pattern, or any other traversing pattern or method. If a subsequence comprising substantially similar Knowledge Cells 800 is not found in the long Sequence 533, the system may concatenate or append the Knowledge Cells 800 from Knowledge Structuring Unit 520 to the long Sequence 533. In further aspects, Connections 853 can optionally be used in Sequence 533 to connect Knowledge Cells 800. For example, a Knowledge Cell 800 can be connected not only with a next Knowledge Cell 800 in the Sequence 533, but also with any other Knowledge Cell 800 in the Sequence 533, thereby creating alternate routes or shortcuts through the Sequence 533. Any number of Connections 853 connecting any Knowledge Cells 800 can be utilized. Any of the previously described and/or other techniques for comparing, inserting, updating, and/or other operations on Knowledge Cells 800, Connections 853, and/or other elements can similarly be utilized in Sequences 533 and/or Collection of Sequences 530*c*.

Any of the previously described data structures or arrangements of Knowledge Cells 800 such as Neural Network 530*a*, Graph 530*b*, Collection of Sequences 530*c*, Sequence 533, Collection of Knowledge Cells 530*d*, and/or others can be used alone, or in combination with each other or with other elements, in alternate embodiments. In one example, a path in Neural Network 530*a* or Graph 530*b* may include its own separate sequence of Knowledge Cells 800 that are not interconnected with Knowledge Cells 800 in other paths. In another example, a part of a path in Neural Network 530a or Graph 530b may include a sequence of Knowledge Cells 800 interconnected with Knowledge Cells 800 in other paths, whereas, another part of the path may include its own separate sequence of Knowledge Cells 800 that are not interconnected with Knowledge Cells 800 in other paths. Any other combinations or arrangements of Knowledge Cells 800 can be implemented.

Figure 21:
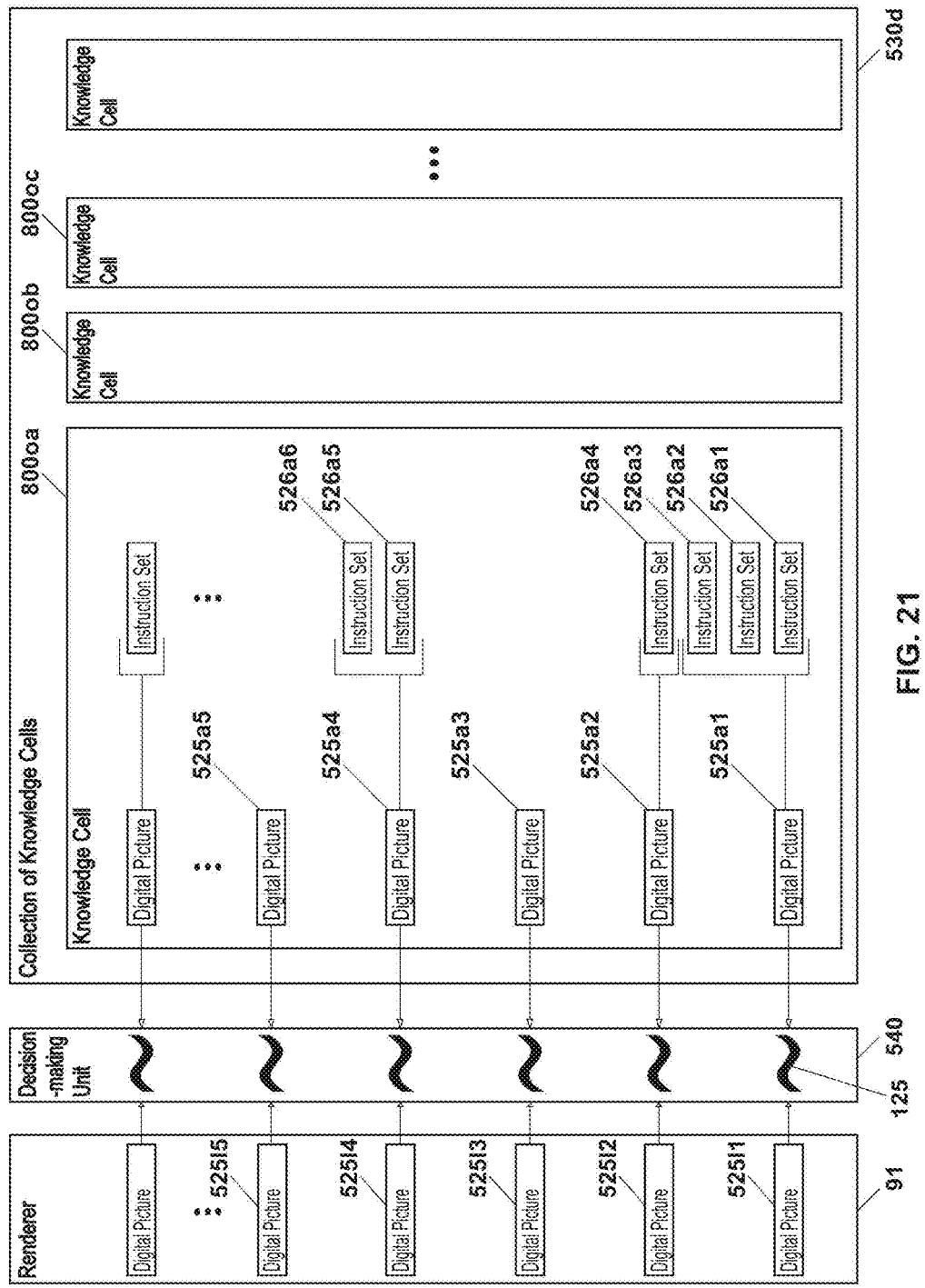
FIG. 21 illustrates an embodiment of determining anticipatory Instruction Sets 526 from a single Knowledge Cell 800.

Referring to FIG. 21, an embodiment of determining anticipatory Instruction Sets 526 from a single Knowledge Cell 800 is illustrated. Knowledge Cell 800 may be part of a Knowledgebase 530 (i.e. Neural Network 530a, Graph 530b, Collection of Sequences 530c, Sequence 533, Collection of Knowledge Cells 530d, etc.) such as Collection of Knowledge Cells 530d. Decision-making Unit 540 comprises the functionality for anticipating or determining an object's operation in various visual surroundings. Decision-making Unit 540 comprises the functionality for anticipating or determining Instruction Sets 526 (i.e. anticipatory Instruction Sets 526, etc.) to be used or executed in Object's 180 autonomous operation based on incoming Digital Pictures 525 of Object's 180 visual surrounding. Decision-making Unit 540 also comprises other disclosed functionalities.

In some aspects, Decision-making Unit 540 may anticipate or determine Instruction Sets 526 (i.e. anticipatory Instruction Sets 526, etc.) for autonomous Object 180 operation by performing Similarity Comparisons 125 of incoming Digital Pictures 525 or portions thereof from Renderer 91 with Digital Pictures 525 or portions thereof from Knowledge Cells 800 in Knowledgebase 530 (i.e. Neural Network 530a, Graph 530b, Collection of Sequences 530c, Sequence 533, Collection of Knowledge Cells 530d, etc.). A Knowledge Cell 800 includes a unit of knowledge (i.e. one or more Digital Pictures 525 correlated with any Instruction Sets 526 and/or Extra Info 527, etc.) of how Object 180 operated in a visual surrounding as previously described. When Digital Pictures 525 or portions thereof of a similar visual surrounding are detected in the future, Decision-making Unit 540 can anticipate the Instruction Sets 526 (i.e. anticipatory Instruction Sets 526, etc.) previously learned in a similar visual surrounding, thereby enabling autonomous Object 180 operation. In some aspects, Decision-making Unit 540 can perform Similarity Comparisons 125 of incoming Digital Pictures 525 from Renderer 91 with Digital Pictures 525 from Knowledge Cells 800 in Knowledgebase 530 (i.e. Neural Network 530a, Graph 530b, Collection of Sequences 530c, Sequence 533, Collection of Knowledge Cells 530d, etc.). If one or more substantially similar Digital Pictures 525 or portions thereof are found in a Knowledge Cell 800 from Knowledgebase 530, Instruction Sets 526 (i.e. anticipatory Instruction Sets 526, etc.) for autonomous Object 180 operation can be anticipated in Instruction Sets 526 correlated with the one or more Digital Pictures 525 from the Knowledge Cell 800. In some designs, subsequent one or more Instruction Sets 526 for autonomous Object 180 operation can be anticipated in Instruction Sets 526 correlated with subsequent Digital Pictures 525 from the Knowledge Cell 800 (or other Knowledge Cells 800), thereby anticipating not only current, but also additional future Instruction Sets 526. Although, Extra Info 527 is not shown in this and/or other figures for clarity of illustration, it should be noted that any Digital Picture 525, Instruction Set 526, and/or other element may include or be associated with Extra Info 527 and that Decision-making Unit 540 can utilize Extra Info 527 for enhanced decision making.

For example, Decision-making Unit 540 can perform Similarity Comparisons 125 of Digital Picture 52511 or portion thereof from Renderer 91 with Digital Picture 525a1 or portion thereof from Knowledge Cell 800oa. Digital Picture 525a1 or portion thereof from Knowledge Cell 800oa may be found substantially similar. Decision-making Unit 540 can anticipate Instruction Sets 526a1-526a3 correlated with Digital Picture 525a1, thereby enabling autonomous Object 180 operation. Decision-making Unit 540 can then perform Similarity Comparisons 125 of Digital Picture 52512 or portion thereof from Renderer 91 with Digital Picture 525a2 or portion thereof from Knowledge Cell 800oa. Digital Picture 525a2 or portion thereof from Knowledge Cell 800oa may be found substantially similar. Decision-making Unit 540 can anticipate Instruction Set 526a4 correlated with Digital Picture 525a2, thereby enabling autonomous Object 180 operation. Decision-making Unit 540 can then perform Similarity Comparisons 125 of Digital Picture 52513 or portion thereof from Renderer 91 with Digital Picture 525a3 or portion thereof from Knowledge Cell 800oa. Digital Picture 525a3 or portion thereof from Knowledge Cell 800oa may be found substantially similar. Decision-making Unit 540 may not anticipate any Instruction Sets 526 since none are correlated with Digital Picture 525a3. Decision-making Unit 540 can then perform Similarity Comparisons 125 of Digital Picture 52514 or portion thereof from Renderer 91 with Digital Picture 525a4 or portion thereof from Knowledge Cell 800oa. Digital Picture 525a4 or portion thereof from Knowledge Cell 800oa may not be found substantially similar. Decision-making Unit 540 can then perform Similarity Comparisons 125 of Digital Picture 52515 or portion thereof from Renderer 91 with Digital Picture 525a5 or portion thereof from Knowledge Cell 800oa. Digital Picture 525a5 or portion thereof from Knowledge Cell 800oa may not be found substantially similar. Decision-making Unit 540 can implement similar logic or process for any additional Digital Picture 525 from Renderer 91, and so on.

It should be understood that any of the described elements and/or techniques in the foregoing example can be omitted, used in a different combination, or used in combination with other elements and/or techniques, in which case the selection of Knowledge Cells 800 or elements (i.e. Digital Pictures 525, Instruction Sets 526, etc.) thereof would be affected accordingly. In one example, Extra Info 527 can be included in the Similarity Comparisons 125 as previously described. In another example, as history of incoming Digital Pictures 525 becomes available, Decision-making Unit 540 can perform collective Similarity Comparisons 125 of the history of Digital Pictures 525 or portions thereof from Renderer 91 with subsequences of Digital Pictures 525 or portions thereof from Knowledge Cell 800. In a further example, the described comparisons in a single Knowledge Cell 800 may be performed on any number of Knowledge Cells 800 sequentially or in parallel. Parallel processors such as a plurality of Processors 11 or cores thereof can be utilized for such parallel processing. In a further example, various arrangements of Digital Pictures 525 and/or other elements in a Knowledge Cell 800 can be utilized as previously described. One of ordinary skill in art will understand that the foregoing exemplary embodiment is described merely as an example of a variety of possible implementations, and that while all of its variations are too voluminous to describe, they are within the scope of this disclosure.

Figure 22:
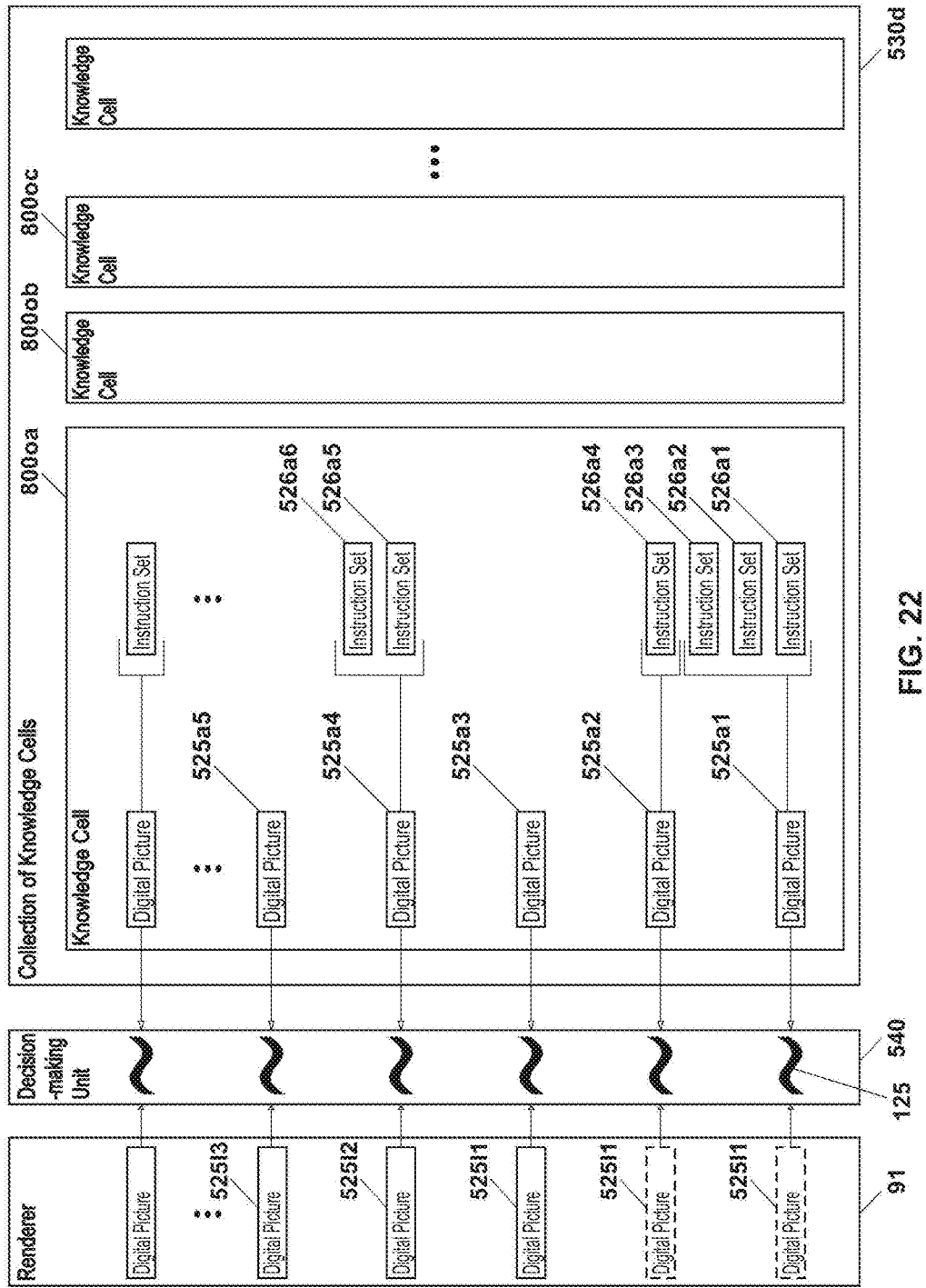
FIG. 22 illustrates an embodiment of determining anticipatory Instruction Sets 526 by traversing a single Knowledge Cell 800.

Referring to FIG. 22, an embodiment of determining anticipatory Instruction Sets 526 by traversing a single Knowledge Cell 800 is illustrated. Knowledge Cell 800 may be part of a Knowledgebase 530 (i.e. Neural Network 530a, Graph 530*b*, Collection of Sequences 530*c*, Sequence 533, Collection of Knowledge Cells 530*d*, etc.) such as Collection of Knowledge Cells 530*d*. For example, Decision-making Unit 540 can perform Similarity Comparisons 125 of Digital Picture 525l1 or portion thereof from Renderer 91 with Digital Picture 525*a*1 or portion thereof from Knowledge Cell 800*oa*. Digital Picture 525*a*1 or portion thereof from Knowledge Cell 800*oa* may not be found substantially similar. Decision-making Unit 540 can then perform Similarity Comparisons 125 of Digital Picture 525l1 or portion thereof from Renderer 91 with Digital Picture 525*a*2 or portion thereof from Knowledge Cell 800*oa*. Digital Picture 525*a*2 or portion thereof from Knowledge Cell 800*oa* may not be found substantially similar. Decision-making Unit 540 can then perform Similarity Comparisons 125 of Digital Picture 525l1 or portion thereof from Renderer 91 with Digital Picture 525*a*3 or portion thereof from Knowledge Cell 800*oa*. Digital Picture 525*a*3 or portion thereof from Knowledge Cell 800*oa* may be found substantially similar. Decision-making Unit 540 may not anticipate any Instruction Sets 526 since none are correlated with Digital Picture 525*a*3. Decision-making Unit 540 can then perform Similarity Comparisons 125 of Digital Picture 525l2 or portion thereof from Renderer 91 with Digital Picture 525*a*4 or portion thereof from Knowledge Cell 800*oa*. Digital Picture 525*a*4 or portion thereof from Knowledge Cell 800*oa* may be found substantially similar. Decision-making Unit 540 can anticipate Instruction Sets 526*a*5-526*a*6 correlated with Digital Picture 525*a*4, thereby enabling autonomous Object 180 operation. Decision-making Unit 540 can then perform Similarity Comparisons 125 of Digital Picture 525l3 or portion thereof from Renderer 91 with Digital Picture 525*a*5 or portion thereof from Knowledge Cell 800*oa*. Digital Picture 525*a*5 or portion thereof from Knowledge Cell 800*oa* may be found substantially similar. Decision-making Unit 540 may not anticipate any Instruction Sets 526 since none are correlated with Digital Picture 525*a*5. Decision-making Unit 540 can implement similar logic or process for any additional Digital Pictures 525 from Renderer 91, and so on.

It should be understood that any of the described elements and/or techniques in the foregoing example can be omitted, used in a different combination, or used in combination with other elements and/or techniques, in which case the selection of Knowledge Cells 800 or elements (i.e. Digital Pictures 525, Instruction Sets 526, etc.) thereof would be affected accordingly. In one example, Extra Info 527 can be included in the Similarity Comparisons 125 as previously described. In another example, as history of incoming Digital Pictures 525 becomes available, Decision-making Unit 540 can perform collective Similarity Comparisons 125 of the history of Digital Pictures 525 or portions thereof from Renderer 91 with subsequences of Digital Pictures 525 or portions thereof from Knowledge Cell 800. In a further example, traversing may be performed in incremental traversing pattern such as starting from one end of Knowledge Cell 800 and moving the comparison subsequence up or down the list one or any number of incremental Digital Pictures 525 at a time. Other traversing patterns or methods can be employed such as starting from the middle of the Knowledge Cell 800 and subdividing the resulting subsequence in a recursive pattern, or any other traversing pattern or method. In a further example, the described traversing of a single Knowledge Cell 800 may be performed on any number of Knowledge Cells 800 sequentially or in parallel. Parallel processors such as a plurality of Processors 11 or cores thereof can be utilized for such parallel processing. In a further example, various arrangements of Digital Pictures 525 and/or other elements in a Knowledge Cell 800 can be utilized as previously described. One of ordinary skill in art will understand that the foregoing exemplary embodiment is described merely as an example of a variety of possible implementations, and that while all of its variations are too voluminous to describe, they are within the scope of this disclosure.

Figure 23:
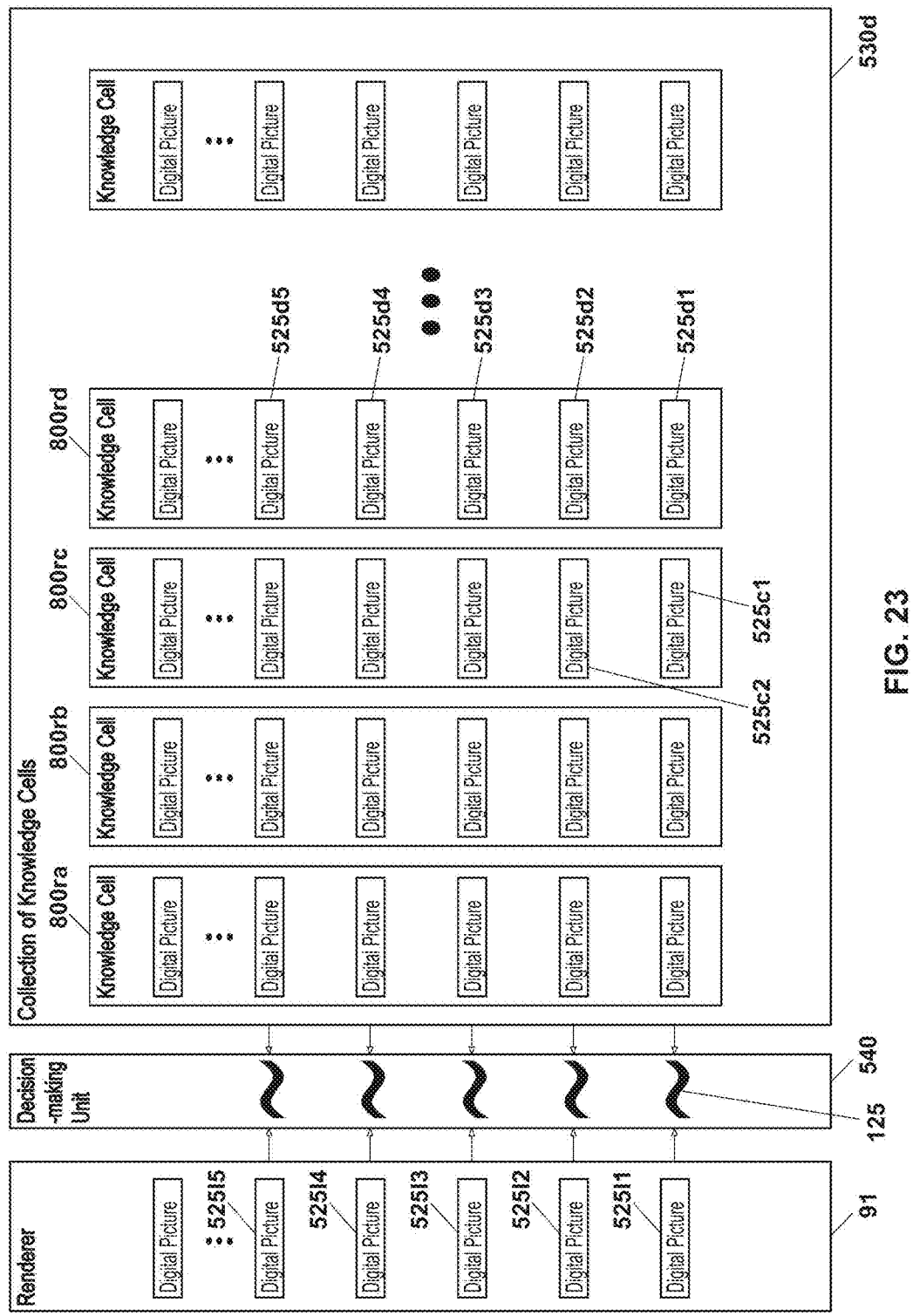
FIG. 23 illustrates an embodiment of determining anticipatory Instruction Sets 526 using collective similarity comparisons.

Referring to FIG. 23, an embodiment of determining anticipatory Instruction Sets 526 using collective similarity comparisons is illustrated. For example, Decision-making Unit 540 can perform Similarity Comparisons 125 of Digital Picture 525l1 or portion thereof from Renderer 91 with corresponding Digital Pictures 525 or portions thereof from Knowledge Cells 800 in Collection of Knowledge Cells 530*d*. Digital Picture 525*c*1 or portion thereof from Knowledge Cell 800*rc* may be found substantially similar with highest similarity. Decision-making Unit 540 can anticipate any Instruction Sets 526 (not shown) correlated with Digital Picture 525*c*1, thereby enabling autonomous Object 180 operation. Decision-making Unit 540 can then perform collective Similarity Comparisons 125 of Digital Pictures 525l1-525l2 or portions thereof from Renderer 91 with corresponding Digital Pictures 525 or portions thereof from Knowledge Cells 800 in Collection of Knowledge Cells 530*d*. Digital Pictures 525*c*1-525*c*2 or portions thereof from Knowledge Cell 800*rc* may be found substantially similar with highest similarity. Decision-making Unit 540 can anticipate any Instruction Sets 526 (not shown) correlated with Digital Picture 525*c*2, thereby enabling autonomous Object 180 operation. Decision-making Unit 540 can then perform collective Similarity Comparisons 125 of Digital Pictures 525l1-525l3 or portions thereof from Renderer 91 with corresponding Digital Pictures 525 or portions thereof from Knowledge Cells 800 in Collection of Knowledge Cells 530*d*. Digital Pictures 525*d*1-525*d*3 or portions thereof from Knowledge Cell 800*rd* may be found substantially similar with highest similarity. Decision-making Unit 540 can anticipate any Instruction Sets 526 (not shown) correlated with Digital Picture 525*d*3, thereby enabling autonomous Object 180 operation. Decision-making Unit 540 can then perform collective Similarity Comparisons 125 of Digital Pictures 525l1-525l4 or portions thereof from Renderer 91 with corresponding Digital Pictures 525 or portions thereof from Knowledge Cells 800 in Collection of Knowledge Cells 530*d*. Digital Pictures 525*d*1-525*d*4 or portions thereof from Knowledge Cell 800*rd* may be found substantially similar with highest similarity. Decision-making Unit 540 can anticipate any Instruction Sets 526 (not shown) correlated with Digital Picture 525*d*4, thereby enabling autonomous Object 180 operation. Decision-making Unit 540 can then perform collective Similarity Comparisons 125 of Digital Pictures 525l1-525l5 or portions thereof from Renderer 91 with corresponding Digital Pictures 525 or portions thereof from Knowledge Cells 800 in Collection of Knowledge Cells 530*d*. Digital Pictures 525*d*1-525*d*5 or portions thereof from Knowledge Cell 800*rd* may be found substantially similar with highest similarity. Decision-making Unit 540 can anticipate any Instruction Sets 526 (not shown) correlated with Digital Picture 525*d*5, thereby enabling autonomous Object 180 operation. Decision-making Unit 540 can implement similar logic or process for any additional Digital Picture 525 from Renderer 91, and so on.

In some embodiments, various elements and/or techniques can be utilized in the aforementioned similarity determinations with respect to collectively compared Digital Pictures 525 and/or other elements. In some aspects, similarity of collectively compared Digital Pictures 525 can be determined based on similarities or similarity indexes of the individually compared Digital Pictures 525. In one example, an average of similarities or similarity indexes of individually compared Digital Pictures 525 can be used to determine similarity of collectively compared Digital Pictures 525. In another example, a weighted average of similarities or similarity indexes of individually compared Digital Pictures 525 can be used to determine similarity of collectively compared Digital Pictures 525. For instance, to affect the weighting of collective similarity, a higher weight or importance (i.e. importance index, etc.) can be assigned to the similarities or similarity indexes of some (i.e. more substantive, etc.) Digital Pictures 525 and lower for other (i.e. less substantive, etc.) Digital Pictures 525. Any other higher or lower weight or importance assignment can be implemented. In other aspects, any of the previously described or other thresholds for substantial similarity of individually compared elements can be similarly utilized for collectively compared elements. In one example, substantial similarity of collectively compared Digital Pictures 525 can be achieved when their collective similarity or similarity index exceeds a similarity threshold. In another example, substantial similarity of collectively compared Digital Pictures 525 can be achieved when at least a threshold number or percentage of Digital Pictures 525 or portions thereof of the collectively compared Digital Pictures 525 match or substantially match. Similarly, substantial similarity of collectively compared Digital Pictures 525 can be achieved when a number or percentage of matching or substantially matching Digital Pictures 525 or portions thereof of the collectively compared Digital Pictures 525 exceeds a threshold. Such thresholds can be defined by a user, by VSAOO system administrator, or automatically by the system based on experience, testing, inquiry, analysis, synthesis, or other techniques, knowledge, or input. Similar elements and/or techniques as the aforementioned can be used for similarity determinations of other collectively compared elements such as Instruction Sets 526, Extra Info 527, Knowledge Cells 800, and/or others. Similarity determinations of collectively compared elements may include any features, functionalities, and embodiments of Similarity Comparison 125, and vice versa.

It should be understood that any of the described elements and/or techniques in the foregoing example can be omitted, used in a different combination, or used in combination with other elements and/or techniques, in which case the selection of Knowledge Cells 800 or elements (i.e. Digital Pictures 525, Instruction Sets 526, etc.) thereof would be affected accordingly. Any of the elements and/or techniques utilized in other examples or embodiments described herein such as using Extra Info 527 in Similarity Comparisons 125, traversing of Knowledge Cells 800 or other elements, using history of Digital Pictures 525 or Knowledge Cells 800 for collective Similarity Comparisons 125, using various arrangements of Digital Pictures 525 and/or other elements in a Knowledge Cell 800, and/or others can similarly be utilized in this example. One of ordinary skill in art will understand that the foregoing exemplary embodiment is described merely as an example of a variety of possible implementations, and that while all of its variations are too voluminous to describe, they are within the scope of this disclosure.

Figure 24:
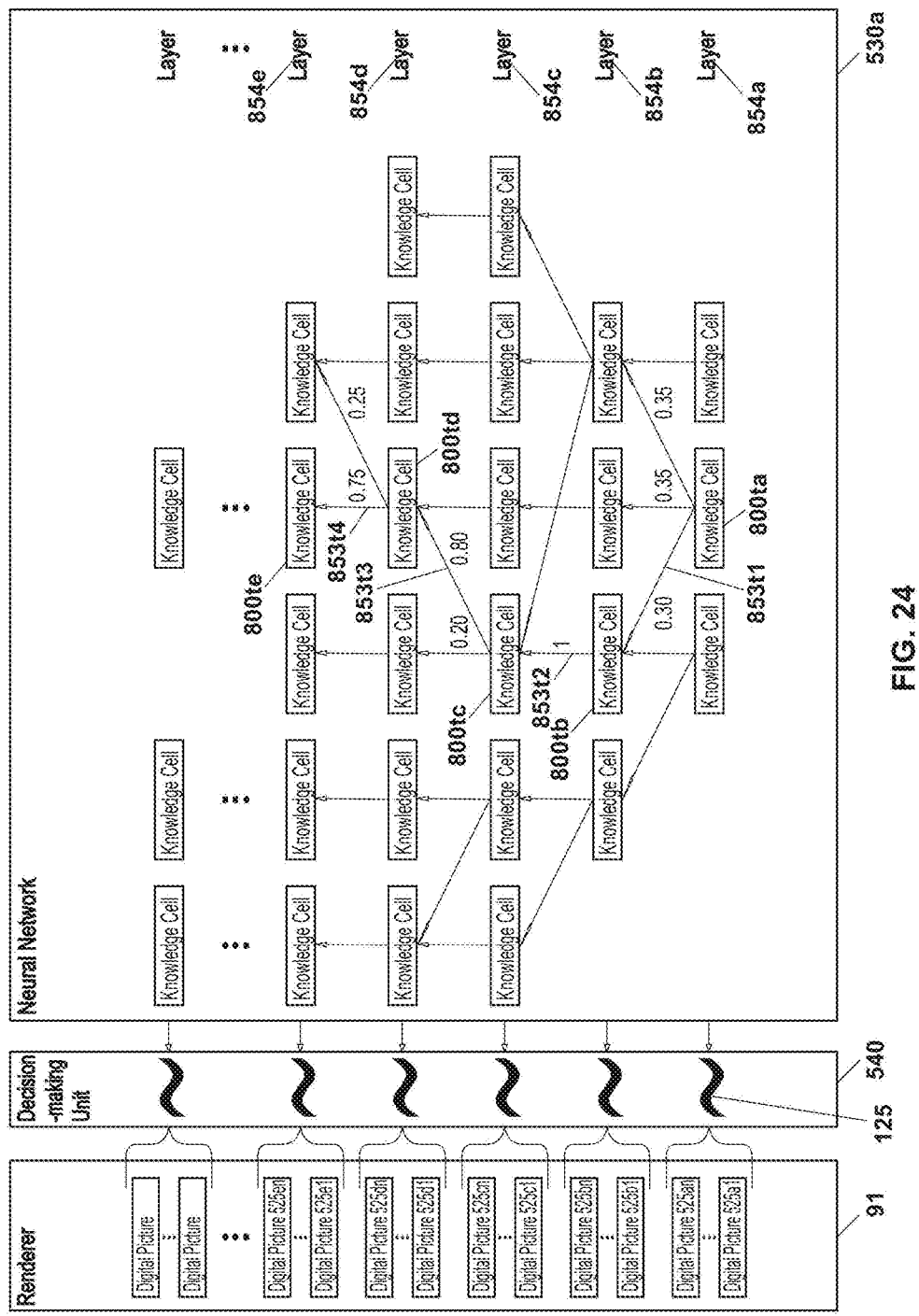

Referring to FIG. 24, an embodiment of determining anticipatory Instruction Sets 526 using Neural Network 530a is illustrated. In some aspects, determining anticipatory Instruction Sets 526 using Neural Network 530a may include selecting a path of Knowledge Cells 800 or elements (i.e. Digital Pictures 525, Instruction Sets 526, etc.) thereof through Neural Network 530a. Decision-making Unit 540 can utilize various elements and/or techniques for selecting a path through Neural Network 530a. Although, these elements and/or techniques are described using Neural Network 530a below, they can similarly be used in any Knowledgebase 530 (i.e. Graph 530b, Collection of Sequences 530c, Sequence 533, Collection of Knowledge Cells 530d, etc.) where applicable.

In some embodiments, Decision-making Unit 540 can utilize similarity index in selecting Knowledge Cells 800 or elements (i.e. Digital Pictures 525, Instruction Sets 526, etc.) thereof in a path through Neural Network 530a. For instance, similarity index may indicate how well one or more Digital Pictures 525 or portions thereof are matched with one or more other Digital Pictures 525 or portions thereof as previously described. In one example, Decision-making Unit 540 may select a Knowledge Cell 800 comprising one or more Digital Pictures 525 with highest similarity index even if Connection 853 pointing to that Knowledge Cell 800 has less than the highest weight. Therefore, similarity index or other such element or parameter can override or disregard the weight of a Connection 853 or other element. In another example, Decision-making Unit 540 may select a Knowledge Cell 800 comprising one or more Digital Pictures 525 whose similarity index is higher than or equal to a weight of Connection 853 pointing to that Knowledge Cell 800. In a further example, Decision-making Unit 540 may select a Knowledge Cell 800 comprising one or more Digital Pictures 525 whose similarity index is lower than or equal to a weight of Connection 853 pointing to that Knowledge Cell 800. Similarity index can be set to be more, less, or equally important than a weight of a Connection 853.

In other embodiments, Decision-making Unit 540 can utilize Connections 853 in selecting Knowledge Cells 800 or elements (i.e. Digital Pictures 525, Instruction Sets 526, etc.) thereof in a path through Neural Network 530a. In some aspects, Decision-making Unit 540 can take into account weights of Connections 853 among the interconnected Knowledge Cells 800 in choosing from which Knowledge Cell 800 to compare one or more Digital Pictures 525 first, second, third, and so on. Specifically, for instance, Decision-making Unit 540 can perform Similarity Comparison 125 with one or more Digital Pictures 525 from Knowledge Cell 800 pointed to by the highest weight Connection 853 first, Digital Pictures 525 from Knowledge Cell 800 pointed to by the second highest weight Connection 853 second, and so on. In other aspects, Decision-making Unit 540 can stop performing Similarity Comparisons 125 as soon as it finds one or more substantially similar Digital Pictures 525 in an interconnected Knowledge Cell 800. In further aspects, Decision-making Unit 540 may only follow the highest weight Connection 853 to arrive at a Knowledge Cell 800 comprising one or more Digital Pictures 525 to be compared, thereby disregarding Connections 853 with less than the highest weight. In further aspects, Decision-making Unit 540 may ignore Connections 853 and/or their weights.

In further embodiments, Decision-making Unit 540 can utilize a bias to adjust similarity index, weight of a Connection 853, and/or other element or parameter used in selecting Knowledge Cells 800 or elements (i.e. Digital Pictures 525, Instruction Sets 526, etc.) thereof in a path through Neural Network 530a. In one example, Decision-making Unit 540 may select a Knowledge Cell 800 comprising one or more Digital Pictures 525 whose similarity index multiplied by or adjusted for a bias is higher than or equal to a weight of Connection 853 pointing to that Knowledge Cell 800. In another example, Decision-making Unit 540 may select a Knowledge Cell 800 comprising one or more Digital Pictures 525 whose similarity index multiplied by or adjusted for a bias is lower than or equal to a weight of Connection 853 pointing to that Knowledge Cell 800. In a further example, bias can be used to resolve deadlock situations where similarity index is equal to a weight of a Connection 853. In some aspects, bias can be expressed in percentages such as 0.3 percent, 1.2 percent, 25.7 percent, 79.8 percent, 99.9 percent, 100.1 percent, 155.4 percent, 298.6 percent, 1105.5 percent, and so on. For example, a bias below 100 percent decreases an element or parameter to which it is applied, a bias equal to 100 percent does not change the element or parameter to which it is applied, and a bias higher than 100 percent increases the element or parameter to which it is applied. In general, any amount of bias can be utilized. Bias can be applied to one or more of a weight of a Connection 853, similarity index, any other element or parameter, and/or all or any combination of them. Also, different biases can be applied to each of a weight of a Connection 853, similarity index, or any other element or parameter. For example, 30 percent bias can be applied to similarity index and 15 percent bias can be applied to a weight of a Connection 853. Also, different biases can be applied to various Layers 854 of Neural Network 530*a*, and/or other disclosed elements. Bias can be defined by a user, by VSAOO system administrator, or automatically by the system based on experience, testing, inquiry, analysis, synthesis, or other techniques, knowledge, or input.

Any other element and/or technique can be utilized in selecting Knowledge Cells 800 or elements (i.e. Digital Pictures 525, Instruction Sets 526, etc.) thereof in a path through Neural Network 530*a*.

In some embodiments, Neural Network 530*a* may include knowledge (i.e. interconnected Knowledge Cells 800 comprising one or more Digital Pictures 525 correlated with any Instruction Sets 526 and/or Extra Info 527, etc.) of how Object 180 operated in various visual surroundings. In some aspects, determining anticipatory Instruction Sets 526 using Neural Network 530*a* may include selecting a path of Knowledge Cells 800 or elements (i.e. Digital Pictures 525, Instruction Sets 526, etc.) thereof through Neural Network 530*a*. Individual and/or collective Similarity Comparisons 125 can be used to determine substantial similarity of the individually and/or collectively compared Digital Pictures 525 or portions thereof. Substantial similarity may be used primarily for selecting a path through Neural Network 530*a*, whereas, weight of any Connection 853 may be used secondarily or not at all.

For example, Decision-making Unit 540 can perform Similarity Comparisons 125 of Digital Pictures 525*a*1-525*an* or portions thereof from Renderer 91 with Digital Pictures 525 or portions thereof from one or more Knowledge Cells 800 in Layer 854*a* (or any other one or more Layers 854, etc.). Digital Pictures 525 or portions thereof from Knowledge Cell 800*ta* may be found collectively substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can then perform Similarity Comparisons 125 of Digital Pictures 525*b*1-525*bn* or portions thereof from Renderer 91 with Digital Pictures 525 or portions thereof from one or more Knowledge Cells 800 in Layer 854*b* interconnected with Knowledge Cell 800*ta*. Digital Pictures 525 or portions thereof from Knowledge Cell 800*tb* may be found collectively substantially similar with highest similarity, thus, Decision-making Unit 540 may follow Connection 853*t*1 disregarding its less than highest weight. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Since Connection 853*t*2 is the only connection from Knowledge Cell 800*tb*, Decision-making Unit 540 may follow Connection 853*t*2 and perform Similarity Comparisons 125 of Digital Pictures 525*c*1-525*cn* or portions thereof from Renderer 91 with Digital Pictures 525 or portions thereof from Knowledge Cell 800*tc* in Layer 854*c*. Digital Pictures 525 or portions thereof from Knowledge Cell 800*tc* may be found collectively substantially similar. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can then perform Similarity Comparisons 125 of Digital Pictures 525*d*1-525*dn* or portions thereof from Renderer 91 with Digital Pictures 525 or portions thereof from one or more Knowledge Cells 800 in Layer 854*d* interconnected with Knowledge Cell 800*tc*. Digital Pictures 525 or portions thereof from Knowledge Cell 800*td* may be found collectively substantially similar with highest similarity, thus, Decision-making Unit 540 may follow Connection 853*t*3. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can then perform Similarity Comparisons 125 of Digital Pictures 525*e*1-525*en* or portions thereof from Renderer 91 with Digital Pictures 525 or portions thereof from one or more Knowledge Cells 800 in Layer 854*e* interconnected with Knowledge Cell 800*td*. Digital Pictures 525 or portions thereof from Knowledge Cell 800*te* may be found collectively substantially similar with highest similarity, thus, Decision-making Unit 540 may follow Connection 853*t*4. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can implement similar logic or process for any additional Digital Pictures 525 from Renderer 91, and so on.

The foregoing exemplary embodiment provides an example of utilizing a combination of collective Similarity Comparisons 125, individual Similarity Comparisons 125, Connections 853, and/or other elements or techniques. It should be understood that any of these elements and/or techniques can be omitted, used in a different combination, or used in combination with other elements and/or techniques, in which case the selection of Knowledge Cells 800 or elements (i.e. Digital Pictures 525, Instruction Sets 526, etc.) thereof in a path through Neural Network 530*a* would be affected accordingly. Any of the elements and/or techniques utilized in other examples or embodiments described herein such as using Extra Info 527 in Similarity Comparisons 125, traversing of Knowledge Cells 800 or other elements, using history of Digital Pictures 525 or Knowledge Cells 800 for collective Similarity Comparisons 125, using various arrangements of Digital Pictures 525 and/or other elements in a Knowledge Cell 800, and/or others can similarly be utilized in this example. These elements and/or techniques can similarly be utilized in Graph 530b, Collection of Sequences 530c, Sequence 533, Collection of Knowledge Cells 530d, and/or other data structures or arrangements. In some aspects, instead of anticipating Instruction Sets 526 correlated with substantially similar individual Digital Pictures 525, Decision-making Unit 540 can anticipate instruction Sets 526 correlated with substantially similar streams of Digital Pictures 525. In other aspects, any time that substantial similarity or other similarity threshold is not achieved in compared Digital Pictures 525 or portions thereof of any of the Knowledge Cells 800, Decision-making Unit 540 can decide to look for a substantially or otherwise similar Digital Pictures 525 or portions thereof in Knowledge Cells 800 elsewhere in Neural Network 530a such as in any Layer 854 subsequent to a current Layer 854, in the first Layer 854, in the entire Neural Network 530a, and/or others, even if such Knowledge Cell 800 may be unconnected with a prior Knowledge Cell 800. It should be noted that any of Digital Pictures 525a1-525an, Digital Pictures 525b1-525bn, Digital Pictures 525c1-525cn, Digital Pictures 525d1-525dn, Digital Pictures 525e1-525en, etc. may include one Digital Picture 525 or a stream of Digital Pictures 525. It should also be noted that any Knowledge Cell 800 may include one Digital Picture 525 or a stream of Digital Pictures 525 as previously described. One of ordinary skill in art will understand that the foregoing exemplary embodiment is described merely as an example of a variety of possible implementations, and that while all of its variations are too voluminous to describe, they are within the scope of this disclosure.

Figure 25:
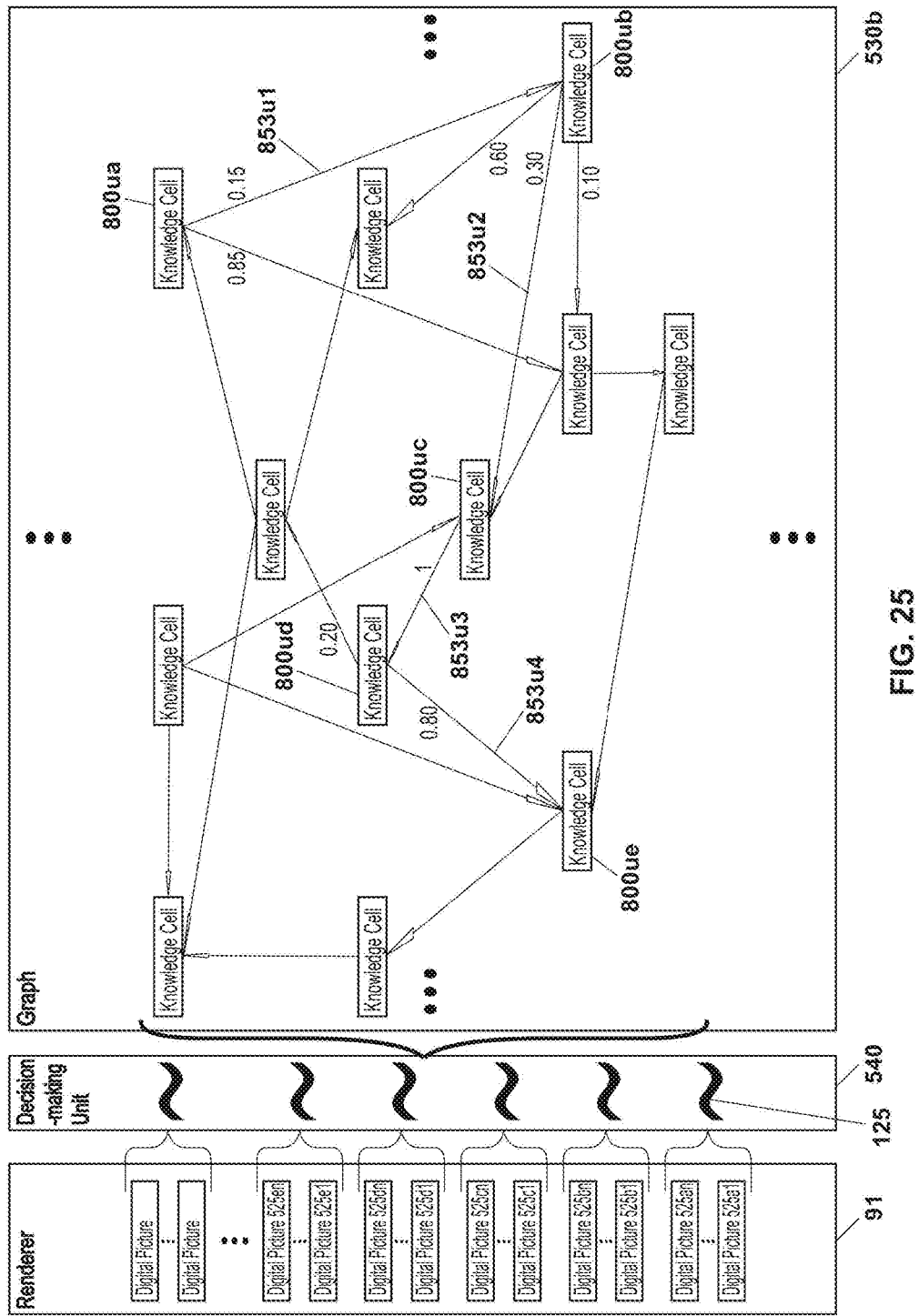
FIG. 25 illustrates an embodiment of determining anticipatory Instruction Sets 526 using Graph 530b.

Referring to FIG. 25, an embodiment of determining anticipatory Instruction Sets 526 using Graph 530b is illustrated. Graph 530b may include knowledge (i.e. interconnected Knowledge Cells 800 comprising one or more Digital Pictures 525 correlated with any Instruction Sets 526 and/or Extra Info 527, etc.) of how Object 180 operated in various visual surroundings. In some aspects, determining anticipatory Instruction Sets 526 using Graph 530b may include selecting a path of Knowledge Cells 800 or elements (i.e. Digital Pictures 525, Instruction Sets 526, etc.) thereof through Graph 530b. Individual and/or collective Similarity Comparisons 125 can be used to determine substantial similarity of the individually and/or collectively compared Digital Pictures 525 or portions thereof. Substantial similarity may be used primarily for selecting a path through Graph 530b, whereas, weight of any Connection 853 may be used secondarily or not at all.

For example, Decision-making Unit 540 can perform Similarity Comparisons 125 of Digital Pictures 525a1-525an or portions thereof from Renderer 91 with Digital Pictures 525 or portions thereof from one or more Knowledge Cells 800 in Graph 530b. Digital Pictures 525 or portions thereof from Knowledge Cell 800ua may be found collectively substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can then perform Similarity Comparisons 125 of Digital Pictures 525b1-525bn or portions thereof from Renderer 91 with Digital Pictures 525 or portions thereof from one or more Knowledge Cells 800 in Graph 530b interconnected with Knowledge Cell 800ua by outgoing Connections 853. Digital Pictures 525 or portions thereof from Knowledge Cell 800ub may be found collectively substantially similar with highest similarity, thus, Decision-making Unit 540 may follow Connection 853u1 disregarding its less than highest weight. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can then perform Similarity Comparisons 125 of Digital Pictures 525c1-525cn or portions thereof from Renderer 91 with Digital Pictures 525 or portions thereof from one or more Knowledge Cells 800 in Graph 530b interconnected with Knowledge Cell 800ub by outgoing Connections 853. Digital Pictures 525 or portions thereof from Knowledge Cell 800uc may be found collectively substantially similar with highest similarity, thus, Decision-making Unit 540 may follow Connection 853u2 disregarding its less than highest weight. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Since Connection 853u3 is the only connection from Knowledge Cell 800uc, Decision-making Unit 540 may follow Connection 853u3 and perform Similarity Comparisons 125 of Digital Pictures 525d1-525dn or portions thereof from Renderer 91 with Digital Pictures 525 or portions thereof from Knowledge Cell 800ud in Graph 530b. Digital Pictures 525 or portions thereof from Knowledge Cell 800ud may be found collectively substantially similar. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can then perform Similarity Comparisons 125 of Digital Pictures 525e1-525en or portions thereof from Renderer 91 with Digital Pictures 525 or portions thereof from one or more Knowledge Cells 800 in Graph 530b interconnected with Knowledge Cell 800ud by outgoing Connections 853. Digital Pictures 525 or portions thereof from Knowledge Cell 800ue may be found collectively substantially similar with highest similarity, thus, Decision-making Unit 540 may follow Connection 853u4. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can implement similar logic or process for any additional Digital Pictures 525 from Activity Detector 160, and so on.

The foregoing exemplary embodiment provides an example of utilizing a combination of collective Similarity Comparisons 125, individual Similarity Comparisons 125, Connections 853, and/or other elements or techniques. It should be understood that any of these elements and/or techniques can be omitted, used in a different combination, or used in combination with other elements and/or techniques, in which case the selection of Knowledge Cells 800 or elements (i.e. Digital Pictures 525, Instruction Sets 526, etc.) thereof in a path through Graph 530*b* would be affected accordingly. Any of the elements and/or techniques utilized in other examples or embodiments described herein such as using Extra Info 527 in Similarity Comparisons 125, traversing of Knowledge Cells 800 or other elements, using history of Digital Pictures 525 or Knowledge Cells 800 in collective Similarity Comparisons 125, using various arrangements of Digital Pictures 525 and/or other elements in a Knowledge Cell 800, and/or others can similarly be utilized in this example. These elements and/or techniques can similarly be utilized in Neural Network 530*a*, Collection of Sequences 530*c*, Sequence 533, Collection of Knowledge Cells 530*d*, and/or other data structures or arrangements. In some aspects, instead of anticipating Instruction Sets 526 correlated with substantially similar individual Digital Pictures 525, Decision-making Unit 540 can anticipate instruction Sets 526 correlated with substantially matching streams of Digital Pictures 525. In other aspects, any time that substantial similarity or other similarity threshold is not achieved in compared Digital Pictures 525 or portions thereof of any of the Knowledge Cells 800, Decision-making Unit 540 can decide to look for a substantially or otherwise similar Digital Pictures 525 or portions thereof in Knowledge Cells 800 elsewhere in Graph 530*b* even if such Knowledge Cell 800 may be unconnected with a prior Knowledge Cell 800. It should be noted that any of Digital Pictures 525*a*1-525*an*, Digital Pictures 525*b*1-525*bn*, Digital Pictures 525*c*1-525*cn*, Digital Pictures 525*d*1-525*dn*, Digital Pictures 525*e*1-525*en*, etc. may include one Digital Picture 525 or a stream of Digital Pictures 525. It should also be noted that any Knowledge Cell 800 may include one Digital Picture 525 or a stream of Digital Pictures 525 as previously described. One of ordinary skill in art will understand that the foregoing exemplary embodiment is described merely as an example of a variety of possible implementations, and that while all of its variations are too voluminous to describe, they are within the scope of this disclosure.

Figure 26:
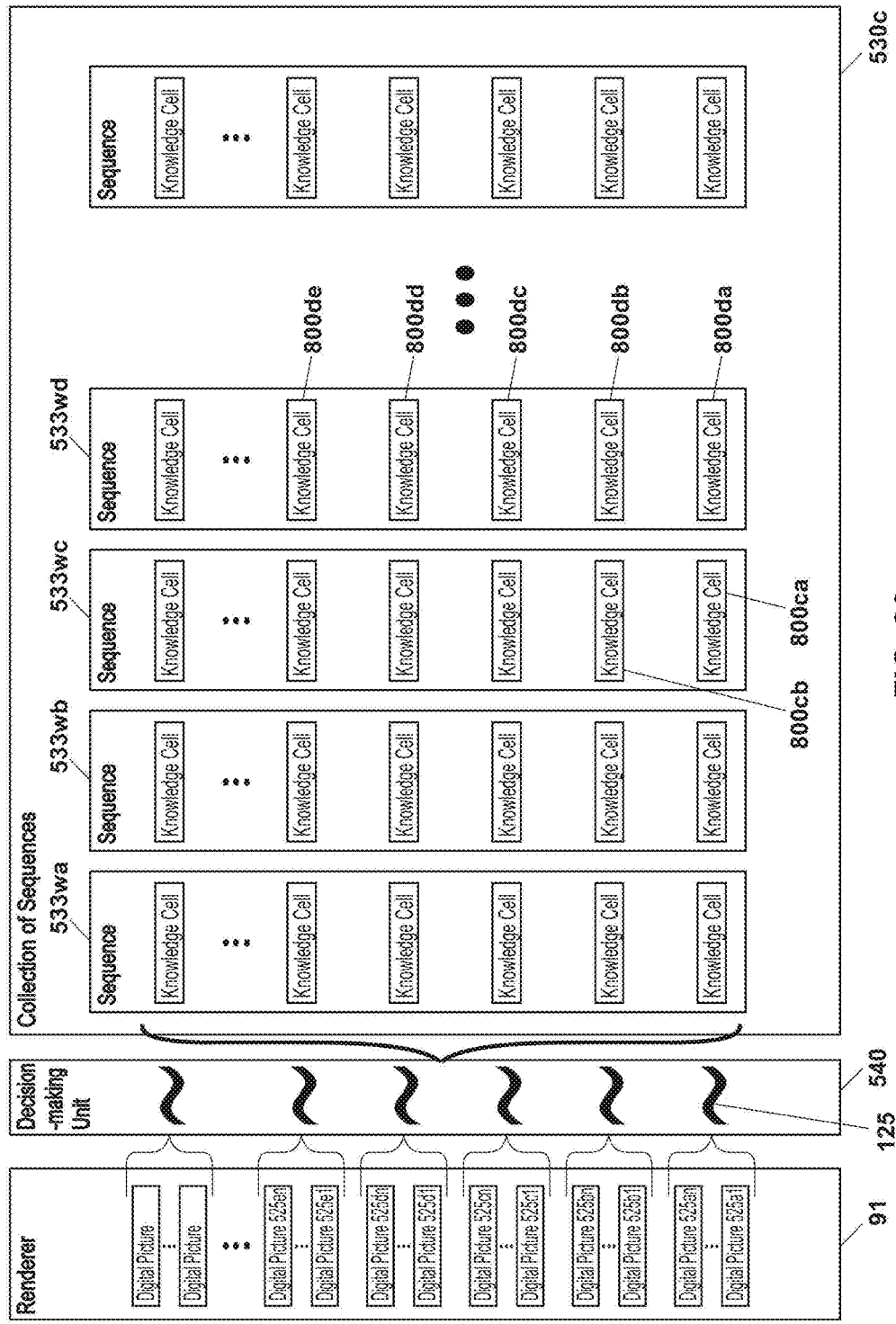
FIG. 26 illustrates an embodiment of determining anticipatory Instruction Sets 526 using Collection of Sequences 530c.

Referring to FIG. 26, an embodiment of determining anticipatory Instruction Sets 526 using Collection of Sequences 530*c* is illustrated. Collection of Sequences 530*c* may include knowledge (i.e. sequences of Knowledge Cells 800 comprising one or more Digital Pictures 525 correlated with any Instruction Sets 526 and/or Extra Info 527, etc.) of how Object 180 operated in various visual surroundings. In some aspects, determining anticipatory Instruction Sets 526 for autonomous Object 180 operation using Collection of Sequences 530*c* may include selecting a Sequence 533 of Knowledge Cells 800 or elements (i.e. Digital Pictures 525, Instruction Sets 526, etc.) thereof from Collection of Sequences 530*c*. Individual and/or collective Similarity Comparisons 125 can be used to determine substantial similarity of the individually and/or collectively compared Digital Pictures 525 or portions thereof.

For example, Decision-making Unit 540 can perform Similarity Comparisons 125 of Digital Pictures 525*a*1-525*an* or portions thereof from Renderer 91 with Digital Pictures 525 or portions thereof from corresponding Knowledge Cells 800 in one or more Sequences 533 of Collection of Sequences 530*c*. Digital Pictures 525 or portions thereof from Knowledge Cell 800*ca* in Sequence 533*wc* may be found collectively substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can then perform Similarity Comparisons 125 of Digital Pictures 525*a*1-525*an* and 525*b*1-525*bn* or portions thereof from Renderer 91 with Digital Pictures 525 or portions thereof from corresponding Knowledge Cells 800 in Sequences 533 of Collection of Sequences 530*c*. Digital Pictures 525 or portions thereof from Knowledge Cells 800*ca*-800*cb* in Sequence 533*wc* may be found collectively substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can then perform Similarity Comparisons 125 of Digital Pictures 525*a*1-525*an*, 525*b*1-525*bn*, and 525*c*1-525*cn* or portions thereof from Renderer 91 with Digital Pictures 525 or portions thereof from corresponding Knowledge Cells 800 in Sequences 533 of Collection of Sequences 530*c*. Digital Pictures 525 or portions thereof from Knowledge Cells 800*da*-800*dc* in Sequence 533*wd* may be found substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can then perform Similarity Comparisons 125 of Digital Pictures 525*a*1-525*an*, 525*b*1-525*bn*, 525*c*1-525*cn*, and 525*d*1-525*dn* or portions thereof from Renderer 91 with Digital Pictures 525 or portions thereof from corresponding Knowledge Cells 800 in Sequences 533 of Collection of Sequences 530*c*. Digital Pictures 525 or portions thereof from Knowledge Cells 800*da*-800*dd* in Sequence 533*wd* may be found substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can then perform Similarity Comparisons 125 of Digital Pictures 525*a*1-525*an*, 525*b*1-525*bn*, 525*c*1-525*cn*, 525*d*1-525*dn*, and 525*e*1-525*en* or portions thereof from Renderer 91 with Digital Pictures 525 or portions thereof from corresponding Knowledge Cells 800 in Sequences 533 of Collection of Sequences 530*c*. Digital Pictures 525 or portions thereof from Knowledge Cells 800*da*-800*de* in Sequence 533*wd* may be found substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Object 180 operation. Decision-making Unit 540 can implement similar logic or process for any additional Digital Pictures 525 from Renderer 91, and so on.

In some embodiments, various elements and/or techniques can be utilized in the aforementioned substantial similarity determinations with respect to collectively compared Knowledge Cells 800 or elements (i.e. Digital Pictures 525, Extra Info 527, etc.) thereof. In some aspects, substantial similarity of collectively compared Knowledge Cells 800 or elements (i.e. Digital Pictures 525, Extra Info 527, etc.) thereof can be determined based on similarities or similarity indexes of the individually compared Knowledge Cells 800 or elements (i.e. Digital Pictures 525, Extra Info 527, etc.) thereof. In one example, an average of similarities or similarity indexes of individually compared Knowledge Cells 800 or elements (i.e. Digital Pictures 525, Extra Info 527, etc.) thereof can be used to determine similarity of collectively compared Knowledge Cells 800 or elements (i.e. Digital Pictures 525, Extra Info 527, etc.) thereof. In another example, a weighted average of similarities or similarity indexes of individually compared Knowledge Cells 800 or elements (i.e. Digital Pictures 525, Extra Info 527, etc.) thereof can be used to determine similarity of collectively compared Knowledge Cells 800 or elements (i.e. Digital Pictures 525, Extra Info 527, etc.) thereof. For instance, to affect the weighting of collective similarity, a higher weight or importance (i.e. importance index, etc.) can be assigned to the similarities or similarity indexes of some Knowledge Cells 800 or elements (i.e. Digital Pictures 525, Extra Info 527, etc.) thereof and lower for other Knowledge Cells 800 or elements (i.e. Digital Pictures 525, Extra Info 527, etc.) thereof. Any higher or lower weight or importance assignment can be implemented. In other aspects, any of the previously described or other thresholds for substantial similarity of individually compared elements can similarly be utilized for collectively compared elements. In one example, substantial similarity of collectively compared Knowledge Cells 800 or elements (i.e. Digital Pictures 525, Extra Info 527, etc.) thereof can be achieved when their collective similarity or similarity index exceeds a similarity threshold. In another example, substantial similarity of collectively compared Knowledge Cells 800 can be achieved when at least a threshold number or percentage of Digital Pictures 525 or portions thereof of the collectively compared Knowledge Cells 800 match or substantially match. Similarly, substantial similarity of collectively compared Knowledge Cells 800 can be achieved when a number or percentage of matching or substantially matching Digital Pictures 525 or portions thereof of the collectively compared Knowledge Cells 800 exceeds a threshold. Such thresholds can be defined by a user, by VSAOO system administrator, or automatically by the system based on experience, testing, inquiry, analysis, synthesis, or other techniques, knowledge, or input. Collective similarity determinations may include any features, functionalities, and embodiments of Similarity Comparison 125, and vice versa.

The foregoing exemplary embodiment provides an example of utilizing a combination of collective Similarity Comparisons 125, individual Similarity Comparisons 125, and/or other elements or techniques. It should be understood that any of these elements and/or techniques can be omitted, used in a different combination, or used in combination with other elements and/or techniques, in which case the selection of Sequence 533 of Knowledge Cells 800 or elements (i.e. Digital Pictures 525, Instruction Sets 526, etc.) thereof would be affected accordingly. Any of the elements and/or techniques utilized in other examples or embodiments described herein such as using Extra Info 527 in Similarity Comparisons 125, traversing of Knowledge Cells 800 or other elements, using history of Digital Pictures 525 or Knowledge Cells 800 in collective Similarity Comparisons 125, using various arrangements of Digital Pictures 525 and/or other elements in a Knowledge Cell 800, and/or others can similarly be utilized in this example. These elements and/or techniques can similarly be utilized in Neural Network 530*a*, Graph 530*b*, Collection of Knowledge Cells 530*d*, and/or other data structures or arrangements. In some aspects, instead of anticipating Instruction Sets 526 correlated with substantially similar individual Digital Pictures 525, Decision-making Unit 540 can anticipate Instruction Sets 526 correlated with substantially matching streams of Digital Pictures 525. In other aspects, any time that substantial similarity or other similarity threshold is not achieved in compared Digital Pictures 525 or portions thereof of any of the Knowledge Cells 800, Decision-making Unit 540 can decide to look for a substantially or otherwise similar Digital Pictures 525 or portions thereof in Knowledge Cells 800 elsewhere in Collection of Sequences 530*c* such as in different Sequences 533. It should be noted that any of Digital Pictures 525*a*1-525*an*, Digital Pictures 525*b*1-525*bn*, Digital Pictures 525*c*1-525*cn*, Digital Pictures 525*d*1-525*dn*, Digital Pictures 525*e*1-525*en*, etc. may include one Digital Picture 525 or a stream of Digital Pictures 525. It should also be noted that any Knowledge Cell 800 may include one Digital Picture 525 or a stream of Digital Pictures 525 as previously described. One of ordinary skill in art will understand that the foregoing exemplary embodiment is described merely as an example of a variety of possible implementations, and that while all of its variations are too voluminous to describe, they are within the scope of this disclosure.

Referring now to Modification Interface 130. Modification Interface 130 comprises the functionality for modifying execution and/or functionality of Application Program 18, Object 180, Processor 11, and/or other processing element. Modification Interface 130 comprises the functionality for modifying execution and/or functionality of Application Program 18, Object 180, Processor 11, and/or other processing element at runtime. Modification Interface 130 comprises the functionality for modifying execution and/or functionality of Application Program 18, Object 180, Processor 11, and/or other processing element based on anticipatory Instruction Sets 526. In one example, Modification Interface 130 comprises the functionality to access, modify, and/or perform other manipulations of runtime engine/environment, virtual machine, operating system, compiler, just-in-time (JIT) compiler, interpreter, translator, execution stack, file, object, data structure, and/or other computing system elements. In another example, Modification Interface 130 comprises the functionality to access, modify, and/or perform other manipulations of memory, storage, bus, interfaces, and/or other computing system elements. In a further example, Modification Interface 130 comprises the functionality to access, modify, and/or perform other manipulations of Processor 11 registers and/or other Processor 11 elements. In a further example, Modification Interface 130 comprises the functionality to access, modify, and/or perform other manipulations of inputs and/or outputs of Application Program 18, Object 180, Processor 11, and/or other processing element. In a further example, Modification Interface 130 comprises the functionality to access, create, delete, modify, and/or perform other manipulations of functions, methods, procedures, routines, subroutines, and/or other elements of Application Program 18 and/or Object 180. In a further example, Modification Interface 130 comprises the functionality to access, create, delete, modify, and/or perform other manipulations of source code, bytecode, compiled, interpreted, or otherwise translated code, machine code, and/or other code. In a further example, Modification Interface 130 comprises the functionality to access, create, delete, modify, and/or perform other manipulations of values, variables, parameters, and/or other data or information. Modification Interface 130 comprises any features, functionalities, and embodiments of Acquisition Interface 120, and vice versa. Modification Interface 130 also comprises other disclosed functionalities.

Modification Interface 130 can employ various techniques for modifying execution and/or functionality of Application Program 18, Object 180, Processor 11, and/or other processing element. In some aspects, some of the previously described techniques and/or tools can be utilized. Code instrumentation, for instance, may involve inserting additional code, overwriting or rewriting existing code, and/or branching to a separate segment of code in Application Program 18 as previously described. For example, instrumented code may include the following:

Object1.moveLeft(18);
modifyApplication( );

In the above sample code, instrumented call to Modification Interface's 130 function (i.e. modifyApplication( ), etc.) can be placed after a function (i.e. moveLeft(18), etc.) of Application Program 18. Similar call to an application modifying function can be placed after or before some or all functions/routines/subroutines, some or all lines of code, some or all statements, some or all instructions or instruction sets, some or all basic blocks, and/or some or all other code segments of Application Program 18. One or more application modifying function calls can be placed anywhere in Application Program's 18 code and can be executed at any points in Application Program's 18 execution. The application modifying function (i.e. modifyApplication( ), etc.) may include Artificial Intelligence Unit 110-determined anticipatory Instruction Sets 526 that can modify execution and/or functionality of Application Program 18. In some embodiments, the previously described obtaining Application Program's 18 instruction sets, data, and/or other information as well as modifying execution and/or functionality of Application Program 18 can be implemented in a single function that performs both tasks (i.e. traceAndModifyApplication( ), etc.).

In some embodiments, various computing systems and/or platforms may provide native tools for modifying execution and/or functionality of Application Program 18, Object 180, Processor 11, and/or other processing element. Independent vendors may provide tools with similar functionalities that can be utilized across different platforms. These tools enable a wide range of techniques or capabilities such as instrumentation, self-modifying code capabilities, dynamic code capabilities, branching, code rewriting, code overwriting, hot swapping, accessing and/or modifying objects or data structures, accessing and/or modifying functions/routines/subroutines, accessing and/or modifying variable or parameter values, accessing and/or modifying processor registers, accessing and/or modifying inputs and/or outputs, providing runtime memory access, and/or other capabilities. One of ordinary skill in art will understand that, while all possible variations of the techniques for modifying execution and/or functionality of Application Program 18, Object 180, Processor 11, and/or other processing element are too voluminous to describe, these techniques are within the scope of this disclosure.

In one example, modifying execution and/or functionality of Application Program 18 and/or Object 180 can be implemented through utilizing metaprogramming techniques, which include applications that can self-modify or that can create, modify, and/or manipulate other applications. Self-modifying code, dynamic code, reflection, and/or other techniques can be used to facilitate metaprogramming. In some aspects, metaprogramming is facilitated through a programming language's ability to access and manipulate the internals of the runtime engine directly or via an API. In other aspects, metaprogramming is facilitated through dynamic execution of expressions (i.e. anticipatory Instruction Sets 526, etc.) that can be created and/or executed at runtime. In yet other aspects, metaprogramming is facilitated through application modification tools, which can perform modifications on an application regardless of whether the application's programming language enables metaprogramming capabilities. Some operating systems may protect an application loaded into memory by restricting access to the loaded application. This protection mechanism can be circumvented by utilizing operating system's, processor's, and/or other low level features or commands to unprotect the loaded application. For example, a self-modifying application may modify the in-memory image of itself. To do so, the application can obtain the in-memory address of its code. The application may then change the operating system's or platform's protection on this memory range allowing it to modify the code (i.e. insert anticipatory Instruction Sets 526, etc.). In addition to a self-modifying application, one application can utilize similar technique to modify another application. Linux mprotect command or similar commands of other operating systems can be used to change protection (i.e. unprotect, etc.) for a region of memory, for example. Other platforms, tools, and/or techniques may provide equivalent or similar functionalities as the above described ones.

In a further example, modifying execution and/or functionality of Application Program 18 and/or Object 180 can be implemented through native capabilities of dynamic, interpreted, and/or scripting programming languages and/or platforms. Most of these languages and/or platforms can perform functionalities at runtime that static programming languages may perform during compilation. Dynamic, interpreted, and/or scripting languages provide native functionalities such as self-modification of code, dynamic code, extending the application, adding new code, extending objects and definitions, and/or other functionalities that can modify an application's execution and/or functionality at runtime. Examples of dynamic, interpreted, and/or scripting languages include Lisp, Perl, PHP, JavaScript, Ruby, Python, Smalltalk, Tcl, VBScript, and/or others. Similar functionalities can also be provided in languages such as Java, C, and/or others using reflection. Reflection includes the ability of an application to examine and modify the structure and behavior of the application at runtime. For example, JavaScript can modify its own code as it runs by utilizing Function object constructor as follows:

myFunc=new Function(arg1, arg2, argN, functionBody);

The sample code above causes a new function object to be created with the specified arguments and body. The body and/or arguments of the new function object may include new instruction sets (i.e. anticipatory Instruction Sets 526, etc.). The new function can be invoked as any other function in the original code. In another example, JavaScript can utilize eval method that accepts a string of JavaScript statements (i.e. anticipatory Instruction Sets 526, etc.) and execute them as if they were within the original code. An example of how eval method can be used to modify an application includes the following JavaScript code:

anticipatoryInstr='Object1.moveForward(27);';
if (anticipatoryInstr !=" " && anticipatoryInstr !=null)
{
    eval(anticipatoryInstr);
}

In the sample code above, Artificial Intelligence Unit 110 may generate anticipatory Instruction Set 526 (i.e. 'Object1.moveForward(27)' for moving an object forward 27 units, etc.) and save it in anticipatoryInstr variable, which eval method can then execute. Lisp is another example of dynamic, interpreted, and/or scripting language that includes similar capabilities as previously described JavaScript. For example, Lisp's compile command can create a function at runtime, eval command may parse and evaluate an expression at runtime, and exec command may execute a given instruction set (i.e. string, etc.) at runtime. In another example, dynamic as well as some non-dynamic languages may provide macros, which combine code introspection and/or eval capabilities. In some aspects, macros can access inner workings of the compiler, interpreter, virtual machine, runtime environment/engine, and/or other components of the computing platform enabling the definition of language-like constructs and/or generation of a complete program or sections thereof. Other platforms, tools, and/or techniques may provide equivalent or similar functionalities as the above described ones.

In a further example, modifying execution and/or functionality of Application Program 18 and/or Object 180 can be implemented through dynamic code, dynamic class loading, reflection, and/or other native functionalities of a programming language or platform. In static applications or static programming, a class can be defined and/or loaded at compile time. Conversely, in dynamic applications or dynamic programming, a class can be loaded into a running environment at runtime. For example, Java Runtime Environment (JRE) may not require that all classes be loaded at compile time and class loading can occur when a class is first referenced at runtime. Dynamic class loading enables inclusion or injection of on-demand code and/or functionalities at runtime. System provided or custom class loaders may enable loading of classes into the running environment. Custom class loaders can be created to enable custom functionalities such as, for example, specifying a remote location from which a class can be loaded. In addition to dynamic loading of a pre-defined class, a class can also be created at runtime. In some aspects, a class source code can be created at runtime. A compiler such as javac, com.sun.tools.javac.Main, javax.tools, javax.tools.JavaCompiler, and/or other packages can then be utilized to compile the source code. Javac, com.sun.tools.javac.Main, javax.tools, javax.tools.JavaCompiler, and/or other packages may include an interface to invoke Java compiler from within a running application. A Java compiler may accept source code in a file, string, object (i.e. Java String, StringBuffer, CharSequence, etc.) and/or other source, and may generate Java bytecode (i.e. class file, etc.). Once compiled, a class loader can then load the compiled class into the running environment. In other aspects, a tool such as Javaassist (i.e. Java programming assistant) can be utilized to enable an application to create or modify a class at runtime. Javassist may include a Java library that provides functionalities to create and/or manipulate Java bytecode of an application as well as reflection capabilities. Javassist may provide source-level and bytecode-level APIs. Using the source-level API, a class can be created and/or modified using only source code, which Javassist may compile seamlessly on the fly. Javassist source-level API can therefore be used without knowledge of Java bytecode specification. Bytecode-level API enables creating and/or editing a class bytecode directly. In yet other aspects, similar functionalities to the aforementioned ones may be provided in tools such as Apache Commons BCEL (Byte Code Engineering Library), ObjectWeb ASM, CGLIB (Byte Code Generation Library), and/or others. Once a dynamic code or class is created and loaded, reflection in high-level programming languages such as Java and/or others can be used to manipulate or change the runtime behavior of an application. Examples of reflective programming languages and/or platforms include Java, JavaScript, Smalltalk, Lisp, Python, .NET Common Language Runtime (CLR), Tcl, Ruby, Perl, PHP, Scheme, PL/SQL, and/or others. Reflection can be used in an application to access, examine, modify, and/or manipulate a loaded class and/or its elements. Reflection in Java can be implemented by utilizing a reflection API such as java.lang.Reflect package. The reflection API provides functionalities such as, for example, loading or reloading a class, instantiating a new instance of a class, determining class and instance methods, invoking class and instance methods, accessing and manipulating a class, fields, methods and constructors, determining the modifiers for fields, methods, classes, and interfaces, and/or other functionalities. The above described dynamic code, dynamic class loading, reflection, and/or other functionalities are similarly provided in the .NET platform through its tools such as, for example, System.CodeDom.Compiler namespace, System.Reflection.Emit namespace, and/or other native or other .NET tools. Other platforms in addition to Java and .NET may provide similar tools and/or functionalities. In some designs, dynamic code, dynamic class loading, reflection, and/or other functionalities can be used to facilitate modification of an application by inserting or injecting instruction sets (i.e. anticipatory Instruction Sets 526, etc.) into a running application. For example, an existing or dynamically created class comprising VSAOO Unit 100 functionalities can be loaded into a running application through manual, automatic, or dynamic instrumentation. Once the class is created and loaded, an instance of VSAOO Unit 100 class may be constructed. The instance of VSAOO Unit 100 can then take or exert control of the application and/or implement alternate instruction sets (i.e. anticipatory Instruction Sets 526, etc.) at any point in the application's execution. Other platforms, tools, and/or techniques may provide equivalent or similar functionalities as the above described ones.

In a further example, modifying execution and/or functionality of Application Program 18 and/or Object 180 can be implemented through independent tools that can be utilized across different platforms. Such tools provide instrumentation and/or other capabilities on more than one platform or computing system and may facilitate application modification or insertion of instruction sets (i.e. anticipatory Instruction Sets 526, etc.). Examples of these tools include Pin, DynamoRIO, DynInst, Kprobes, KernInst, OpenPAT, DTrace, SystemTap, and/or others. In some aspects, Pin and/or any of its elements, methods, and/or techniques can be utilized for dynamic instrumentation. Pin can perform instrumentation by taking control of an application after it loads into memory. Pin may insert itself into the address space of an executing application enabling it to take control. Pin JIT compiler can then compile and implement alternate code (i.e. anticipatory Instruction Sets 526, etc.). Pin provides an extensive API for instrumentation at several abstraction levels. Pin supports two modes of instrumentation, JIT mode and probe mode. JIT mode uses a just-in-time compiler to insert instrumentation and recompile program code while probe mode uses code trampolines for instrumentation. Pin was designed for architecture and operating system independence. In other aspects, KernInst and/or any of its elements, methods, and/or techniques can be utilized for dynamic instrumentation. KernInst includes an instrumentation framework designed for dynamically inserting code into a running kernel of an operating system. KernInst implements probe-based dynamic instrumentation where code can be inserted, changed, and/or removed at will. KernInst API enables client tools to construct their own tools for dynamic kernel instrumentation to suit variety of purposes such as insertion of alternate instruction sets (i.e. anticipatory Instruction Sets 526, etc.). Client tools can communicate with KernInst over a network (i.e. internet, wireless network, LAW, WAN, etc). Other platforms, tools, and/or techniques may provide equivalent or similar functionalities as the above described ones.

In a further example, modifying execution and/or functionality of Application Program 18 and/or Object 180 can be implemented through utilizing operating system's native tools or capabilities such as Unix ptrace command. Ptrace includes a system call that may enable one process to control another allowing the controller to inspect and manipulate the internal state of its target. Ptrace can be used to modify a running application such as modifying an application with alternate instruction sets (i.e. anticipatory Instruction Sets 526, etc.). By attaching to an application using the ptrace call, the controlling application can gain extensive control over the operation of its target. This may include manipulation of its instruction sets, execution path, file descriptors, memory, registers, and/or other components. Ptrace can single-step through the target's code, observe and intercept system calls and their results, manipulate the target's signal handlers, receive and send signals on the target's behalf, and/or perform other operations within the target application. Ptrace's ability to write into the target application's memory space enables the controller to modify the running code of the target application. Other platforms, tools, and/or techniques may provide equivalent or similar functionalities as the above described ones.

In a further example, modifying execution and/or functionality of Application Program 18 and/or Object 180 can be implemented through utilizing just-in-time (JIT) compiling. JIT compilation (also known as dynamic translation, dynamic compilation, etc.) includes compilation performed during an application's execution (i.e. runtime, etc.). A code can be compiled when it is about to be executed, and it may be cached and reused later without the need for additional compilation. In some aspects, a JIT compiler can convert source code or byte code into machine code. In other aspects, a JIT compiler can convert source code into byte code. JIT compiling may be performed directly in memory. For example, JIT compiler can output machine code directly into memory and immediately execute it. Platforms such as Java, .NET, and/or others may implement JIT compilation as their native functionality. Platform independent tools for custom system design may include JIT compilation functionalities as well. In some aspects, JIT compilation includes redirecting application's execution to a JIT compiler from a specific entry point. For example, Pin can insert its JIT compiler into the address space of an application. Once execution is redirected to it, JIT compiler may receive alternate instruction sets (i.e. anticipatory Instruction Sets 526, etc.) immediately before their compilation. The JIT compiled instruction sets can be stored in memory or another repository from where they may be retrieved and executed. Alternatively, for example, JIT compiler can create a copy of the original application code or a segment thereof, and insert alternate code (i.e. anticipatory Instruction Sets 526, etc.) before compiling the modified code copy. In some aspects, JIT compiler may include a specialized memory such as fast cache memory dedicated to JIT compiler functionalities from which the modified code can be fetched rapidly. JIT compilation and/or any compilation in general may include compilation, interpretation, or other translation into machine code, bytecode, and/or other formats or types of code. Other platforms, tools, and/or techniques may provide equivalent or similar functionalities as the above described ones.

In a further example, modifying execution and/or functionality of Application Program 18 and/or Object 180 can be implemented through dynamic recompilation. Dynamic recompilation includes recompiling an application or part thereof during execution. An application can be modified with alternate features or instruction sets that may take effect after recompilation. Dynamic recompilation may be practical in various types of applications including object oriented, event driven, forms based, and/or other applications. In a typical windows-based application, most of the action after initial startup occurs in response to user or system events such as moving the mouse, selecting a menu option, typing text, running a scheduled task, making a network connection, and/or other events when an event handler is called to perform an operation appropriate for the event. Generally, when no events are being generated, the application is idle. For example, when an event occurs and an appropriate event handler is called, instrumentation can be implemented in the application's source code to insert alternate instruction sets (i.e. anticipatory Instruction Sets 526, etc.) at which point the modified source code can be recompiled and/or executed. In some aspects, the state of the application can be saved before recompiling its modified source code so that the application may continue from its prior state. Saving the application's state can be achieved by saving its variables, data structures, objects, location of its current instruction, and/or other necessary information in environmental variables, memory, or other repositories where they can be accessed once the application is recompiled. In other aspects, application's variables, data structures, objects, address of its current instruction, and/or other necessary information can be saved in a repository such as file, database, or other repository accessible to the application after recompilation of its source code. Other platforms, tools, and/or techniques may provide equivalent or similar functionalities as the above described ones.

In a further example, modifying execution and/or functionality of Application Program 18 and/or Object 180 can be implemented through modifying or redirecting Application Program's 18 execution path. Generally, an application can be loaded into memory and the flow of execution proceeds from one instruction set to the next until the end of the application. An application may include a branching mechanism that can be driven by keyboard or other input devices, system events, and/or other computing system components or events that may impact the execution path. The execution path can also be altered by an external application through acquiring control of execution and/or redirecting execution to a function, routine/subroutine, or an alternate code segment at any point in the application's execution. A branch, jump, or other mechanism can be utilized to implement the redirected execution. For example, a jump instruction can be inserted at a specific point in an application's execution to redirect execution to an alternate code segment. A jump instruction set may include, for example, an unconditional branch, which always results in branching, or a conditional branch, which may or may not result in branching depending on a condition. When executing an application, a computer may fetch and execute instruction sets in sequence until it encounters a branch instruction set. If the instruction set is an unconditional branch, or it is conditional and the condition is satisfied, the computer may fetch its next instruction set from a different instruction set sequence or code segment as specified by the branch instruction set. After the execution of the alternate code segment, control may be redirected back to the original jump point or to another point in the application. For example, modifying an application can be implemented by redirecting execution of an application to alternate instruction sets (i.e. anticipatory Instruction Sets 526, etc.). Alternate instruction sets can be pre-compiled, pre-interpreted, or otherwise pre-translated and ready for execution. Alternate instruction sets can also be JIT compiled, JIT interpreted, or otherwise JIT translated before execution. Other platforms, tools, and/or techniques may provide equivalent or similar functionalities as the above described ones.

In a further example, modifying execution and/or functionality of Application Program 18 and/or Object 180 can be implemented through assembly language. Assembly language instructions may be directly related with the architecture's machine instructions as previously described. Assembly language can, therefore, be a powerful tool for implementing direct hardware (i.e. processor registers, memory, etc.) access and manipulations as well as access and manipulations of specialized processor features or instructions. Assembly language can also be a powerful tool for implementing low-level embedded systems, real-time systems, interrupt handlers, self or dynamically modifying code, and/or other applications. Specifically, for instance, self or dynamically modifying code that can be used to facilitate modifying of an application can be seamlessly implemented using assembly language. For example, using assembly language, instruction sets can be dynamically created and loaded into memory similar to the ones that a compiler may generate. Furthermore, using assembly language, memory space of a loaded application can be accessed to modify (including rewrite, overwrite, etc.) original instruction sets or to insert jumps or branches to alternate code elsewhere in memory. Some operating systems may implement protection from changes to applications loaded into memory. Operating system's, processor's, or other low level features or commands can be used to unprotect the protected locations in memory before the change as previously described. Alternatively, a pointer that may reside in a memory location where it could be readily altered can be utilized where the pointer may reference alternate code. In one example, assembly language can be utilized to write alternate code (i.e. anticipatory Instruction Sets 526, etc.) into a location in memory outside a running application's memory space. Assembly language can then be utilized to redirect the application's execution to the alternate code by inserting a jump or branch into the application's in-memory code, by redirecting program counter, or by other technique. In another example, assembly language can be utilized to overwrite or rewrite the entire or part of an application's in-memory code with alternate code. In some aspects, high-level programming languages can call an external assembly language program to facilitate application modification as previously described. In yet other aspects, relatively low-level programming languages such as C may allow embedding assembly language directly in their source code such as, for example, using asm keyword of C. Other platforms, tools, and/or techniques may provide equivalent or similar functionalities as the above described ones.

In a further example, modifying execution and/or functionality of Application Program 18 and/or Object 180 can be implemented through binary rewriting. Binary rewriting tools and/or techniques may modify an application's executable. In some aspects, modification can be minor such as in the case of optimization where the original executable's functionality is kept. In other aspects, modification may change the application's functionality such as by inserting alternate code (i.e. anticipatory Instruction Sets 526, etc.). Examples of binary rewriting tools include SecondWrite, ATOM, DynamoRIO, Purify, Pin, EEL, DynInst, PLTO, and/or others. Binary rewriting may include disassembly, analysis, and/or modification of target application. Since binary rewriting works directly on machine code executable, it is independent of source language, compiler, virtual machine (if one is utilized), and/or other higher level abstraction layers. Also, binary rewriting tools can perform application modifications without access to original source code. Binary rewriting tools include static rewriters, dynamic rewriters, minimally-invasive rewriters, and/or others. Static binary rewriters can modify an executable when the executable is not in use (i.e. not running). The rewritten executable may then be executed including any new or modified functionality. Dynamic binary rewriters can modify an executable during its execution, thereby enabling modification of an application's functionality at runtime. In some aspects, dynamic rewriters can be used for instrumentation or selective modifications such as insertion of alternate code (i.e. anticipatory Instruction Sets 526, etc.), and/or for other runtime transformations or modifications. For example, some dynamic rewriters can be configured to intercept an application's execution at indirect control transfers and insert instrumentation or other application modifying code. Minimally-invasive rewriters may keep the original machine code to the greatest extent possible. They support limited modifications such as insertion of jumps into and out of instrumented code. Other platforms, tools, and/or techniques may provide equivalent or similar functionalities as the above described ones.

Figure 27:
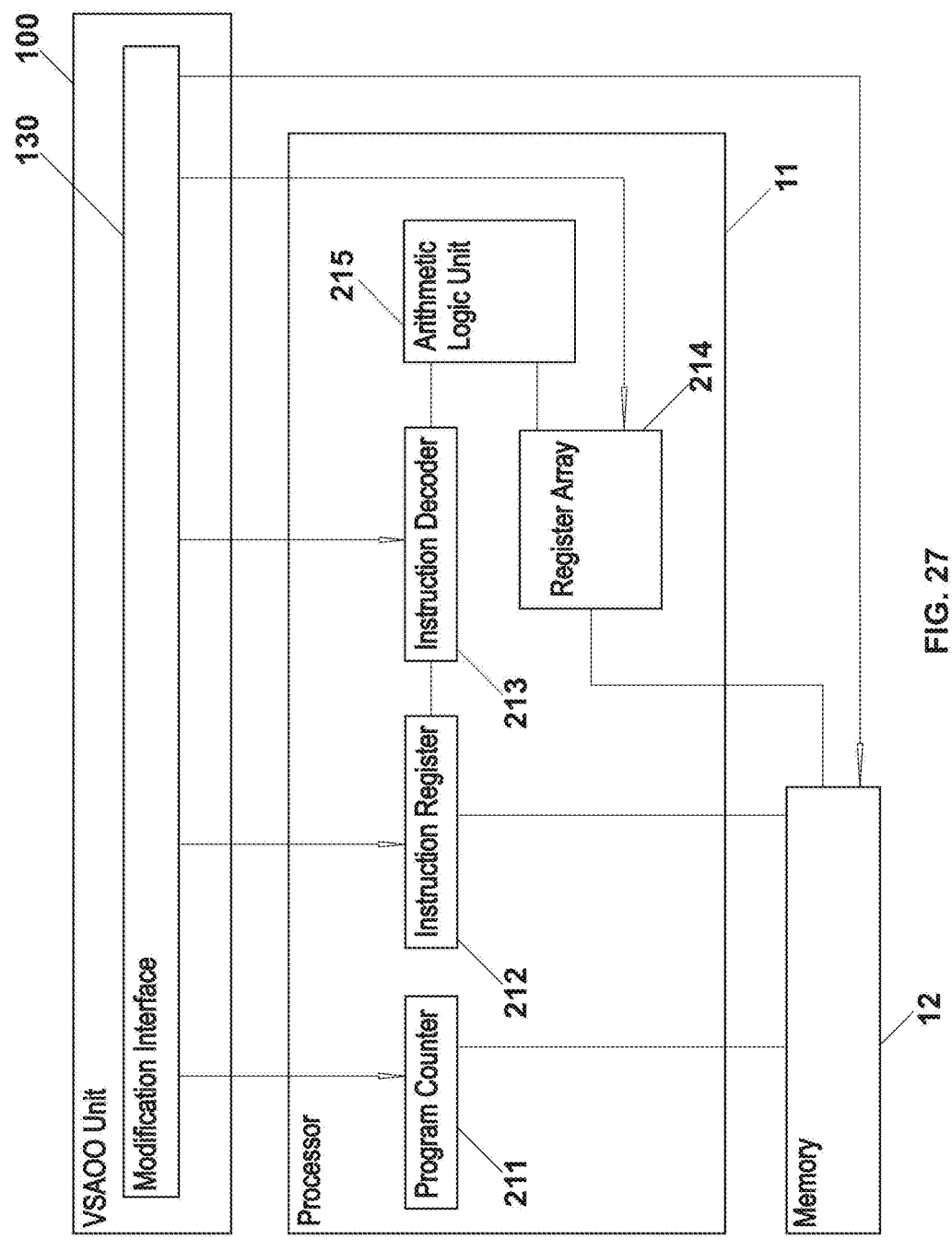
FIG. 27 illustrates some embodiments of modifying execution and/or functionality of Processor 11 through modification of Processor 11 registers, memory, or other computing system components.

Referring to FIG. 27, in a further example, modifying execution and/or functionality of Processor 11 can be implemented through modification of processor registers, memory, or other computing system components. In some aspects, modifying execution and/or functionality of Processor 11 can be implemented by redirecting Processor's 11 execution to alternate instruction sets (i.e. anticipatory Instruction Sets 526, etc.). In one example, Program Counter 211 may hold or point to a memory address of the next instruction set that will be executed by Processor 11. Artificial Intelligence Unit 110 may generate anticipatory Instruction Sets 526 and store them in Memory 12 as previously described. Modification Interface 130 may then change Program Counter 211 to point to the location in Memory 12 where anticipatory Instruction Sets 526 are stored. The anticipatory Instruction Sets 526 can then be fetched from the location in Memory 12 pointed to by the modified Program Counter 211 and loaded into Instruction Register 212 for decoding and execution. Once anticipatory Instruction Sets 526 are executed, Modification Interface 130 may change Program Counter 211 to point to the last instruction set before the redirection or to any other instruction set. In other aspects, anticipatory Instruction Sets 526 can be loaded directly into Instruction Register 212. As previously described, examples of other processor or computing system components that can be used during an instruction cycle include memory address register (MAR), memory data register (MDR), data registers, address registers, general purpose registers (GPRs), conditional registers, floating point registers (FPRs), constant registers, special purpose registers, machine-specific registers, Register Array 214, Arithmetic Logic Unit 215, control unit, and/or other circuits or components. Any of the aforementioned processor registers, memory, or other computing system components can be accessed and/or modified to facilitate the disclosed functionalities. In some embodiments, processor interrupt may be issued to facilitate such access and/or modification. In some designs, modifying execution and/or functionality of Processor 11 can be implemented in a program, combination of programs and hardware, or purely hardware system. Dedicated hardware may be built to perform modifying execution and/or functionality of Processor 11 with marginal or no impact to computing overhead. Other platforms, tools, and/or techniques may provide equivalent or similar functionalities as the above described ones.

Other additional techniques or elements can be utilized as needed for modifying execution and/or functionality of Application Program 18, Object 180, Processor 11, and/or other processing elements, or some of the disclosed techniques or elements can be excluded, or a combination thereof can be utilized in alternate embodiments.

Figure 28:
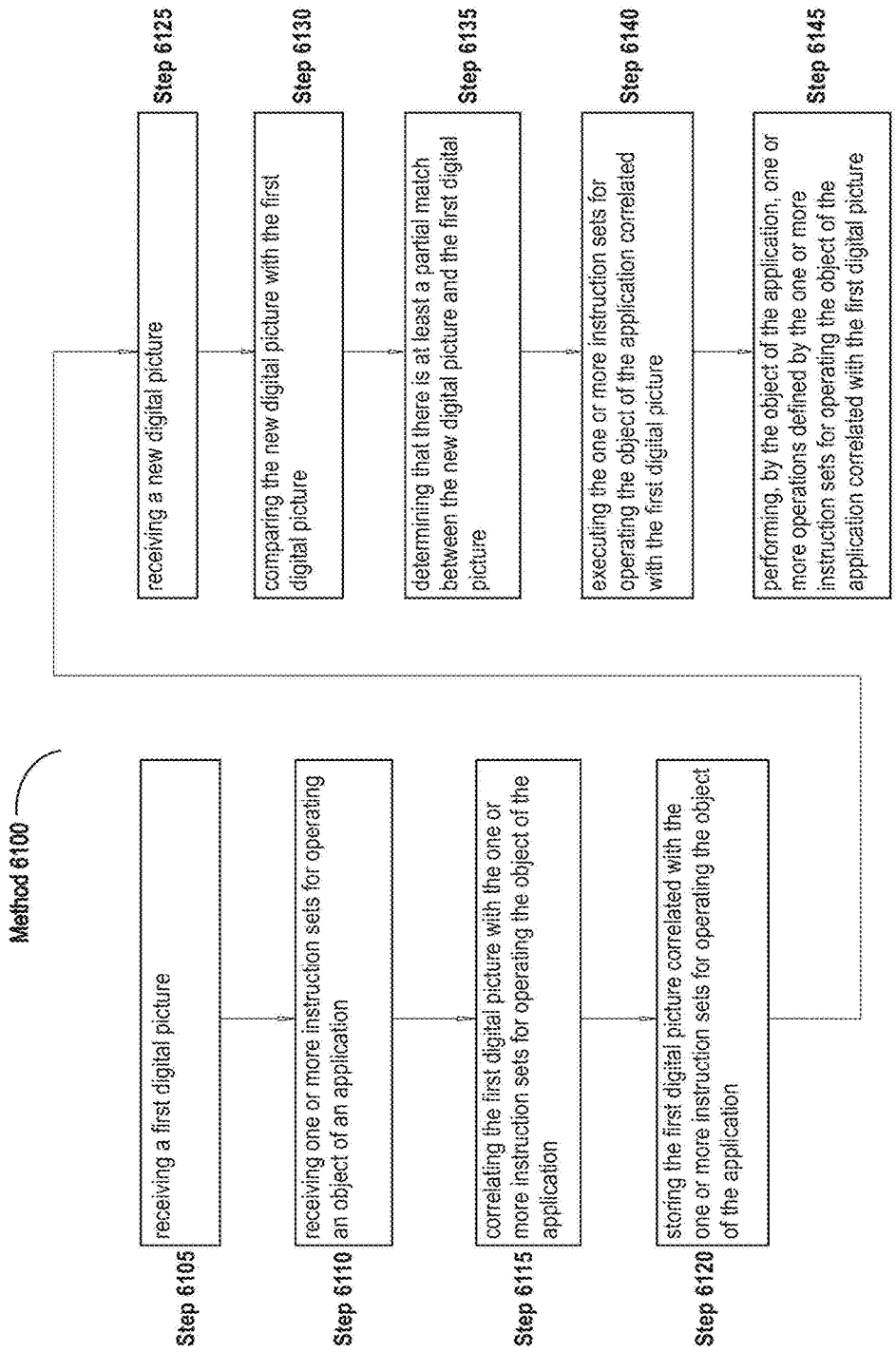
FIG. 28 illustrates a flow chart diagram of an embodiment of method 6100 for learning and/or using visual surrounding for autonomous object operation.

Referring to FIG. 28, the illustration shows an embodiment of a method 6100 for learning and/or using visual surrounding for autonomous object operation. The method can be used on a computing device or system to enable learning of an object's operation in various visual surroundings and enable autonomous object operation in similar visual surroundings. Method 6100 may include any action or operation of any of the disclosed methods such as method 6200, 6300, 6400, 6500, 6600, and/or others. Additional steps, actions, or operations can be included as needed, or some of the disclosed ones can be optionally omitted, or a different combination or order thereof can be implemented in alternate embodiments of method 6100.

At step 6105, a first digital picture is received. In some aspects, a digital picture (i.e. Digital Picture 525, etc.) includes a depiction of an object's (i.e. Object's 180, etc.) visual surrounding in an application. For example, a digital picture includes a depiction of an avatar's surrounding in a 3D application (i.e. 3D computer game, virtual world, CAD application, etc.). In other aspects, a digital picture includes a depiction of a view of an application. For example, a digital picture includes a screenshot, an area of interest, a top-down view, a side-on view, or other view of an application. In further aspects, a digital picture includes a depiction of any visual aspects of an application or an object thereof. In some embodiments, a digital picture may include a collection of color encoded pixels or dots. A digital picture comprises any type or form of digital picture such as JPEG, GIF, TIFF, PNG, PDF, and/or other digitally encoded picture. In other embodiments, a stream of digital pictures (i.e. motion picture, video, etc.) may include one or more digital pictures. A stream of digital pictures comprises any type or form of digital motion picture such as MPEG, AVI, FLV, MOV, RM, SWF, WMV, DivX, and/or other digitally encoded motion picture. In some aspects, a digital picture may include or be substituted with a stream of digital pictures, and vice versa. Therefore, the terms digital picture and stream of digital pictures may be used interchangeably herein depending on context. One or more digital pictures can be rendered or generated by a renderer (i.e. Renderer 91, etc.) or other picture processing device, apparatus, system, or application. In some embodiments, rendering and/or generating may be responsive to a triggering object, action, event, time, and/or other stimulus. Once rendered or generated, one or more digital pictures can be received from a renderer or other picture processing device, apparatus, system, or application. Receiving comprises any action or operation by or for a Renderer 91, Digital Picture 525, and/or other disclosed elements.

At step 6110, one or more instruction sets for operating an object of an application are received. In some designs, object includes an avatar or a user-controllable object. In other designs, object includes an object controlled by a system, program, and/or other mechanism for controlling an object. In some aspects, an instruction set (i.e. Instruction Set 526, etc.) may be used for operating an object of an application or for operating the application itself. Therefore, a reference to an instruction set for operating an object of an application includes or can be substituted with an instruction set for operating the application depending on context. In some embodiments, an instruction set (i.e. Instruction Set 526, etc.) may be used or executed by a processor (i.e. Processor 11, etc.). In other embodiments, an instruction set may be part of an application program (i.e. Application Program 18, etc.). The application can run or execute on one or more processors or other processing elements. Operating an object (i.e. Object 180, etc.) of an application includes performing any operations on or with the object. An instruction set may temporally correspond to a digital picture. In some aspects, an instruction set that temporally corresponds to a digital picture may include an instruction set used or executed at the time of receiving or capturing the digital picture. In other aspects, an instruction set that temporally corresponds to a digital picture may include an instruction set used or executed within a certain time period before and/or after receiving or capturing the digital picture. Any time period may be utilized. In further aspects, an instruction set that temporally corresponds to a digital picture may include an instruction set used or executed from the time of capturing of the digital picture to the time of capturing of a next digital picture. In further aspects, an instruction set that temporally corresponds to a digital picture may include an instruction set used or executed from the time of capturing of a preceding digital picture to the time of capturing of the digital picture. Any other temporal relationship or correspondence between digital pictures and correlated instruction sets can be implemented. In general, an instruction set that temporally corresponds to a digital picture enables structuring knowledge of an object's operation at or around the time of the receiving or capturing the digital picture. Such functionality enables spontaneous or seamless learning of an object's operation in various visual surroundings as user operates the object in real life situations. In some designs, an instruction set can be received from a processor, application program, object, and/or other processing element as the instruction set is being used or executed. In other aspects, an instruction set can be received from a processor, application program, object, and/or other processing element after the instruction set is used or executed. In further aspects, an instruction set can be received from a processor, application program, object, and/or other processing element before the instruction set has been used or executed. An instruction set can be received from a running processor, running application program, running object, and/or other running processing element. As such, an instruction set can be received at runtime. In some embodiments, an instruction set may include one or more commands, keywords, symbols (i.e. parentheses, brackets, commas, semicolons, etc.), instructions, operators (i.e. =, <, >, etc.), variables, values, objects (i.e. file handle, network connection, Object1, etc.), data structures (i.e. table, database, user defined data structure, etc.), functions (i.e. Function1( ), FIRST( ), MIN( ), SQRT( ), etc.), parameters, states, signals, inputs, outputs, and/or references thereto. In other embodiments, an instruction set may include source code, bytecode, intermediate code, compiled, interpreted, or otherwise translated code, runtime code, assembly code, machine code, and/or any other computer code. In further embodiments, an instruction set can be compiled, interpreted or otherwise translated into machine code or any intermediate code (i.e. bytecode, assembly code, etc.). In some aspects, an instruction set can be received from memory (i.e. Memory 12, etc.), hard drive, or any other storage element or repository. In other aspects, an instruction set can be received over a network such as Internet, local area network, wireless network, and/or other network. In further aspects, an instruction set can be received by an interface (i.e. Acquisition Interface 120, etc.) configured to obtain instruction sets from a processor, application program, object, and/or other element. In general, an instruction set can be received by any element of the system. In some embodiments, receiving may be responsive to a triggering object, action, event, time, and/or other stimulus. Receiving comprises any action or operation by or for an Acquisition Interface 120, Instruction Set 526, and/or other disclosed elements.

At step 6115, the first digital picture is correlated with the one or more instruction sets for operating the object of the application. In some aspects, individual digital pictures can be correlated with one or more instruction sets. In other aspects, streams of digital pictures can be correlated with one or more instruction sets. In further aspects, individual digital pictures or streams of digital pictures can be correlated with temporally corresponding instruction sets as previously described. In further aspects, a digital picture or stream of digital pictures may not be correlated with any instruction sets. Correlating may include structuring or generating a knowledge cell (i.e. Knowledge Cell 800, etc.) and storing one or more digital pictures correlated with any instruction sets into the knowledge cell. Therefore, knowledge cell may include any data structure or arrangement that can facilitate such storing. A knowledge cell includes a unit of knowledge of how an object operated in a visual surrounding. In some designs, extra information (i.e. Extra Info 527, etc.) may optionally be used to facilitate enhanced comparisons or decision making in autonomous object operation where applicable. Therefore, any digital picture, instruction set, and/or other element may include or be correlated with extra information. Extra information may include any information useful in comparisons or decision making performed in autonomous object operation. Examples of extra information include time information, location information, computed information, observed information, acoustic information, contextual information, and/or other information. In some embodiments, correlating may be responsive to a triggering object, action, event, time, and/or other stimulus. Correlating may be omitted where learning of an object's operations in visual surroundings is not implemented. Correlating comprises any action or operation by or for a Knowledge Structuring Unit 520, Knowledge Cell 800, and/or other disclosed elements.

At step 6120, the first digital picture correlated with the one or more instruction sets for operating the object of the application is stored. A digital picture correlated with one or more instruction sets may be part of a stored plurality of digital pictures correlated with one or more instruction sets. Digital pictures correlated with any instruction sets can be stored in a memory unit or other repository. The previously described knowledge cells comprising digital pictures correlated with any instruction sets can be used in/as neurons, nodes, vertices, or other elements in any of the data structures or arrangements (i.e. neural networks, graphs, sequences, collection of knowledge cells, etc.) used for storing the knowledge of an object's operation in visual surroundings. Knowledge cells may be connected, interrelated, or interlinked into knowledge structures using statistical, artificial intelligence, machine learning, and/or other models or techniques. Such interconnected or interrelated knowledge cells can be used for enabling autonomous object operation. The interconnected or interrelated knowledge cells may be stored or organized into a knowledgebase (i.e. Knowledgebase 530, etc.). In some embodiments, knowledgebase may be or include a neural network (i.e. Neural Network 530*a*, etc.). In other embodiments, knowledgebase may be or include a graph (i.e. Graph 530*b*, etc.). In further embodiments, knowledgebase may be or include a collection of sequences (i.e. Collection of Sequences 530*c*, etc.). In further embodiments, knowledgebase may be or include a sequence (i.e. Sequence 533, etc.). In further embodiments, knowledgebase may be or include a collection of knowledge cells (i.e. Collection of Knowledge Cells 530*d*, etc.). In general, knowledgebase may be or include any data structure or arrangement, and/or repository capable of storing the knowledge of an object's operation in various visual surroundings. Knowledgebase may also include or be substituted with various artificial intelligence methods, systems, and/or models for knowledge structuring, storing, and/or representation such as deep learning, supervised learning, unsupervised learning, neural networks (i.e. convolutional neural network, recurrent neural network, deep neural network, etc.), search-based, logic and/or fuzzy logic-based, optimization-based, tree/graph/other data structure-based, hierarchical, symbolic and/or sub-symbolic, evolutionary, genetic, multi-agent, deterministic, probabilistic, statistical, and/or other methods, systems, and/or models. Storing may be omitted where learning of an object's operations in visual surroundings is not implemented. Storing comprises any action or operation by or for a Knowledgebase 530, Neural Network 530*a*, Graph 530*b*, Collection of Sequences 530*c*, Sequence 533, Collection of Knowledge Cells 530*d*, Knowledge Cell 800, Node 852, Layer 854, Connection 853, Similarity Comparison 125, and/or other disclosed elements.

At step 6125, a new digital picture is received. Step 6125 may include any action or operation described in Step 6105 as applicable.

At step 6130, the new digital picture is compared with the first digital picture. Comparing one digital picture with another digital picture may include comparing at least a portion of one digital picture with at least a portion of the other digital picture. In some embodiments, digital pictures may be compared individually. In some aspects, comparing of individual pictures may include comparing one or more regions of one picture with one or more regions of another picture. In other aspects, comparing of individual pictures may include comparing one or more features of one picture with one or more features of another picture. In further aspects, comparing of individual pictures may include comparing pixels of one picture with pixels of another picture. In other aspects, comparing of individual pictures may include recognizing a person or object in one digital picture and recognizing a person or object in another digital picture, and comparing the person or object from the one digital picture with the person or object from the other digital picture. Comparing may also include other aspects or properties of digital pictures or pixels examples of which comprise color adjustment, size adjustment, content manipulation, transparency (i.e. alpha channel, etc.), use of a mask, and/or others. In other embodiments, digital pictures may be compared collectively as part of streams of digital pictures (i.e. motion pictures, videos, etc.). In some aspects, collective comparing may include comparing one or more digital pictures of one stream of digital pictures with one or more digital pictures of another stream of digital pictures. In some aspects, Dynamic Time Warping (DTW) and/or other techniques can be utilized for comparison and/or aligning temporal sequences (i.e. streams of digital pictures, etc.) that may vary in time or speed. Any combination of the aforementioned and/or other elements or techniques can be utilized in alternate embodiments of the comparing. Comparing may be omitted where anticipating of an object's operation in visual surroundings is not implemented. Comparing comprises any action or operation by or for a Decision-making Unit 540, Similarity Comparison 125, and/or other disclosed elements.

At step 6135, a determination is made that there is at least a partial match between the new digital picture and the first digital picture. In some embodiments, determining at least a partial match between individually compared digital pictures includes determining that similarity between one or more portions of one digital picture and one or more portions of another digital picture exceeds a similarity threshold. In other embodiments, determining at least a partial match between individually compared digital pictures includes determining at least a partial match between one or more portions of one digital picture and one or more portions of another digital picture. A portion of a digital picture may include a region, a feature, a pixel, or other portion. In further embodiments, determining at least a partial match between individually compared digital pictures includes determining that the number or percentage of matching or substantially matching regions of the compared pictures exceeds a threshold number (i.e. 1, 2, 5, 11, 39, etc.) or threshold percentage (i.e. 38%, 63%, 77%, 84%, 98%, etc.). In some aspects, the type of regions, the importance of regions, and/or other elements or techniques relating to regions can be utilized for determining similarity using regions. In further aspects, some of the regions can be omitted in determining similarity using regions. In further aspects, similarity determination can focus on regions of interest from the compared pictures. In further aspects, detection or recognition of persons or objects in regions of the compared pictures can be utilized for determining similarity. Where a reference to a region is used herein it should be understood that a portion of a region or a collection of regions can be used instead of or in addition to the region. In further embodiments, determining at least a partial match between individually compared digital pictures includes determining that the number or percentage of matching or substantially matching features of the compared pictures exceeds a threshold number (i.e. 3, 22, 47, 93, 128, 431, etc.) or a threshold percentage (i.e. 49%, 53%, 68%, 72%, 95%, etc.). In some aspects, the type of features, the importance of features, and/or other elements or techniques relating to features can be utilized for determining similarity using features. In further aspects, some of the features can be omitted in determining similarity using features. In further aspects, similarity determination can focus on features in certain regions of interest from the compared pictures. In further aspects, detection or recognition of persons or objects using features in the compared pictures can be utilized for determining similarity. Where a reference to a feature is used herein it should be understood that a portion of a feature or a collection of features can be used instead of or in addition to the feature. In further embodiments, determining at least a partial match between individually compared digital pictures may include determining that the number or percentage of matching or substantially matching pixels of the compared pictures exceeds a threshold number (i.e. 449, 2219, 92229, 442990, 1000028, etc.) or a threshold percentage (i.e. 39%, 45%, 58%, 72%, 92%, etc.). In some aspects, some of the pixels can be omitted in determining similarity using pixels. In further aspects, similarity determination can focus on pixels in certain regions of interest from the compared pictures. Where a reference to a pixel is used herein it should be understood that a collection of pixels can be used instead of or in addition to the pixel. In further embodiments, determining at least a partial match between individually compared digital pictures may include determining substantial similarity between at least a portion of one digital picture and at least a portion of another digital picture. In some aspects, substantial similarity of individually compared digital pictures can be achieved when a similarity between at least a portion of one digital picture and at least a portion of another digital picture exceeds a similarity threshold. In other aspects, substantial similarity of individually compared digital pictures can be achieved when the number or percentage of matching or substantially matching regions of the compared pictures exceeds a threshold number (i.e. 3, 22, 47, 93, 128, 431, etc.) or a threshold percentage (i.e. 49%, 53%, 68%, 72%, 95%, etc.). In further aspects, substantial similarity of individually compared digital pictures can be achieved when the number or percentage of matching or substantially matching features of the compared pictures exceeds a threshold number (i.e. 1, 2, 5, 11, 39, etc.) or threshold percentage (i.e. 38%, 63%, 77%, 84%, 98%, etc.). In further aspects, substantial similarity of individually compared digital pictures can be achieved when the number or percentage of matching or substantially matching pixels of the compared pictures exceeds a threshold number (i.e. 449, 2219, 92229, 442990, 1000028, etc.) or a threshold percentage (i.e. 39%, 45%, 58%, 72%, 92%, etc.). In some designs, substantial similarity of individually compared digital pictures can be achieved taking into account objects or persons detected within the compared digital pictures. For example, substantial similarity can be achieved if same or similar objects or persons are detected in the compared pictures. In some embodiments, determining at least a partial match between collectively compared digital pictures (i.e. streams of digital pictures [i.e. motion pictures, videos, etc.], etc.) may include determining that the number or percentage of matching or substantially matching digital pictures of the compared streams of digital pictures exceeds a threshold number (i.e. 28, 74, 283, 322, 995, 874, etc.) or a threshold percentage (i.e. 29%, 33%, 58%, 72%, 99%, etc.). In some aspects, Dynamic Time Warping (DTW) and/or other techniques for aligning temporal sequences (i.e. streams of digital pictures, etc.) that may vary in time or speed can be utilized in determining similarity of collectively compared digital pictures or streams digital pictures. In other aspects, the order of digital pictures, the importance of digital pictures, and/or other elements or techniques relating to digital pictures can be utilized for determining similarity of collectively compared digital pictures or streams digital pictures. In further aspects, some of the digital pictures can be omitted in determining similarity of collectively compared digital pictures or streams digital pictures. In some designs, a threshold for a number or percentage similarity can be used to determine a match or substantial match between any of the aforementioned elements. Any combination of the aforementioned and/or other elements or techniques can be utilized in alternate embodiments. Determining may be omitted where anticipating of an object's operation in visual surroundings is not implemented. Determining comprises any action or operation by or for a Decision-making Unit 540, Similarity Comparison 125, and/or other disclosed elements.

At step 6140, the one or more instruction sets for operating the object of the application correlated with the first digital picture are executed. The executing may be performed in response to the aforementioned determining. The executing may be caused by VSAOO Unit 100, Artificial Intelligence Unit 110, and/or other disclosed elements. An instruction set may be executed by a processor (i.e. Processor 11, etc.), application program (i.e. Application Program 18, etc.), and/or other processing element. Executing may include executing one or more alternate instruction sets instead of or prior to an instruction set that would have been executed in a regular course of execution. In some aspects, alternate instruction sets comprise one or more instruction sets for operating an object correlated with one or more digital pictures. In some embodiments, executing may include modifying a register or other element of a processor with one or more alternate instruction sets. Executing may also include redirecting a processor to one or more alternate instruction sets. In further embodiments, a processor may include an application including instruction sets for operating an object, the application running on the processor. In some aspects, executing includes executing one or more alternate instruction sets as part of the application. In other aspects, executing includes modifying the application. In further aspects, executing includes redirecting the application to one or more alternate instruction sets. In further aspects, executing includes modifying one or more instruction sets of the application. In further aspects, executing includes modifying the application's source code, bytecode, intermediate code, compiled code, interpreted code, translated code, runtime code, assembly code, machine code, or other code. In further aspects, executing includes modifying memory, processor register, storage, repository or other element where the application's instruction sets are stored or used. In further aspects, executing includes modifying instruction sets used for operating an object of the application. In further aspects, executing includes modifying an element of a processor, an element of an object, a virtual machine, a runtime engine, an operating system, an execution stack, a program counter, or a user input used in running the application. In further aspects, executing includes modifying the application at source code write time, compile time, interpretation time, translation time, linking time, loading time, runtime, or other time. In further aspects, executing includes modifying one or more of the application's lines of code, statements, instructions, functions, routines, subroutines, basic blocks, or other code segments. In further aspects, executing includes a manual, automatic, dynamic, just in time (JIT), or other instrumentation of the application. In further aspects, executing includes utilizing one or more of a .NET tool, .NET application programming interface (API), Java tool, Java API, operating system tool, independent tool or other tool for modifying the application. In further aspects, executing includes utilizing a dynamic, interpreted, scripting or other programming language. In further aspects, executing includes utilizing dynamic code, dynamic class loading, or reflection. In further aspects, executing includes utilizing assembly language. In further aspects, executing includes utilizing metaprogramming, self-modifying code, or an application modification tool. In further aspects, executing includes utilizing just in time (JIT) compiling, JIT interpretation, JIT translation, dynamic recompiling, or binary rewriting. In further aspects, executing includes utilizing dynamic expression creation, dynamic expression execution, dynamic function creation, or dynamic function execution. In further aspects, executing includes adding or inserting additional code into the application's code. In further aspects, executing includes modifying, removing, rewriting, or overwriting the application's code. In further aspects, executing includes branching, redirecting, extending, or hot swapping the application's code. Branching or redirecting an application's code may include inserting a branch, jump, or other means for redirecting the application's execution. Executing comprises any action or operation by or for a Processor 11, Application Program 18, Modification Interface 130, and/or other disclosed elements.

At step 6145, one or more operations defined by the one or more instruction sets for operating the object of the application correlated with the first digital picture are performed by the object of the application. The one or more operations may be performed in response to the aforementioned executing. In some aspects, an operation includes any operation that can be performed by, with, or on the object of the application. For example, an operation includes moving, maneuvering, jumping, running, shooting, selecting, and/or other operations. In other aspects, an operation includes any operation that can be performed by, with, or on the application. One of ordinary skill in art will recognize that, while all possible variations of operations by/with/on an object or application are too voluminous to list and limited only by the object's or application's design and/or user's utilization, other operations are within the scope of this disclosure in various implementations.

Figure 29:
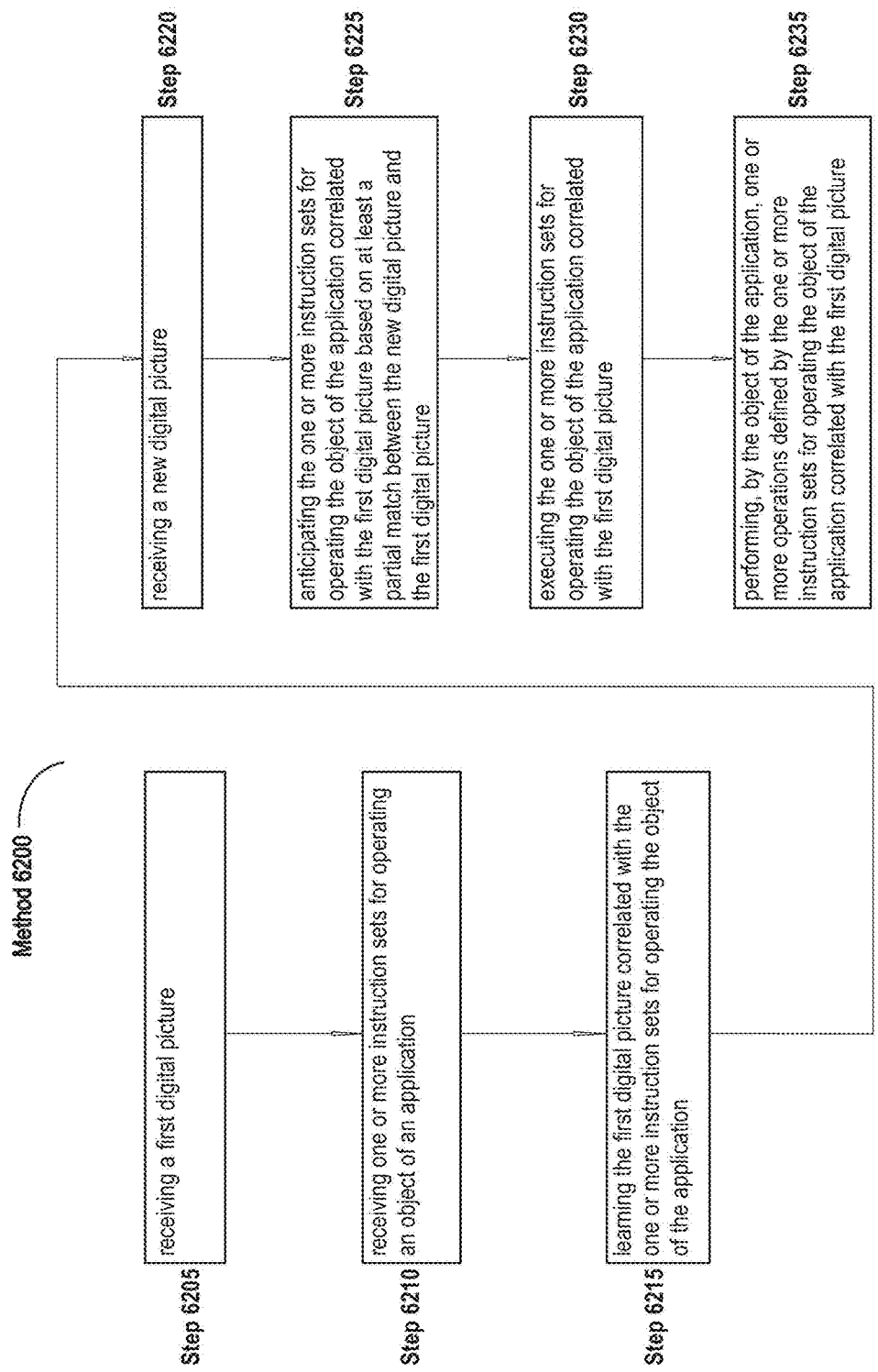
FIG. 29 illustrates a flow chart diagram of an embodiment of method 6200 for learning and/or using visual surrounding for autonomous object operation.

Referring to FIG. 29, the illustration shows an embodiment of a method 6200 for learning and/or using visual surrounding for autonomous object operation. The method can be used on a computing device or system to enable learning of an object's operation in various visual surroundings and enable autonomous object operation in similar visual surroundings. Method 6200 may include any action or operation of any of the disclosed methods such as method 6100, 6300, 6400, 6500, 6600, and/or others. Additional steps, actions, or operations can be included as needed, or some of the disclosed ones can be optionally omitted, or a different combination or order thereof can be implemented in alternate embodiments of method 6200.

At step 6205, a first digital picture is received. Step 6205 may include any action or operation described in Step 6105 of method 6100 as applicable.

At step 6210, one or more instruction sets for operating an object of an application are received. Step 6210 may include any action or operation described in Step 6110 of method 6100 as applicable.

At step 6215, the first digital picture correlated with the one or more instruction sets for operating the object of the application are learned. Step 6215 may include any action or operation described in Step 6115 and/or Step 6120 of method 6100 as applicable.

At step 6220, a new digital picture is received. Step 6220 may include any action or operation described in Step 6125 of method 6100 as applicable.

At step 6225, the one or more instruction sets for operating the object of the application correlated with the first digital picture are anticipated based on at least a partial match between the new digital picture and the first digital picture. Step 6225 may include any action or operation described in Step 6130 and/or Step 6135 of method 6100 as applicable.

At step 6230, the one or more instruction sets for operating the object of the application correlated with the first digital picture are executed. Step 6230 may include any action or operation described in Step 6140 of method 6100 as applicable.

At step 6235, one or more operations defined by the one or more instruction sets for operating the object of the application correlated with the first digital picture are performed by the object of the application. Step 6235 may include any action or operation described in Step 6145 of method 6100 as applicable.

Figure 30:
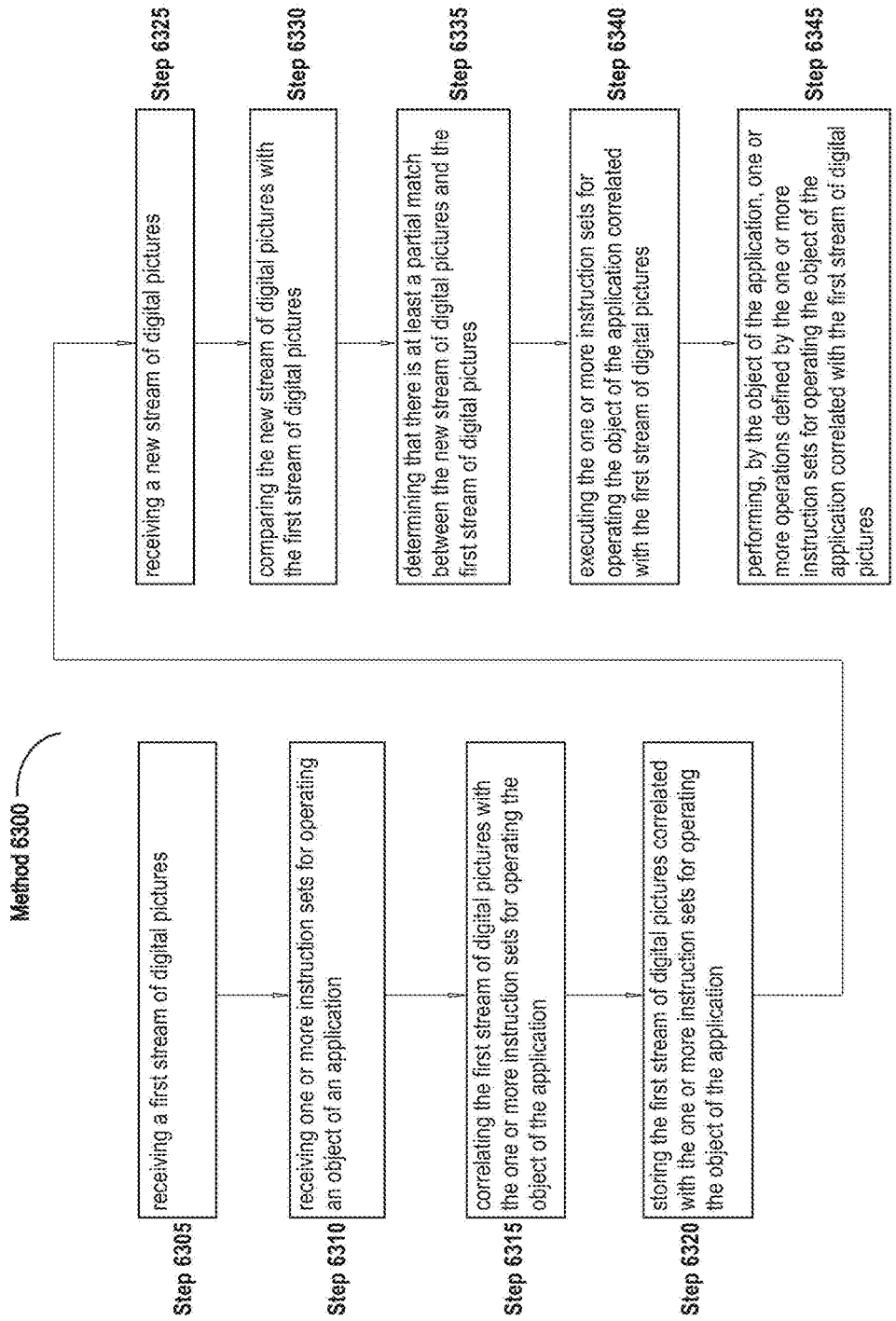
FIG. 30 illustrates a flow chart diagram of an embodiment of method 6300 for learning and/or using visual surrounding for autonomous object operation.

Referring to FIG. 30, the illustration shows an embodiment of a method 6300 for learning and/or using visual surrounding for autonomous object operation. The method can be used on a computing device or system to enable learning of an object's operation in various visual surroundings and enable autonomous object operation in similar visual surroundings. Method 6300 may include any action or operation of any of the disclosed methods such as method 6100, 6200, 6400, 6500, 6600, and/or others. Additional steps, actions, or operations can be included as needed, or some of the disclosed ones can be optionally omitted, or a different combination or order thereof can be implemented in alternate embodiments of method 6300.

At step 6305, a first stream of digital pictures is received. Step 6305 may include any action or operation described in Step 6105 of method 6100 as applicable.

At step 6310, one or more instruction sets for operating an object of an application are received. Step 6310 may include any action or operation described in Step 6110 of method 6100 as applicable.

At step 6315, the first stream of digital pictures is correlated with the one or more instruction sets for operating the object of the application. Step 6315 may include any action or operation described in Step 6115 of method 6100 as applicable.

At step 6320, the first stream of digital pictures correlated with the one or more instruction sets for operating the object of the application are stored. Step 6320 may include any action or operation described in Step 6120 of method 6100 as applicable.

At step 6325, a new stream of digital pictures is received. Step 6325 may include any action or operation described in Step 6125 of method 6100 as applicable.

At step 6330, the new stream of digital pictures is compared with the first stream of digital pictures. Step 6330 may include any action or operation described in Step 6130 of method 6100 as applicable.

At step 6335, a determination is made that there is at least a partial match between the new stream of digital pictures and the first stream of digital pictures. Step 6335 may include any action or operation described in Step 6135 of method 6100 as applicable.

At step 6340, the one or more instruction sets for operating the object of the application correlated with the first stream of digital pictures are executed. Step 6340 may include any action or operation described in Step 6140 of method 6100 as applicable.

At step 6345, one or more operations defined by the one or more instruction sets for operating the object of the application correlated with the first stream of digital pictures are performed by the object of the application. Step 6345 may include any action or operation described in Step 6145 of method 6100 as applicable.

Figure 31:
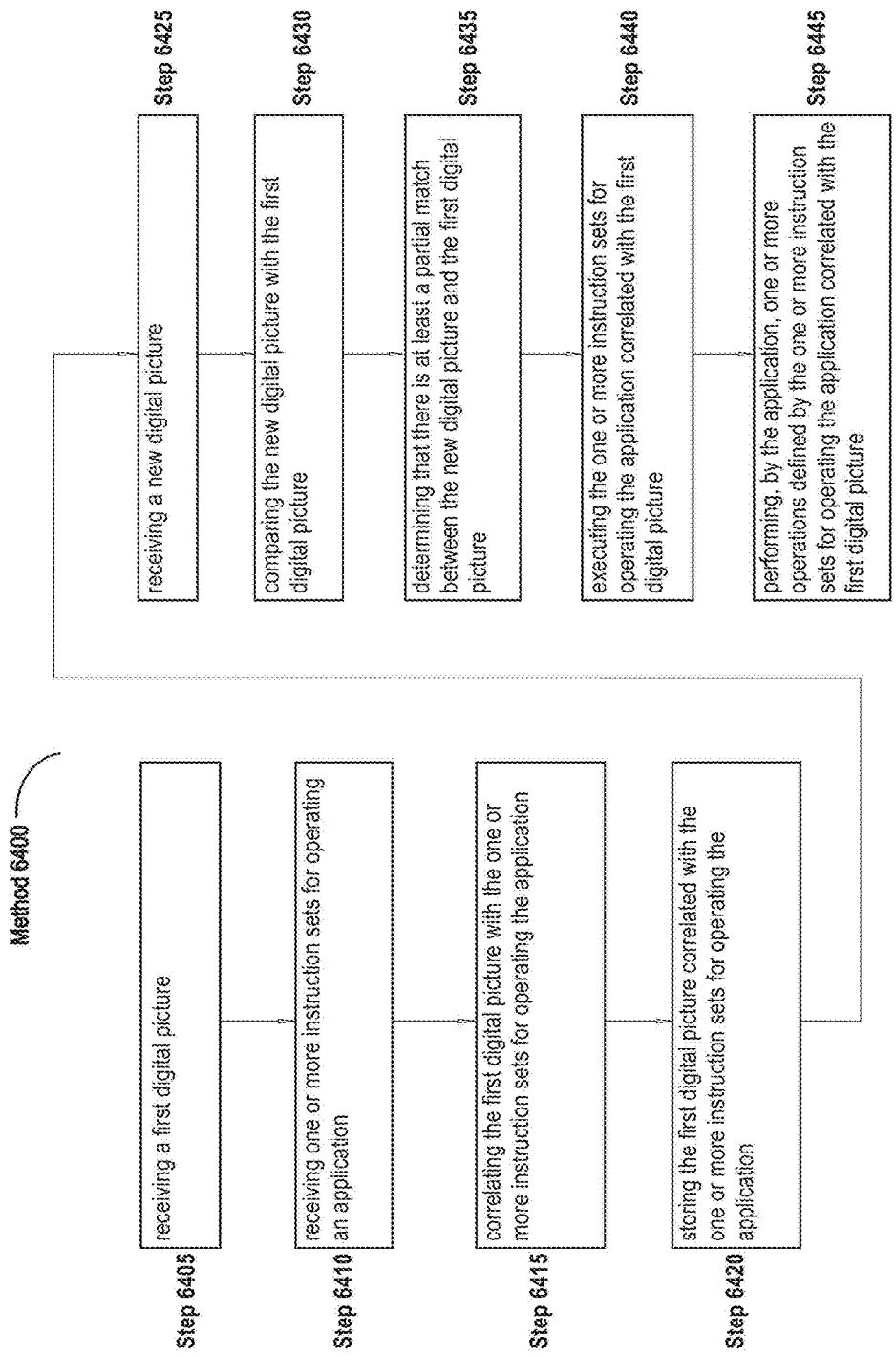
FIG. 31 illustrates a flow chart diagram of an embodiment of method 6400 for learning and/or using views of an application for autonomous application operation.

Referring to FIG. 31, the illustration shows an embodiment of a method 6400 for learning and/or using views of an application for autonomous application operation. The method can be used on a computing device or system to enable learning of an application's operation related to various views of the application and enable autonomous application operation related to similar views. Method 6400 may include any action or operation of any of the disclosed methods such as method 6100, 6200, 6300, 6500, 6600, and/or others. Additional steps, actions, or operations can be included as needed, or some of the disclosed ones can be optionally omitted, or a different combination or order thereof can be implemented in alternate embodiments of method 6400.

At step 6405, a first digital picture is received. Step 6405 may include any action or operation described in Step 6105 of method 6100 as applicable.

At step 6410, one or more instruction sets for operating an application are received. Step 6410 may include any action or operation described in Step 6110 of method 6100 as applicable.

At step 6415, the first digital picture is correlated with the one or more instruction sets for operating the application. Step 6415 may include any action or operation described in Step 6115 of method 6100 as applicable.

At step 6420, the first digital picture correlated with the one or more instruction sets for operating the application are stored. Step 6420 may include any action or operation described in Step 6120 of method 6100 as applicable.

At step 6425, a new digital picture is received. Step 6425 may include any action or operation described in Step 6125 of method 6100 as applicable.

At step 6430, the new digital picture is compared with the first digital picture. Step 6430 may include any action or operation described in Step 6130 of method 6100 as applicable.

At step 6435, a determination is made that there is at least a partial match between the new digital picture and the first digital picture. Step 6435 may include any action or operation described in Step 6135 of method 6100 as applicable.

At step 6440, the one or more instruction sets for operating the application correlated with the first digital picture are executed. Step 6440 may include any action or operation described in Step 6140 of method 6100 as applicable.

At step 6445, one or more operations defined by the one or more instruction sets for operating the application correlated with the first digital picture are performed by the application. Step 6445 may include any action or operation described in Step 6145 of method 6100 as applicable.

Figure 32:
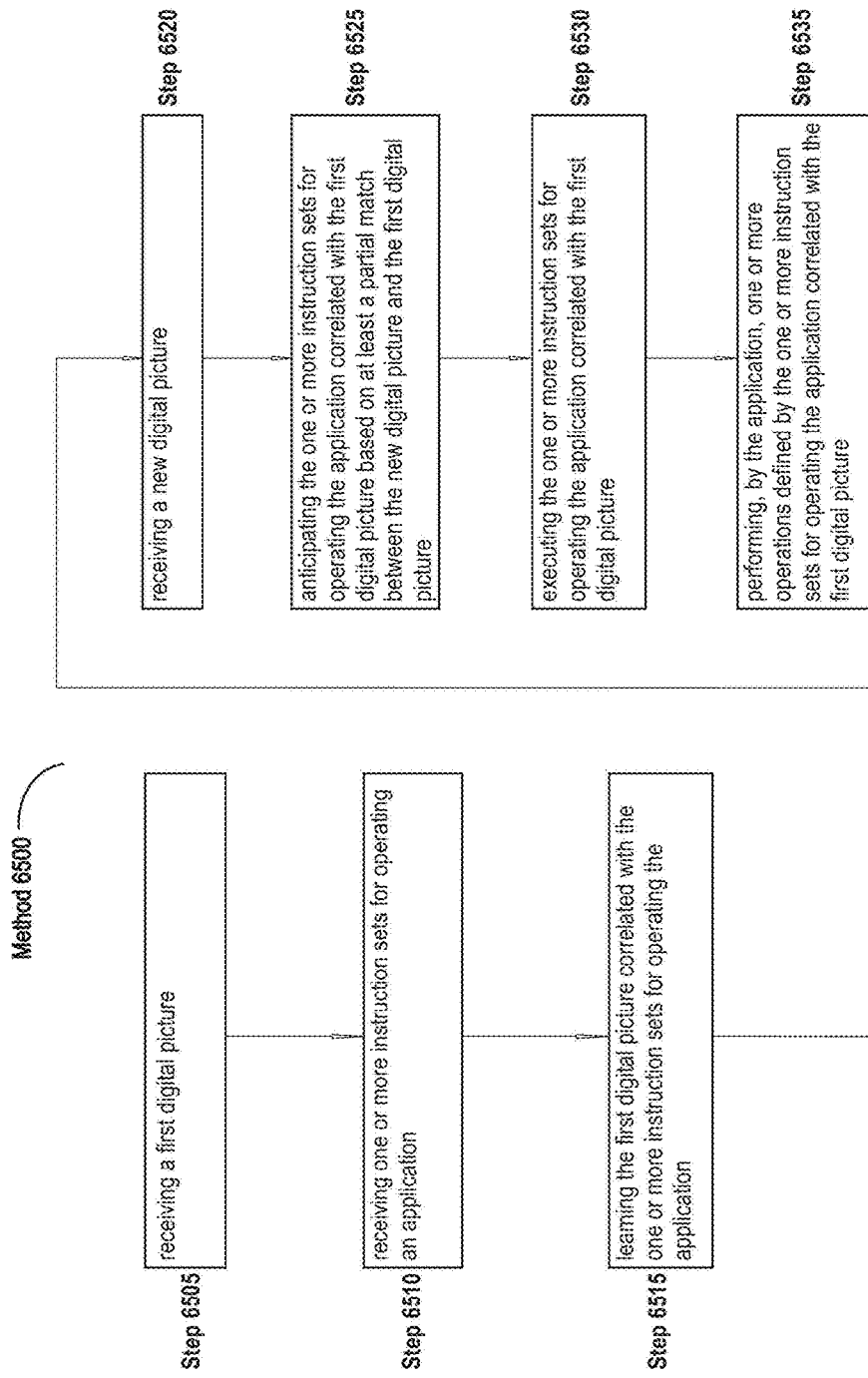
FIG. 32 illustrates a flow chart diagram of an embodiment of method 6500 for learning and/or using views of an application for autonomous application operation.

Referring to FIG. 32, the illustration shows an embodiment of a method 6500 for learning and/or using views of an application for autonomous application operation. The method can be used on a computing device or system to enable learning of an application's operation related to various views of the application and enable autonomous application operation related to similar views. Method 6500 may include any action or operation of any of the disclosed methods such as method 6100, 6200, 6300, 6400, 6600, and/or others. Additional steps, actions, or operations can be included as needed, or some of the disclosed ones can be optionally omitted, or a different combination or order thereof can be implemented in alternate embodiments of method 6500.

At step 6505, a first digital picture is received. Step 6505 may include any action or operation described in Step 6105 of method 6100 as applicable.

At step 6510, one or more instruction sets for operating an application are received. Step 6510 may include any action or operation described in Step 6110 of method 6100 as applicable.

At step 6515, the first digital picture correlated with the one or more instruction sets for operating the application are learned. Step 6515 may include any action or operation described in Step 6115 and/or Step 6120 of method 6100 as applicable.

At step 6520, a new digital picture is received. Step 6520 may include any action or operation described in Step 6125 of method 6100 as applicable.

At step 6525, the one or more instruction sets for operating the application correlated with the first digital picture are anticipated based on at least a partial match between the new digital picture and the first digital picture. Step 6525 may include any action or operation described in Step 6130 and/or Step 6135 of method 6100 as applicable.

At step 6530, the one or more instruction sets for operating the application correlated with the first digital picture are executed. Step 6530 may include any action or operation described in Step 6140 of method 6100 as applicable.

At step 6535, one or more operations defined by the one or more instruction sets for operating the application correlated with the first digital picture are performed by the application. Step 6535 may include any action or operation described in Step 6145 of method 6100 as applicable.

Figure 33:
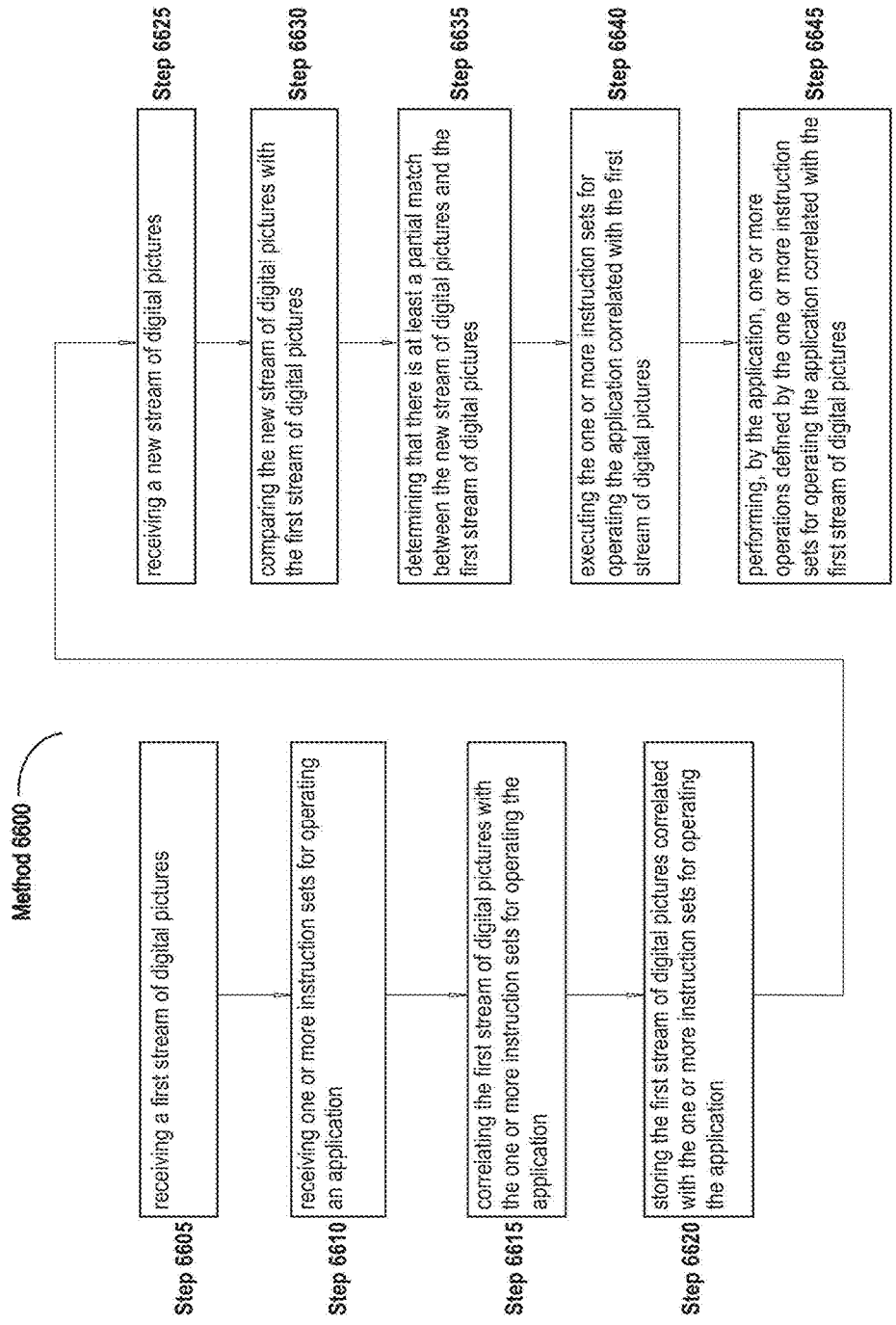
FIG. 33 illustrates a flow chart diagram of an embodiment of method 6600 for learning and/or using views of an application for autonomous application operation.

Referring to FIG. 33, the illustration shows an embodiment of a method 6600 for learning and/or using views of an application for autonomous application operation. The method can be used on a computing device or system to enable learning of an application's operation related to various views of the application and enable autonomous application operation related to similar views. Method 6600 may include any action or operation of any of the disclosed methods such as method 6100, 6200, 6300, 6400, 6500, and/or others. Additional steps, actions, or operations can be included as needed, or some of the disclosed ones can be optionally omitted, or a different combination or order thereof can be implemented in alternate embodiments of method 6600.

At step 6605, a first stream of digital pictures is received. Step 6605 may include any action or operation described in Step 6105 of method 6100 as applicable.

At step 6610, one or more instruction sets for operating an application are received. Step 6610 may include any action or operation described in Step 6110 of method 6100 as applicable.

At step 6615, the first stream of digital pictures is correlated with the one or more instruction sets for operating the application. Step 6615 may include any action or operation described in Step 6115 of method 6100 as applicable.

At step 6620, the first stream of digital pictures correlated with the one or more instruction sets for operating the application are stored. Step 6620 may include any action or operation described in Step 6120 of method 6100 as applicable.

At step 6625, a new stream of digital pictures is received. Step 6625 may include any action or operation described in Step 6125 of method 6100 as applicable.

At step 6630, the new stream of digital pictures is compared with the first stream of digital pictures. Step 6630 may include any action or operation described in Step 6130 of method 6100 as applicable.

At step 6635, a determination is made that there is at least a partial match between the new stream of digital pictures and the first stream of digital pictures. Step 6635 may include any action or operation described in Step 6135 of method 6100 as applicable.

At step 6640, the one or more instruction sets for operating the application correlated with the first stream of digital pictures are executed. Step 6640 may include any action or operation described in Step 6140 of method 6100 as applicable.

At step 6645, one or more operations defined by the one or more instruction sets for operating the application correlated with the first stream of digital pictures are performed by the application. Step 6645 may include any action or operation described in Step 6145 of method 6100 as applicable.

Concerning methods 6400, 6500, and 6600, any features, functionalities, and embodiments of the systems and methods described above with respect to learning Object's 180 operations in various visual surroundings and/or enabling Object's 180 autonomous operation similarly apply to learning Application Program's 18 operations related to various views of Application Program 18 and/or enabling Application Program's 18 autonomous operation. Therefore, in addition to the previously described features, functionalities, and embodiments of the system elements, the system elements include the following features, functionalities, and embodiments. In some aspects, VSAOO Unit 100 comprises the functionality for learning the operation of Application Program 18 related to various views of Application Program 18. VSAOO Unit 100 comprises the functionality for structuring and/or storing this knowledge in a knowledgebase (i.e. neural network, graph, sequences, other repository, etc.). VSAOO Unit 100 further comprises the functionality for enabling autonomous operation of Application Program 18 related to various views of Application Program 18. VSAOO Unit 100 comprises the functionality for learning and/or implementing User's 50 knowledge, methodology, or style of operating Application Program 18 related to various views of Application Program 18. In other aspects, Artificial Intelligence Unit 110 comprises the functionality for learning Application Program's 18 operation related to various views such as learning one or more Digital Pictures 525 of Application Program's 18 views correlated with any Instruction Sets 526 and/or Extra Info 527. Artificial Intelligence Unit 110 further comprises the functionality for anticipating Application Program's 18 operation related to various views such as anticipating one or more Instruction Sets 526 based on one or more incoming Digital Pictures 525 of Application Program's 18 views. In further aspects, Knowledge Structuring Unit 520 comprises the functionality for structuring the knowledge of Application Program's 18 operation related to various views of Application Program 18 such as correlating one or more Digital Pictures 525 of Application Program's 18 views with any Instruction Sets 526 and/or Extra Info 527. Knowledge Structuring Unit 520 further comprises the functionality for creating or generating Knowledge Cell 800 and storing one or more Digital Pictures 525 correlated with any Instruction Sets 526 and/or Extra Info 527 into the Knowledge Cell 800. Knowledge Cell 800 includes a unit of knowledge of how Application Program 18 operated related to a view of Application Program 18. In further aspects, Knowledgebase 530 comprises the functionality for storing the knowledge of Application Program's 18 operation related to various views such as storing one or more Digital Pictures 525 of Application Program's 18 views correlated with any Instruction Sets 526 and/or Extra Info 527. In further aspects, Decision-making Unit 540 comprises the functionality for anticipating or determining Application Program's 18 operation related to various views such as anticipating or determining Instruction Sets 526 (i.e. anticipatory Instruction Sets 526, etc.) to be used or executed in Application Program's 18 autonomous operation based on incoming Digital Pictures 525 of Application Program's 18 views.

Figure 34:
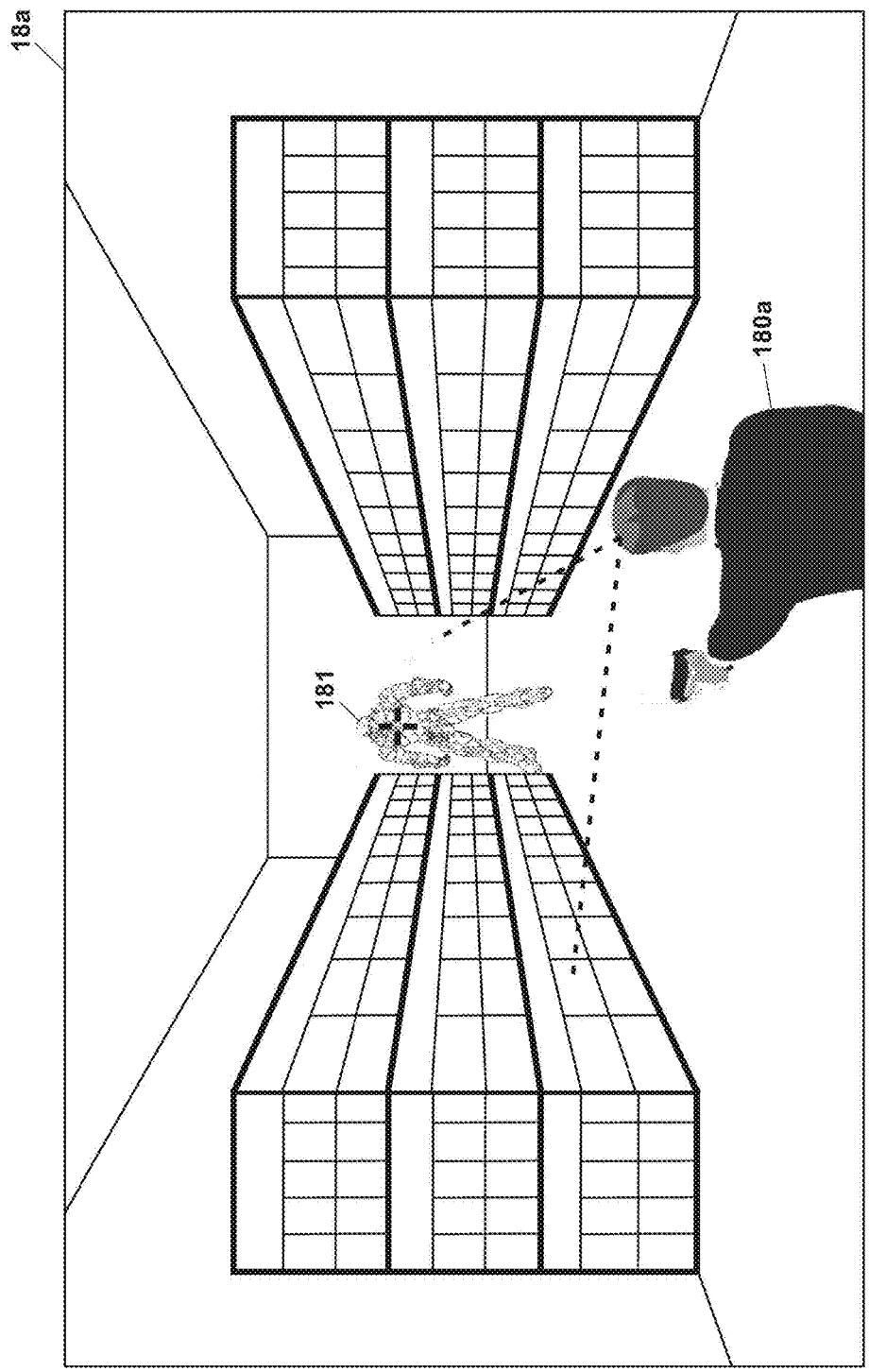

Referring to FIG. 34, in some exemplary embodiments, Application Program 18 may be or include a 3D Computer Game 18*a*. Object 180 may be or include Avatar 180*a* within 3D Computer Game 18*a*. Examples of Avatar 180*a* include a character, a creature, and/or other representation of User 50. Examples of 3D Computer Game 18*a* include a first shooter game, a flight simulation, a driving simulation, and/or others. Computing Device 70 may include Renderer 91 that renders or processes one or more Digital Pictures 525 of Avatar's 180*a* visual surrounding in 3D Computer Game 18*a*. In some aspects, Renderer 91 may render or generate Digital Pictures 525 of Avatar's 180*a* visual surrounding as seen through Avatar's 180*a* eyes (i.e. first person view, etc.) as indicated by the dotted sight lines. In other aspects, Renderer 91 may render or generate Digital Pictures 525 of Avatar's 180*a* visual surrounding as seen from a standpoint of Avatar's 180*a* observer (i.e. third person view, etc.). Avatar 180*a* may be controlled by Processor 11, 3D Computer Game 18*a*, and/or other processing element that receives User's 50 (i.e. game player's, etc.) operating directions and causes desired operations with Avatar 180*a* such as moving, maneuvering, shooting, jumping, and/or other operations. User 50 can interact with Processor 11, 3D Computer Game 18*a*, and/or other processing element through inputting operating directions (i.e. manipulating game controller elements, pressing keyboard buttons, tilting a joystick, etc.) via Human-machine Interface 23 such as a game controller, keyboard, joystick, or other input device. For instance, responsive to User's 50 manipulating one or more game controller elements, Processor 11 or 3D Computer Game 18*a* may cause Avatar 180*a* to move, maneuver, shoot, jump, and/or perform other operations. Computing Device 70 may include or be coupled to VSAOO Unit 100. VSAOO Unit 100 may be embedded (i.e. integrated, etc.) into or coupled to Computing Device's 70 Processor 11 and/or other processing element. VSAOO Unit 100 may also be a program embedded (i.e. integrated, etc.) into or interfaced with 3D Computer Game 18*a* running on Processor 11 and/or other processing element. VSAOO Unit 100 can obtain Instruction Sets 526 used or executed by Processor 11, 3D Computer Game 18*a*, and/or other processing element. The obtained Instruction Sets 526 may be used or executed to operate Avatar 180*a*. In some aspects, Instruction Sets 526 may include one or more instruction sets from Computing Device's 70 Processor's 11 registers or other components. In other aspects, Instruction Sets 526 may include one or more instruction sets used or executed in 3D Computer Game 18*a* running on Processor 11 and/or other processing element. VSAOO Unit 100 may also optionally obtain any Extra Info 527 (i.e. time, location, computed, observed, acoustic, and/or other information, etc.) related to Avatar's 180*a* operation. As User 50 operates Avatar 180*a* in various visual surroundings as shown, VSAOO Unit 100 may learn Avatar's 180*a* operations in visual surroundings by correlating Digital Pictures 525 of Avatar's 180*a* visual surrounding with one or more Instruction Sets 526 used or executed by Processor 11, 3D Computer Game 18*a*, and/or other processing element. Any Extra Info 527 related to Avatar's 180*a* operation may also optionally be correlated with Digital Pictures 525 of Avatar's 180*a* visual surrounding. VSAOO Unit 100 may store this knowledge into Knowledgebase 530 (i.e. Neural Network 530*a*, Graph 530*b*, Collection of Sequences 530*c*, Sequence 533, Collection of Knowledge Cells 530*d*, etc.). In the future, VSAOO Unit 110 may compare incoming Digital Pictures 525 of Avatar's 180*a* visual surrounding with previously learned Digital Pictures 525 including optionally using any Extra Info 527 for enhanced decision making. If substantially similar or at least a partial match is found or determined, the Instruction Sets 526 correlated with the previously learned Digital Pictures 525 can be autonomously executed by Processor 11, 3D Computer Game 18*a*, and/or other processing element, thereby enabling autonomous operation of Avatar 180*a* in a similar visual surrounding as in a previously learned one. For instance, VSAOO Unit 100 may learn User 50-directed shooting at Opponent 181 by Avatar 180*a* in a visual surrounding that includes Opponent 181. In the future, when visual surrounding that includes same or similar Opponent 181 is encountered, or when same or similar Opponent 181 is detected, VSAOO Unit 100 may implement the shooting at Opponent 181 by Avatar 180*a* autonomously. One of ordinary skill in art will understand that the aforementioned functionalities described with respect to 3D Computer Game 18*a* can be implemented in any 3D Application Program 18 such as a 3D virtual world, computer aided design (CAD) application, and/or others.

In some embodiments, one or more Renderers 91 may render or generate Digital Pictures 525 of a plurality of views of Avatar's 180*a* visual surrounding. In one example, one or more Renderers 91 may render or generate Digital Pictures 525 of different angles of Avatar's 180*a* front. In another example, one or more Renderers 91 may render or generate Digital Pictures 525 of the front, sides, and/or back of Avatar 180*a*. In a further example, one or more Renderers 91 may render or generate Digital Pictures 525 of views from different sub-elements of Avatar 180*a* such as from Avatar's 180*a* head, arms, and legs, thereby enabling learning the operations of the sub-elements in visual surroundings as seen from the perspective of the sub-elements. In some designs where multiple views of Avatar's 180*a* surrounding are utilized, as User 50 operates Avatar 180*a* in various visual surroundings, VSAOO Unit 100 may learn Avatar's 180*a* operation in visual surroundings by correlating collective Digital Pictures 525 of various views of Avatar's 180*a* visual surrounding from Renderer 91 with one or more Instruction Sets 526 used or executed by Processor 11, 3D Computer Game 18*a*, and/or other processing element. In other designs where multiple views of Avatar's 180*a* surrounding are utilized, multiple VSAOO Units 100 may also be utilized (i.e. one VSAOO Unit 100 for each view, etc.). In such designs, as User 50 operates Avatar 180*a* in various visual surroundings, VSAOO Unit 100 may learn Avatar's 180*a* operation in visual surroundings by correlating Digital Pictures 525 of a view of Avatar's 180*a* visual surrounding from Renderer 91 assigned to the VSAOO Unit 100 with one or more Instruction Sets 526 used or executed by Processor 11, 3D Computer Game 18*a*, and/or other processing element. Each sub-element of Avatar 180*a* can, therefore, perform its own learning and/or decision making in autonomous operation.

In some embodiments, Avatar 180*a* can be controlled by a combination of VSAOO Unit 100 and User 50 and/or other systems. In some aspects, Avatar 180*a* controlled by VSAOO Unit 100 may encounter a visual surrounding that has not been encountered or learned before. In such situations, User 50 and/or non-VSAOO system may take control of Avatar's 180*a* operation. VSAOO Unit 100 may take control again when Avatar 180*a* encounters a previously learned visual surrounding. Naturally, VSAOO Unit 100 can learn Avatar's 180*a* operation in visual surroundings while User 50 and/or non-VSAOO system is in control of Avatar 180*a*, thereby reducing or eliminating the need for future involvement of User 50 and/or non-VSAOO system. In some implementations, one User 50 can control or assist in controlling multiple VSAOO enabled Avatars 180*a*. In one example, User 50 can control or assist in controlling an Avatar 180*a* that may encounter a visual surrounding that has not been encountered or learned before while the Avatars 180*a* operating in previously learned visual surroundings can operate autonomously under the control of VSAOO Unit 100. In another example, User 50 can control multiple Avatars 180*a* by switching among Avatars 180*a* at will, where User 50 may control an active Avatar 180*a* while other Avatars 180*a* may operate autonomously under the control of VSAOO Unit 100. In other aspects, Avatar 180*a* may be primarily controlled by User 50 and/or non-VSAOO system. User 50 and/or non-VSAOO system can release control to VSAOO Unit 100 for any reason (i.e. User 50 gets tired or distracted, non-VSAOO system gets stuck or cannot make a decision, etc.), at which point Avatar 180*a* can be controlled by VSAOO Unit 100. In further aspects, VSAOO Unit 100 may take control in certain special visual surroundings where VSAOO Unit 100 may offer superior performance even if User 50 and/or non-VSAOO system may generally be preferred. Once Avatar 180*a* leaves such special visual surrounding, VSAOO Unit 100 may release control to User 50 and/or non-VSAOO system. In general, VSAOO Unit 100 can take control from, share control with, or release control to User 50, non-VSAOO system, and/or other system or process at any time, under any circumstances, and remain in control for any period of time as needed.

In some embodiments, VSAOO Unit 100 may control one or more sub-elements of Avatar 180*a* while User 50 and/or non-VSAOO system may control other one or more sub-elements of Avatar 180*a*. For example, VSAOO Unit 100 may control the legs for moving Avatar 180*a*, while User 50 and/or non-VSAOO system may control the arms for Avatar's 180*a* shooting. Any other combination of controlling various sub-elements or functions of Avatar 180*a* by VSAOO Unit 100, User 50, and/or non-VSAOO system can be implemented.

In some embodiments, VSAOO Unit 100 enables learning of a particular User's 50 (i.e. player's, etc.) knowledge, methodology, or style of operating Avatar 180*a*. In some aspects, learning of a particular User's 50 knowledge, methodology, or style of operating Avatar 180*a* includes learning the User's 50 directing or operating Avatar 180*a* in certain visual surroundings and/or circumstances. In one example, one User 50 may shoot opponent while another User 50 may strike the opponent with a sword. In another example, one User 50 may jump over an obstacle while another User 50 may move around the obstacle. In a further example, one User 50 may drive fast in a racing game while another User 50 may drive cautiously, and so on. The knowledge of User's 50 methodology or style of operating Avatar 180*a* can be used to enable personalized autonomous operation of Avatar 180*a* specific to a particular User 50. Therefore, VSAOO-enabled Avatar 180*a* may exemplify User's 50 knowledge, methodology, or style of operating Avatar 180*a* as learned from User 50. In some aspects, this functionality enables one or more VSAOO-enabled Avatars 180*a* to be utilized in 3D Computer Game 18*a* to assist User 50 in defeating an opponent or achieving another game goal. In one example, User 50 can utilize a team of VSAOO-enabled Avatars 180*a* each of which may exemplify User's 50 knowledge, methodology, or style of operating Avatar 180*a*. In one instance, VSAOO-enabled Avatars 180*a* may be dispersed around a User 50-controlled Avatar 180*a* within a specific radius and follow User 50-controlled Avatar's 180*a* movement. In another instance, VSAOO-enabled Avatars 180*a* may move autonomously toward a certain point or goal in 3D Computer Game 18*a*. In a further instance, VSAOO-enabled Avatars 180*a* can be completely autonomous and rely solely on the knowledge learned from User's 50 methodology or style of operating Avatar 180*a*.

In some embodiments, VSAOO Unit 100 enables a professional or other experienced game player to record his/her knowledge, methodology, or style of operating Avatar 180*a* into Knowledgebase 530 (i.e. Graph 530*b*, Collection of Sequences 530*c*, Sequence 533, Collection of Knowledge Cells 530*d*, etc.) and/or other repository. User 50 can then sell or make available his/her knowledge, methodology, or style of operating Avatar 180*a* to other users who may want to implement User's 50 knowledge, methodology, or style of operating Avatar 180*a*. Knowledgebase 530 and/or other repository comprising User's 50 knowledge, methodology, or style of operating Avatar 180*a* can be available to other users via a storage medium, via a network, or via other means.

One of ordinary skill in art will understand that the features, functionalities, and embodiments described with respect to Avatar 180*a* can similarly be implemented by/with/on any Object 180 of Application Program 18 or by/with/on Application Program 18.

Figure 35:
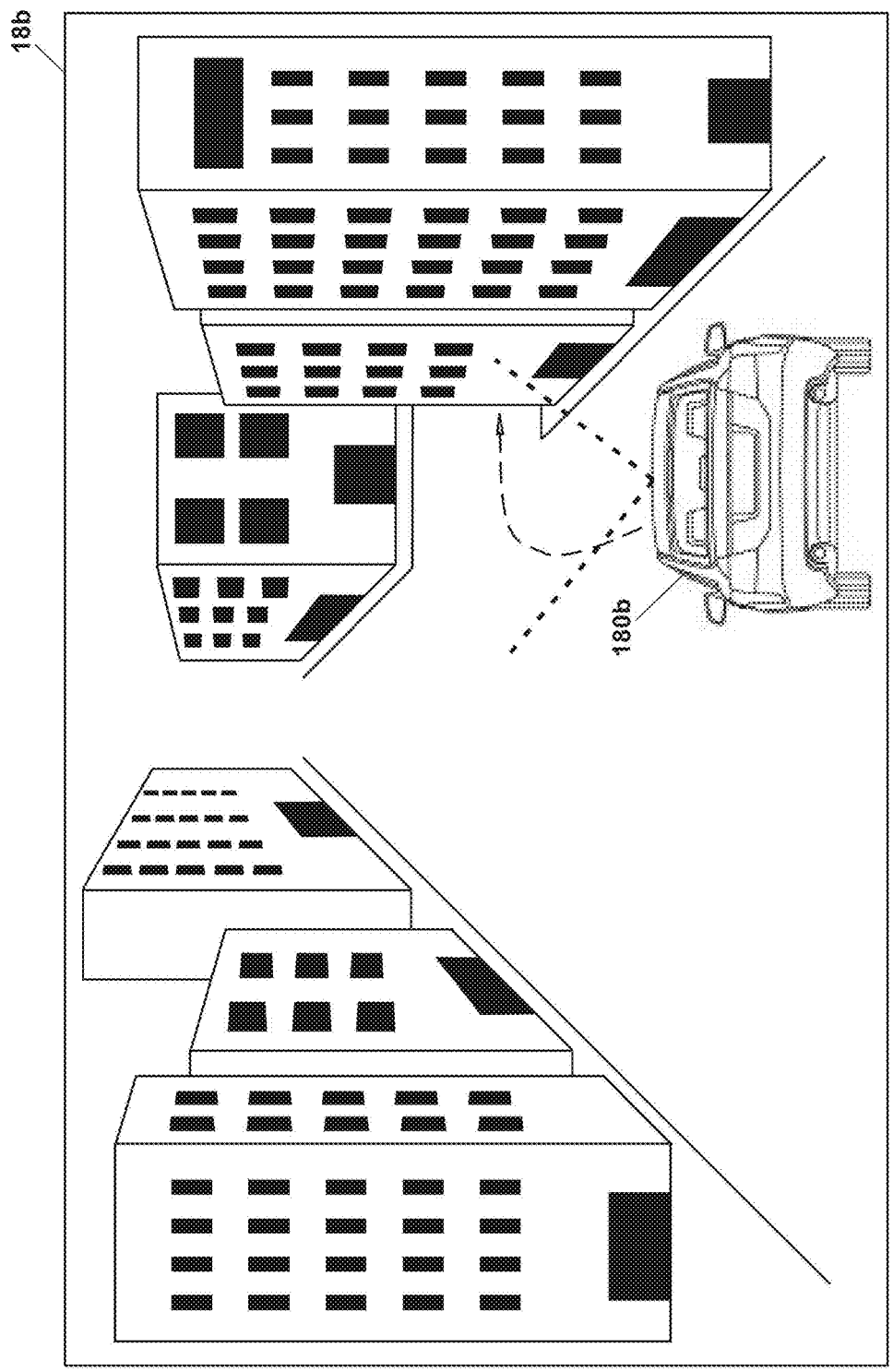
FIG. 35 illustrates an exemplary embodiment of User Controllable Object 180b within 3D Virtual World 18b.

Referring to FIG. 35, in some exemplary embodiments, Application Program 18 may be or include a 3D Virtual World 18*b*. Object 180 may be or include User Controllable Object 180*b* within 3D Virtual World 18*b*. Examples of User Controllable Object 180*b* include a ground, aquatic, or aerial vehicle, a creature, an avatar, and/or other object controllable by User 50. Examples of 3D Virtual World 18*b* include Second Life, IMVU, Twinity, and/or others. Computing Device 70 may include Renderer 91 that renders or processes one or more Digital Pictures 525 of User Controllable Object's 180*b* visual surrounding in 3D Virtual World 18*b*. In some aspects, Renderer 91 may render or generate Digital Pictures 525 of User Controllable Object's 180*b* visual surrounding as seen from a standpoint of User Controllable Object 180*b* (i.e. first person view, etc.) as indicated by the dotted sight lines. In other aspects, Renderer 91 may render or generate Digital Pictures 525 of User Controllable Object's 180*b* visual surrounding as seen from a standpoint of User Controllable Object's 180*b* observer (i.e. third person view, etc.). User Controllable Object 180*b* may be controlled by Processor 11, 3D Virtual World 18*b*, and/or other processing element that receives User's 50 (i.e. virtual world participant's, etc.) operating directions and causes desired operations with User Controllable Object 180*b* such as moving, maneuvering, turning, and/or other operations. User 50 can interact with Processor 11, 3D Virtual World 18*b*, and/or other processing element through inputting operating directions (i.e. manipulating controller elements, pressing keyboard buttons, tilting a joystick, etc.) via Human-machine Interface 23 such as a controller, keyboard, joystick, or other input device. For instance, responsive to User's 50 manipulating one or more controller elements, Processor 11 or 3D Virtual World 18*b* may cause User Controllable Object 180*b* to move, maneuver, turn, and/or perform other operations. Computing Device 70 may include or be coupled to VSAOO Unit 100. VSAOO Unit 100 may be embedded (i.e. integrated, etc.) into or coupled to Computing Device's 70 Processor 11 and/or other processing element. VSAOO Unit 100 may also be a program embedded (i.e. integrated, etc.) into or interfaced with 3D Virtual World 18*b* running on Processor 11 and/or other processing element. VSAOO Unit 100 can obtain Instruction Sets 526 used or executed by Processor 11, 3D Virtual World 18*b*, and/or other processing element. The obtained Instruction Sets 526 may be used or executed to operate User Controllable Object 180*b*. In some aspects, Instruction Sets 526 may include one or more instruction sets from Computing Device's 70 Processor's 11 registers or other components. In other aspects, Instruction Sets 526 may include one or more instruction sets used or executed in 3D Virtual World 18*b* running on Processor 11 and/or other processing element. VSAOO Unit 100 may also optionally obtain any Extra Info 527 (i.e. time, location, computed, observed, acoustic, and/or other information, etc.) related to User Controllable Object's 180*b* operation. As User 50 operates User Controllable Object 180*b* in various visual surroundings as shown, VSAOO Unit 100 may learn User Controllable Object's 180*b* operation in visual surroundings by correlating Digital Pictures 525 of User Controllable Object's 180*b* visual surrounding with one or more Instruction Sets 526 used or executed by Processor 11, 3D Virtual World 18*b*, and/or other processing element. Any Extra Info 527 related to User Controllable Object's 180*b* operation may also optionally be correlated with Digital Pictures 525 of User Controllable Object's 180*b* visual surrounding. VSAOO Unit 100 may store this knowledge into Knowledgebase 530 (i.e. Neural Network 530*a*, Graph 530*b*, Collection of Sequences 530*c*, Sequence 533, Collection of Knowledge Cells 530*d*, etc.). In the future, VSAOO Unit 110 may compare incoming Digital Pictures 525 of User Controllable Object's 180*b* visual surrounding with previously learned Digital Pictures 525 including optionally using any Extra Info 527 for enhanced decision making. If substantially similar or at least a partial match is found or determined, the Instruction Sets 526 correlated with the previously learned Digital Pictures 525 can be autonomously executed by Processor 11, 3D Virtual World 18*b*, and/or other processing element, thereby enabling autonomous operation of User Controllable Object 180*b* in a similar visual surrounding as in a previously learned one. For instance, VSAOO Unit 100 may learn User 50-directed turn by User Controllable Object 180*b* (i.e. vehicle, etc.) in a visual surrounding that includes a street crossing on User Controllable Object's 180*b* path. In the future, when visual surrounding that includes the street crossing is encountered, or when the street crossing is detected, VSAOO Unit 100 may implement the turn by User Controllable Object 180*b* autonomously. One of ordinary skill in art will understand that the aforementioned functionalities described with respect to 3D Virtual World 18*b* can be implemented in any 3D Application Program 18 such as a 3D computer game, computer aided design (CAD) application, and/or others. One of ordinary skill in art will also understand that the features, functionalities, and embodiments described with respect to User Controllable Object 180*b* can similarly be implemented by/with/on any Object 180 of Application Program 18 or by/with/on Application Program 18.

Figure 36:
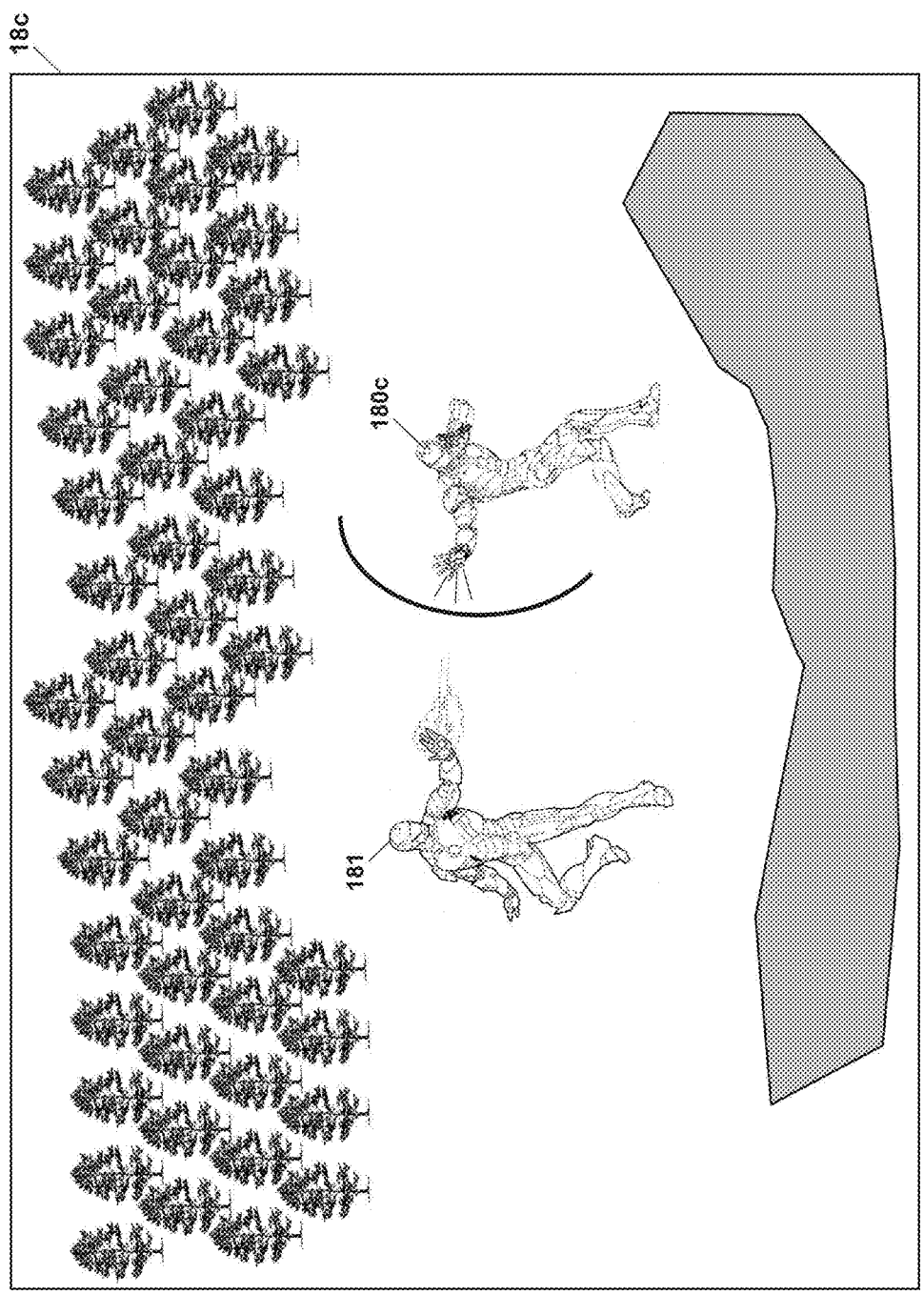
FIG. 36 illustrates an exemplary embodiment of Avatar 180c within 2D Computer Game 18c.

Referring to FIG. 36, in some exemplary embodiments, Application Program 18 may be or include a 2D Computer Game 18*c*. Object 180 may be or include Avatar 180*c* within 2D Computer Game 18*c*. Examples of Avatar 180*c* include a character, a creature, and/or other representation of User 50. Examples of 2D Computer Game 18*c* include a strategy game, a shooter game, a tile-matching game, a platform game, and/or others. Computing Device 70 may include Renderer 91 that renders or processes one or more Digital Pictures 525 of Avatar's 180*c* visual surrounding in 2D Computer Game 18*c*. In some aspects, Digital Pictures 525 of Avatar's 180*c* visual surrounding may include Avatar 180*c* itself as shown. Avatar 180*c* may be controlled by Processor 11, 2D Computer Game 18*c*, and/or other processing element that receives User's 50 (i.e. game player's, etc.) operating directions and causes desired operations with Avatar 180*c* such as moving, maneuvering, blocking, shooting, jumping, and/or other operations. User 50 can interact with Processor 11, 2D Computer Game 18*c*, and/or other processing element through inputting operating directions (i.e. manipulating game controller elements, pressing keyboard buttons, tilting a joystick, etc.) via Human-machine Interface 23 such as a game controller, keyboard, joystick, or other input device. For instance, responsive to User's 50 manipulating one or more game controller elements, Processor 11 or 2D Computer Game 18*c* may cause Avatar 180*c* to move, maneuver, block, shoot, jump, and/or perform other operations. Computing Device 70 may include or be coupled to VSAOO Unit 100. VSAOO Unit 100 may be embedded (i.e. integrated, etc.) into or coupled to Computing Device's 70 Processor 11 and/or other processing element. VSAOO Unit 100 may also be a program embedded (i.e. integrated, etc.) into or interfaced with 2D Computer Game 18*c* running on Processor 11 and/or other processing element. VSAOO Unit 100 can obtain Instruction Sets 526 used or executed by Processor 11, 2D Computer Game 18*c*, and/or other processing element. The obtained Instruction Sets 526 may be used or executed to operate Avatar 180*c*. In some aspects, Instruction Sets 526 may include one or more instruction sets from Computing Device's 70 Processor's 11 registers or other components. In other aspects, Instruction Sets 526 may include one or more instruction sets used or executed in 2D Computer Game 18*c* running on Processor 11 and/or other processing element. VSAOO Unit 100 may also optionally obtain any Extra Info 527 (i.e. time, location, computed, observed, acoustic, and/or other information, etc.) related to Avatar's 180*c* operation. As User 50 operates Avatar 180*c* in various visual surroundings as shown, VSAOO Unit 100 may learn Avatar's 180*c* operation in visual surroundings by correlating Digital Pictures 525 of Avatar's 180*c* visual surrounding with one or more Instruction Sets 526 used or executed by Processor 11, 2D Computer Game 18*c*, and/or other processing element. Any Extra Info 527 related to Avatar's 180*c* operation may also optionally be correlated with Digital Pictures 525 of Avatar's 180*c* visual surrounding. VSAOO Unit 100 may store this knowledge into Knowledgebase 530 (i.e. Neural Network 530*a*, Graph 530*b*, Collection of Sequences 530*c*, Sequence 533, Collection of Knowledge Cells 530*d*, etc.). In the future, VSAOO Unit 110 may compare incoming Digital Pictures 525 of Avatar's 180*c* visual surrounding with previously learned Digital Pictures 525 including optionally using any Extra Info 527 for enhanced decision making. If substantially similar or at least a partial match is found or determined, the Instruction Sets 526 correlated with the previously learned Digital Pictures 525 can be autonomously executed by Processor 11, 2D Computer Game 18*c*, and/or other processing element, thereby enabling autonomous operation of Avatar 180*c* in a similar visual surrounding as in a previously learned one. For instance, VSAOO Unit 100 may learn User 50-directed shield usage by Avatar 180*c* in a visual surrounding that includes Opponent 181 shooting at Avatar 180*c*. In the future, when visual surrounding that includes same or similar Opponent 181 shooting at Avatar 180*c* is encountered, or when same or similar Opponent 181 shooting at Avatar 180*c* is detected, VSAOO Unit 100 may implement the shield usage by Avatar 180*c* autonomously. One of ordinary skill in art will understand that the aforementioned functionalities described with respect to 2D Computer Game 18c can be implemented in any 2D Application Program 18 as applicable. One of ordinary skill in art will also understand that the features, functionalities, and embodiments described with respect to Avatar 180c can similarly be implemented by/with/on any Object 180 of Application Program 18 or by/with/on Application Program 18.

Figure 37:
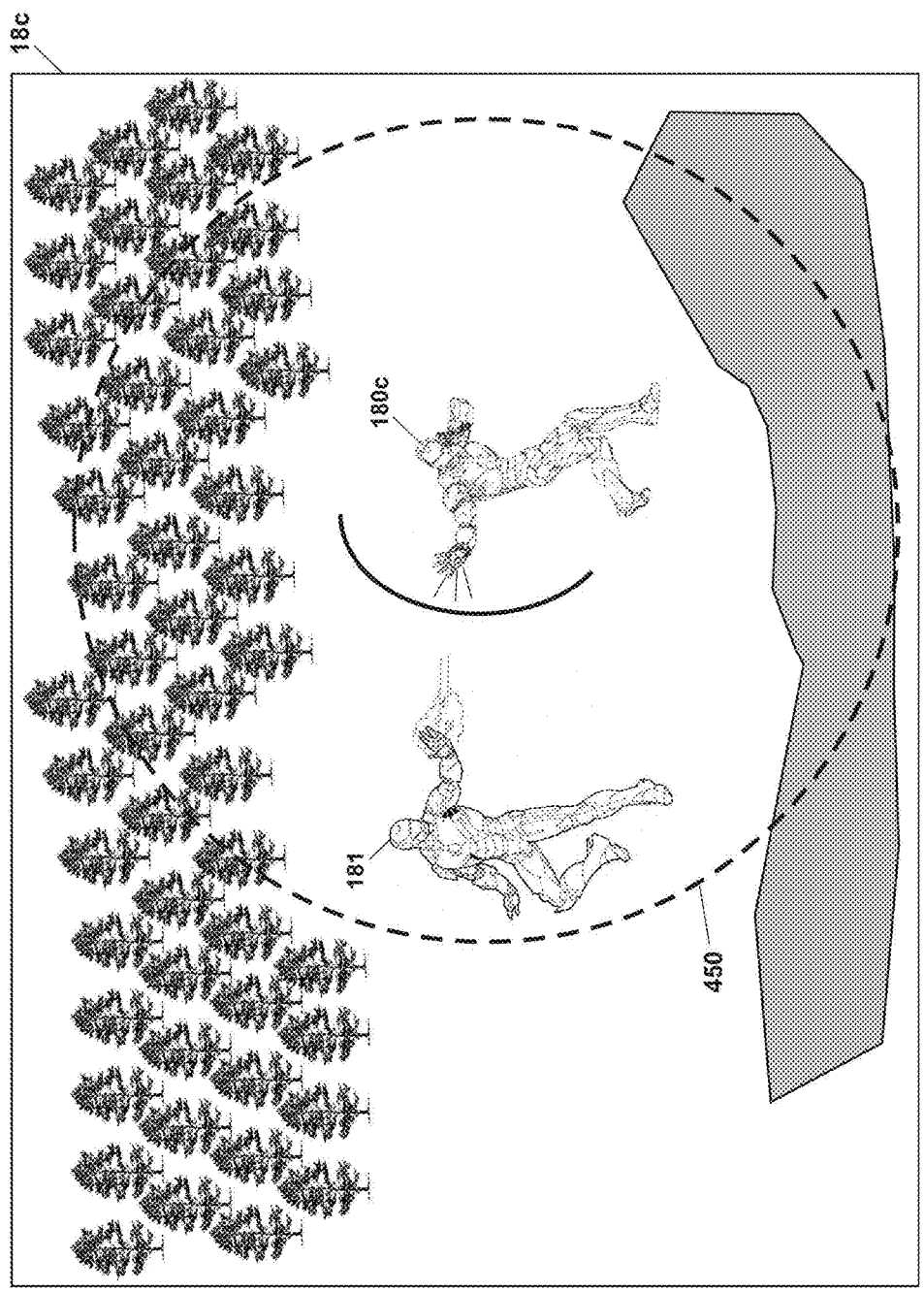
FIG. 37 illustrates an exemplary embodiment of utilizing Area of Interest 450 around Avatar 180c within 2D Computer Game 18c.

Referring to FIG. 37, in some exemplary embodiments related to the previously described exemplary embodiments, Renderer 91 and/or other element may render or generate one or more Digital Pictures 525 of Avatar's 180c Area of Interest 450. In one example, Area of Interest 450 may include a radial, circular, elliptical, or other such area around Avatar 180c. In another example, Area of Interest 450 may include a triangular, rectangular, octagonal or other such area around Avatar 180c. In a further example, Area of Interest 450 may include a spherical, cubical, pyramid-like or other such area around Avatar 180c as applicable to a 3D application (i.e. 3D computer game, 3D virtual world, etc.). Any other Area of Interest 450 shape can be utilized around Avatar 180c, around other object, or anywhere in an Application Program 18. Utilizing Area of Interest 450 enables VSAOO Unit 100 to focus on Avatar's 180c immediate surrounding, thereby avoiding extraneous detail in the rest of the surrounding. In some aspects, Area of Interest 450 can be subdivided into sub-areas (i.e. sub-circles, sub-rectangles, sub-spheres, etc.). Sub-areas can be used to classify the surrounding by distance from Avatar 180c. For example, the surrounding closer to Avatar 180c may be more important and may be assigned higher importance index or weight. Avatar 180c can scan its surrounding by utilizing Area of Interest 450 or detection area. As User 50 operates Avatar 180c in various visual surroundings as shown, VSAOO Unit 100 may learn Avatar's 180c operation in Area of Interest 450 by correlating Digital Pictures 525 of Avatar's 180c Area of Interest 450 with one or more Instruction Sets 526 used or executed by Processor 11, 2D Computer Game 18c, and/or other processing element. Any Extra Info 527 related to Avatar's 180c operation may also optionally be correlated with Digital Pictures 525 of Avatar's 180c Area of Interest 450. VSAOO Unit 100 may store this knowledge into Knowledgebase 530 (i.e. Neural Network 530a, Graph 530b, Collection of Sequences 530c, Sequence 533, Collection of Knowledge Cells 530d, etc.). In the future, VSAOO Unit 110 may compare incoming Digital Pictures 525 of Avatar's 180c Area of Interest 450 with previously learned Digital Pictures 525 including optionally using any Extra Info 527 for enhanced decision making. If substantially similar or at least a partial match is found or determined, the Instruction Sets 526 correlated with the previously learned Digital Pictures 525 can be autonomously executed by Processor 11, 2D Computer Game 18c, and/or other processing element, thereby enabling autonomous operation of Avatar 180c in a similar Area of Interest 450 as in a previously learned one. For instance, Computing Device 70 comprising VSAOO Unit 100 may learn User 50-directed shield usage by Avatar 180c in an Area of Interest 450 that includes Opponent 181 shooting at Avatar 180c. In the future, when Area of Interest 450 that includes same or similar Opponent 181 shooting at Avatar 180c is encountered, or when same or similar Opponent 181 shooting at Avatar 180c is detected in Area of Interest 450, Computing Device 70 may implement the shield usage by Avatar 180c autonomously.

Figure 38:
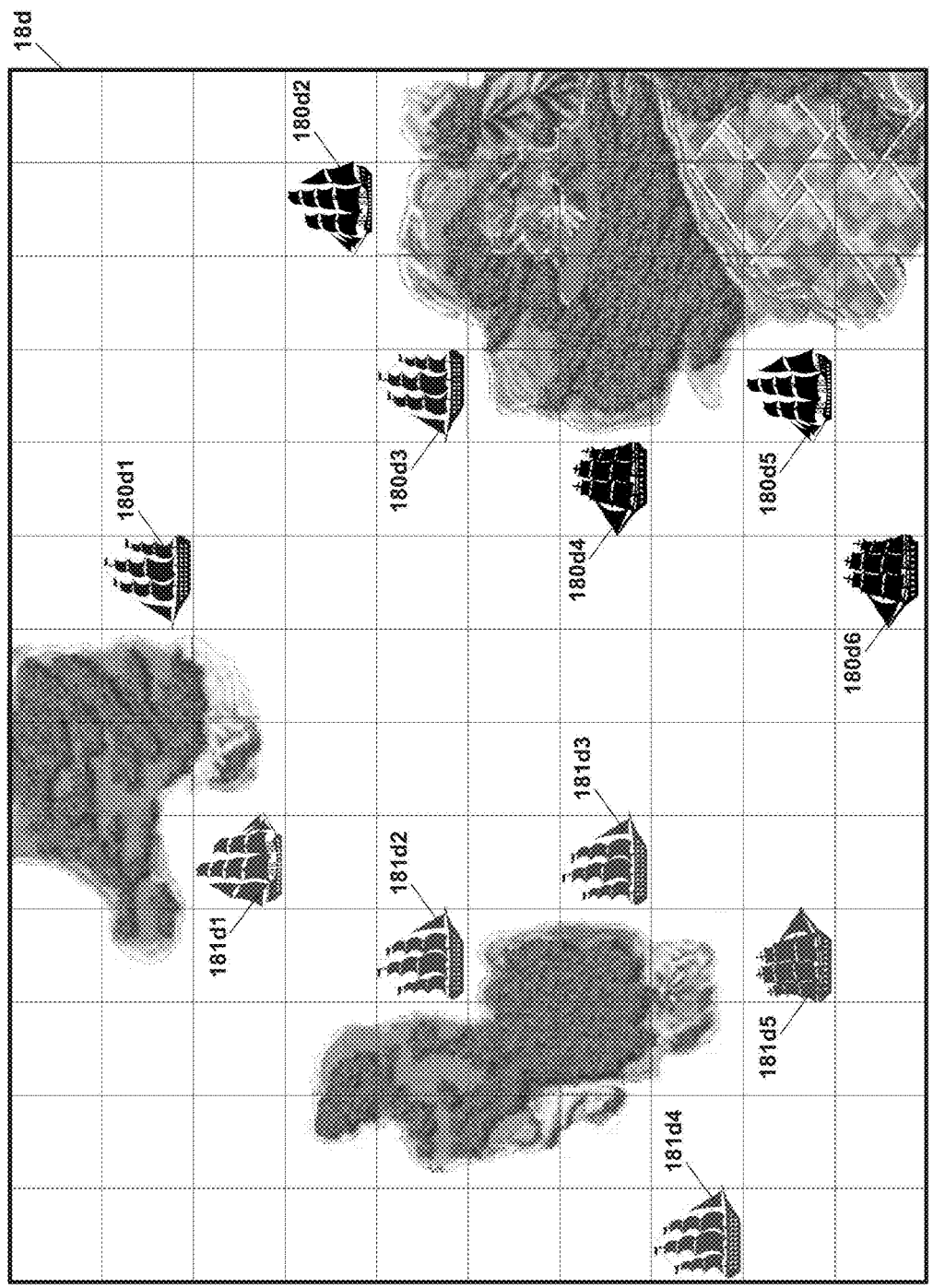
FIG. 38 illustrates an exemplary embodiment of 2D Computer Game 18d comprising multiple Objects 180 that User 50 can control or operate.

Referring to FIG. 38, in some exemplary embodiments, Application Program 18 may be or include a 2D Computer Game 18d comprising multiple Objects 180 that User 50 can control or operate. As multiple Objects 180 can perform operations in such an Application Program 18, a view of the Application Program 18 including multiple Objects 180 may be more relevant than a particular Object's 180 visual surrounding. Object 180 may be or include User Controllable Object 180d within 2D Computer Game 18d. Examples of User Controllable Object 180d include a ground, aquatic, or aerial vehicle, a creature, an avatar, and/or other object controllable by User 50. Examples of 2D Computer Game 18d include a strategy game, a board game, a tile-matching game, and/or others. Computing Device 70 may include Renderer 91 that renders or processes one or more Digital Pictures 525 of views of 2D Computer Game 18d. In some aspects, Digital Pictures 525 of views of 2D Computer Game 18d may include multiple User Controllable Objects 180d1-180d6, etc. as shown. User Controllable Objects 180d1-180d6, etc. may be controlled by Processor 11, 2D Computer Game 18d, and/or other processing element that receives User's 50 (i.e. game player's, etc.) operating directions and causes desired operations with User Controllable Objects 180d1-180d6, etc. such as moving, maneuvering, shooting, and/or other operations. User 50 can interact with Processor 11, 2D Computer Game 18d, and/or other processing element through inputting operating directions (i.e. manipulating game controller elements, pressing keyboard buttons, tilting a joystick, etc.) via Human-machine Interface 23 such as a game controller, keyboard, joystick, or other input device. For instance, responsive to User's 50 manipulating one or more game controller elements, Processor 11 or 2D Computer Game 18d may cause User Controllable Objects 180d1-180d6, etc. to move, maneuver, shoot, and/or perform other operations. Computing Device 70 may include or be coupled to VSAOO Unit 100. VSAOO Unit 100 may be embedded (i.e. integrated, etc.) into or coupled to Computing Device's 70 Processor 11 and/or other processing element. VSAOO Unit 100 may also be a program embedded (i.e. integrated, etc.) into or interfaced with 2D Computer Game 18d running on Processor 11 and/or other processing element. VSAOO Unit 100 can obtain Instruction Sets 526 used or executed by Processor 11, 2D Computer Game 18d, and/or other processing element. The obtained Instruction Sets 526 may be used or executed to operate User Controllable Objects 180d1-180d6, etc. In some aspects, Instruction Sets 526 may include one or more instruction sets from Computing Device's 70 Processor's 11 registers or other components. In other aspects, Instruction Sets 526 may include one or more instruction sets used or executed in 2D Computer Game 18d running on Processor 11 and/or other processing element. VSAOO Unit 100 may also optionally obtain any Extra Info 527 (i.e. time, location, computed, observed, acoustic, and/or other information, etc.) related to User Controllable Objects' 180d1-180d6, etc. operation. As User 50 operates User Controllable Objects 180d1-180d6, etc. related to various views as shown, VSAOO Unit 100 may learn User Controllable Objects' 180d1-180d6, etc. operation related to the views by correlating Digital Pictures 525 of views of 2D Application Program 18d with one or more Instruction Sets 526 used or executed by Processor 11, 2D Computer Game 18d, and/or other processing element. Any Extra Info 527 related to User Controllable Objects' 180d1-180d6, etc. operation may also optionally be correlated with Digital Pictures 525 of views of 2D Application Program 18d. VSAOO Unit 100 may store this knowledge into Knowledgebase 530 (i.e. Neural Network 530a, Graph 530b, Collection of Sequences 530c, Sequence 533, Collection of Knowledge Cells 530d, etc.). In the future, VSAOO Unit 110 may compare incoming Digital Pictures 525 of views of 2D Application Program 18*d* with previously learned Digital Pictures 525 including optionally using any Extra Info 527 for enhanced decision making. If substantially similar or at least a partial match is found or determined, the Instruction Sets 526 correlated with the previously learned Digital Pictures 525 can be autonomously executed by Processor 11, 2D Computer Game 18*d*, and/or other processing element, thereby enabling autonomous operation of User Controllable Objects 180*d*1-180*d*6, etc. and/or 2D Application Program 18*d* related to similar views as in previously learned ones. For instance, VSAOO Unit 100 may learn User 50-directed moving and shooting by User Controllable Objects 180*d*1-180*d*6, etc. related to one or more views that include Opponents 181*d*1-181*d*5, etc. In the future, when one or more views that include same or similar Opponents 181*d*1-181*d*5, etc. is encountered, or when same or similar Opponents 181*d*1-181*d*5, etc. are detected, VSAOO Unit 100 may implement the moving and shooting by User Controllable Objects 180*d*1-180*d*6, etc. autonomously. One of ordinary skill in art will understand that the aforementioned functionalities described with respect to 2D Computer Game 18*d* can be implemented in any Application Program 18 such as a virtual world, a web browser, a media application, a word processing application, a spreadsheet application, a database application, a GPS application, a forms-based application, a 2D application, a 3D application, an operating system, a factory automation application, a device control application, a vehicle control application, and/or other application or program as applicable. In such Application Programs 18, examples of Objects 180 that can be utilized include a text (i.e. character, word, sentence, etc.), a number, a picture, a form element (i.e. text field, radio button, push button, check box, etc.), a graphical user interface (GUI) element, a 2D shape (i.e. point, line, square, rectangle, circle, triangle, etc.), a 3D shape (i.e. cube, sphere, etc.), a 2D model, a 3D model, a data or database element, a spreadsheet element, a link, and/or others as applicable. One of ordinary skill in art will also understand that the features, functionalities, and embodiments described with respect to any one or more User Controllable Objects 180*d* can similarly be implemented by/with/on any Object 180 of Application Program 18 or by/with/on Application Program 18.

It must be noted that as used herein and in the appended claims, the singular forms "a", "an", and "the" include plural referents unless the context clearly dictates otherwise.

A number of embodiments have been described herein. While this disclosure contains many specific implementation details, these should not be construed as limitations on the scope of any inventions or of what may be claimed, but rather as descriptions of features specific to particular embodiments. It should be understood that various modifications can be made without departing from the spirit and scope of the invention. The logic flows depicted in the figures do not require the particular order shown, or sequential order, to achieve desirable results. In addition, other or additional steps, elements, or connections can be included, or some of the steps, elements, or connections can be eliminated, or a combination thereof can be utilized in the described flows, illustrations, or descriptions. Further, the various aspects of the disclosed devices, apparatuses, systems, and/or methods can be combined in whole or in part with each other to produce additional implementations. Moreover, separation of various components in the embodiments described herein should not be understood as requiring such separation in all embodiments, and it should be understood that the described components can generally be integrated together in a single software product or packaged into multiple software products. Accordingly, other embodiments are within the scope of the following claims.

The invention claimed is:

1. A system comprising:
one or more processor circuits;
a memory configured to store at least a first one or more digital pictures correlated with a first one or more instruction sets for operating a first application program;
a renderer configured to render digital pictures; and
an artificial intelligence unit configured to:
receive a new one or more digital pictures from the renderer;
anticipate the first one or more instruction sets for operating the first application program based on at least partial match between the new one or more digital pictures and the first one or more digital pictures, wherein the anticipate includes at least one of: determining that a number of at least partially matching portions of the new one or more digital pictures and portions of the first one or more digital pictures exceeds a threshold number, or determining that a percentage of at least partially matching portions of the new one or more digital pictures and portions of the first one or more digital pictures exceeds a threshold percentage; and
cause the one or more processor circuits to execute the first one or more instruction sets for operating the first application program, wherein the cause is performed in response to the anticipate, and wherein the first application program or a second application program autonomously performs one or more operations defined by the first one or more instruction sets for operating the first application program.

2. The system of claim 1, wherein the first one or more instruction sets for operating the first application program include one or more instruction sets for operating an object of the first application program, and wherein the first application program or the second application program autonomously performing the one or more operations defined by the first one or more instruction sets for operating the first application program includes the object or another object of the first application program or an object of the second application program autonomously performing one or more operations defined by the one or more instruction sets for operating the object of the first application program.

3. The system of claim 1, wherein the first one or more digital pictures depict at least a portion of a surrounding of an object of the first application program, and wherein the new one or more digital pictures depict: at least a portion of a surrounding of the object of the first application program, at least a portion of a surrounding of another object of the first application program, or at least a portion of a surrounding of an object of the second application program.

4. The system of claim 1, wherein the first application program includes: a computer game, a video game, a simulation program, a program including text processing, a program including number processing, a program including picture processing, a program including object processing, or a program, and wherein the second application program includes: a computer game, a video game, a simulation program, a program including text processing, a program including number processing, a program including picture processing, a program including object processing, or a program, and wherein the memory is further configured to store at least a second one or more digital pictures correlated with a second one or more instruction sets for operating the first application program.

5. The system of claim 1, wherein the cause the one or more processor circuits to execute the first one or more instruction sets for operating the first application program includes:
   instrumenting at least a portion of the first application program with the first one or more instruction sets for operating the first application program, or
   instrumenting at least a portion of the second application program with the first one or more instruction sets for operating the first application program.

6. The system of claim 1, wherein the new one or more digital pictures depict at least a portion of a view of the first application program, and wherein the first one or more instruction sets for operating the first application program are applied to the first application program so that the first application program autonomously performs the one or more operations defined by the first one or more instruction sets for operating the first application program.

7. The system of claim 1, wherein the new one or more digital pictures depict at least a portion of a view of the second application program, and wherein the first one or more instruction sets for operating the first application program are applied to the second application program so that the second application program autonomously performs the one or more operations defined by the first one or more instruction sets for operating the first application program.

8. The system of claim 1, wherein the memory is further configured to store at least a knowledge structure that includes:
   a first knowledge cell including the first one or more digital pictures correlated with the first one or more instruction sets for operating the first application program, and
   a second knowledge cell including a second one or more digital pictures correlated with a second one or more instruction sets for operating the first application program, and wherein the first knowledge cell is connected with the second knowledge cell by a directed connection that indicates a temporal order of the first knowledge cell and the second knowledge cell.

9. The system of claim 1, wherein the first one or more digital pictures include one or more still digital pictures or one or more motion digital pictures, and wherein the new one or more digital pictures include one or more still digital pictures or one or more motion digital pictures, and wherein the first application program includes an object of the first application program, and wherein the second application program includes an object of the second application program.

10. The system of claim 1, wherein the new one or more digital pictures depict at least a portion of a view of the second application program, and wherein the first one or more instruction sets for operating the first application program are modified and applied to the second application program so that the second application program autonomously performs the one or more operations defined by the modified first one or more instruction sets for operating the first application program.

11. The system of claim 1, wherein the portions of the new one or more digital pictures include portions of the new one or more digital pictures that depict recognized objects, and wherein the portions of the first one or more digital pictures include portions of the first one or more digital pictures that depict recognized objects.

12. The system of claim 1, wherein the artificial intelligence unit includes at least one of: a hardware element that is included in the one or more processor circuits, a hardware element that is included in another one or more processor circuits, an application operating on the one or more processor circuits, an application operating on another one or more processor circuits, or an element coupled to the one or more processor circuits, and wherein the renderer includes at least one of: a hardware element that is included in the one or more processor circuits, a hardware element that is included in another one or more processor circuits, an application operating on the one or more processor circuits, an application operating on another one or more processor circuits, an element that is included in the artificial intelligence unit, or an element coupled to the artificial intelligence unit, and wherein the memory is further configured to store at least a second one or more digital pictures correlated with a second one or more instruction sets for operating the second application program.

13. A non-transitory machine readable medium having stored thereon instructions that when executed by one or more processor circuits cause the one or more processor circuits to perform operations comprising:
   accessing a memory configured to store at least a first one or more digital pictures correlated with a first one or more instruction sets for operating a first application program;
   receiving a new one or more digital pictures from a renderer;
   anticipating the first one or more instruction sets for operating the first application program based on at least partial match between the new one or more digital pictures and the first one or more digital pictures, wherein the anticipating includes at least one of: determining that a number of at least partially matching portions of the new one or more digital pictures and portions of the first one or more digital pictures exceeds a threshold number, or determining that a percentage of at least partially matching portions of the new one or more digital pictures and portions of the first one or more digital pictures exceeds a threshold percentage; and
   causing the one or more processor circuits or another one or more processor circuits to execute the first one or more instruction sets for operating the first application program, wherein the causing is performed in response to the anticipating, and wherein the first application program or a second application program autonomously performs one or more operations defined by the first one or more instruction sets for operating the first application program.

14. The non-transitory machine readable medium of claim 13, wherein the memory is further configured to store at least a knowledge structure that includes:
   a first knowledge cell including the first one or more digital pictures correlated with the first one or more instruction sets for operating the first application program, and
   a second knowledge cell including a second one or more digital pictures correlated with a second one or more instruction sets for operating the first application program, and wherein the first knowledge cell is connected with the second knowledge cell by a directed connection that indicates a temporal order of the first knowledge cell and the second knowledge cell.

15. The non-transitory machine readable medium of claim 13, wherein the new one or more digital pictures depict at least a portion of a view of the second application program, and wherein the first one or more instruction sets for operating the first application program are applied to the second application program so that the second application program autonomously performs the one or more operations defined by the first one or more instruction sets for operating the first application program.

16. The non-transitory machine readable medium of claim 13, wherein the new one or more digital pictures depict at least a portion of a view of the second application program, and wherein the first one or more instruction sets for operating the first application program are modified and applied to the second application program so that the second application program autonomously performs the one or more operations defined by the modified first one or more instruction sets for operating the first application program.

17. A method comprising:
   (a) accessing a memory configured to store at least a first one or more digital pictures correlated with a first one or more instruction sets for operating a first application program, the accessing of (a) performed by one or more processor circuits;
   (b) receiving a new one or more digital pictures from a renderer, the receiving of (b) performed by the one or more processor circuits;
   (c) anticipating the first one or more instruction sets for operating the first application program based on at least partial match between the new one or more digital pictures and the first one or more digital pictures, wherein the anticipating of (c) includes at least one of: determining that a number of at least partially matching portions of the new one or more digital pictures and portions of the first one or more digital pictures exceeds a threshold number, or determining that a percentage of at least partially matching portions of the new one or more digital pictures and portions of the first one or more digital pictures exceeds a threshold percentage, the anticipating of (c) performed by the one or more processor circuits;
   (d) executing the first one or more instruction sets for operating the first application program, the executing of (d) performed by the one or more processor circuits or by another one or more processor circuits in response to the anticipating of (c); and
   (e) autonomously performing, by the first application program or by a second application program, one or more operations defined by the first one or more instruction sets for operating the first application program.

18. The method of claim 17, wherein the memory is further configured to store at least a knowledge structure that includes:
   a first knowledge cell including the first one or more digital pictures correlated with the first one or more instruction sets for operating the first application program, and
   a second knowledge cell including a second one or more digital pictures correlated with a second one or more instruction sets for operating the first application program, and wherein the first knowledge cell is connected with the second knowledge cell by a directed connection that indicates a temporal order of the first knowledge cell and the second knowledge cell.

19. The method of claim 17, wherein the new one or more digital pictures depict at least a portion of a view of the second application program, and wherein the first one or more instruction sets for operating the first application program are applied to the second application program so that the second application program autonomously performs the one or more operations defined by the first one or more instruction sets for operating the first application program.

20. The method claim 17, wherein the new one or more digital pictures depict at least a portion of a view of the second application program, and wherein the first one or more instruction sets for operating the first application program are modified and applied to the second application program so that the second application program autonomously performs the one or more operations defined by the modified first one or more instruction sets for operating the first application program.

* * * * *